US007340753B2

(12) United States Patent
Inata et al.

(10) Patent No.: US 7,340,753 B2
(45) Date of Patent: Mar. 4, 2008

(54) DISK DRIVE

(75) Inventors: Masahiro Inata, Itami (JP); Kozo Ezawa, Hirakata (JP); Yoshito Saji, Ashiya (JP); Teruyuki Takizawa, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 384 days.

(21) Appl. No.: 10/533,048

(22) PCT Filed: Oct. 30, 2003

(86) PCT No.: PCT/JP03/13965

§ 371 (c)(1),
(2), (4) Date: Apr. 28, 2005

(87) PCT Pub. No.: WO2004/040569

PCT Pub. Date: May 13, 2004

(65) Prior Publication Data

US 2006/0020954 A1    Jan. 26, 2006

(30) Foreign Application Priority Data

Nov. 1, 2002  (JP) .............................. 2002-320201
Aug. 7, 2003  (JP) .............................. 2003-289287

(51) Int. Cl.
*G11B 17/03* (2006.01)
*G11B 23/03* (2006.01)
*G11B 17/04* (2006.01)
(52) U.S. Cl. .................................. 720/643; 720/742
(58) Field of Classification Search ................ 720/601, 720/607, 616, 643, 644, 742
See application file for complete search history.

(56) References Cited

U.S. PATENT DOCUMENTS

| 6,477,138 | B1* | 11/2002 | Cho et al. ................... 720/742 |
| 7,111,313 | B2* | 9/2006 | Kurosawa et al. .......... 720/742 |
| 2001/0046104 | A1 | 11/2001 | Inoue et al. |
| 2002/0031080 | A1 | 3/2002 | Inoue |
| 2003/0053409 | A1 | 3/2003 | Okazawa et al. |
| 2004/0052167 | A1 | 3/2004 | Tsutsumi et al. |
| 2005/0229194 | A1* | 10/2005 | Kawaguchi et al. ........ 720/630 |

FOREIGN PATENT DOCUMENTS

| EP | 1 274 082 A2 | 1/2003 |
| JP | 09-153264 A | 6/1997 |
| JP | 03091178 A * | 4/1999 |

* cited by examiner

*Primary Examiner*—William J Klimowicz
(74) *Attorney, Agent, or Firm*—Panitch Schwarze Belisario & Nadel LLP

(57) ABSTRACT

A disk drive is adapted to a disk cartridge having a rotational member and a shutter interlocked with the rotational member. The drive includes a transporting portion for transporting the cartridge and a shutter driving mechanism, which includes a rack portion engaging with a gear portion of the rotational member, and first and second driving levers supported to fit into, and turn with, first and second notched portions of the rotational member, respectively. The transporting portion includes a first cam structure for driving the first and second driving levers of the shutter driving mechanism such that the levers swing as the transporting portion moves. As the transporting portion moves, the first and second notched portions and the gear portion of the disk cartridge held on the transporting portion get engaged with the shutter driving mechanism, which then rotates the rotational member to open or close the shutter.

27 Claims, 83 Drawing Sheets

DISK DRIVE

CROSS-REFERENCE TO RELATED APPLICATIONS

This application is a Section 371 of International Application No. PCT/JP2003/013965, filed Oct. 30, 2003, which was published in the Japanese language on May 13, 2004, under International Publication No. WO 2004/040569 A1, the disclosure of which is incorporated herein by reference.

BACKGROUND OF THE INVENTION

The present invention relates to a disk drive for reading and/or writing data from/on a disklike data storage medium such as an optical disc or a magnetic disk, which is stored in a cartridge type container.

Disklike data storage media are used extensively to store software or data for computer-related equipment, music, video and various other types of information thereon. Data may be read or written with a light beam or magnetism. Examples of data storage media using a light beam include CDs and DVDs. A floppy disk has been known as a data storage medium that used magnetism. Furthermore, some data storage media such as MOs and MDs use both a light beam and magnetism alike.

Among other things, a data storage medium of the type allowing the user to rewrite data is housed in a cartridge type storage case to protect the data stored there.

Japanese Patent Application Laid-Open Publication No. 9-153264 discloses such a cartridge type storage case (which will be referred to herein as a "disk cartridge"). As shown in FIG. 63, the disk cartridge 100 includes a cartridge body 101 to store a readable and/or rewritable disk 10. The cartridge body 101 has a window 101w on the upper and lower surfaces thereof so as to allow a drive mechanism (such as a spindle motor) for rotating the disk 10 and a read/write head to enter the cartridge body 101 and access the disk 10.

The disk cartridge 100 further includes a shutter 103 with a square bottom and a C-cross section in order to cover the window 101w on the upper and lower surfaces of the cartridge body 101 and to protect the side of the disk 10 exposed through the window 101w.

As shown in FIG. 63, the shutter 103 is movable in the direction pointed by the arrow P. A spring (not shown) applies elastic force to the shutter 103 so as to make the shutter 103 shut the window 101w. Particularly when no external force is applied, the shutter 103 shuts the window 101w so as not to expose the disk 10.

In reading or writing data from/on the disk cartridge 100 using a disk drive (not shown), a shutter opener 104, provided for the disk drive, is used. Specifically, the protrusion 104a of the shutter opener 104 is fitted with a notched portion 103a of the shutter 103, and the disk cartridge 100 is pushed deeply into the disk drive in the direction pointed by the arrow Q. As a result, the shutter opener 104 turns around the center of rotation 104b in the direction pointed by the arrow R, thereby shifting the shutter 103 in the direction pointed by the arrow P. In this manner, the shutter 103 can be opened.

The shutter 103 of the disk cartridge 100 has a square bottom and a C-cross section as described above. However, it is usually difficult to make a shutter in such a shape. Also, to make the shutter slide smoothly, the shutter needs to be shaped with high precision. As a result, the cost of this part rises and eventually the cost of the disk cartridge 100 itself goes up, too.

Also, the shutter 103 with such a structure easily leaves a gap between the shutter 103 and the cartridge body 101 even while the window 101w on the upper and lower surfaces of the cartridge body 101 is closed. Thus, it is difficult to effectively prevent dust or dirt from entering the disk cartridge 100. Consequently, errors are more likely to happen while data is being read or written from/on the disk 10.

As a disk cartridge having a structure that can overcome these problems, Japanese Patent Application Laid-Open Publication No. 2002-50148 discloses a disk cartridge having a structure in which the window is opened or closed with a plurality of planar shutters. FIG. 64 is a perspective view of such a cartridge 200. FIG. 65 is an exploded perspective view illustrating the respective members of the cartridge 200.

The disk cartridge 200 includes a cartridge body 210 consisting of an upper shell 211 and a lower shell 212. The lower shell 212 has a window 212w on its lower surface so as to allow a drive mechanism (such as a spindle motor) for rotating the disk 10 and a read/write head to enter the cartridge body 210 and access the disk 10. On the outer surface of the lower shell 212, provided are positioning holes 215a and 215b for positioning the disk cartridge 200 on a plane parallel to the disk 10 within a disk drive (not shown) and a notch 212t for preventing the user from inserting the disk cartridge 200 upside down. On the inner surface of the lower shell 212, a first link spindle 212a and a second link spindle 212b are provided. As shown in FIG. 65, a window 212g for exposing a part of the outer periphery of a rotational member 230 (to be described later) is provided on a side surface of the lower shell 212. Two guide portions 212G and 212H are provided on both ends of the window 212g.

In the cartridge body 210, provided are a shutter pair 220 for shutting the window 212w, a rotational member 230 that rotates around a point substantially matching the center of the disk 10, and a locking member 225. The shutter pair 220 consists of a first shutter 221 and a second shutter 222.

The rotational member 230 has a disk shape and also has a window 230w, which is positioned and shaped so as to completely match the window 212w when the shutter pair 220 is fully opened. Also, on the side surface of this rotational member 230, a first notched portion 231, a second notched portion 232 and a gear portion 233 located between the two notched portions 231 and 232 are provided so as to rotate and drive the rotational member 230 externally. On the lower surface of the rotational member 230 opposed to the shutter pair 220, rotation spindles 230a and 230b are provided for the first and second shutters 221 and 222, respectively.

The first shutter 221 has a rotation center hole 221a and a link groove 221b to which the rotation spindle 230a and the first link spindle 212a are respectively inserted, while the second shutter 222 has a rotation center hole 222a and a link groove 222b to which the rotation spindle 230b and the second link spindle 212b are respectively inserted. Thus, the first and second shutters 221 and 222 turn on the rotation spindles 230a and 230b, respectively.

The locking member 225 is supported in a rotatable position on a rotation shaft 212c provided for the lower shell 212. While the window 212w is closed, the convex portion 225a of the locking member 225 fits into the second notched portion 232 of the rotational member 230, thereby locking the rotational member 230 and keeping it from rotating.

In this disk cartridge 200, the upper shell 211 covers the entire upper surface of the disk 10, and therefore, a damper 240 is provided inside to clamp the disk 10 thereon.

Next, it will be described with reference to FIGS. 66 through 68 how the shutter pair 220 of the disk cartridge 200 carries out its opening/closing operation. FIGS. 66, 67 and 68 respectively illustrate a fully closed state, an opening state, and a fully opened state of the shutter pair 220.

As shown in FIG. 66, if the operating portion 225b of the locking member 225 is pressed in the direction pointed by the arrow P, then the locking member 225 turns on the rotation shaft 212c in the direction pointed by the arrow 225A. As a result, the convex portion 225a of the locking member 225 is disengaged from the second notched portion 232 of the rotational member 230, thereby getting the rotational member 230 ready to rotate. If the rotational member 230 is rotated in the direction pointed by the arrow S after having been unlocked with the operating portion 225b pressed, then the first and second rotation spindles 230a and 230b rotate in the directions pointed by the arrows T1 and U1, respectively. As a result, the rotation center holes 221a and 222a of the first and second shutters 221 and 222 also rotate in those directions. In addition, the link grooves 221b and 222b slide along the first and second link spindles 212a and 212b in the directions pointed by the arrows T2 and U2, respectively.

If the rotational member 230 is kept being rotated in the direction pointed by the arrow S, then the first and second shutters 221 and 222 move in the directions pointed by the arrows T2 and U2, respectively, while rotating around their rotation center holes 221a and 222a in the directions pointed by the arrows T1 and U1, respectively, as shown in FIG. 67. As a result, the shutter pair 220 is fully opened as shown in FIG. 68. Then, the window 212w of the lower shell 212 substantially matches the window 230w of the rotational member 230. Consequently, a drive mechanism (such as a spindle motor) for rotating and driving the disk 10 and a read/write head can now enter the cartridge body 210 and access the disk 10 stored in the disk cartridge 200.

The window 212w may be shut by performing the opposite of the opening operation described above, i.e., by rotating the rotational member 230 in the direction pointed by the arrow S'. As shown in FIG. 66, when the shutter pair 220 is closed to shut the window 212w fully, the locking member 225 is turned on its rotation shaft 212c in the direction pointed by the arrow 225A' by the elastic portion 225c provided for the locking member 225 itself, thereby getting the convex portion 225a of the locking member 225 fitted with the second notched portion 232 of the rotational member 230 again. In this manner, the rotational member 230 is locked so as not to rotate and the shutter closing operation is finished.

As described above, since the link grooves 221b and 222b of the first and second shutters 221 and 222 are fitted with the first and second link spindles 212a and 212b of the lower shell 212, respectively, the rotational member 230 cannot rotate freely, but only to a predetermined degree, between the opened and closed states of the shutter pair 220. No matter to what degree the rotational member 230 has rotated with respect to the cartridge body 210, at least one of the first and second notched portions 231 and 232 and the gear portion 233 is exposed through the window 212g provided on the side surface of the cartridge body 210. For that reason, by rotating the rotational member 230 such that at least one of the first and second notched portions 231 and 232 and the gear portion 233 is engaged, the shutter pair 220 can be operated no matter in what state the shutter pair 220 is.

To stabilize the operation of the shutter pair in the disk cartridge 220, the disk cartridge needs to be held firmly. One of the easiest and safest ways to fill this need is to provide holding members 210a and 210b for the disk drive as shown in FIGS. 66 through 68 for the purpose of gripping the cartridge body 210 (of which only the lower shell 212 is shown in these drawings) on the side surfaces thereof.

As shown in FIGS. 69 and 70, Japanese Patent Application Laid-Open Publication No. 2002-50148 discloses a rack bar 250, including a first fitting convex portion 251, a gear portion 253 and a second fitting convex portion 252, which are arranged in line, as a means for rotating the rotational member 230. The first fitting convex portion 251, gear portion 253 and second fitting convex portion 252 respectively fit with a first notched portion 231, a gear portion 233 and a second notched portion 232 provided on the side surface of the rotational member 230. A side surface portion 231a with the first notched portion 231 is as high as the addendum plane of the gear portion 233. On the other hand, a side surface portion 232a with the second notched portion 232 is also as high as the addendum plane of the gear portion 233.

In opening or closing a shutter pair 220, the rack bar 250 is slid from the location shown in FIG. 69 to that shown in FIG. 70 in the direction pointed by the arrow 250A (i.e., substantially parallel to the side surface of the disk cartridge 200), thereby rotating the rotational member 230 as described above.

However, in order to slide such an integrally molded rack bar 250 along the side surface of the disk cartridge 200, a space needs to be provided near the side surface of the disk cartridge 200 to allow the rack bar 250 to shift with respect to the disk cartridge 200.

As a result, a holding member 210a for holding the disk cartridge 200 firmly interferes with the shifting space of the rack bar 250. Thus, if a sufficient space were allowed the rack bar 250 to shift freely, then the disk cartridge 200 could not be held firmly with the holding member 210a anymore, which is a problem.

Also, if the rack bar 250 is an integrally molded member, then the rack bar 250 and the rotational member 230 are interlocked together by utilizing the elasticity of the resin that makes the rack bar 250. Accordingly, the elasticity of the rack bar 250 may not be controllable appropriately. In that case, the rack bar 250 may not engage or disengage itself with/from the outer surface of the disk cartridge 200 smoothly enough. Or after having gone through a number of opening and closing operations, the rack bar 250 may be deformed plastically and may not be interlocked with the rotational member 230 perfectly anymore.

BRIEF SUMMARY OF THE INVENTION

In order to overcome the problems described above, an object of the present invention is to provide a disk drive, which is adapted to a disk cartridge that opens and closes its shutters by rotating a rotational member and which can contribute to opening and closing the shutters with good stability and more certainty by using a simple mechanism.

A disk drive according to the present invention is adapted for use with a disk cartridge including: a disk; a body to store the disk therein; a window, which is provided for the body to allow a head to access the disk to read and/or write data from/on the disk; a shutter for opening or shutting the window; and a rotational member, which includes a gear portion and first and second notched portions to sandwich the gear portion and which interlocks with the shutter. The disk drive includes: a motor for spinning the disk; a transporting portion for holding and transporting the disk cartridge between a position where the motor is ready to spin the disk and a position where the disk cartridge is loaded into, or unloaded from, the disk drive; the head for reading and/or writing the data; and a shutter driving mechanism, which includes a rack portion that engages with the gear portion, and first and second driving levers that are supported to fit into, and turn with, the first and second notched portions, respectively. The transporting portion includes a first cam structure for driving the first and second driving levers of the shutter driving mechanism such that the first and second driving levers swing as the transporting portion moves. As the transporting portion moves, the first and second notched portions and the gear portion of the disk cartridge held on the transporting portion get engaged with the shutter driving mechanism, which then rotates the rotational member so as to open or close the shutter.

In one preferred embodiment, the first and second driving levers are supported in rotatable positions on the rack portion.

In another preferred embodiment, the first and second driving levers include fitting portions to fit into the first and second notched portions, respectively, and the shutter driving mechanism applies elastic force to the first and second driving levers such that the fitting portions of the first and second driving levers are pressed toward the transporting portion.

In another preferred embodiment, the shutter driving mechanism further includes: a base portion for supporting the rack portion such that the rack portion is movable perpendicularly to the direction in which the transporting portion is transported; and a second force applying structure for applying an elastic force to the rack portion toward the transporting portion.

In another preferred embodiment, the transporting portion includes a second cam structure for driving the rack portion perpendicularly to the transporting direction.

In another preferred embodiment, the transporting portion has a side surface that is opposed to the shutter driving mechanism and that includes the first and second cam structures thereon.

In another preferred embodiment, the transporting portion has a guide wall for holding the disk cartridge at a predetermined position.

In another preferred embodiment, the first cam structure contacts with the first and second driving levers.

In another preferred embodiment, the second cam structure has a second guide surface that contacts with the rack portion.

In another preferred embodiment, the transporting portion has a side surface opposed to the shutter driving mechanism, and the first and second guide surfaces are provided parallel to each other on the side surface of the transporting portion.

In another preferred embodiment, the first cam structure drives the first and second driving levers such that the fitting portions of the first and second driving levers fit with only the first and second notched portions without contacting with any other portion of the side surface of the disk cartridge.

In another preferred embodiment, the shutter driving mechanism includes a guide rib for guiding the transporting portion.

In another preferred embodiment, the guide rib may be provided for the rack portion.

In an alternative preferred embodiment, the guide rib may be provided for the base portion.

In another preferred embodiment, a pitch as measured from the second notched portion of the rotational member to either a tooth or a groove, which is located at one end of the gear portion closest to the second notched portion, is equal to a pitch as measured from the fitting portion of the second driving lever to either a groove or a tooth, which is located at one end of the rack portion closest to the second driving lever.

In another preferred embodiment, a pitch as measured from the second notched portion of the rotational member to either a tooth or a groove, which is located at one end of the gear portion closest to the second notched portion, is longer by one tooth than a pitch as measured from the fitting portion of the second driving lever to either a groove or a tooth, which is located at one end of the rack portion closest to the second driving lever.

In another preferred embodiment, the first and second driving levers are arranged in the shutter driving mechanism, and one tooth of the rack portion, which is located closest to the second lever, is chamfered, such that as the shutter of the disk cartridge is going to be closed, the second lever gets interlocked with the rotational member of the disk cartridge earlier than the first lever.

In another preferred embodiment, the force applied by the second force applying structure is greater than that applied by the first force applying structure.

In another preferred embodiment, the first cam structure drives the first and second driving levers such that as the transporting portion is going to load the disk cartridge into the disk drive, the first driving lever, the rack portion and the second driving lever contact with the rotational member of the disk cartridge in this order.

In another preferred embodiment, the first cam structure drives the first and second driving levers, and the second cam structure drives the rack portion, such that as the transporting portion is going to load the disk cartridge into the disk drive, the first driving lever, the rack portion and the second driving lever contact with the rotational member of the disk cartridge in this order.

In another preferred embodiment, while the transporting portion is unloading the disk cartridge from the disk drive, the rack portion is able to engage with the gear portion at least in first and second positions, and no matter whether the rack portion has engaged with the gear portion in the first position or the second position, the shutter is closable.

In another preferred embodiment, after the shutter of the disk cartridge has been opened, the first and second driving levers are driven so as to avoid contact with the disk cartridge.

In another preferred embodiment, after the shutter of the disk cartridge has been opened, the rack portion is driven so as to avoid contact with the disk cartridge.

In another preferred embodiment, after the shutter of the disk cartridge has been either opened or closed, the transporting portion moves a predetermined distance.

In another preferred embodiment, the transporting portion has a recess on which another disk cartridge, having a different shape from that of the disk cartridge, is mountable.

In another preferred embodiment, the disk cartridge includes a locking member for keeping the rotational member from rotating, and the first cam structure drives the first and second driving levers such that the first and second driving levers avoid contact with the locking member.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 6A is a plan view showing a state of the shutter driving mechanism during its opening or closing operation in a situation where the disk cartridge has been inserted into the disk drive with its shutter pair fully closed, while

FIG. 8A is a plan view showing a state of the shutter driving mechanism during its opening or closing operation in a situation where the disk cartridge has been inserted into the disk drive with its shutter pair fully closed, while

FIG. 9A is a plan view showing a state of the shutter driving mechanism during its opening or closing operation in a situation where the disk cartridge has been inserted into the disk drive with its shutter pair fully closed, while

FIG. 11A is a plan view showing a state of the shutter driving mechanism during its opening or closing operation in a situation where the disk cartridge has been inserted into the disk drive with its shutter pair fully closed, while

FIG. 12A is a plan view showing a state of the shutter driving mechanism during its opening or closing operation in a situation where the disk cartridge has been inserted into the disk drive with its shutter pair fully closed, while

FIG. 14A is a plan view showing a state of the shutter driving mechanism during its opening or closing operation in a situation where the disk cartridge has been inserted into the disk drive with its shutter pair fully closed, while

FIG. 33A is a plan view showing a state of the shutter driving mechanism during its opening or closing operation in a situation where the disk cartridge has been inserted into the disk drive with its shutter pair fully closed, while

FIG. 35A is a plan view showing a state of the shutter driving mechanism during its opening or closing operation in a situation where the disk cartridge has been inserted into the disk drive with its shutter pair fully closed, while

FIG. 36A is a plan view showing a state of the shutter driving mechanism during its opening or closing operation in a situation where the disk cartridge has been inserted into the disk drive with its shutter pair fully closed, while

FIG. 37A is a plan view showing a state of the shutter driving mechanism during its opening or closing operation in a situation where the disk cartridge has been inserted into the disk drive with its shutter pair fully closed, while

FIG. 38A is a plan view showing a state of the shutter driving mechanism during its opening or closing operation in a situation where the disk cartridge has been inserted into the disk drive with its shutter pair fully closed, while

FIG. 40A is a plan view showing a state of the shutter driving mechanism during its opening or closing operation in a situation where the disk cartridge has been inserted into the disk drive with its shutter pair fully closed, while

DETAILED DESCRIPTION OF THE INVENTION

Figure 1:
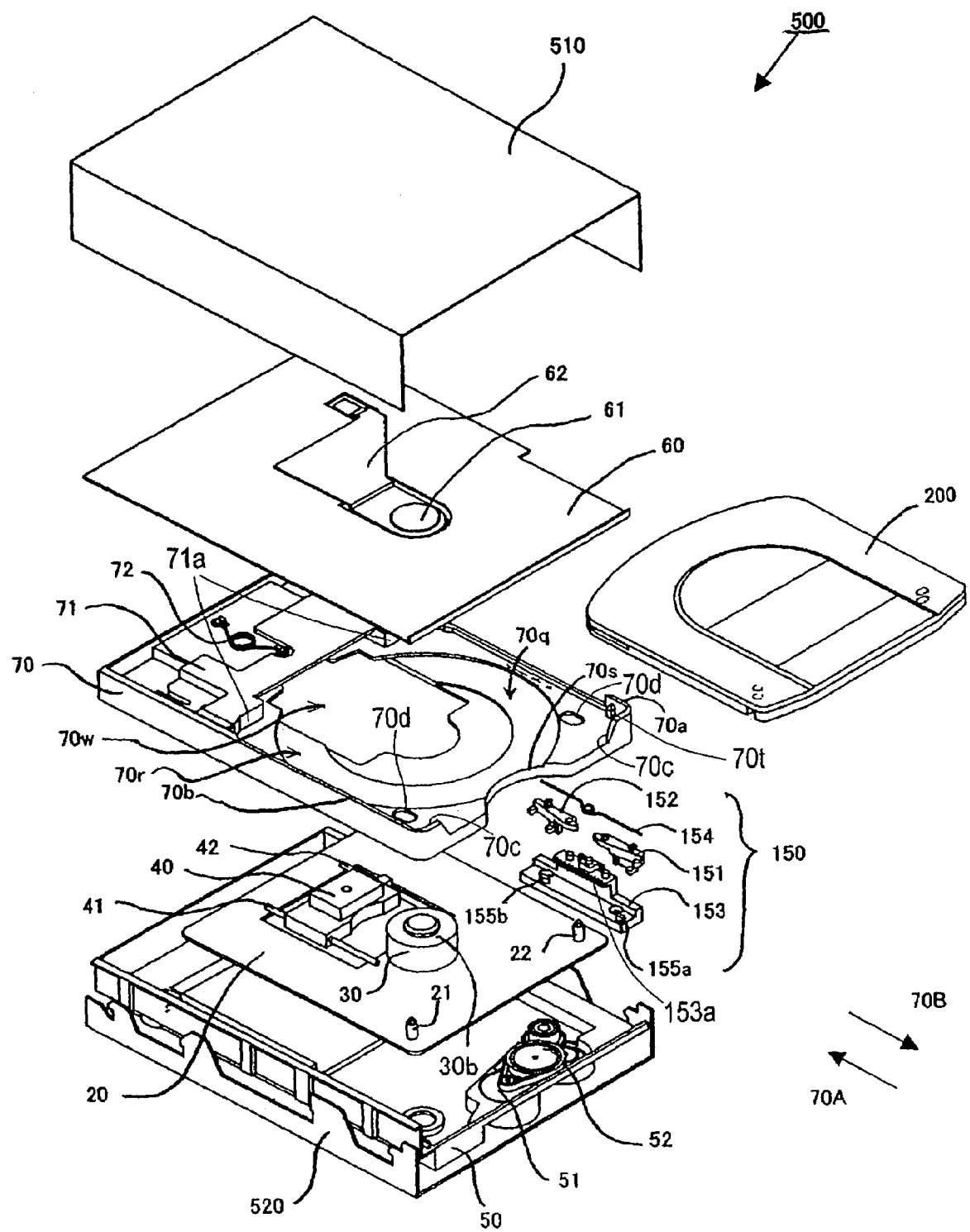
FIG. 1 is an exploded perspective view illustrating a configuration for a disk drive according to a first preferred embodiment of the present invention.

A disk drive according to the present invention is adapted for use with the disk cartridge 200 that has already been described with reference to FIGS. 64 through 68. When loaded with the disk cartridge 200, the disk drive can read or write data from/on the disk 10 that is stored in the disk cartridge 200. Since the structure of the disk cartridge 200 has already been described, the respective members of the disk cartridge 200 will be identified by the same reference numerals as those used in FIGS. 64 through 68 and the detailed description of its structure will be omitted herein.

However, the disk cartridge to which the disk drive of the present invention can be applied is not limited the disk cartridge 200. Rather the present invention is broadly applicable for use with any disk cartridge if the disk cartridge includes a disk on which data can be stored or has already been stored, a body to store the disk therein, a window provided for the body to allow a read/write head to access the disk, a shutter for opening or shutting the window, and a rotational member for opening and closing the shutter, and if the disk cartridge opens and closes the shutter by rotating the rotational member. In any case, the outer periphery of the rotational member preferably includes a gear portion and first and second notched portions. The disk drive of the present invention can also be used effectively for the disk cartridge 300 shown in FIGS. 71 and 72, for example. The disk cartridge 300 is disclosed in PCT International Patent Application Publication No. WO 03/041076.

Figure 71:
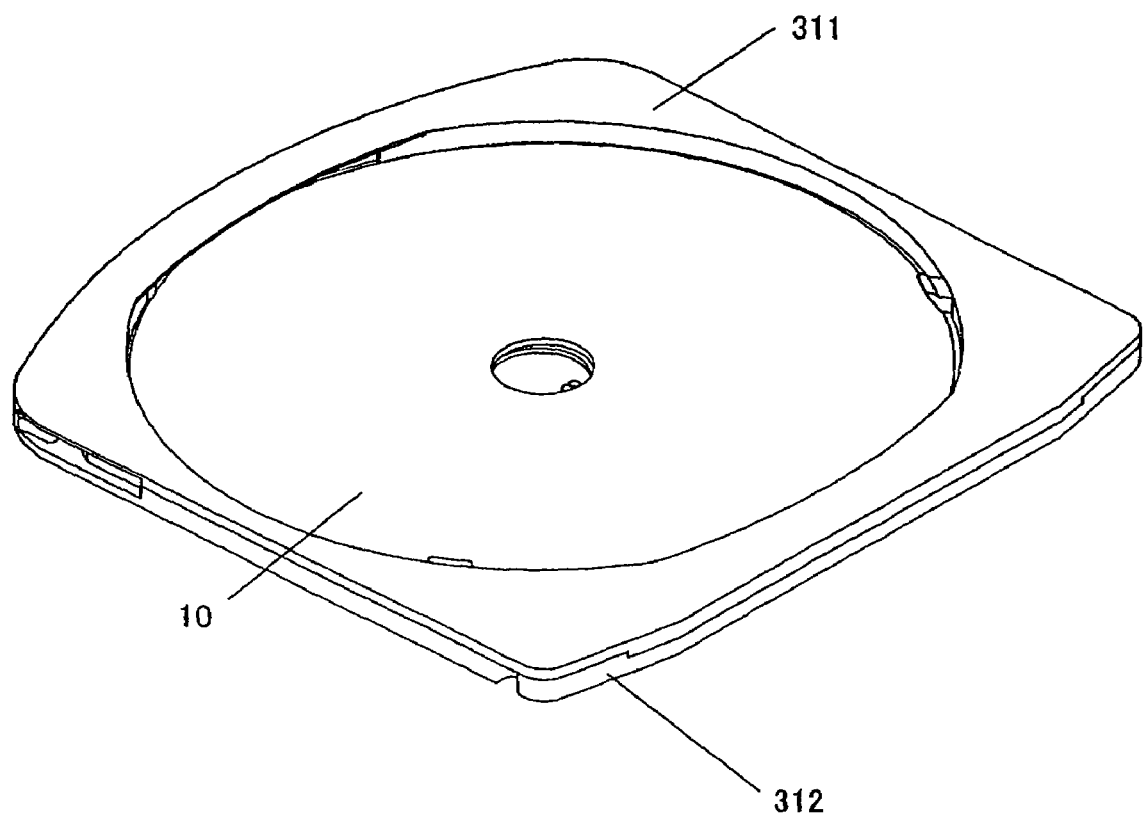
FIG. 71 is a perspective view illustrating another disk cartridge for use in the present invention.
Figure 72:
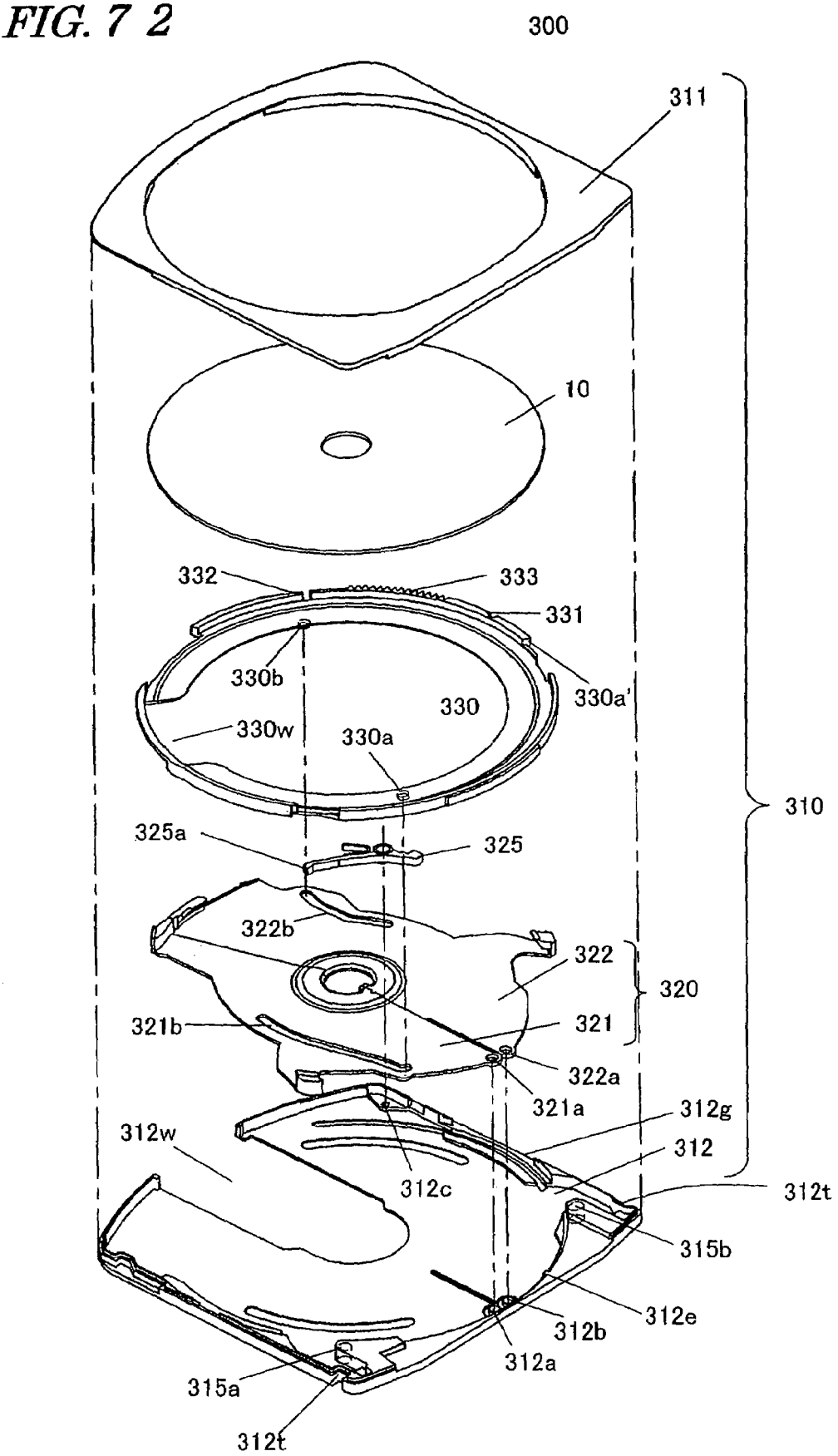
FIG. 72 is a perspective view illustrating still another disk cartridge for use in the present invention.

As shown in FIGS. 71 and 72, the disk cartridge 300 includes a body 310 consisting of an upper shell 311 and a lower shell 312, a disk 10 stored in the cartridge body 310, a window 312w provided through the lower shell 312, a shutter pair 320 for opening or shutting the window 312w with respect to an external device, and a rotational member 330.

As shown in these drawings, the upper shell 311 has a window that exposes one side of the disk 10 almost entirely. Accordingly, while the disk 10 is stored in the cartridge body 310, one side of the disk 10, e.g., the label side thereof, is exposed through the window of the upper shell 311. On the inner surface of the lower shell 312, rotation spindles 312a and 312b, functioning as the axes of rotation for the shutter pair, are provided. Also, on the outer surface of the lower shell 312, positioning holes 315a and 315b are provided. Another window 312g is further provided on a side surface of the cartridge body 310.

The shutter pair 320 consists of a first shutter 321 and a second shutter 322. The first and second shutters 321 and 322 have guide grooves 321b and 322b and rotation holes 321a and 322a to which the rotation spindles 312a and 312b are respectively inserted.

The rotational member 330 includes a flat ringlike portion and a cylindrical side surface provided to surround the ringlike portion. On the lower surface of the ringlike portion, which is opposed to the shutter pair 320, link spindles 330a and 330b are provided so as to be inserted into the guide grooves 321b and 322b, respectively. The ringlike portion further has a notched portion 330w. In addition, on its side surface, provided are a first notched portion 331, a second notched portion 332 and a gear portion 333, sandwiched between the first and second notched portions 331 and 332.

The disk cartridge 300 further includes a locking member 325, which is supported so as to turn on a spindle 312c. The locking member 325 has a convex portion 325a. While the shutter pair 320 is closed, the convex portion 325a fits into the second notched portion 332, thereby keeping the rotational member 330 from rotating.

The rotational member 330 interlocks with the shutter pair 320 by fitting its link spindles 330a and 330b with the guide grooves 321b and 322b, respectively. By rotating the rotational member 330, it is possible to make the shutter pair 320 shut or open the window 312w. The shutter pair 320, interlocking with the rotational member 330, is supported on the rotation spindles 312a and 312b. Accordingly, the rotational member 330 cannot rotate freely, but only to a predetermined degree, between the opened and closed states of the shutter pair. No matter to what degree the rotational member 330 has rotated with respect to the cartridge body 310, at least one of the first and second notched portions 331 and 332 and the gear portion 333 is exposed through the window 312g provided on the side surface of the cartridge body 310. For that reason, by rotating the rotational member 330 such that at least one of the first and second notched portions 331 and 332 and the gear portion 333 is engaged, the shutter pair 320 can be operated no matter in what state the shutter pair 320 is.

Embodiment 1

Hereinafter, a first preferred embodiment of the present invention will be described in detail. First, the structure of a disk drive 500 according to this preferred embodiment will be described with reference to FIGS. 1 through 3. FIG. 1 is an exploded perspective view of the disk drive 500 that can be loaded with the disk cartridge 200. This preferred embodiment of the disk drive 500 will be described as being adapted for use with the disk cartridge 200. However, as mentioned above, the disk drive 500 is also applicable for use with the disk cartridge 300 or a disk cartridge having the structure described above.

As shown in FIG. 1, the disk drive 500 includes a traverse base 20, a spindle motor 30 for spinning the disk 10 stored in the disk cartridge 200, and an optical head 40 for performing read and/or write operation(s).

The spindle motor 30 has a disk mount 30b for holding the disk 10 thereon and is fixed to the traverse base 20. The optical head 40 is supported on the traverse base 20 so as to be movable on guide shafts 41 and 42. A drive source (not shown) is provided on the traverse base 20. The direction in which the optical head 40 moves on the guide shafts 41 and 42 is roughly the same as the radial direction of the disk 10. On the traverse base 20, further provided are fixing pins 21 and 22 to fit with the positioning holes 215a and 215b of the disk cartridge 200, respectively. By fitting the positioning pins 21 and 22 with the positioning holes 215a and 15b, the disk cartridge 200 can be positioned with respect to the spindle motor 30.

The disk drive 500 further includes a base chassis 50, a top plate 60, and a tray 70. The base chassis 50 supports the traverse base 20 and guides the tray 70 such that the tray 70 is movable in the direction pointed by either the arrow 70A or the arrow 70B. On the base chassis 50, also provided are a drive motor 51 for shifting the tray 70 in the direction pointed by either the arrow 70A or the arrow 70B and a gear train 52 for decreasing and transmitting the driving force of the drive motor 51. The drive motor 51 and the gear train 52 are located under the tray 70. By engaging the gear train 52 with a rack member (not shown) or any other member provided on the lower surface of the tray 70, the tray 70 is driven.

The top plate 60 is provided with a damper 61 for holding the disk 10 and a damper supporting portion 62 and is secured to the base chassis 50. The damper 61 is used when a disk cartridge with no damper (e.g., the disk cartridge 300) is loaded. Meanwhile, the disk cartridge 200 has the damper 240 inside its cartridge. Accordingly, when the disk cartridge 200 is loaded into the disk drive 500, the damper 61 is not used.

The tray 70 transports the disk cartridge 200 from a position in which the disk cartridge 200 has been ejected out of the disk drive 500 while still being held thereon to a position in which the spindle motor 30 can mount the disk 10 in the disk cartridge 200, or vice versa. The tray 70 has guide walls 70a, 70b, 70c and 71a for holding the disk cartridge 200 at a predetermined position within the tray 70.

The guide wall 71a is provided for a sliding portion 71, which can slide in the directions pointed by the arrows 70A and 70B within the tray 70. A force applying spring 72, which is an exemplary force applying structure, applies elastic force to the sliding portion 71 in the direction pointed by the arrow 70B. Accordingly, when the disk cartridge 200 is mounted on the tray 70, the sliding portion 71 applies elastic force to the disk cartridge 200 in the direction pointed by the arrow 70B such that the disk cartridge 200 contacts with the guide wall 70C. These guide walls 70a, 70b, 70c and 71a define a recess 70r to receive the disk cartridge 200. And the disk cartridge 200 is positioned within the recess 70r of the tray 70.

The guide wall 70a is parallel to the direction in which the tray moves, and faces the shutter driving mechanism 150 to be described later. The guide wall 70a is partially notched to allow the shutter driving mechanism 150 to pass there. On the bottom of the recess 70r, provided are a window 70w that allows the spindle motor 30 and the optical head 40 to access the disk 10 and holes 70d to pass the fixing pins 21 and 22. Convex portions 70t are provided inside of the guide walls 70a and 70b.

Optionally, another circular recess 70q may be further defined on the bottom of the recess 70r of the tray 60 so as to directly mount the disk 10 that is not stored in a cartridge. Furthermore, to make the disk cartridge 200 on the recess 70r easily removable from the tray 70, a notch 70s to partially expose a side surface of the cartridge may be provided on the front side of the tray 70.

As will be described in detail later, the disk drive 500 includes a shutter driving mechanism 150 for opening and closing the shutter pair 220 of the disk cartridge 200 by rotating the rotational member 230. The shutter driving mechanism 150 includes a first driving lever 151, a second driving lever 152, a base 153 with a rack portion 153a, and a spring 154 for applying elastic force to the first and second driving levers 151 and 152, and is secured to the base chassis 50.

The base 153 has guide ribs 155a and 155b for guiding the tray 70 in the direction pointed by the arrow 70A or 70B, thereby increasing the positioning accuracy of the shutter driving mechanism 150 with respect to the tray 70.

The base chassis 50 is secured to a lower casing 520 that is the lower half of the outer shell of the disk drive 500. An upper casing 510, which is the upper half of the outer shell of the disk drive 500, is combined with the lower casing 520. In this manner, the outer shell of the disk drive 500 is made up of the lower and upper casings 520 and 510. Optionally, the base chassis 50 may be supported on the lower casing 520 with a damper, which is made of an elastic material such as a rubber to cushion impact on the drive, interposed, for example.

Figure 2:
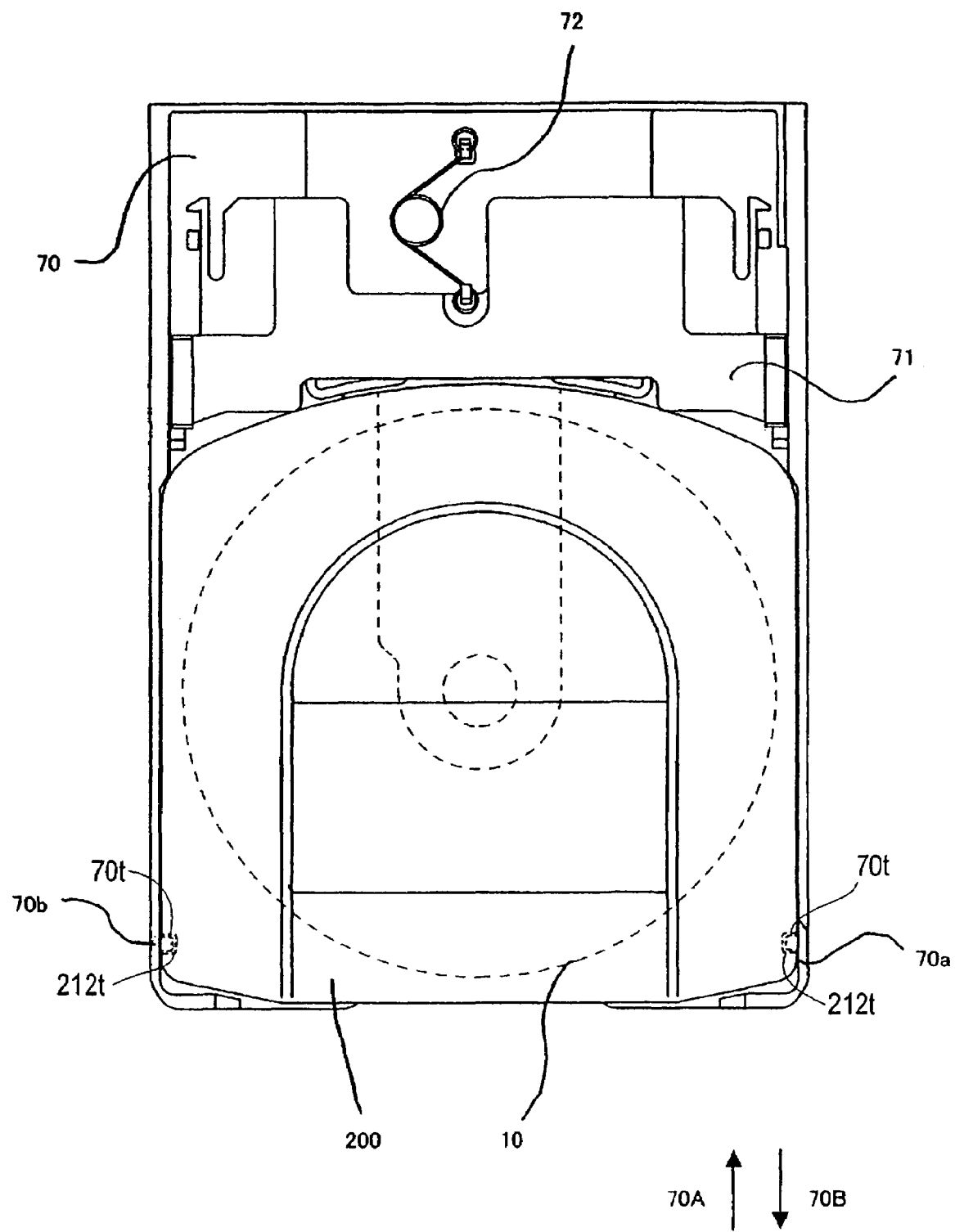
FIG. 2 is a plan view showing a situation where the disk cartridge shown in FIG. 64 has been mounted on the tray shown in FIG. 1.

FIG. 2 is a plan view showing a situation where the disk cartridge 200 has been mounted on the tray 70. As shown in FIG. 2, the convex portions 70t of the tray 70 fit into the notches 212t of the lower shell 212 of the disk cartridge 200. The upper shell 211 of the disk cartridge 200 has no notches. Accordingly, even if one tries to mount the disk cartridge 200 on the tray 70 upside down (i.e., such that the upper shell 211 contacts with the tray 70), the notches 212t interfere with the upper shell 211 and the disk cartridge 200 cannot be mounted on the tray 70 properly.

Figure 3:
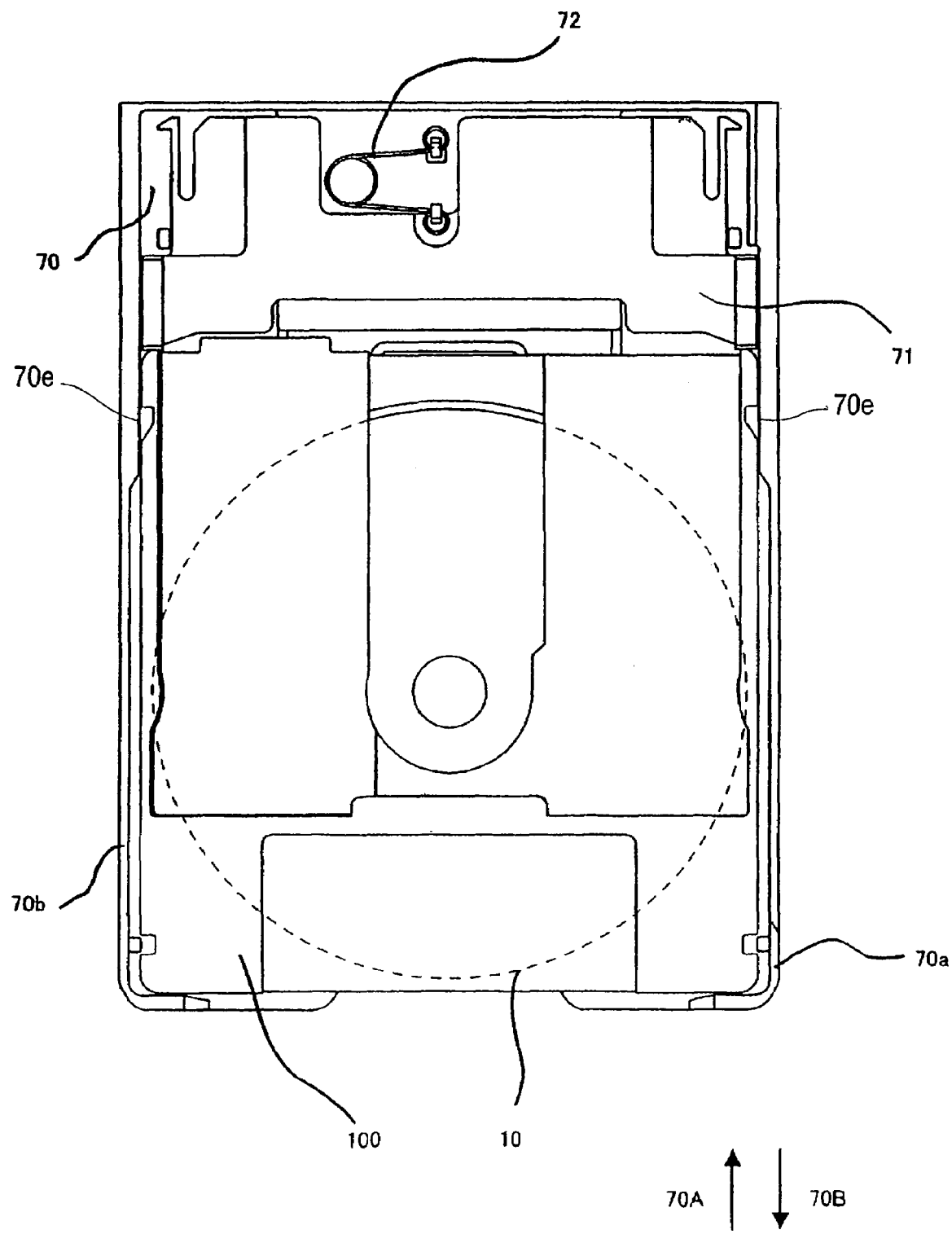
FIG. 3 is a plan view showing a situation where the disk cartridge shown in FIG. 63 has been mounted on the tray shown in FIG. 1.

Optionally, the disk drive 500 may be adapted to not only the disk cartridges 200 and 300 but also to a disk cartridge 100 as shown in FIG. 3. In that case, the shape of the recess 70r of the tray 70 may be adjusted to the disk cartridge 100 such that both the disk cartridge 200 or 300 and the disk cartridge 100 can be mounted on the tray 70 properly and can be positioned roughly. For example, convex portions 70e may be provided for the guide walls 70a and 70b so as not to contact with the disk cartridge 200 but to contact with the disk cartridge 100 and position it when the disk cartridge 100 is mounted on the tray 70.

Figure 4:
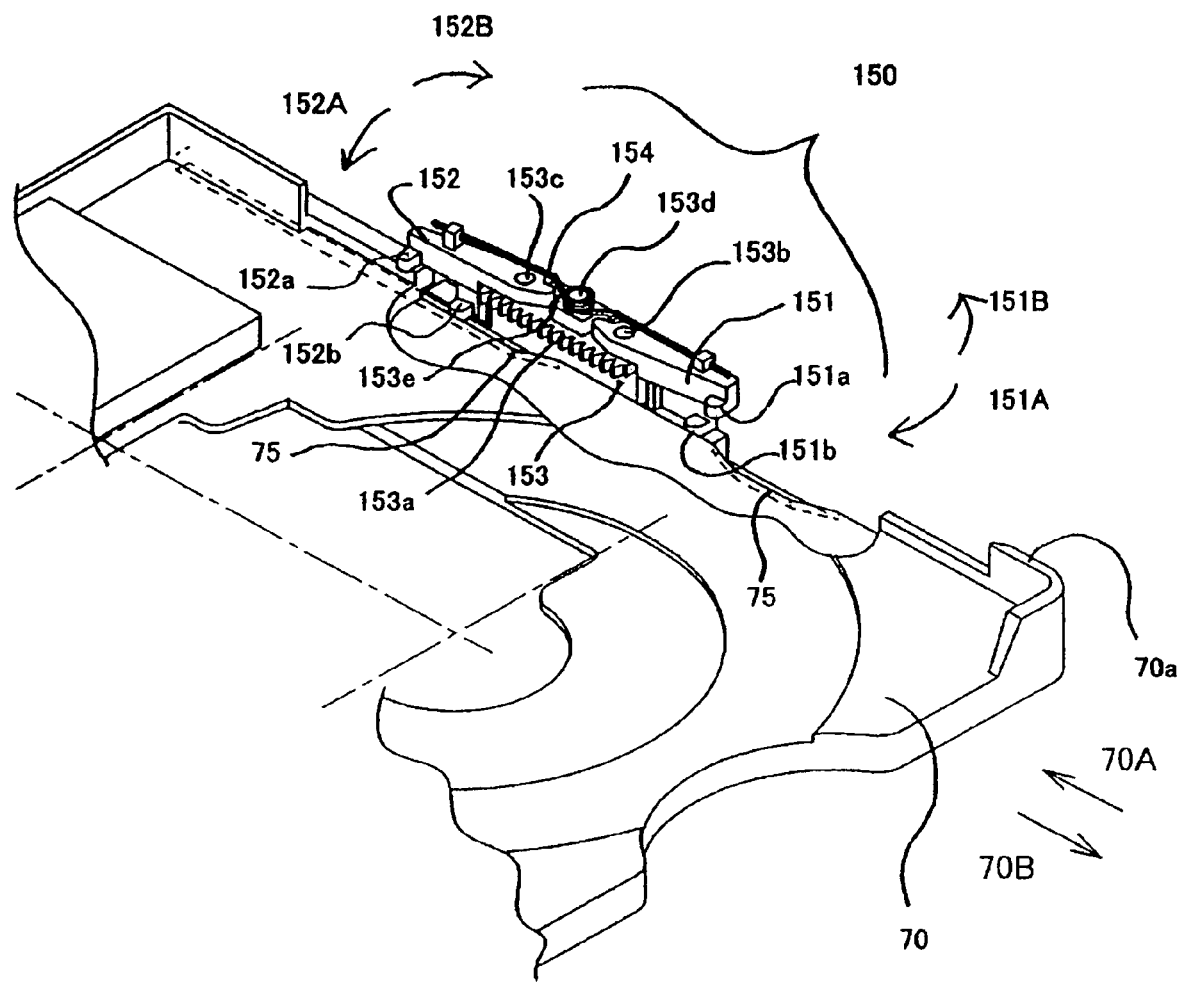
FIG. 4 is a perspective view illustrating the structure of the shutter driving mechanism shown in FIG. 1.

Next, the structure of the shutter driving mechanism 150 will be described. FIG. 4 is a perspective view illustrating the structure of the shutter driving mechanism 150. The shutter driving mechanism 150 opens and closes the shutter pair 220 by rotating the rotational member 230 of the disk cartridge 200. As shown in FIG. 4, the shutter driving mechanism 150 includes a first driving lever 151 fitting with the first notched portion 231 of the rotational member 230, a second driving lever 152 fitting with the second notched portion 232 of the rotational member 230, a base 153 with a rack portion 153a engaging with the gear portion 233 of the rotational member 230, and a spring 154.

The first and second driving levers 151 and 152 are respectively supported on rotation shafts 153b and 153c on the base 153 in rotatable positions. The first driving lever 151 includes a fitting portion 151a to fit into the first notched portion 231 of the rotational member 230 and another fitting portion 151b to fit with the cam groove 75 to be described later. Likewise, the second driving lever 152 also includes a fitting portion 152a to fit into the second notched portion 232 of the rotational member 230 and another fitting portion 152b to fit with the cam groove 75 of the tray 70.

The spring 154 is fitted with a spindle 153d provided on the base 153 and applies elastic force to the fitting portions 151a and 151b of the first driving lever 151 in the direction pointed by the arrow 151A (i.e., toward the tray 70). In addition, the spring 154 also applies elastic force to the fitting portions 152a and 152b of the second driving lever 152 in the direction pointed by the arrow 152A (i.e., toward the tray 70, too).

On the base 153, further provided is a stopper portion 153e, which contacts with portions of the first and second driving levers 151 and 153 such that the first and second driving levers 151 and 153 do not turn to more than a predetermined degree.

Figure 5:
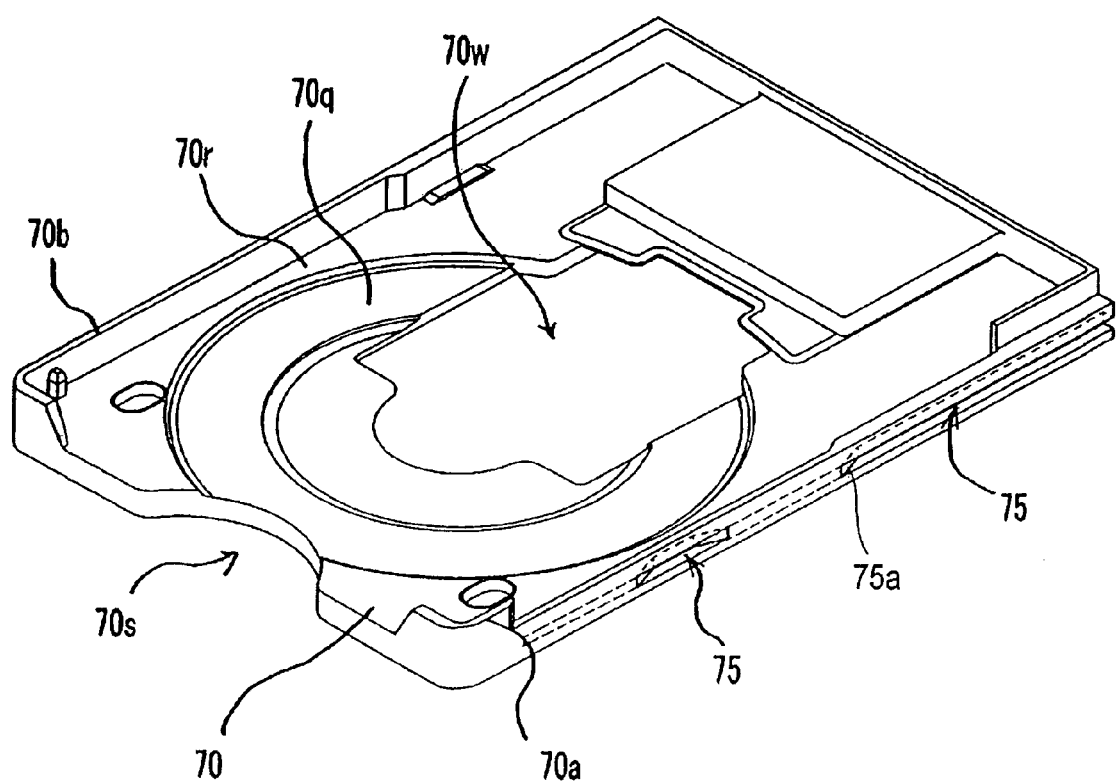
FIG. 5 is a perspective view illustrating a cam groove provided on a side surface of the tray shown in FIG. 4.

FIG. 5 is a perspective view of the tray 70 illustrating its side surface that is opposed to the shutter driving mechanism 150. As shown in FIG. 5, a cam groove 75 is provided as a first cam structure on the side surface of the guide wall 70a that is opposed to the shutter driving mechanism 150. The cam groove 75 has a guide surface 75a at the bottom of the groove. When the guide surface 75a contacts with the fitting portions 151b and 152b of the first and second driving levers 151 and 152, the first and second driving levers 151 and 152 are driven according to the profile of the cam groove 75. In the cam groove 75, the guide surface 75a thereof is raised and does not define any groove there.

As used herein, the "cam structure" is a mechanical element having an arbitrary shape and causing an arbitrary motion on an object that has contacted with that element directly. In this preferred embodiment, the cam groove 75 is used as the first cam structure. Alternatively, any other known cam structure may also be used. That is to say, the tray 70 may have, as its cam structure, a structure having an arbitrary shape that can cause motion on the first and second driving levers 151 and 152 when contacting directly with the first and second driving levers 151 and 152. For example, the groove may be replaced with an overall raised ridge. As another alternative, the cam structure may also be defined by a combination of a groove and a ridge.

As described above, the spring 154 applies elastic force to the fitting portions 151b and 152b of the first and second driving levers 151 and 152 toward the tray 70. For that reason, if the tray 70 has moved in the direction pointed by the arrow 70A or 70B with respect to the shutter driving mechanism 150, then the fitting portions 151b and 152b move while keeping contact with the guide surface 75a of the cam groove 75. As a result, the first and second driving levers 151 and 152 swing on the rotation shafts 153b and 153c, respectively, according to the profile of the cam groove 75.

Next, it will be described how the shutter driving mechanism 150 works. When the tray 70 on which the disk cartridge 200 has been mounted is inserted into the disk drive 500 (i.e., moved in the direction pointed by the arrow 70A), the shutter driving mechanism 150 is driven so as to perform the operation of opening the shutter pair 220 of the disk cartridge 200. On the other hand, if the tray 70 has been ejected from the disk drive 500 (i.e., moved in the direction pointed by the arrow 70B), the shutter driving mechanism 220 is driven so as to perform the operation of closing the shutter pair 220.

As long as the disk cartridge 200 is used in a normal condition, the operator or the user is not supposed to open or close the shutter pair 220 arbitrarily. Even so, the operator may still open or close the shutter pair 220 by intentionally turning the locking member 225 that is locking the rotational member 230 and by unlocking and rotating the rotational member 230.

This is why the shutter pair 220 is not always closed when the operator loads the disk cartridge 200 into the disk drive 500.

That is to say, when the disk cartridge 200 is mounted onto the tray 70 and when the tray 70 is inserted into the disk drive 500, the disk cartridge 200 may assume State (A) in which the shutter pair 220 is fully closed, State (B) in which the shutter pair 220 is not closed fully, and State (C) in which the shutter pair 220 is fully opened. On the other hand, whenever the disk cartridge 200 starts to be ejected out of the disk drive 500, the shutter pair 220 is always opened. That is to say, when the disk cartridge 200 starts to be ejected from the disk drive 500, the disk cartridge 200 must assume only State (D) in which the shutter pair 220 is fully opened. Hereinafter, it will be described how the disk drive 500 operates in each of these four situations.

In each of the drawings to be referred to in the following description, the tray 70 is illustrated at substantially the same location, while the shutter driving mechanism 150 is illustrated at a different location as if the shutter driving mechanism 150 moved with respect to the tray 70. Actually, however, the shutter driving mechanism 150 is fixed at a predetermined location within the disk drive 500 and the tray 70 moves in the direction pointed by either the arrow 70A or the arrow 70B, thereby changing its position with respect to the shutter driving mechanism 150. Some of the drawings to be referred to in the following description are identified by a combination of a reference drawing number and one of the two capital letters A and B (e.g., FIGS. 6A and 6B). In each of those pairs of drawings, the portion A illustrates a situation where the disk cartridge 200 has been mounted, while the portion B illustrates a situation where no disk cartridge has been mounted yet.

First, it will be described how the shutter driving mechanism 150 operates in the situation (A) where the disk cartridge 200 is mounted on the tray 70 and then loaded into the disk drive 500 with the shutter pair 220 fully closed.

Figure 6A:
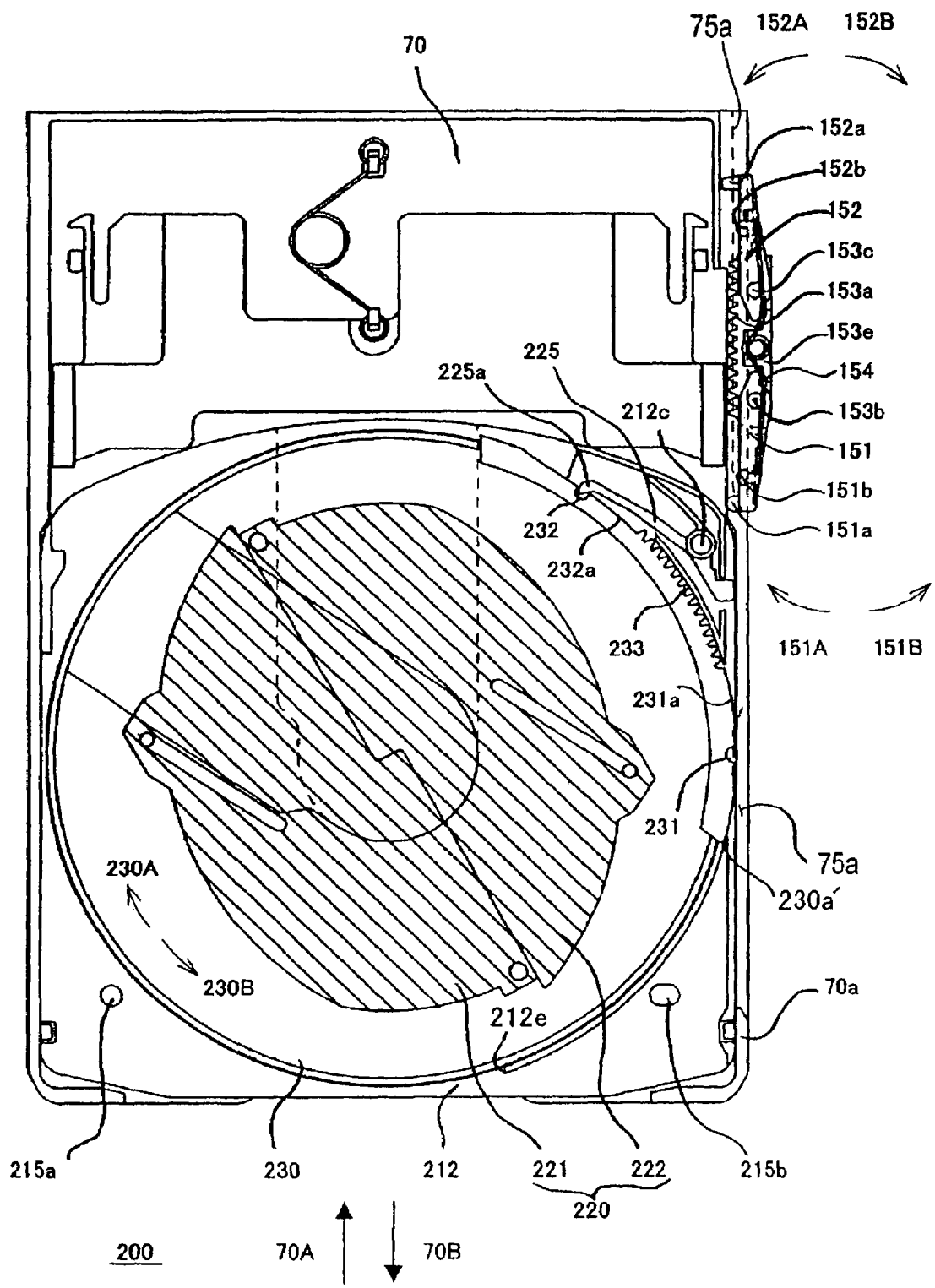
Figure 6B:
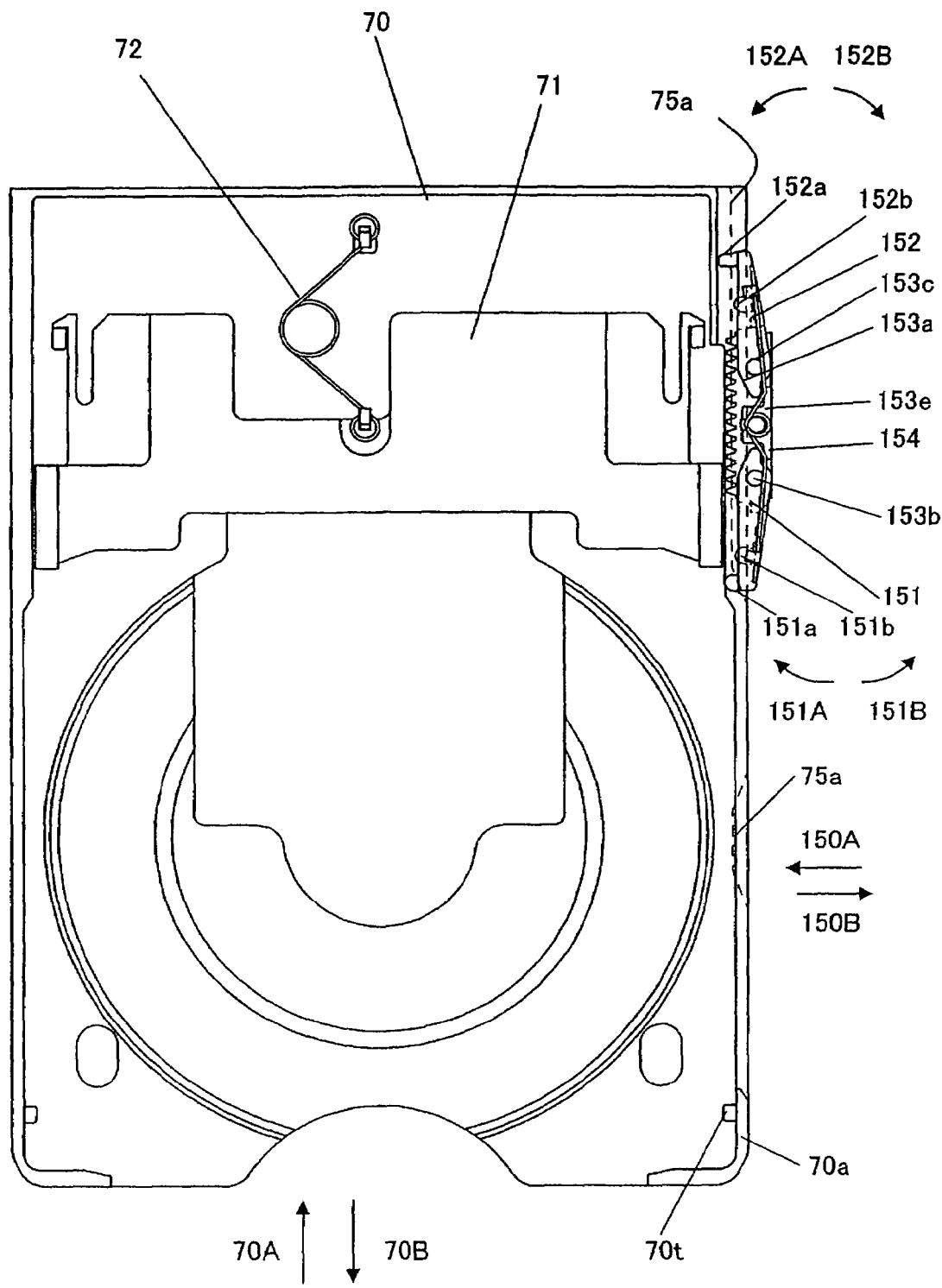
FIG. 6B is a plan view showing a state corresponding to that shown in FIG. 6A with the disk cartridge removed.

FIGS. 6A and 6B illustrate a situation where the tray 70 has been ejected out of the disk drive 500. Specifically, FIG. 6A illustrates a situation where the disk cartridge 200 has been mounted on the tray 70 with the shutter pair 220 closed, while FIG. 6B illustrates only the tray 70 and the shutter driving mechanism 150. As shown in FIGS. 6A and 6B, the disk cartridge 200 is mounted on the tray 70 and then the tray 70 is inserted in the direction pointed by the arrow 70A by the drive motor 51. The shutter driving mechanism 150 is secured to the base chassis 50. Accordingly, as the tray 70 is inserted deeper, the shutter driving mechanism 150 gets closer to the disk cartridge 200. At this point in time, portions of the cam groove 75 where the fitting portions 151b and 152b of the first and second driving levers 151 and 152 are located are rather deep. Thus, the guide surface 75a is not in contact with the fitting portions 151b and 152b and the first and second driving levers 151 and 152 are held at their predetermined positions by the stopper portion 153e provided for the base 153. Alternatively, the guide surface 75a may be in contact with the fitting portions 151b and 152b by adjusting the position of the stopper portion 153e.

Figure 7:
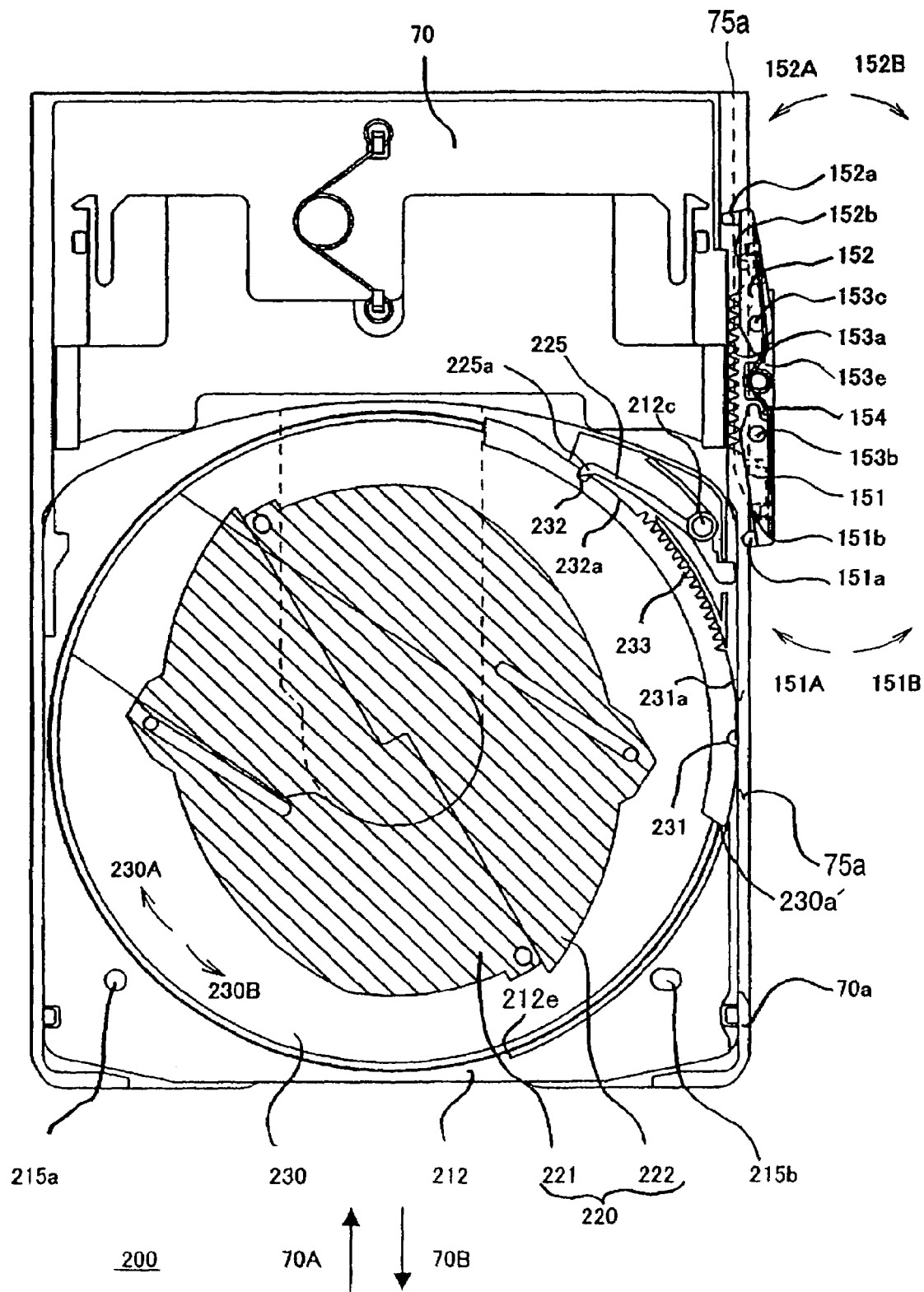
FIG. 7 is a plan view showing a state of the shutter driving mechanism during its opening or closing operation in a situation where the disk cartridge has been inserted into the disk drive with its shutter pair fully closed.

As the tray 70 is inserted deeper in the direction pointed by the arrow 70A from the position shown in FIGS. 6A and 6B, the fitting portion 151b of the first driving lever 151 soon reaches a raised portion of the guide surface 75a of the cam groove 75 as shown in FIG. 7. The fitting portion 151b contacts with the guide surface 75a of the cam groove 75 and the first driving lever 151 turns on the rotation shaft 153b in the direction pointed by the arrow 151B, thereby preventing the locking member 225 of the disk cartridge 200 from contacting with the first driving lever 151. At this point in time, the second driving lever 152 has not contacted with the cam groove 75 of the tray 70 yet, and therefore, stays at its predetermined position (maintains a predetermined angle of rotation) as defined by the stopper portion 153e of the base 153.

Figure 8A:
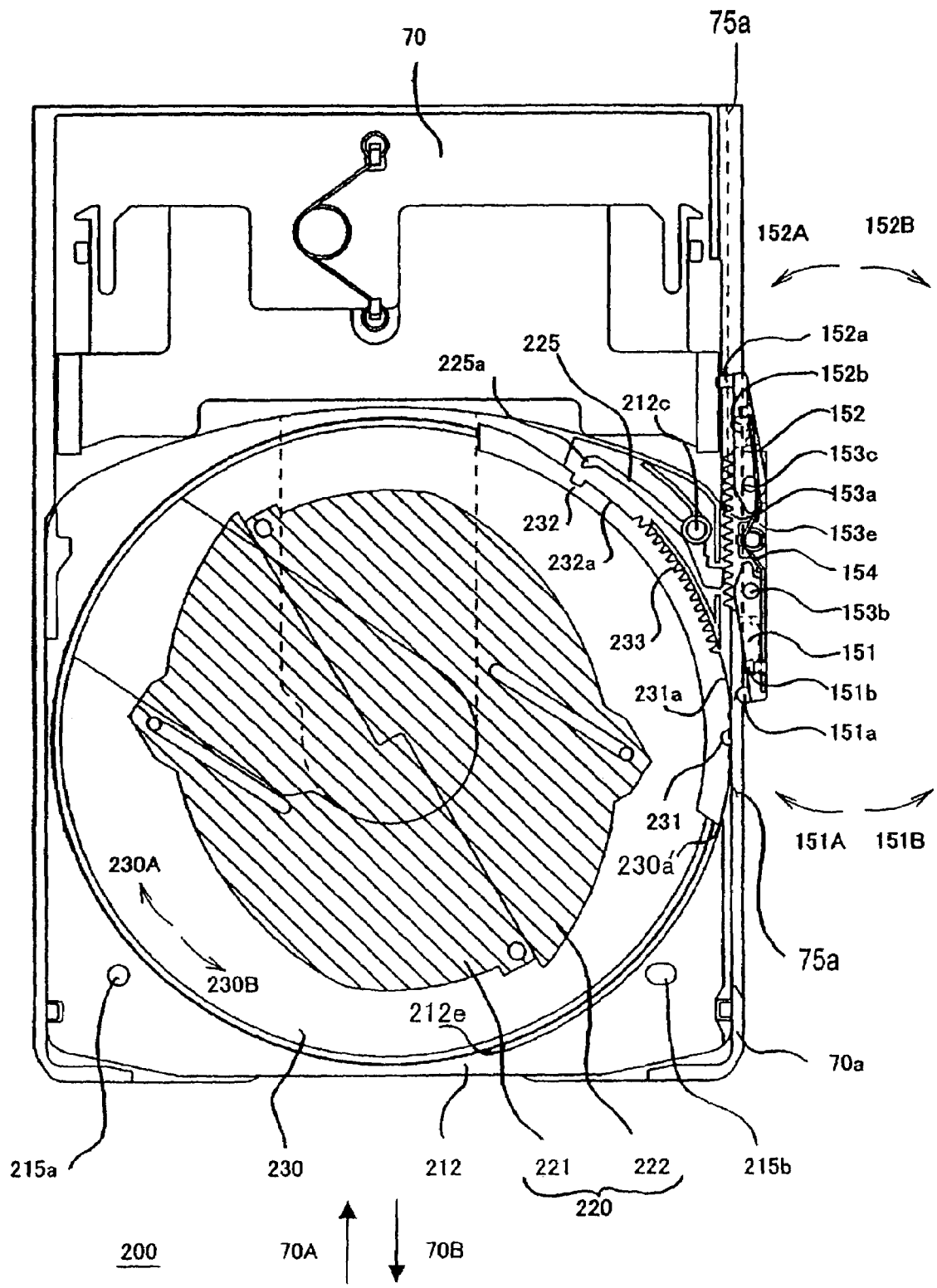
Figure 8B:
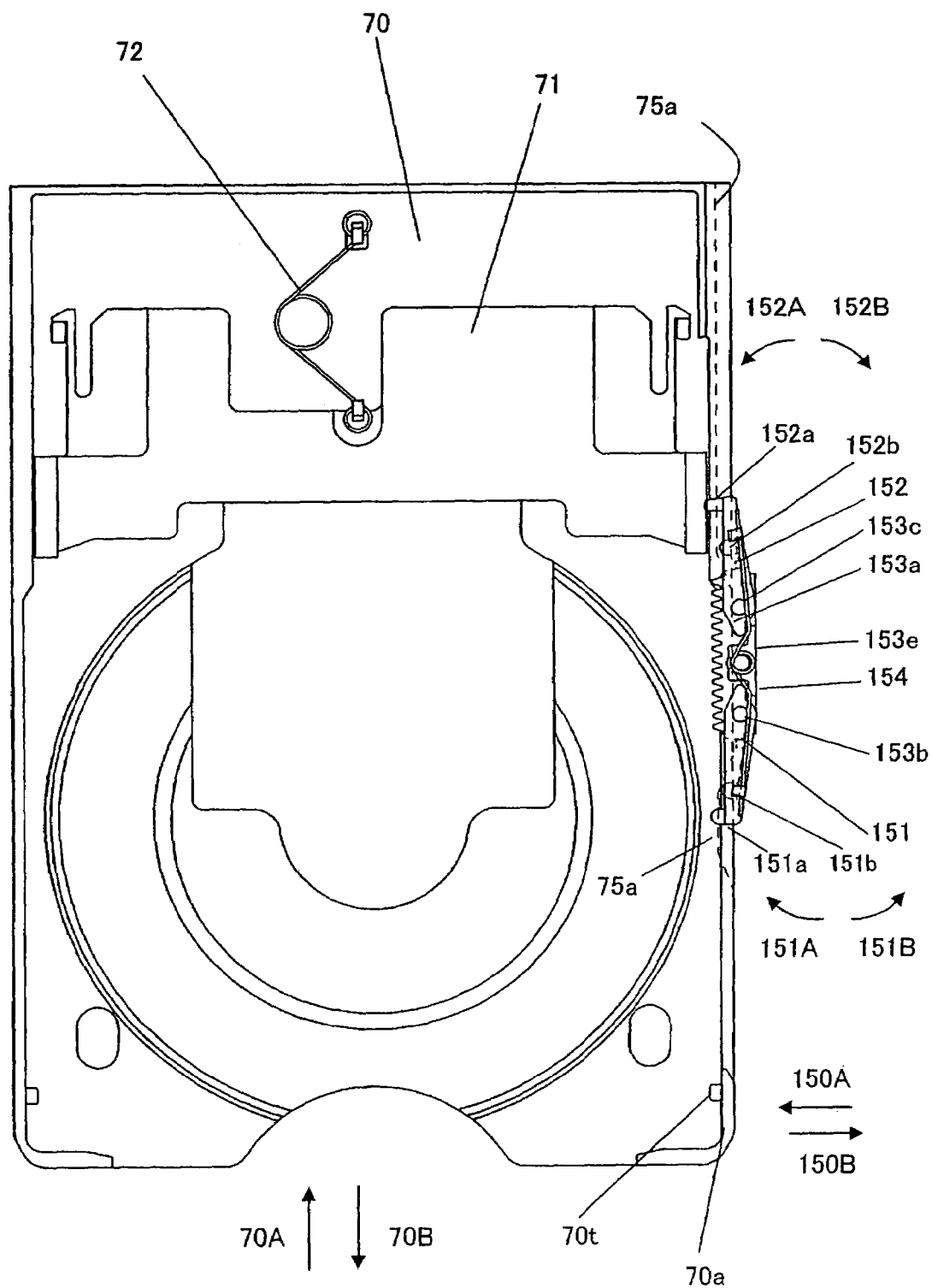
FIG. 8B is a plan view showing a state corresponding to that shown in FIG. 8A with the disk cartridge removed.

As the tray 70 is inserted even deeper in the arrow direction 70A from the position shown in FIG. 7, the rack portion 153a soon reaches a point where the rack portion 153a contacts with the locking member 225 of the disk cartridge 200 as shown in FIGS. 8A and 8B. The locking member 225 is pushed by the rack portion 153a and the convex portion 225a of the locking member 225 turns on the spindle 212c. As a result, the convex portion 225a of the locking member 225 is disengaged from the second notched portion 232 of the rotational member 230 and the rotational member 230 is unlocked. Meanwhile, the first driving lever 151 has still been turned by the cam groove 75 of the tray 70 and the second driving lever 152 does not fit with the cam groove 75 of the tray 70 and still stays at its predetermined position as defined by the stopper portion 153e of the base 153.

As the tray 70 is inserted even deeper in the arrow direction 70A from the position shown in FIGS. 8A and 8B, the fitting portion 151b of the first driving lever 151 soon reaches the recessed portion of the cam groove 75. Since the spring 154 applies elastic force thereto, the first driving lever 151 turns in the direction pointed by the arrow 151A to make the fitting portion 151b contact with the recessed guide surface 75a. Then, the fitting portion 151a of the first driving lever 151 contacts with the side surface portion 231a of the rotational member 230. Thereafter, as the tray 70 is inserted even deeper in the arrow direction 70A, the fitting portion 151a of the first driving lever 151 slides and shifts on the side surface portion 231a of the rotational member 230 and then gets fitted with the first notched portion 231a of the rotational member 230 as shown in FIG. 9A.

Since the locking member 225 has been pushed inward by the rack portion 153a, the rotational member 230 is now unlocked. Accordingly, as the tray 70 is inserted even deeper in the arrow direction 70A from the position shown in FIG. 9A, the rotational member 230, being interlocked with the first driving lever 151 of the shutter driving mechanism 150, rotates in the direction pointed by the arrow 230A. As a result, the shutter pair 220, interlocked with the rotational member 230, starts to open its shutters.

Figure 10:
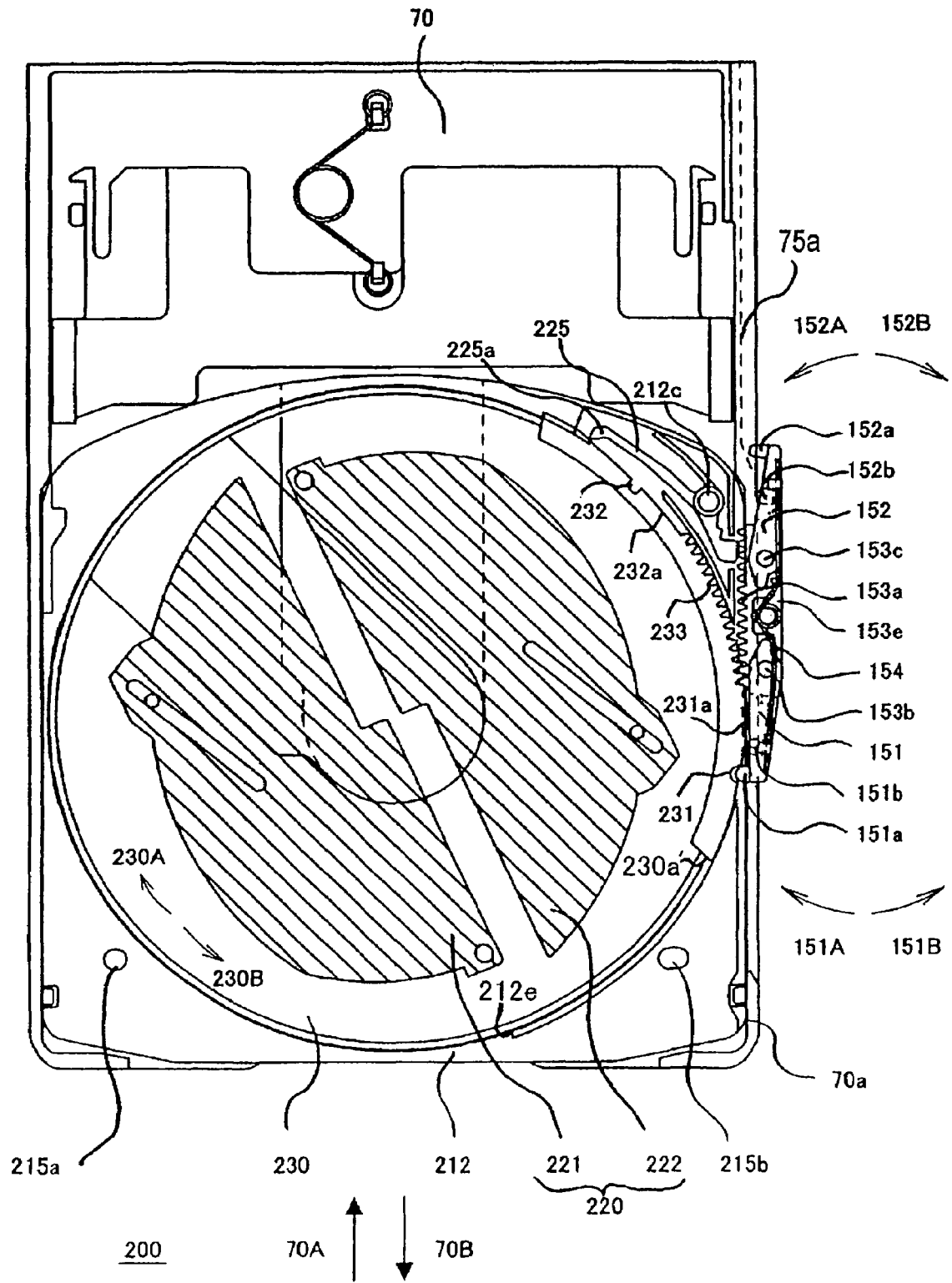
FIG. 10 is a plan view showing a state of the shutter driving mechanism during its opening or closing operation in a situation where the disk cartridge has been inserted into the disk drive with its shutter pair fully closed.

As shown in FIG. 10, the rotational member 230 rotates to a predetermined degree as defined by the relative movement of the tray 70 with respect to the shutter driving mechanism 150. Then, before the fitting portion 151a of the first driving lever 151 disengages itself from the first notched portion 231, the rack portion 153a starts engaging with the gear portion 233 of the rotational member 230. After that, the rotational member 230 receives driving force from the shutter driving mechanism 150 due to the engagement between the rack portion 153a and the gear portion 233. And as the rotational member 230 rotates, the shutter pair 220 is going to open to an even greater degree.

Figure 9A:
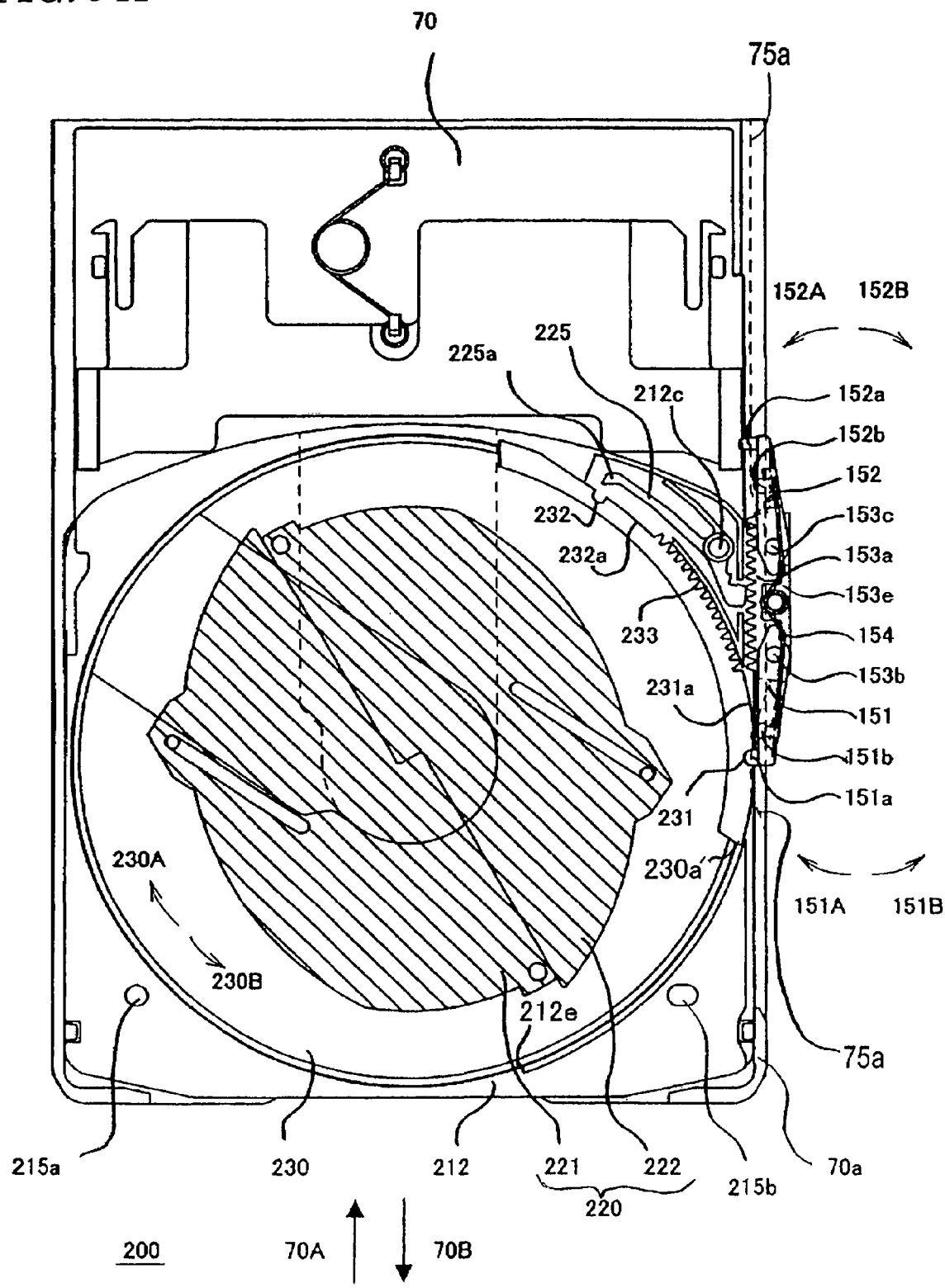

At this point in time, the fitting portion 152b of the second driving lever 152 reaches a raised portion of the guide surface 75a of the cam groove 75 as shown in FIG. 9A. The fitting portion 152b contacts with the guide surface 75a of the cam groove 75 and the second driving lever 152 turns on the rotation shaft 153c in the direction pointed by the arrow 152B, thereby preventing the locking member 225 of the disk cartridge 200 from contacting with the second driving lever 152.

Figure 11A:
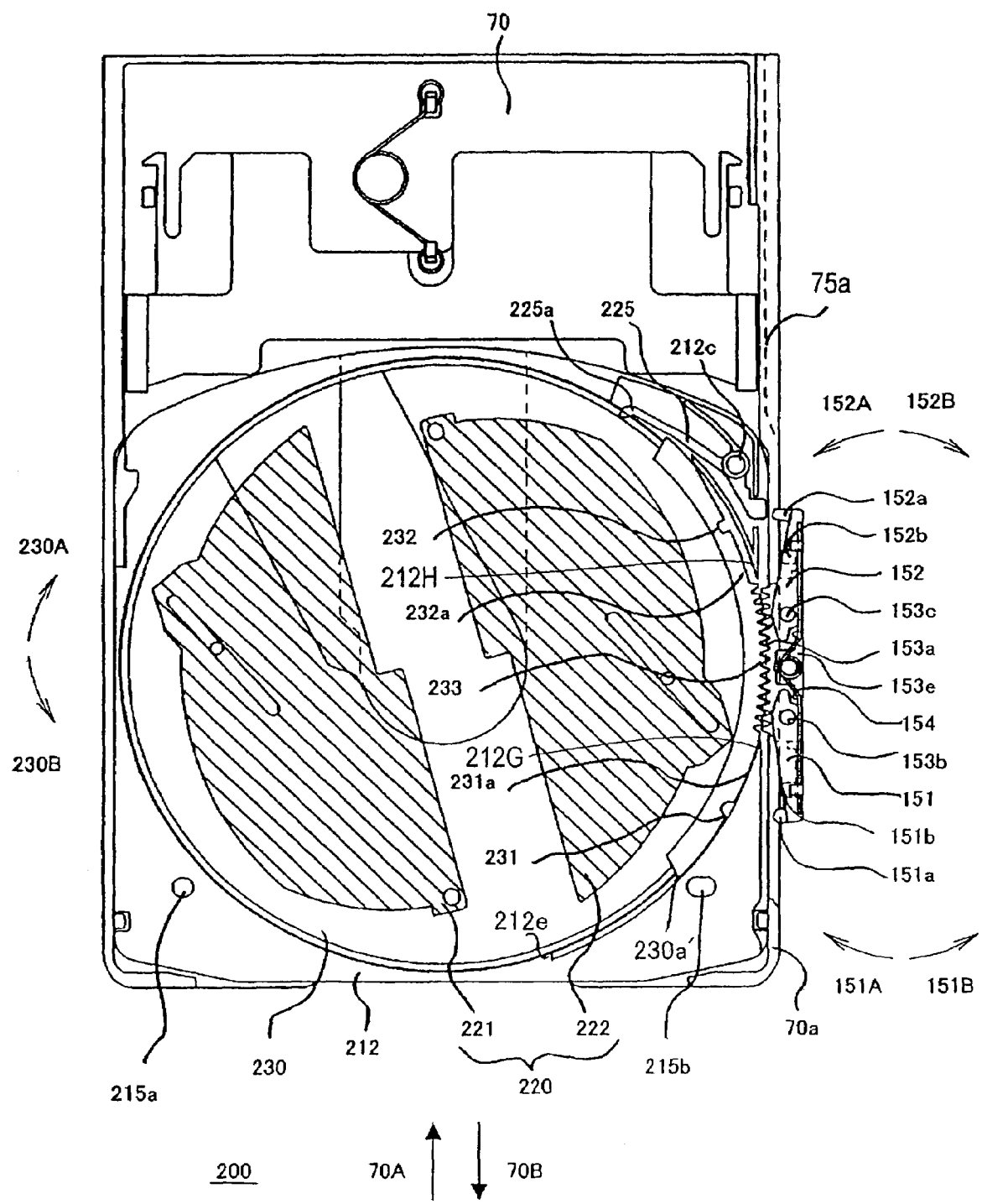
Figure 11B:
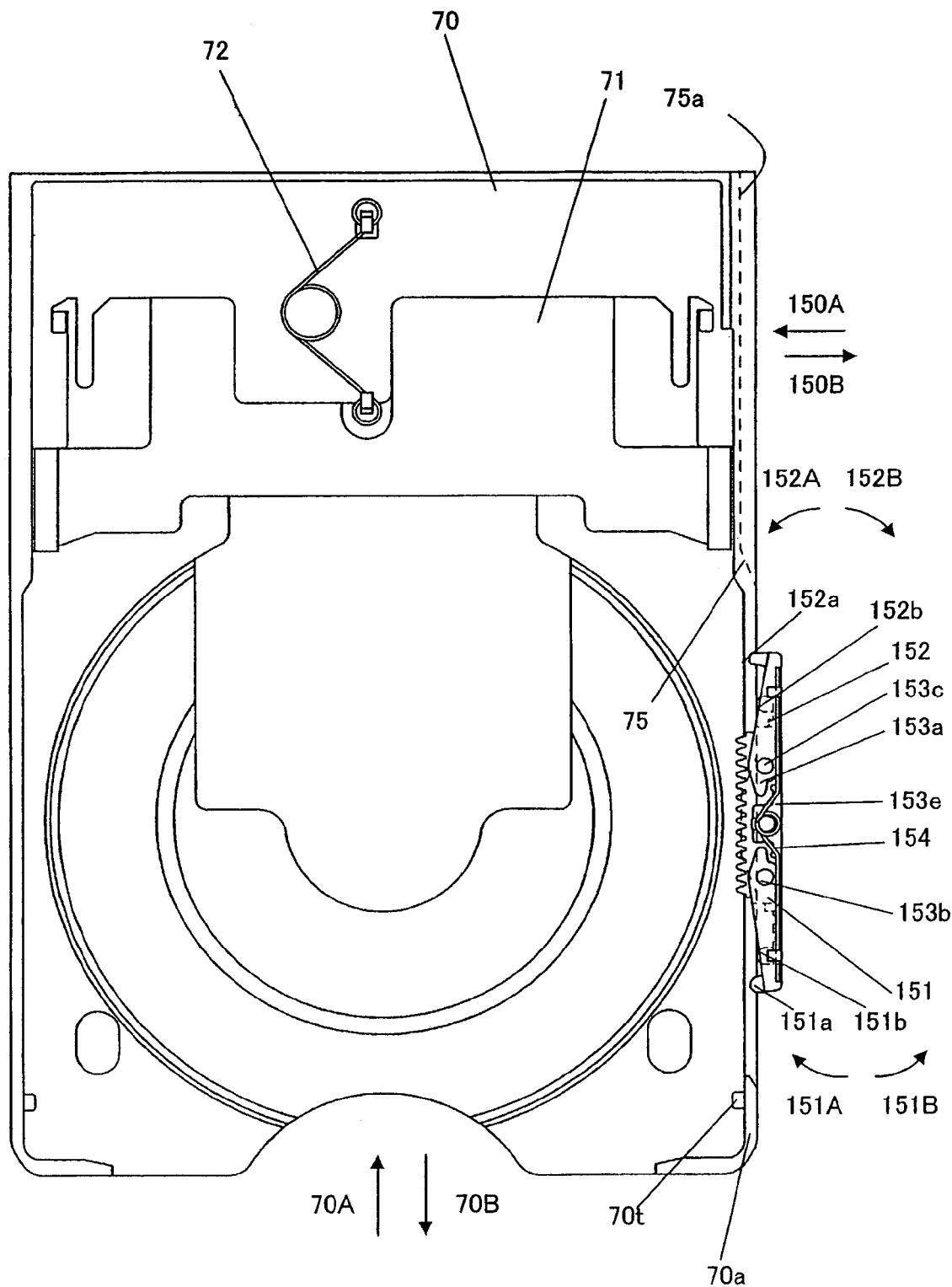
FIG. 11B is a plan view showing a state corresponding to that shown in FIG. 11A with the disk cartridge removed.

As the tray 70 is inserted even deeper in the arrow direction 70A, the rotational member 230 further rotates in the arrow direction 230A and the shutter pair 220 opens to a greater degree due to the engagement between the rack portion 153a and the gear portion 233 of the rotational member 230 as shown in FIGS. 11A and 11B. At this point in time, the fitting portion 151b of the first driving lever 151 contacts with the guide surface 75a of the cam groove 75 and is driven by the cam groove 75. As a result, the first driving lever 151 turns on the rotation shaft 153b in the direction pointed by the arrow 151B so as to avoid contact with the outer surface of the disk cartridge 200. This contact should be avoided to prevent the guide portion 212G that defines the outer shape of the disk cartridge 200 for the rotational member 230 from contacting with the first driving lever 151.

As the tray 70 is inserted even deeper in the arrow direction 70A, the fitting portion 152b of the second driving lever 152 soon reaches the recessed portion of the cam groove 75. Since the spring 154 applies elastic force thereto, the second driving lever 152 turns in the direction pointed by the arrow 152A to make the fitting portion 152b contact with the recessed guide surface 75a. Then, due to the engagement between the gear portion 233 of the rotational member 230 and the rack portion 153a, the rotational member 230 rotates to a predetermined degree while opening the shutter pair 220. As a result, before the gear portion 230 disengages itself from the rack portion 153a, the fitting portion 152a of the second driving lever 152 starts fitting into the second notched portion 232 of the rotational member 230.

At this point in time, the fitting portion 151a of the first driving lever 151 contacts with the sloped surface 70g of the guide wall 70a of the tray 70 to turn in the direction pointed by the arrow 151B along this sloped surface 70g and the guide wall 70a. By retracting the first driving lever 151 in this manner, it is possible to prevent the guide wall 70a for positioning the disk cartridge 200 within the tray 70 from interfering with the fitting portion 151a of the first driving lever 151. Besides, if the guide wall 70a is sufficiently high, then the area of contact between the disk cartridge 200 and the guide wall 70a can be increased and the disk cartridge 200 can be positioned with good stability. In this preferred embodiment, the first driving lever 151 is turned by bringing the fitting portion 151a of the first driving lever 151 into contact with the guide wall 70a. Alternatively, the first driving lever 151 may also be turned by using the cam groove 75 that contacts with the fitting portion 151b of the first driving lever 151.

Figure 12A:
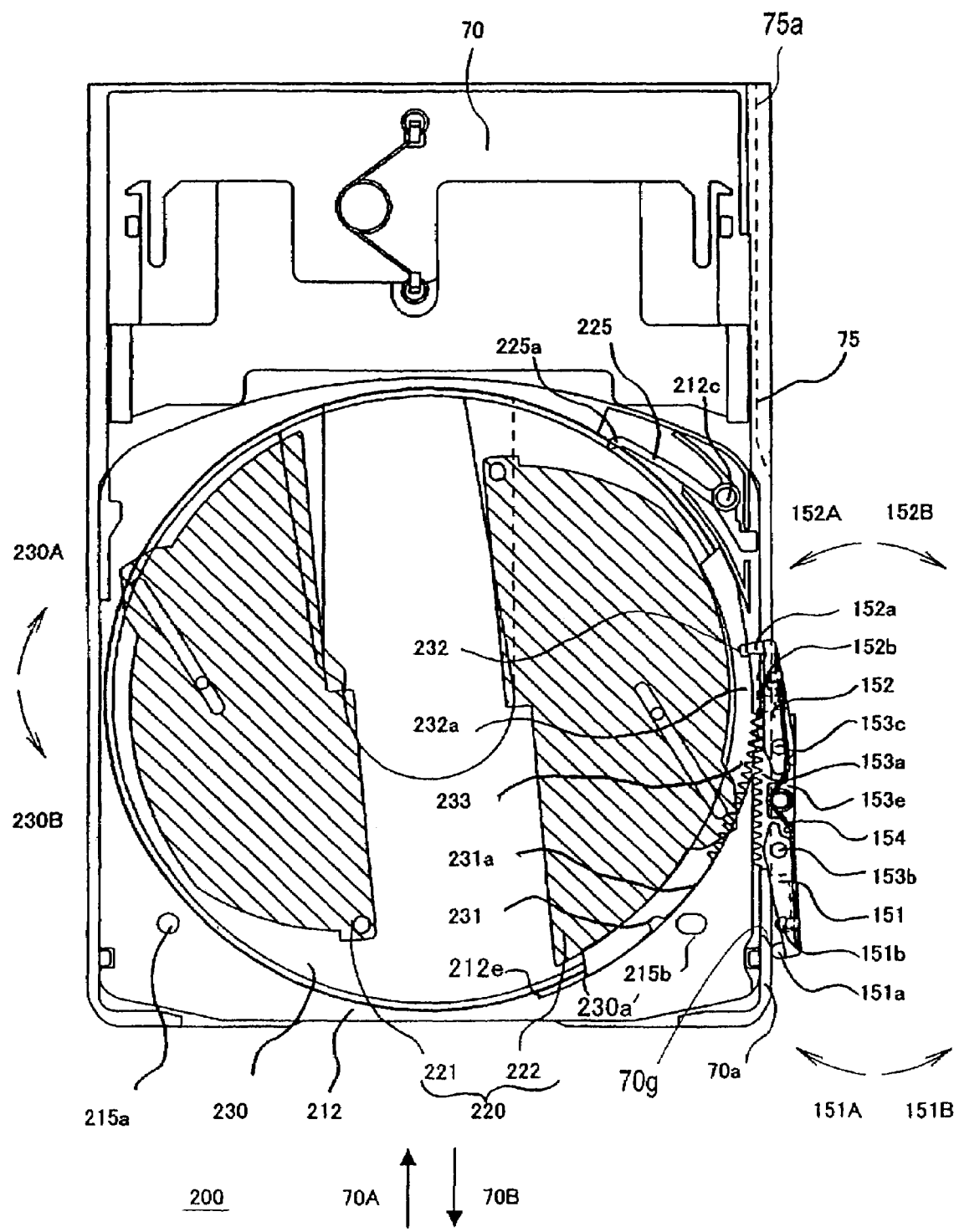
Figure 12B:
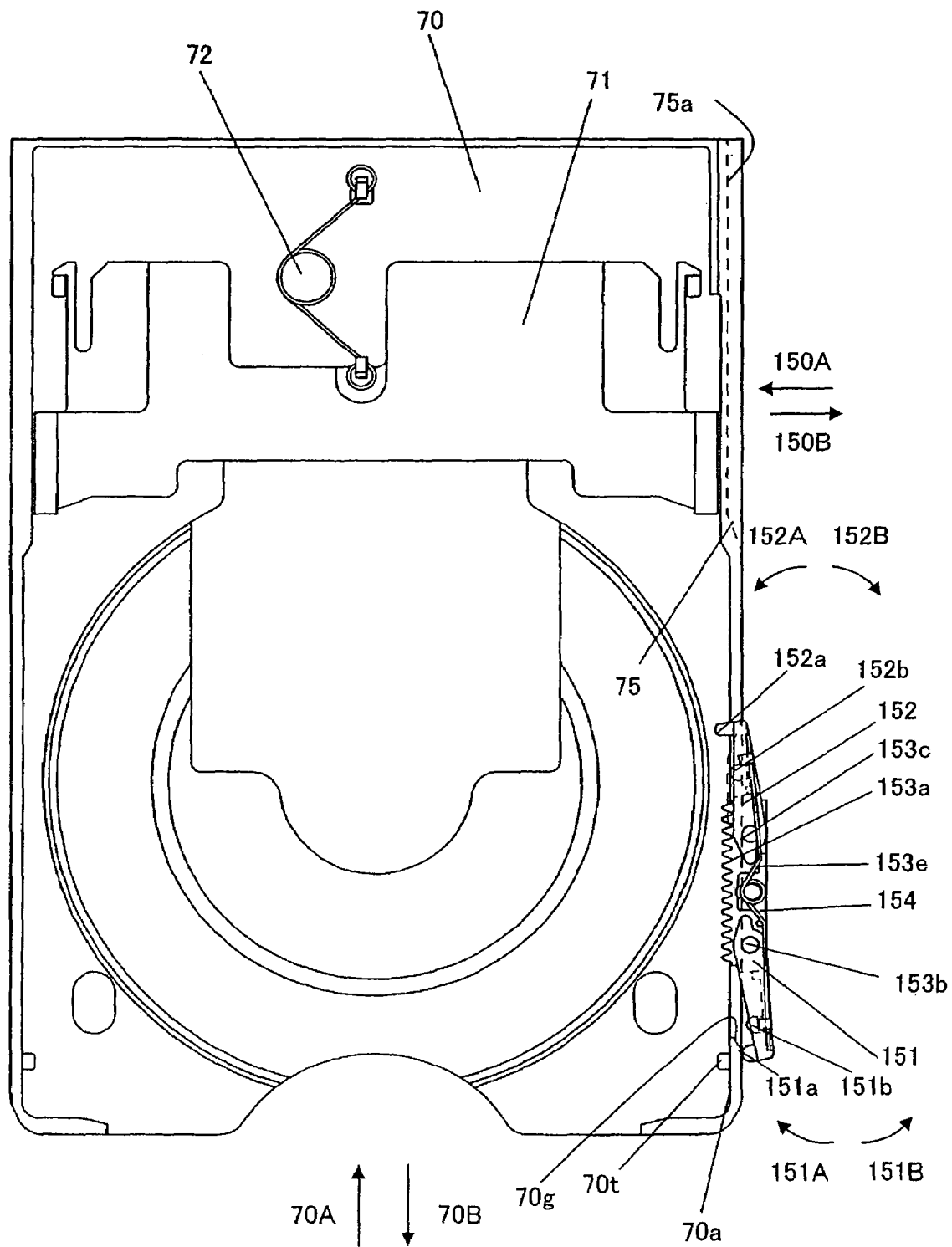
FIG. 12B is a plan view showing a state corresponding to that shown in FIG. 12A with the disk cartridge removed.

As the tray 70 is inserted even deeper in the arrow direction 70A from the position shown in FIGS. 12A and 12B, the fitting portion 152a of the second driving lever 152 gets fitted with the second notched portion 232 of the rotational member 230, thereby rotating the rotational member 230 and opening the shutter pair 200 to an even greater degree. When the stopper protrusion 230a' of the rotational member 230 contacts with the stopper portion 212e of the lower shell 212, the rotational member 230 stops its rotation. Then, the shutter pair 220 is fully opened and finishes its opening operation.

Figure 13:
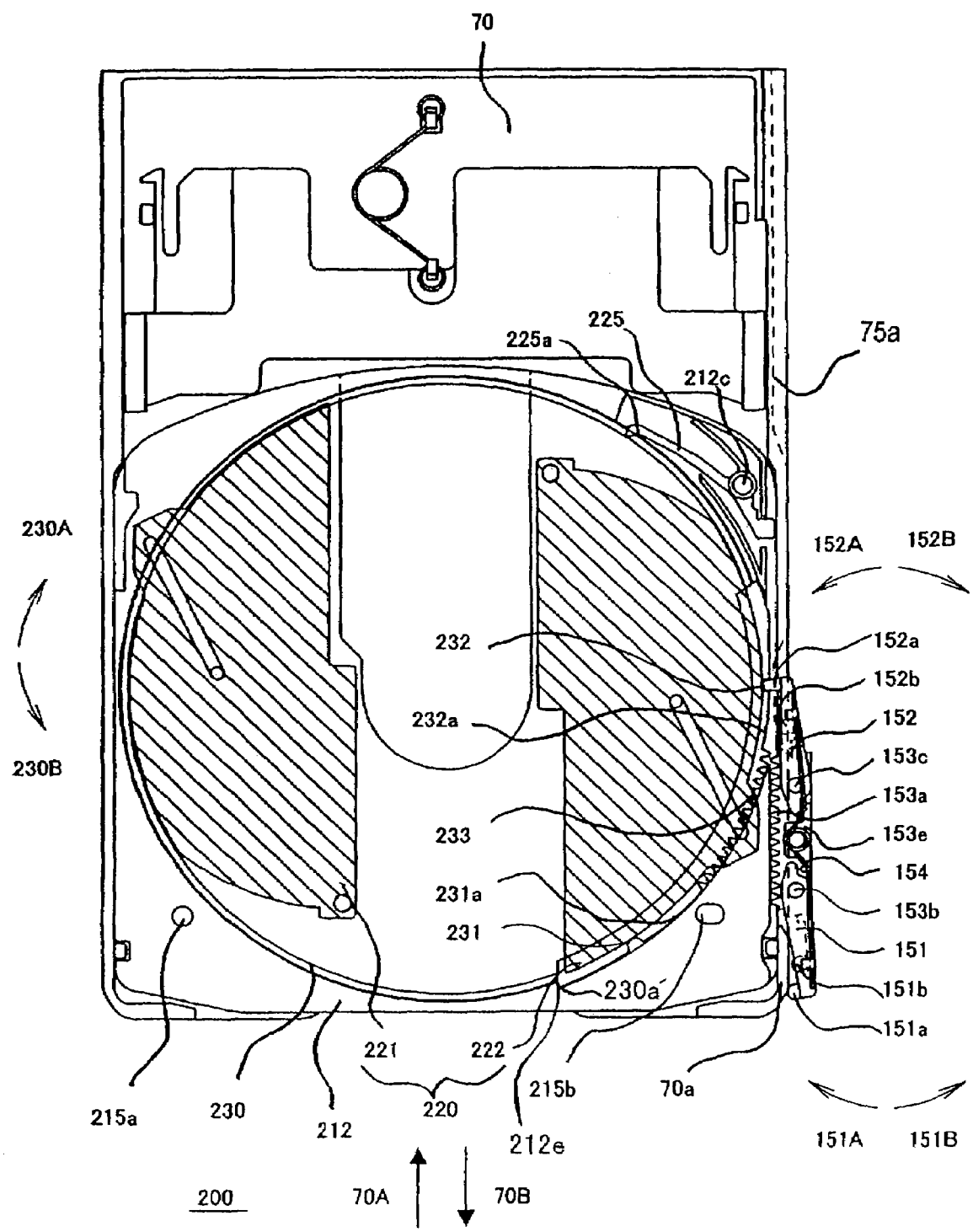
FIG. 13 is a plan view showing a state of the shutter driving mechanism during its opening or closing operation in a situation where the disk cartridge has been inserted into the disk drive with its shutter pair fully closed.

However, depending on variations in the shape accuracy of the shutter driving mechanism 150, the disk cartridge 200 and other members (e.g., imperfect and loose fit between the fitting portion 152a of the second driving lever 152 and the second notched portion 232 of the rotational member 230) and/or the shift of the tray 70 in the disk cartridge 200 in the direction pointed by either the arrow 70A or the arrow 70B, the shutters may not have been opened fully when the relative position of the tray 70 to the shutter driving mechanism 150 is as shown in FIG. 13.

In addition, the tray 70 inserted into the disk drive 500 cannot always stop at exactly the same position with high accuracy. For that reason, the position of the disk cartridge 200 with respect to the spindle motor 30 on the traverse base 20 could slightly shift. To correct such a positional error, normally positioning is carried out by fitting the positioning pins 21 and 22 on the traverse base with the positioning holes 215a and 215b of the disk cartridge 200. In that case, however, if the second notched portion 233 and second driving lever 152 remained engaged with each other, the movement of the disk cartridge 200 might be restricted too much to position them accurately.

Figure 14A:
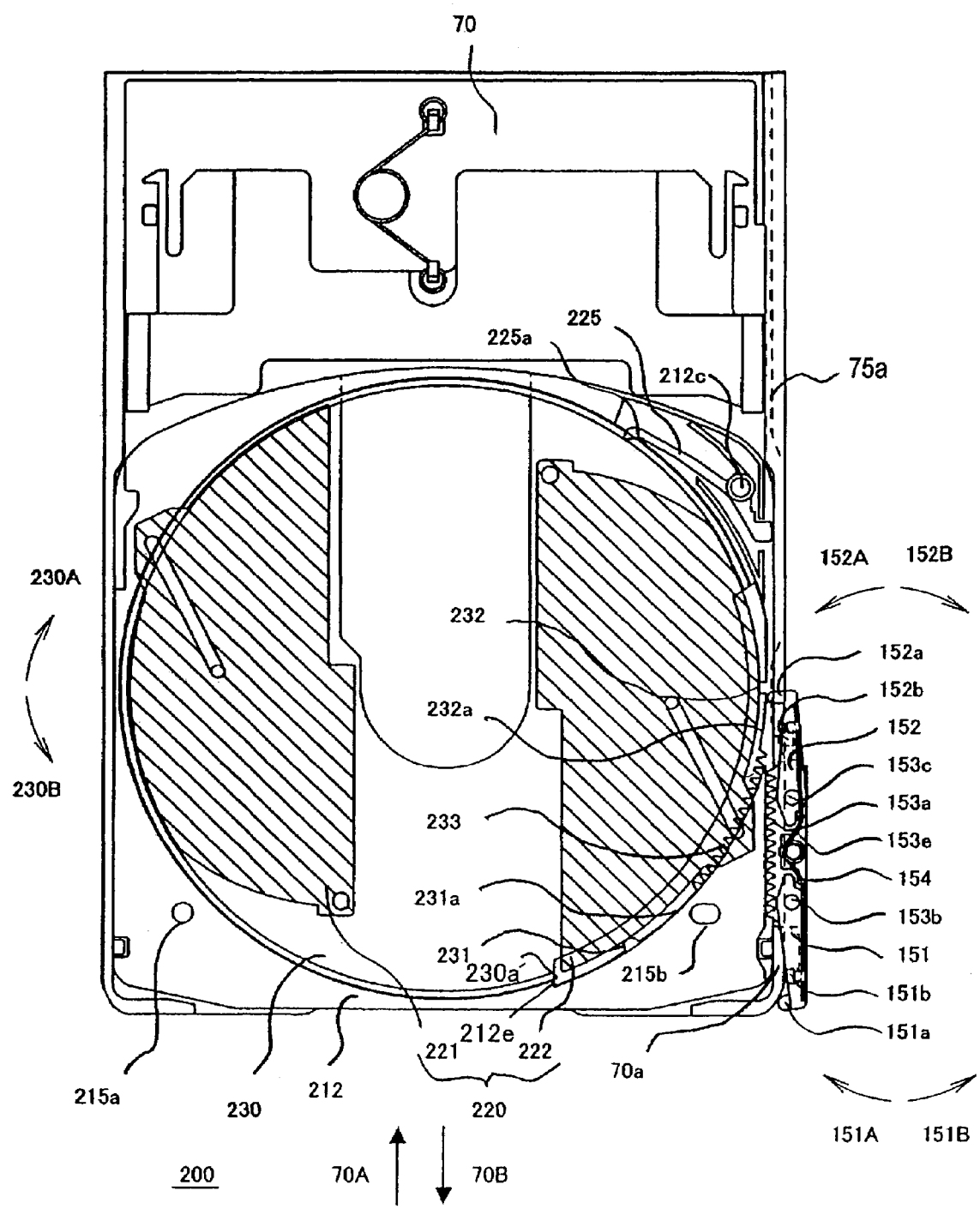
Figure 14B:
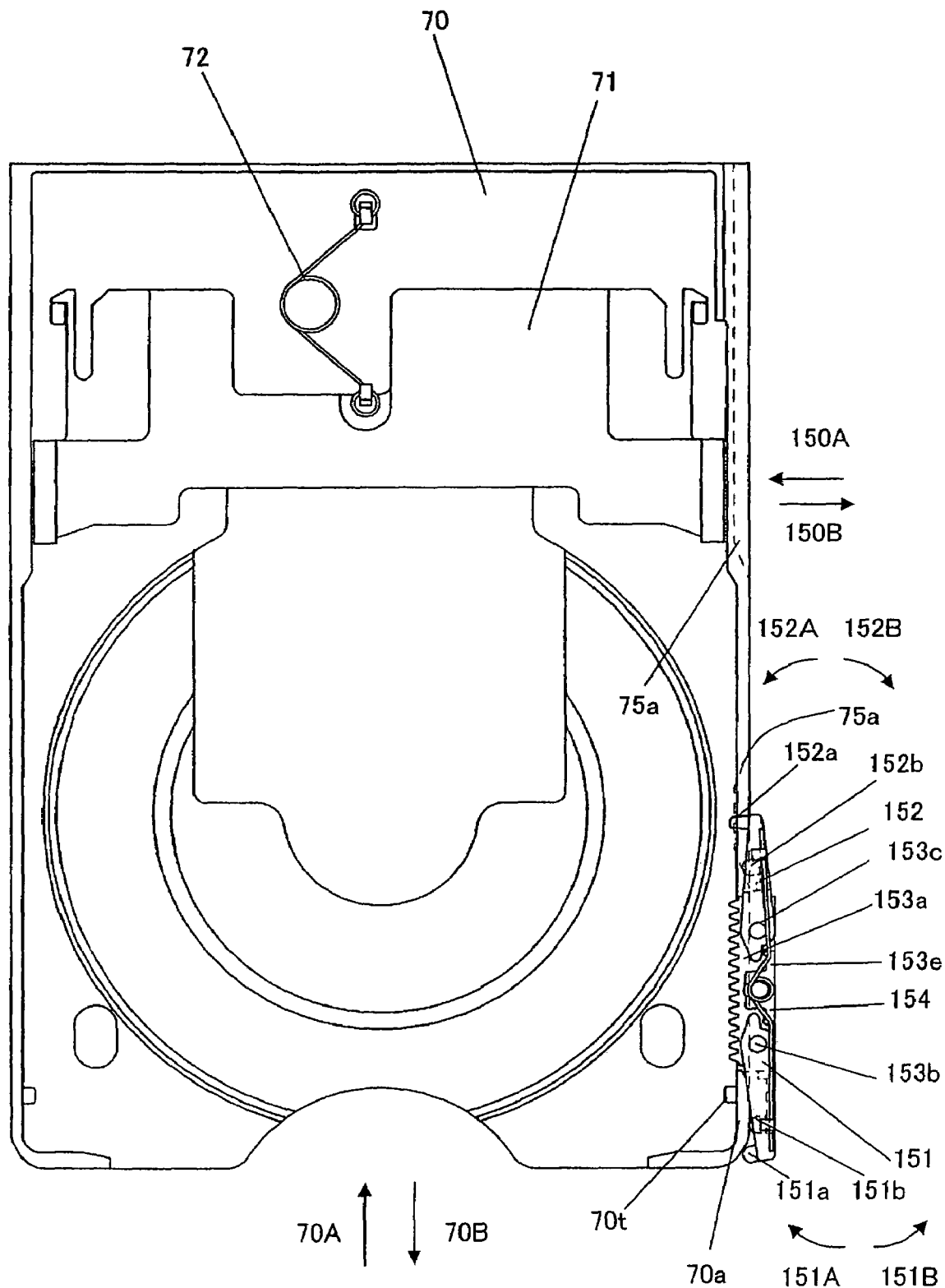
FIG. 14B is a plan view showing a state corresponding to that shown in FIG. 14A with the disk cartridge removed.

In view of this consideration, the tray 70 is inserted even deeper in the arrow direction 70A from the position shown in FIG. 13, thereby driving the tray 70 until the stopper protrusion 230a' of the rotational member 230 contacts with the stopper portion 212e of the lower shell 212 just as designed. Thereafter, the tray 70 is further inserted in the arrow direction 70A, thereby bringing the fitting portion 152b into contact with the raised portion of the guide surface 75a of the cam groove 75 as shown in FIGS. 14A and 14B. In this manner, the second driving lever 152 is turned in the direction pointed by the arrow 152B against the elastic force applied by the spring 154, thereby disengaging the fitting portion 152a of the second driving lever 152 from the second notched portion 232. The fitting portion 152a of the second driving lever 152 may contact with the side surface portion 232a of the rotational member 230. As a result, the operation of inserting the tray 70 into the disk drive 500 is finished. By moving the tray 70 with respect to the shutter driving mechanism 150 in this manner until the fitting portion 152a is completely disengaged from the notched portion 232, the error caused by the variations in the shape accuracy of respective members described above is removed, thereby realizing the state shown in FIG. 14A. Also, as shown in FIG. 14A, the fitting portion 152a is not fitted with the notched portion 232. Thus, when the fixing pins 21 and 22 are fitted with the positioning holes 215a and 215b of the disk cartridge 200, the disk cartridge 200 can be moved. Consequently, the disk cartridge 200 can be positioned accurately with respect to the spindle motor 30 fixed on the traverse base.

Next, it will be described how the shutter driving mechanism 150 operates in the situation (B) where the disk cartridge 200 is mounted on the tray 70 and then loaded into the disk drive 500 with the shutter pair 220 closed incompletely.

Figure 15:
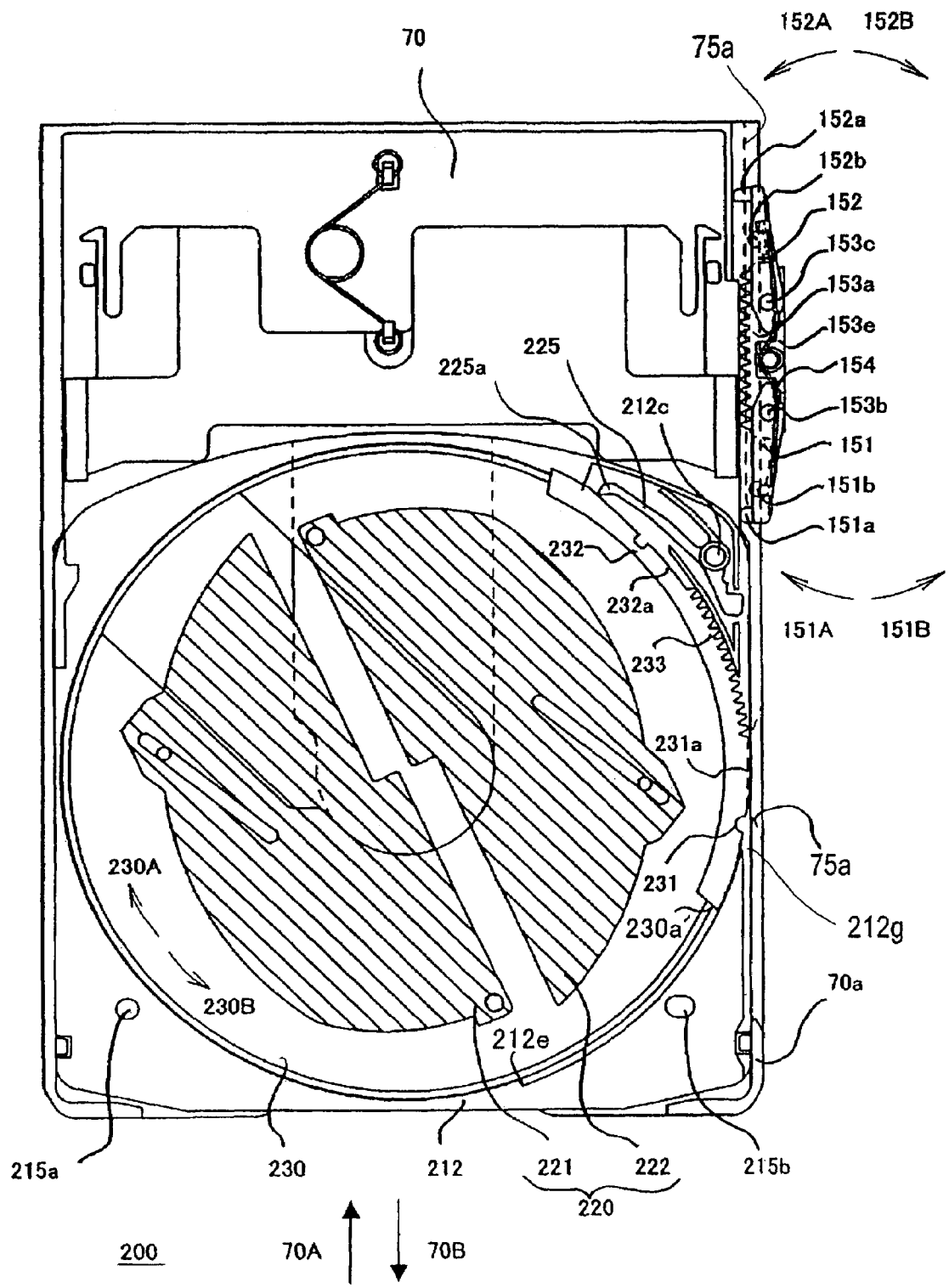
FIG. 15 is a plan view showing a state of the shutter driving mechanism during its opening operation in a situation where the disk cartridge has been inserted into the disk drive with its shutter pair incompletely closed.

As shown in FIG. 15, when the shutter pair 220 is closed incompletely, the gear portion 233 of the rotational member 230 is partially exposed through the window 212g on the side surface of the cartridge body 210. The disk cartridge 200 in such a condition is mounted on the tray 70 and then the tray 70 is inserted in the direction pointed by the arrow 70A by the drive motor 51. The shutter driving mechanism 150 is secured to the base chassis 50. Accordingly, as the tray 70 is inserted deeper, the shutter driving mechanism 150 gets closer to the disk cartridge 200. At this point in time, the guide surface 75a of the cam groove 75 is not in contact with the fitting portions 151b and 152b of the first and second driving levers 151 and 152 and the first and second driving levers 151 and 152 are held with their predetermined angles by the stopper portion 153e provided for the base 153.

Figure 16:
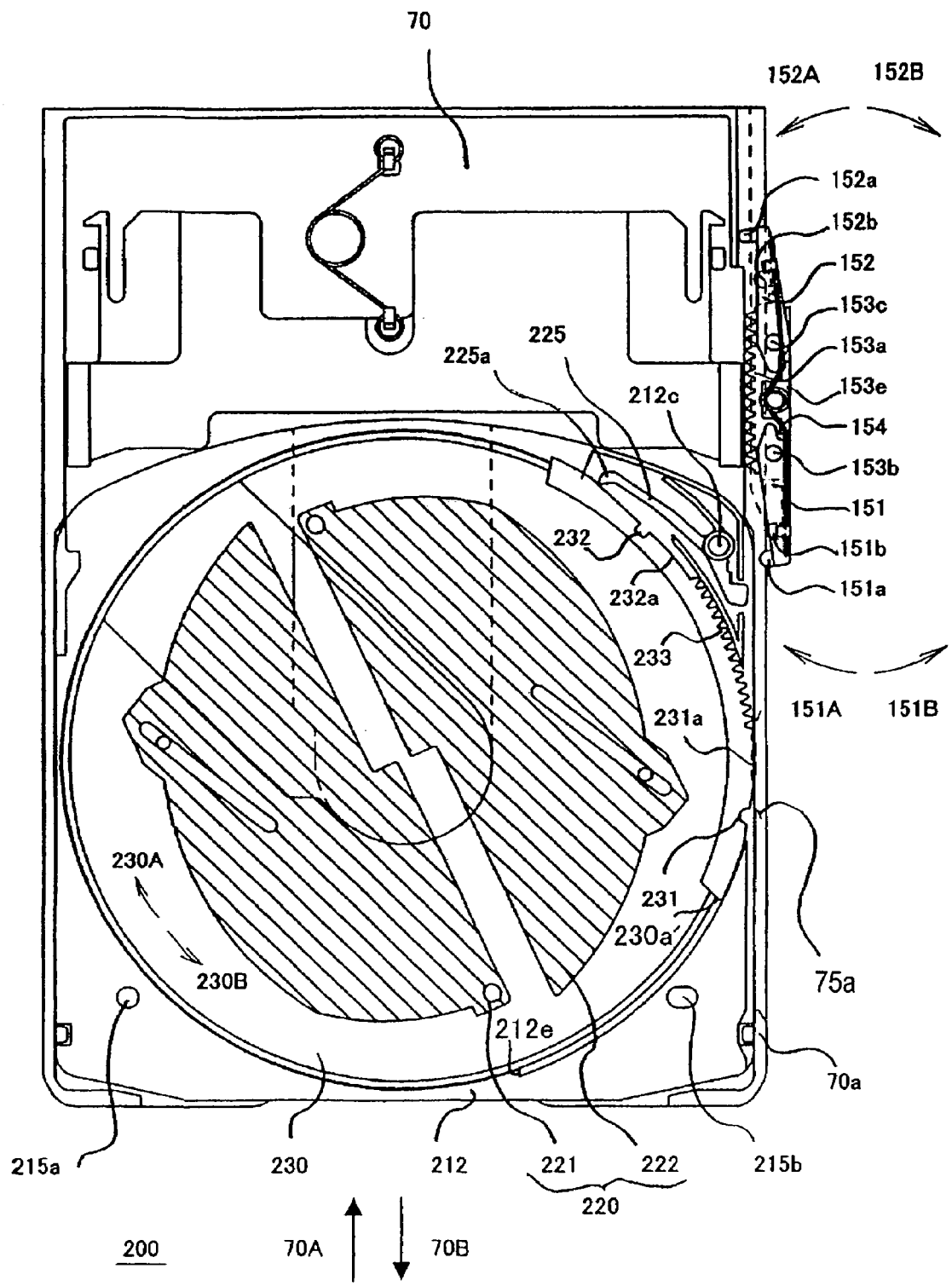
FIG. 16 is a plan view showing a state of the shutter driving mechanism during its opening operation in a situation where the disk cartridge has been inserted into the disk drive with its shutter pair incompletely closed.

As the tray 70 is inserted deeper in the direction pointed by the arrow 70A from the position shown in FIG. 15, the fitting portion 151b of the first driving lever 151 soon reaches a raised portion of the guide surface 75a of the cam groove 75 as shown in FIG. 16. The fitting portion 151b contacts with the guide surface 75a of the cam groove 75 and the first driving lever 151 turns on the rotation shaft 153b in the direction pointed by the arrow 151B, thereby preventing the locking member 225 of the disk cartridge 200 from contacting with the first driving lever 151. At this point in time, the second driving lever 152 has not contacted with the cam groove 75 of the tray 70 yet, and therefore, maintains a predetermined angle of rotation as defined by the stopper portion 153e of the base 153.

Figure 17:
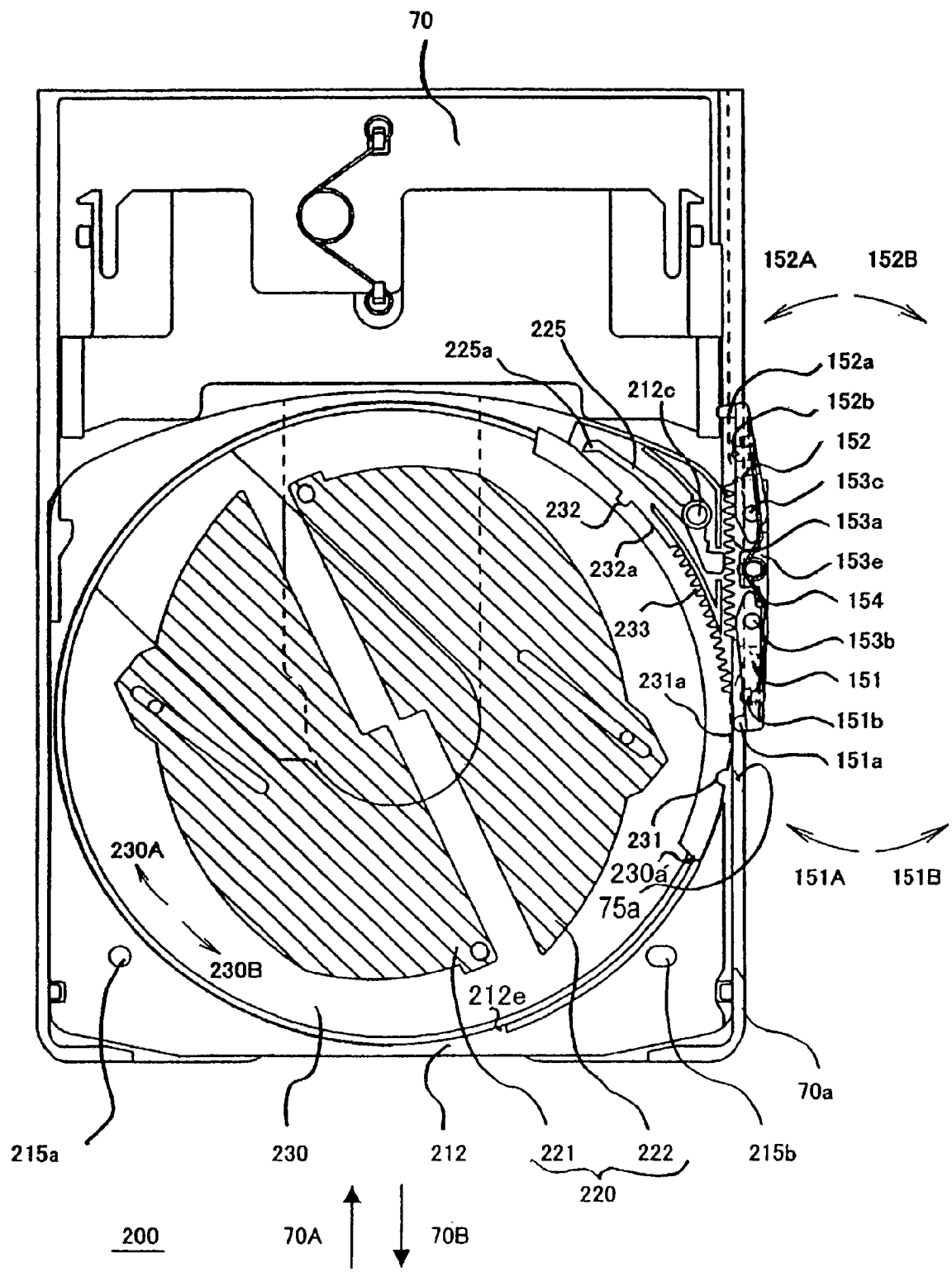
FIG. 17 is a plan view showing a state of the shutter driving mechanism during its opening operation in a situation where the disk cartridge has been inserted into the disk drive with its shutter pair incompletely closed.

As the tray 70 is inserted even deeper in the arrow direction 70A from the position shown in FIG. 16, the rack portion 153a soon reaches a point where the rack portion 153a contacts with the locking member 225 of the disk cartridge 200 as shown in FIG. 17. The locking member 225 of the disk cartridge 200 is pushed by the rack portion 153a. However, since the rotational member 230 has been rotated in the direction pointed by the arrow 230A, the rotational member 230 has already been unlocked. At this point in time, the fitting portion 151b of the first driving lever 151 reaches the recessed portion of the cam groove 75. Since the spring 154 applies elastic force thereto, the first driving lever 151 turns in the direction pointed by the arrow 151A to make the fitting portion 151b contact with the recessed guide surface 75a. Then, the fitting portion 151a of the first driving lever 151 contacts with the side surface portion 231a (or the gear portion 233) of the rotational member 230.

Figure 9B:
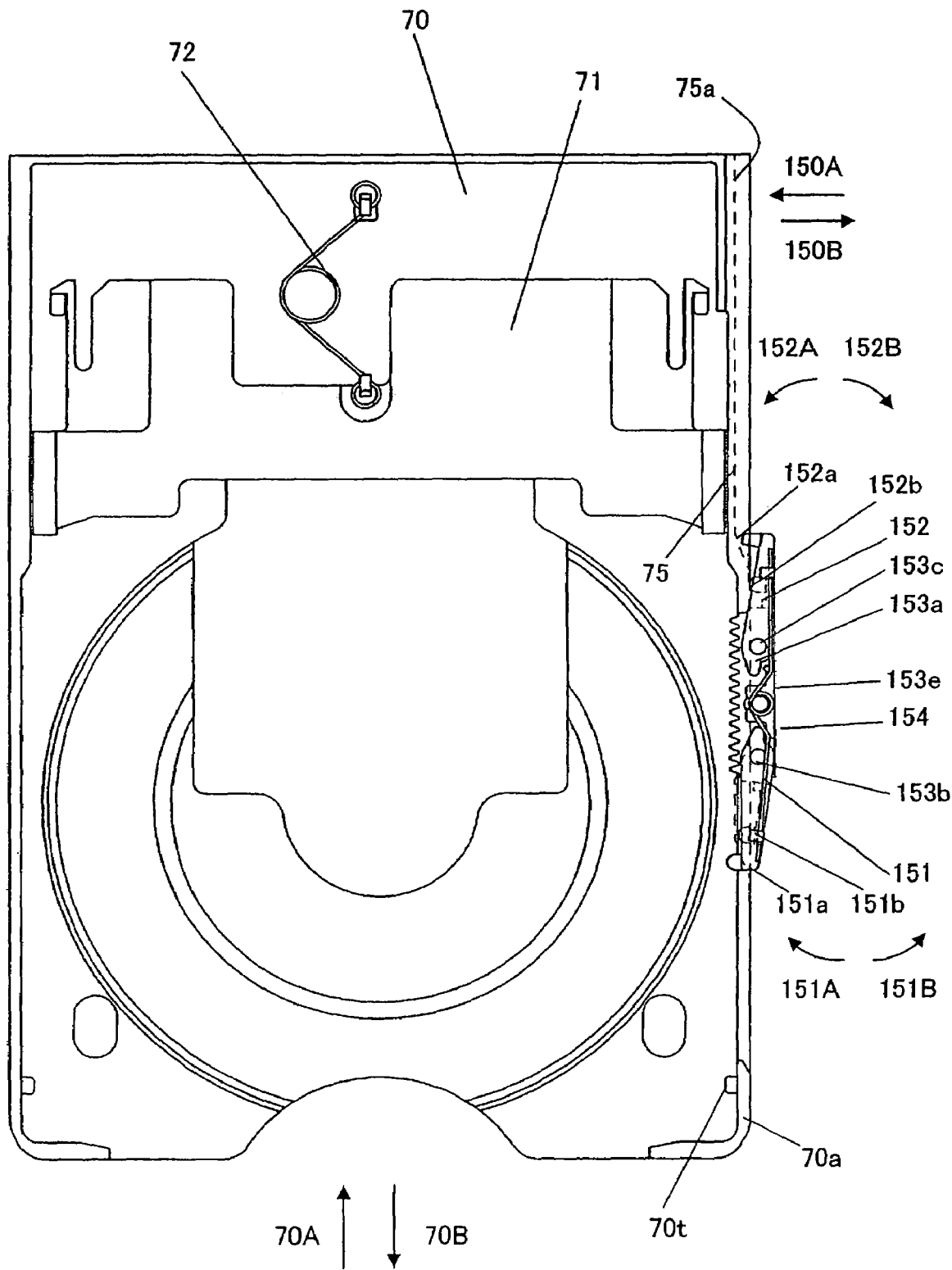
FIG. 9B is a plan view showing a state corresponding to that shown in FIG. 9A with the disk cartridge removed.

However, even if the tray 70 is inserted even deeper in the arrow direction 70A from the position shown in FIG. 17, the first notched portion 231 is not exposed through the window 212g and the fitting portion 151a of the first driving lever 151 does not contact with the first notched portion 231 of the rotational member 230 unlike the situation shown in FIGS. 9A and 9B. Accordingly, the rotational member 230 does not rotate and the fitting portion 151a of the first driving lever 151 slides on the side surface portion 231a (or the gear portion 233) of the rotational member 230.

Figure 18:
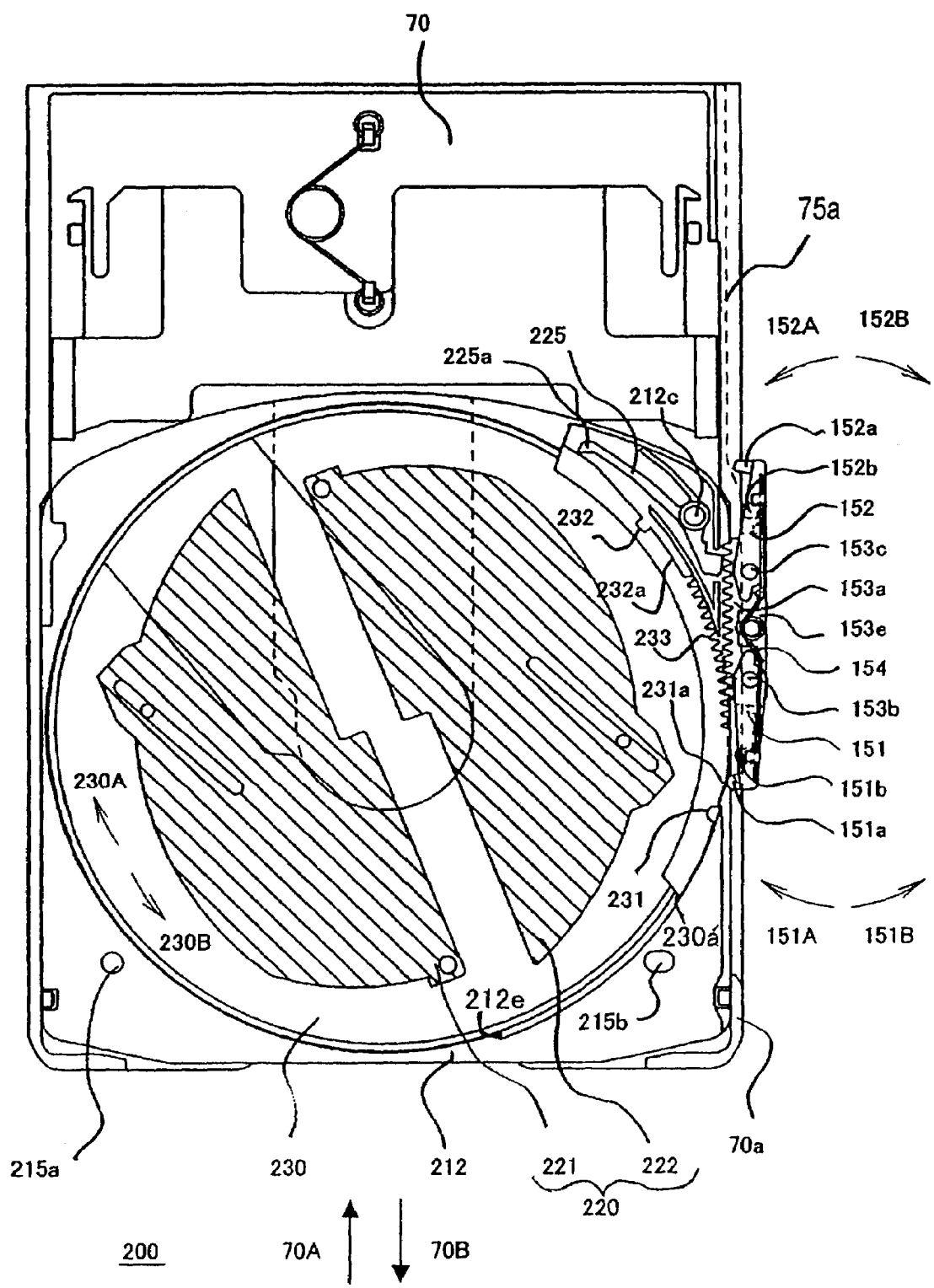
FIG. 18 is a plan view showing a state of the shutter driving mechanism during its opening operation in a situation where the disk cartridge has been inserted into the disk drive with its shutter pair incompletely closed.

As the tray 70 is further inserted in the arrow direction 70A, the rack portion 153a starts engaging with the gear portion 233 of the rotational member 230 as shown in FIG. 18. In this case, unlike the situation shown in FIG. 10, the end of the rack portion 153a engages with any of the teeth of the gear portion 233 that is closer to the center than to the end. By inserting the tray 70 with the rack portion 153a and the gear portion 233 engaged with each other, the rotational member 230 rotates in the direction pointed by the arrow 230A and the incompletely closed shutter pair 220 starts to open. At this point in time, the fitting portion 152b of the second driving lever 152 reaches a raised portion of the guide surface 75a of the cam groove 75. The fitting portion 152b contacts with the guide surface 75a of the cam groove 75 and the second driving lever 152 turns on the rotation shaft 153c in the direction pointed by the arrow 152B, thereby preventing the locking member 225 of the disk cartridge 200 from contacting with the second driving lever 152.

Figure 19:
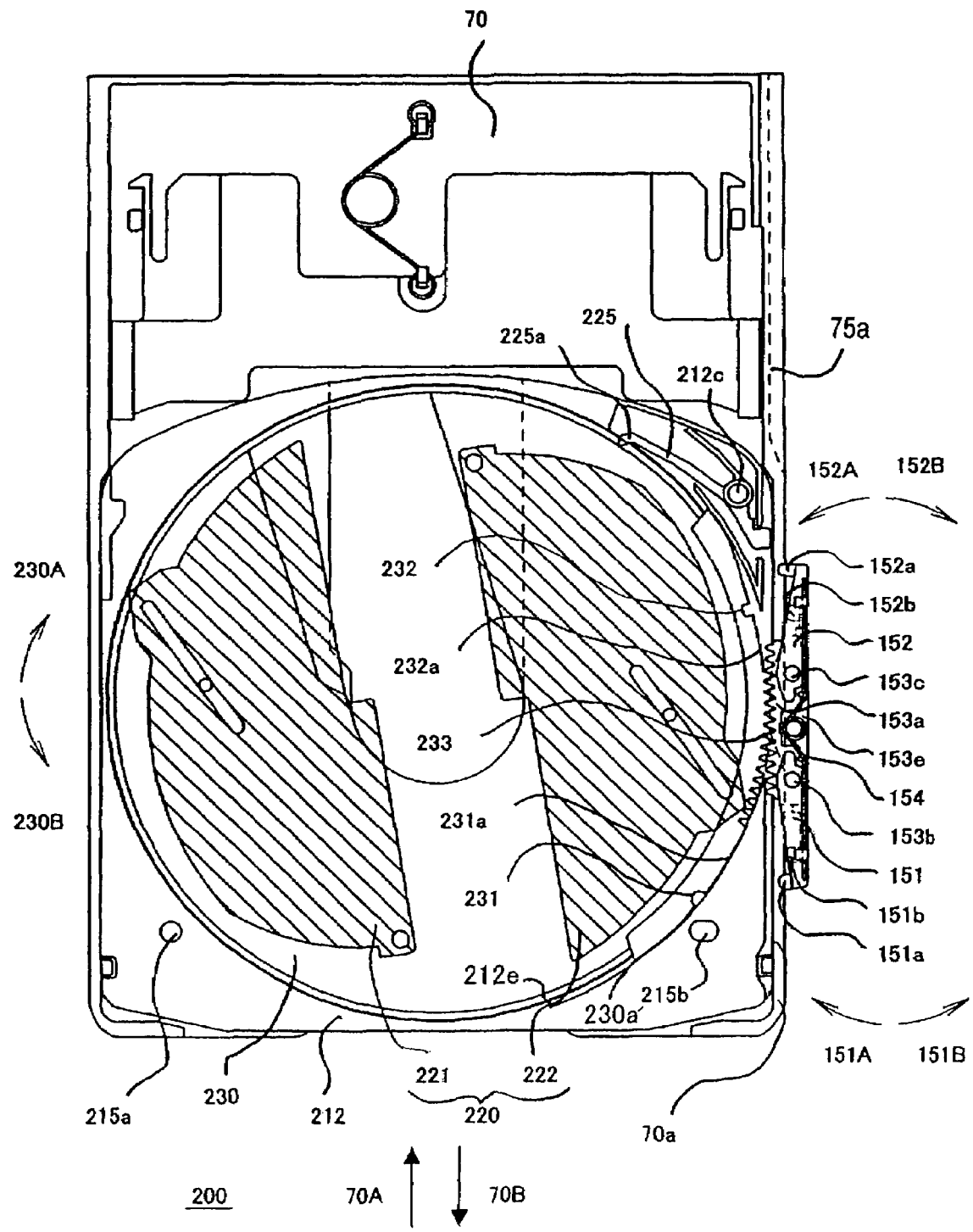
FIG. 19 is a plan view showing a state of the shutter driving mechanism during its opening operation in a situation where the disk cartridge has been inserted into the disk drive with its shutter pair incompletely closed.

As the tray 70 is inserted even deeper in the arrow direction 70A from the position shown in FIG. 18, the rotational member 230 further rotates in the arrow direction 230A and the shutter pair 220 opens to a greater degree due to the engagement between the rack portion 153a and the gear portion 233 of the rotational member 230 as shown in FIG. 19. At this point in time, the first driving lever 151 is driven by the cam groove 75 of the tray 70. As a result, the first driving lever 151 turns on the rotation shaft 153b in the direction pointed by the arrow 151B so as to avoid contact with the side surface of the disk cartridge 200.

Figure 20:
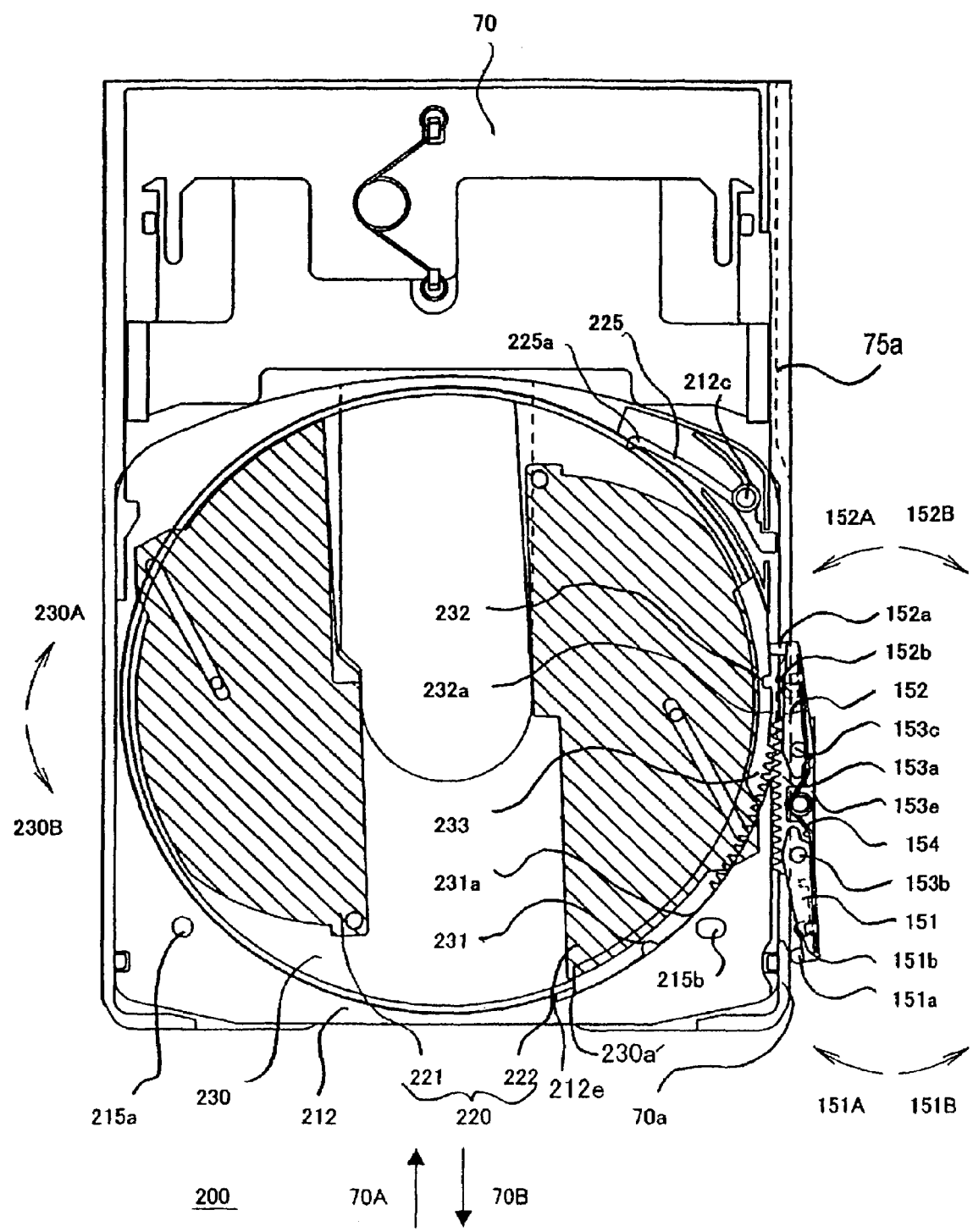
FIG. 20 is a plan view showing a state of the shutter driving mechanism during its opening operation in a situation where the disk cartridge has been inserted into the disk drive with its shutter pair incompletely closed.

As the tray 70 is inserted even deeper in the arrow direction 70A from the position shown in FIG. 19, the fitting portion 152b of the second driving lever 152 soon reaches the recessed portion of the cam groove 75. Since the spring 154 applies elastic force thereto, the second driving lever 152 turns in the direction pointed by the arrow 152A to make the fitting portion 152b contact with the recessed guide surface 75a. Thus, the fitting portion 152a of the second driving lever 152 contacts with the side surface portion 232a of the rotational member 230 as shown in FIG. 20.

The rack portion 153a started to engage with the gear portion 233 of the rotational member 230 from a halfway point thereof. Thus, the number of teeth of the rack portion 153a exceeds the number of teeth of the gear portion 233. However, the side surface portion 232a of the rotational member 230 with the second notched portion 232 is as high as the addendum plane of the gear portion 233. Accordingly, the extra teeth of the rack portion 153a do not contact with the rotational member 230 but slide and move on the surface of the side surface portion 232a. Meanwhile, the fitting portion 152a of the second driving lever 152 also slides and moves on the side surface portion 232a of the rotational member 230. That is to say, the rotational member 230 receives no driving force from the shutter driving mechanism 150 in the meantime and stops its rotation.

When the fitting portion 152a of the second driving lever 152 reaches the position of the second notched portion 232 by inserting the tray 70, the fitting portion 152a gets fitted with the second notched portion 232. As a result of this fitting, the rotational member 230 starts to rotate again and the shutter driving mechanism 150 and the disk cartridge 200 operate just as described above. The shutter pair 220 is fully opened as shown in FIG. 14 once the error caused by the shape variations of respective members has been removed after having gone through the situation shown in FIG. 13. In this manner, the shutter driving mechanism 150 finishes its opening operation.

As described above, even if the disk cartridge 200 is mounted on the tray 70 with the shutter pair 220 closed incompletely and if the tray 70 is loaded into the disk drive 500, the shutter driving mechanism 150 can open the shutter pair 220 just as intended and the disk cartridge 200 can be loaded into the disk drive 500 without causing any inconvenience.

Next, it will be described how the shutter driving mechanism 150 operates in the situation (C) where the disk cartridge 200 is mounted on the tray 70 and then loaded into the disk drive 500 with the shutter pair 220 fully opened.

Figure 21:
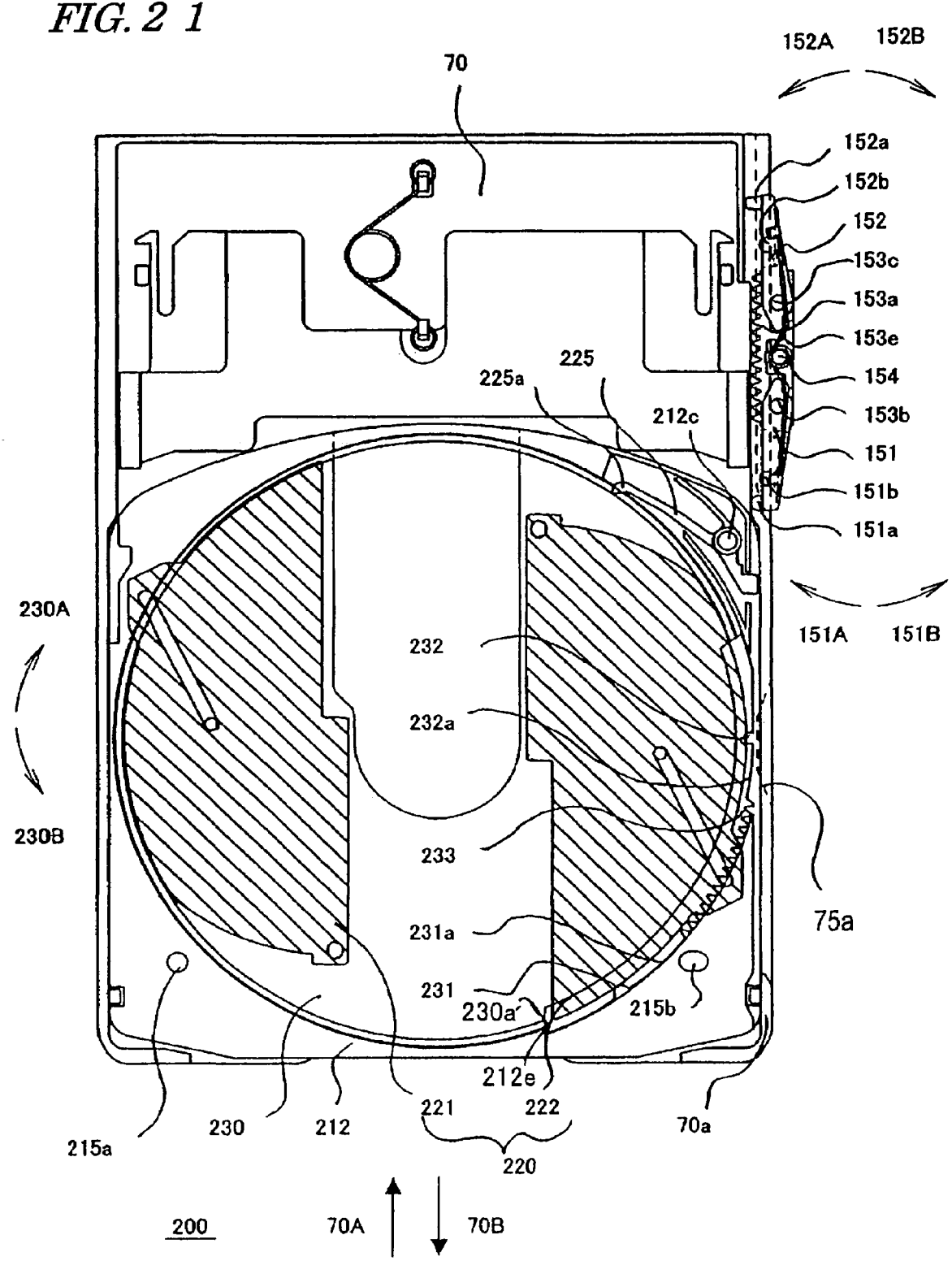
FIG. 21 is a plan view showing a state of the shutter driving mechanism during its opening operation in a situation where the disk cartridge has been inserted into the disk drive with its shutter pair fully opened.

As shown in FIG. 21, when the shutter pair 220 is opened fully, the second notched portion 232 of the rotational member 230 is fully exposed through the window 212g on the side surface of the disk cartridge 200 as shown in FIG. 21. The disk cartridge 200 in such a condition is mounted on the tray 70 and then the tray 70 is inserted in the direction pointed by the arrow 70A by the drive motor 51. The shutter driving mechanism 150 is secured to the base chassis 50. Accordingly, as the tray 70 is inserted deeper, the shutter driving mechanism 150 gets closer to the disk cartridge 200. At this point in time, the guide surface 75a of the cam groove 75 is not in contact with the fitting portions 151b and 152b of the first and second driving levers 151 and 152 and the first and second driving levers 151 and 152 are held with their predetermined angles by the stopper portion 153e provided for the base 153.

Figure 22:
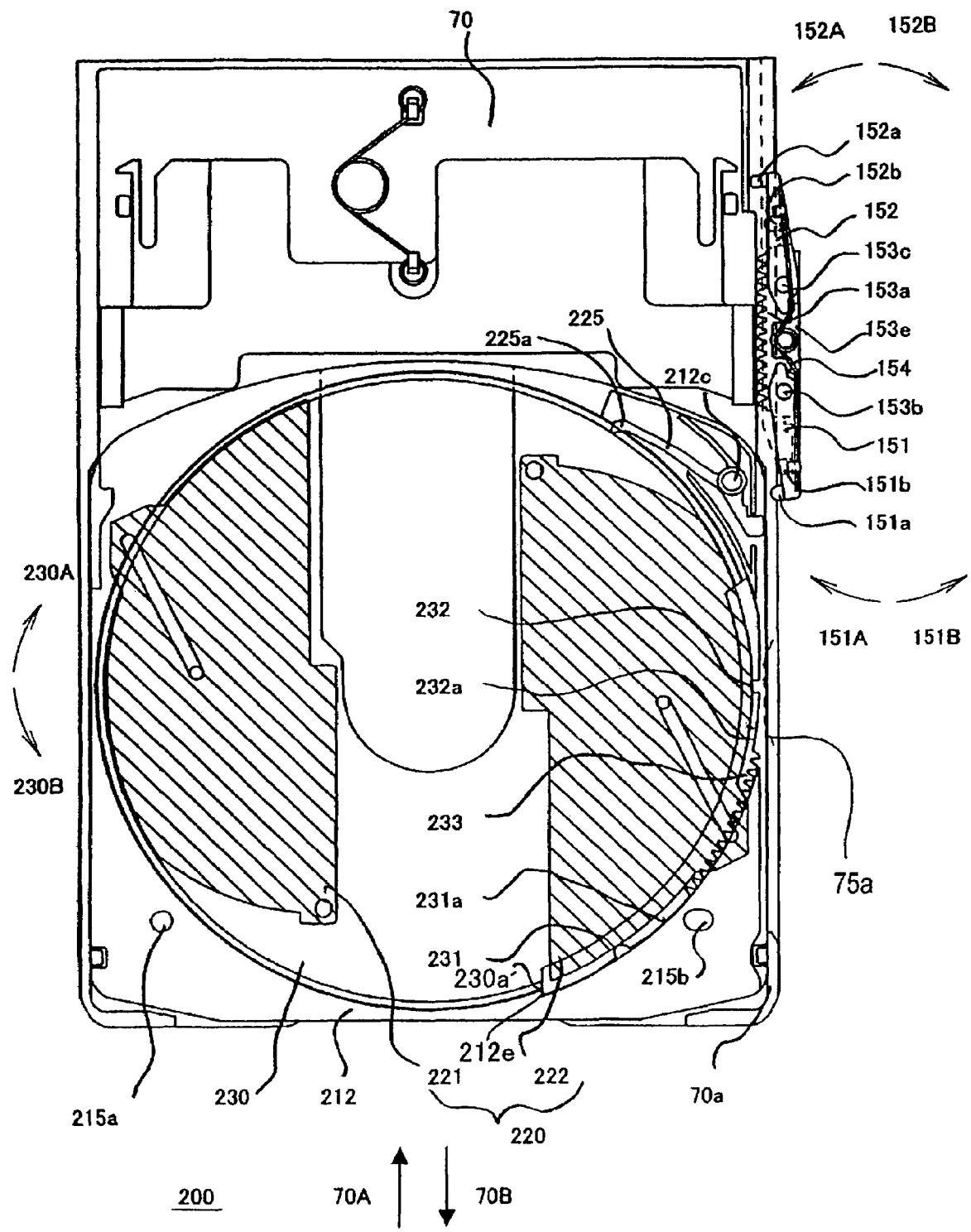
FIG. 22 is a plan view showing a state of the shutter driving mechanism during its opening operation in a situation where the disk cartridge has been inserted into the disk drive with its shutter pair fully opened.
Figure 23:
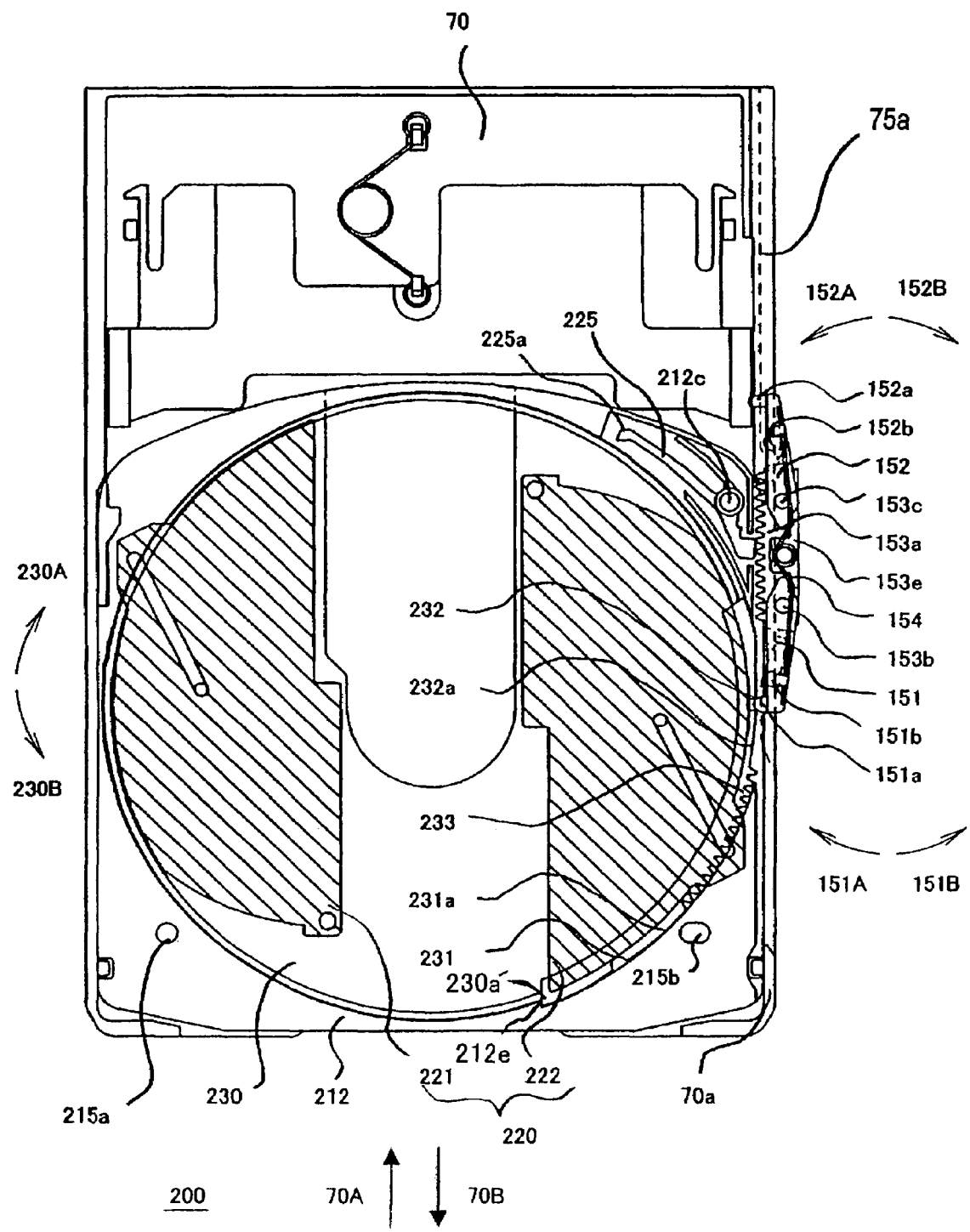
FIG. 23 is a plan view showing a state of the shutter driving mechanism during its opening operation in a situation where the disk cartridge has been inserted into the disk drive with its shutter pair fully opened.

As the tray 70 is inserted deeper in the direction pointed by the arrow 70A from the position shown in FIG. 21, the fitting portion 151b of the first driving lever 151 soon reaches a raised portion of the guide surface 75a of the cam groove 75 as shown in FIG. 22. The fitting portion 151b contacts with the guide surface 75a of the cam groove 75 and the first driving lever 151 turns on the rotation shaft 153b in the direction pointed by the arrow 151B, thereby preventing the locking member 225 of the disk cartridge 200 from contacting with the first driving lever 151. At this point in time, the second driving lever 152 has not contacted with the cam groove 75 of the tray 70 yet, and therefore, maintains a predetermined angle of rotation as defined by the stopper portion 153e of the base 153.

As the tray 70 is inserted even deeper in the arrow direction 70A from the position shown in FIG. 22, the rack portion 153a soon reaches a point where the rack portion 153a contacts with the locking member 225 of the disk cartridge 200. The locking member 225 of the disk cartridge 200 is pushed by the rack portion 153a. However, since the rotational member 230 has been rotated in the direction pointed by the arrow 230A, the rotational member 230 has already been unlocked. At this point in time, the fitting portion 151b of the first driving lever 151 reaches the recessed portion of the cam groove 75. Since the spring 154 applies elastic force thereto, the first driving lever 151 turns in the direction pointed by the arrow 151A to make the fitting portion 151b contact with the recessed guide surface 75a. Then, the fitting portion 151a of the first driving lever 151 contacts with the side surface portion 231a (or the gear portion 233) of the rotational member 230.

However, even if the tray 70 is inserted even deeper in the arrow direction 70A from the position shown in FIG. 22, not the first notched portion 231 but the second notched portion 232 is exposed through the window 212g unlike the situation shown in FIGS. 9A and 9B. Nevertheless, since the side surface portion 232a with the second notched portion 232 is the bottom of the teeth of the gear portion 233, the second notched portion 232 is recessed with respect to the fitting portion 151a of the first driving lever 151, and therefore, the fitting portion 151a does not fit with the second notched portion 232. Accordingly, the rotational member 230 does not rotate and the fitting portion 151a of the first driving lever 151 slides and shifts on the side surface portion 232a of the rotational member 230. Even if the fitting portion 151a of the first driving lever 151 happen to get fitted with the second notched portion 232 due to the shape variation of respective members, the stopper protrusion 230a' of the rotational member 230 contacts with the stopper portion 212e of the cartridge lower shell 212, thereby preventing the rotational member 230 from rotating. Accordingly, even in such a situation, the first driving lever 151 is turned in the direction pointed by the arrow 151B and disengaged easily due to the reactive force applied from the non-rotating rotational member 230.

Figure 24:
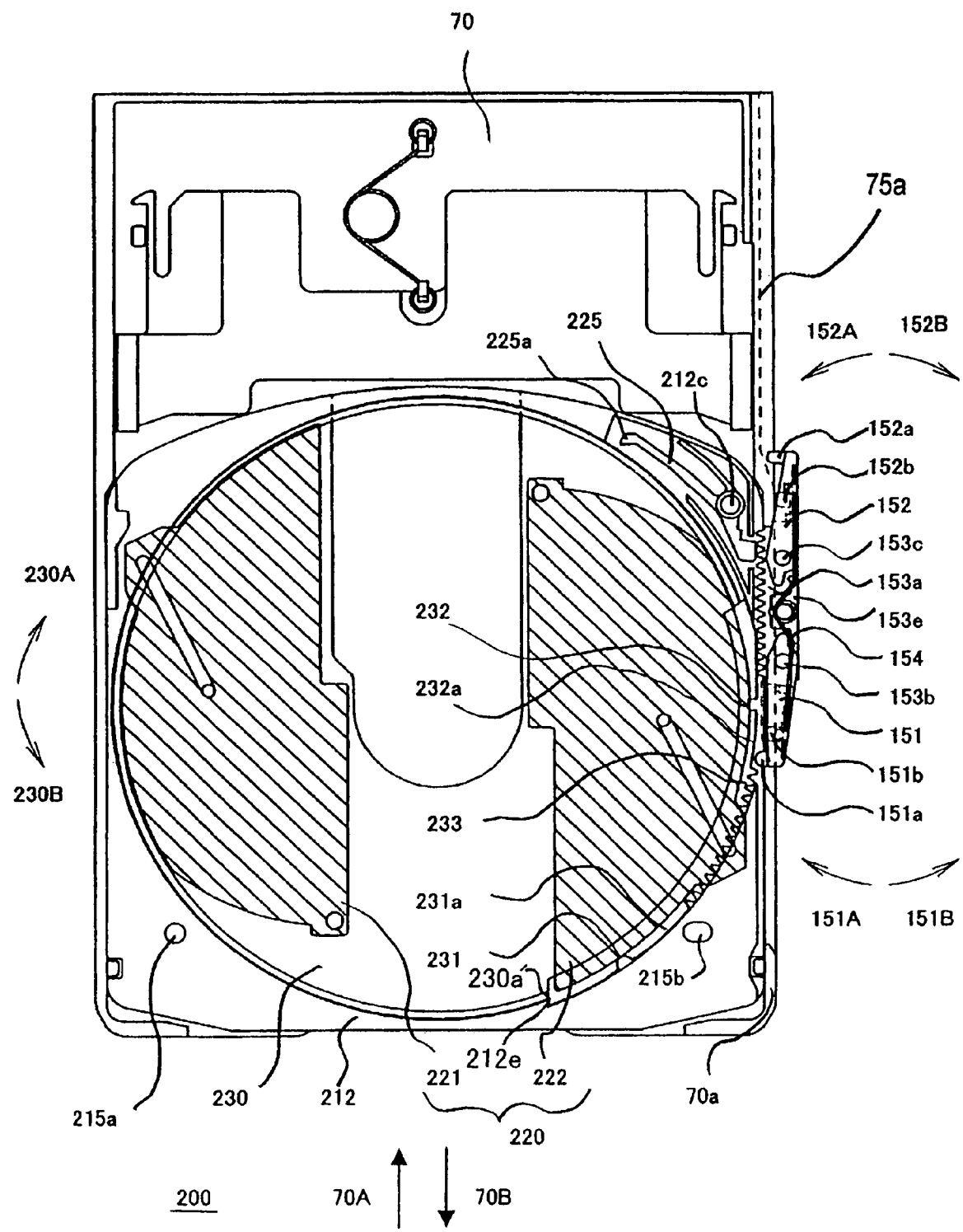
FIG. 24 is a plan view showing a state of the shutter driving mechanism during its opening operation in a situation where the disk cartridge has been inserted into the disk drive with its shutter pair fully opened.

As the tray 70 is inserted even deeper in the arrow direction 70A, the rack portion 153a soon reaches the side surface portion 232a of the rotational member 230 as shown in FIG. 24. As described above, the side surface portion 232a is located as high as the addendum plane of the gear portion 233. Thus, the rack portion 153a does not engage with the rotational member 230 but just slips. At this point in time, the fitting portion 152b of the second driving lever 152 reaches the raised portion of the guide surface 75a of the cam groove 75 and the fitting portion 152b contacts with the guide surface 75a of the cam groove 75, thereby turning the second driving lever 152 on the rotation shaft 153c in the arrow direction 152B and preventing the locking member 225 of the disk cartridge 200 from contacting with the second driving lever 152.

Even if the tray 70 is further inserted in the arrow direction 70A from the position shown in FIG. 24, the rack portion 153a still does not engage with the gear portion 233 but moves on the side surface portion 232a. Accordingly, the rotational member 230 does not rotate but remains stopped. At this point in time, the first driving lever 151 is driven by the cam groove 75 of the tray 70 and turned on the rotation shaft 153b in the arrow direction 151B so as not to contact with the side surface of the disk cartridge 200.

Figure 25:
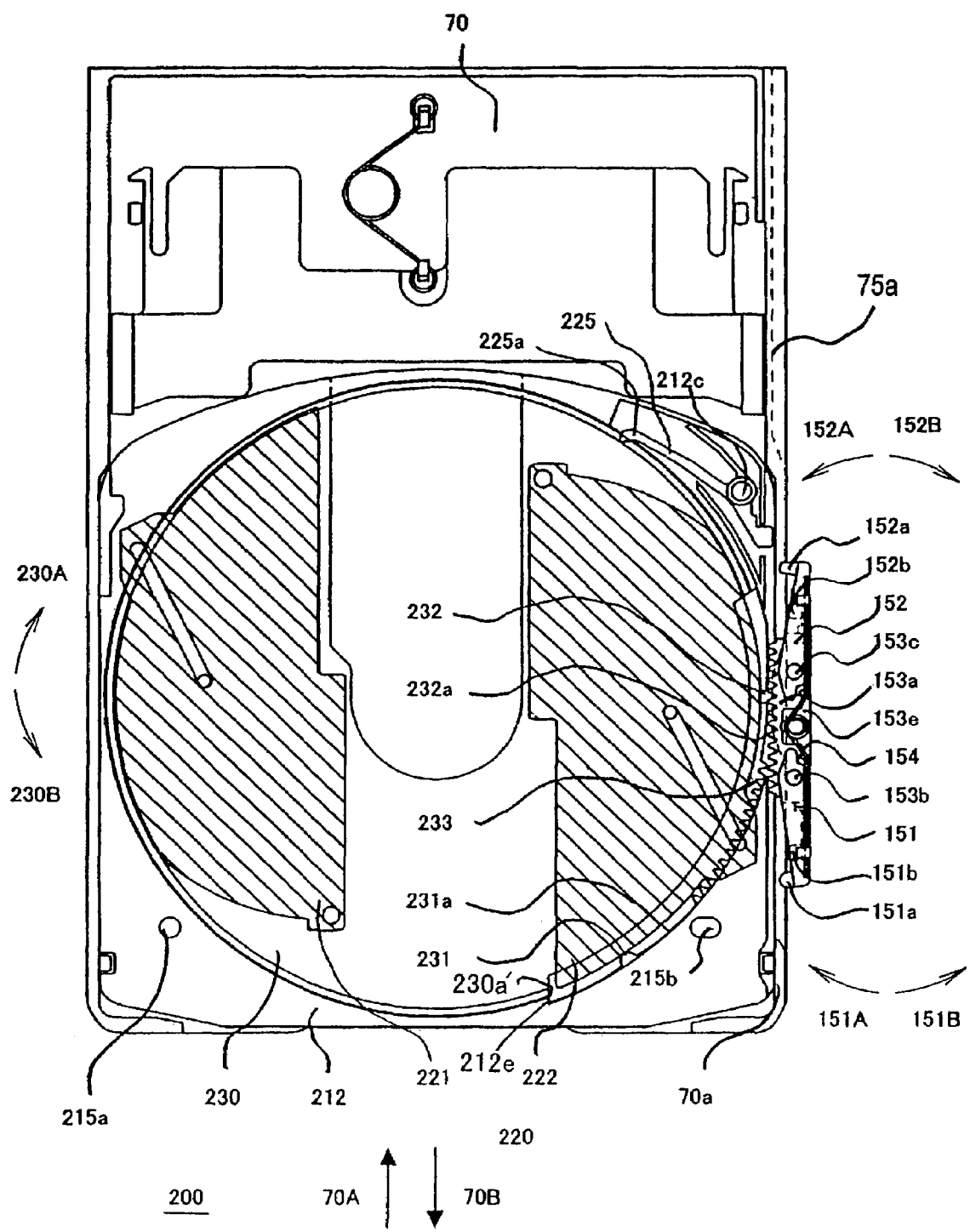
FIG. 25 is a plan view showing a state of the shutter driving mechanism during its opening operation in a situation where the disk cartridge has been inserted into the disk drive with its shutter pair fully opened.
Figure 26:
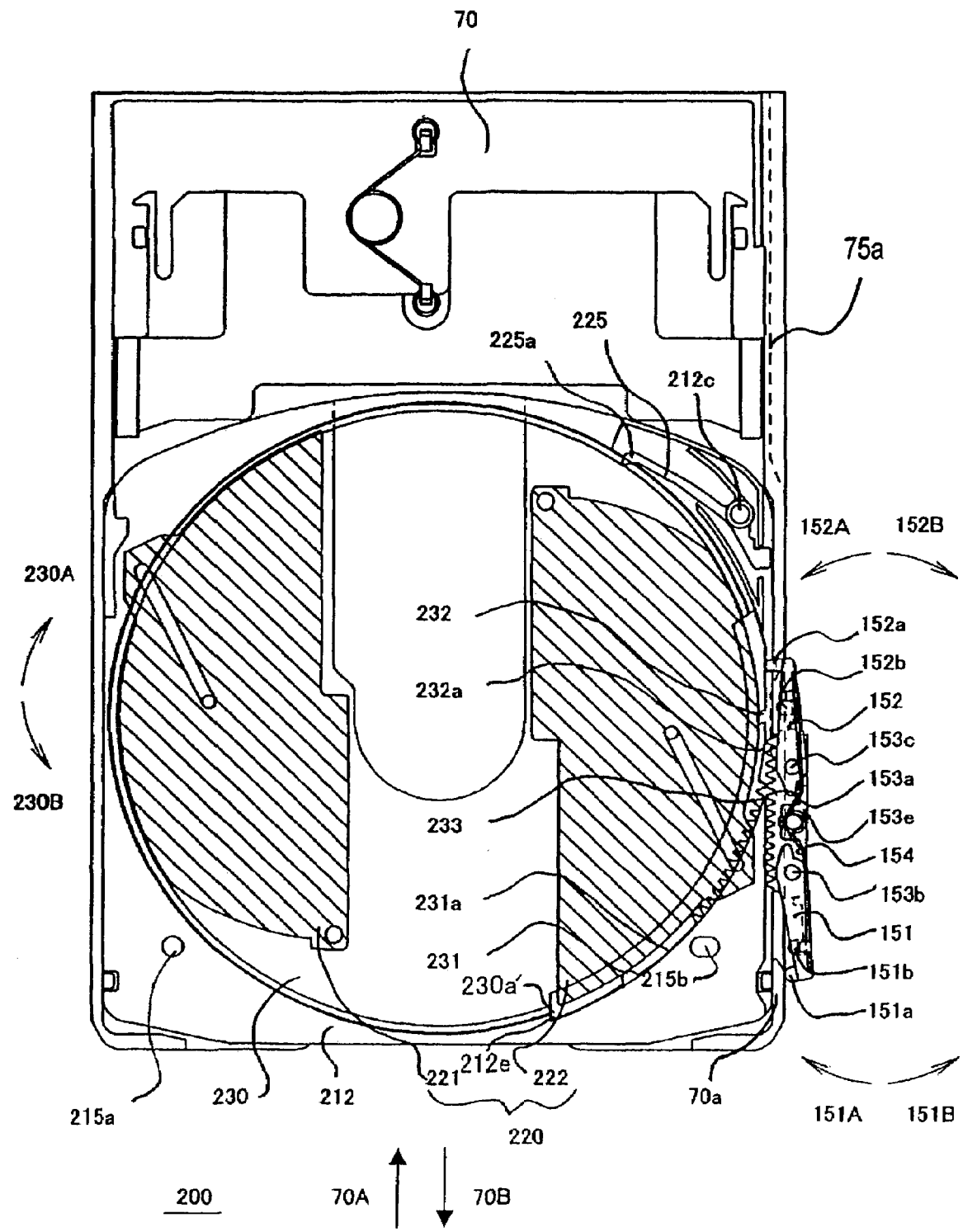
FIG. 26 is a plan view showing a state of the shutter driving mechanism during its opening operation in a situation where the disk cartridge has been inserted into the disk drive with its shutter pair fully opened.

As the tray 70 is inserted even deeper in the arrow direction 70A from the position shown in FIG. 25, the fitting portion 152b of the second driving lever 152 soon reaches the recessed portion of the cam groove 75. Since the spring 154 applies elastic force thereto, the second driving lever 152 turns in the direction pointed by the arrow 152A to make the fitting portion 152b contact with the recessed guide surface 75a. Thus, the fitting portion 152a of the second driving lever 152 contacts with the side surface portion 232a of the rotational member 230 as shown in FIG. 26. As the tray 70 further moves, the fitting portion 152a of the second driving lever 152 slides and moves on the side surface portion 232a of the rotational member 230 and gets fitted with the second notched portion 232 as shown in FIG. 13. Thereafter, the error caused by the shape variations of respective members is removed and the disk drive 500 comes to have the condition shown in FIG. 14. In this manner, the shutter driving mechanism 150 finishes its opening operation.

As described above, even if the disk cartridge 200 is mounted on the tray 70 with the shutter pair 220 fully opened and then the tray 70 is loaded into the disk drive 500, the disk cartridge 200 can be loaded into the disk drive 500 without causing any inconvenience and with the shutter pair 220 kept opened.

Finally, it will be described how the shutter driving mechanism 150 operates in the situation (D) where the disk cartridge 200 is unloaded with the shutter pair 220 closed. This operation is carried out in quite the opposite procedure to the situation (A) where the tray 70 is inserted into the disk drive 500 with the shutter pair 220 fully closed. That is to say, the operation is started in the situation shown in FIGS. 14A and 14B. And by shifting and ejecting the tray 70 out of the disk drive 500, the shutter driving mechanism 150 closes the shutter pair 220 fully as in the situation shown in FIG. 6.

As the drive motor 51 moves the tray 70 in the direction pointed by the arrow 70B from the position shown in FIG. 14 to eject the tray 70, the fitting portion 152b of the second driving lever 152 soon reaches the recessed portion of the cam groove 75 of the tray 70. Since the spring 154 applies elastic force thereto, the second driving lever 152 turns in the direction pointed by the arrow 152A to make the fitting portion 152b contact with the recessed guide surface 75a. Then, the fitting portion 152a of the second driving lever 152 contacts with the side surface portion 232a of the rotational member 230. Thereafter, as the tray 70 is further moved forward in the arrow direction 70B, the fitting portion 152a of the second driving lever 152 slides on the side surface portion 232a of the rotational member 230 and then gets fitted with the second notched portion 232 of the rotational member 230 as shown in FIG. 13. As the tray 70 is further moved forward in the arrow direction 70B from the position shown in FIG. 13, the shutter driving mechanism 150 rotates the rotational member 230 in the direction pointed by the arrow 230B due to the engagement between the fitting portion 152a of the second driving lever 152 and the second notched portion 232. As a result, the shutter pair 220 starts to close its shutters.

Consequently, the rotational member 230 rotates to a predetermined degree as defined by the relative movement of the tray 70 with respect to the shutter driving mechanism 150 as shown in FIGS. 12A and 12B. Then, before the fitting portion 152a of the second driving lever 152 disengages itself from the second notched portion 232, the rack portion 153a starts engaging with the gear portion 233 of the rotational member 230. And the shutter pair 220 is further closed.

As the tray 70 is further moved forward in the arrow direction 70B from the position shown in FIG. 12A, the rotational member 230 further rotates in the arrow direction 230B and the shutter pair 220 is further closed due to the engagement between the rack portion 153a and the gear portion 233 of the rotational member 230 as shown in FIGS. 11A and 11B. At this point in time, the fitting portion 152b of the second driving lever 152 reaches the raised portion of the cam groove 75. Thus, the second driving lever 152 turns on the rotation shaft 153c in the direction pointed by the arrow 152B such that the fitting portion 152a goes away from the side surface of the disk cartridge 200. In this manner, it is possible to prevent the guide portion 212H and locking member 225 of the rotational member 230 from contacting with the fitting portion 152a of the second driving lever 152.

As the tray 70 is further moved forward in the arrow direction 70B from the position shown in FIG. 1A, the fitting portion 151b of the first driving lever 151 soon reaches the recessed portion of the cam groove 75 as shown in FIG. 10. Since the spring 154 applies elastic force thereto, the first driving lever 151 turns in the direction pointed by the arrow 151A to make the fitting portion 151b contact with the recessed guide surface 75a. Then, due to the engagement between the gear portion 233 of the rotational member 230 and the rack portion 153a, the rotational member 230 rotates to a predetermined degree while closing the shutter pair 220. As a result, before the gear portion 230 disengages itself from the rack portion 153a, the fitting portion 151a of the first driving lever 151 starts fitting into the first notched portion 231 of the rotational member 230. At this point in time, the locking member 225 is pushed by the rack portion 153a and the rotational member 230 is unlocked.

As the tray 70 is moved further forward in the arrow direction 70B from the position shown in FIG. 10, the fitting portion 151a of the first driving lever 151 gets fitted with the first notched portion 231 of the rotational member 230, thereby rotating the rotational member 230 and closing the shutter pair 220 as shown in FIGS. 9A and 9B. When the shutter pair 220 is closed fully, the rotational member 230 stops its rotation.

At this point in time, however, the shutters may not have been closed fully yet due to the shape variations of respective members mentioned above. In view of this consideration, as shown in FIGS. 8A and 8B, the tray 70 is further moved forward in the arrow direction 70B from the position shown in FIG. 9, thereby rotating the rotational member 230 until the first and second shutters 221 and 222 contact with each other closely. In this manner, the error caused by the variations in the shape accuracy of respective members described above is removed, thereby closing the shutter pair 220 just as intended. Thereafter, the fitting portion 151b of the first driving lever 151 soon reaches a raised portion of the guide surface 75a of the cam groove 75. Then, along the guide surface 75a, the first driving lever 151 turns in the direction pointed by the arrow 151B, thereby disengaging the fitting portion 151a from the first notched portion 231.

As the tray 70 is further moved forward in the arrow direction 70B, the fitting portion 151a of the first driving lever 151 goes away from the side surface of the disk cartridge 200 and the shutter driving mechanism 150 moves so as to avoid contact with the guide portion 212H and locking member 225 of the rotational member 230 as shown in FIG. 7.

When the tray 70 is further moved forward in the arrow direction 70B from the position shown in FIG. 7, the fitting portions 151b and 152b of the first and second driving levers 151 and 152 reach deeply recessed portions of the guide surface 75a of the cam groove 75 as shown in FIGS. 6A and 6B. These fitting portions 151b and 152b do not contact with the guide surface 75a. Accordingly, the first and second driving levers 151 and 152 contact with the stopper portion 153e provided for the base 153 and keep their predetermined angles of rotation. When the tray 70 has been moved fully, the shutter driving mechanism 150 finishes the operation of closing the shutters. Then, the disk cartridge 200 on the tray 70 is ejected from the disk drive 500.

In this preferred embodiment, the disk cartridge 200 is positioned by providing the positioning pins 21 and 22 on the traverse base 20. However, the positioning pins do not have to be fixed on the traverse base 20.

Also, in the preferred embodiment described above, while the disk cartridge 200 is being positioned after the operation of opening the shutter pair 220 is finished, the second driving lever 152 is separated from the rotational member 230. However, if the disk cartridge 200 can be positioned with respect to the spindle motor 30 sufficiently accurately by increasing the machining accuracy of respective members, for example, then the operation of opening the shutter pair may be finished and the tray 70 may stop being driven with the second driving lever 152 still interlocked with the rotational member 230.

Furthermore, in the preferred embodiment described above, the tray 70 is driven slightly excessively with the error in the degree of openness of the shutter pair 220, which could be caused due to the shape variations of respective members, taken into account. However, if the full openness of the shutter pair 220 can be guaranteed either by improving the machining accuracy of respective members or by increasing the tolerance of the shutter driving mechanism 150 with respect to the shift in the position of the disk cartridge 200 when the shutter pair 220 thereof is fully opened, the operation of opening the shutter pair 220 may also be finished with the second driving lever still interlocked with the rotational member 230.

Furthermore, in the preferred embodiment described above, the first and second driving levers 151 and 152 are driven by the cam groove 75 provided on a side surface of the tray 70. However, as long as the first and second driving levers 151 and 152 can be driven through the operation of the inserting or ejecting the tray 70, the cam groove 75 may also be defined on the back surface of the tray 70, for example.

Also, in the preferred embodiment described above, the first and second driving levers 151 and 152 are driven by the same cam groove 75. Alternatively, the first and second driving levers 151 and 152 may also be respectively driven by two independent cam grooves.

Furthermore, in the preferred embodiment described above, the recessed cam groove 75 is defined on the side surface of the tray 70. However, the cam structure may also have a raised shape.

Furthermore, in the preferred embodiment described above, the tray 70 is used to load and unload the disk cartridge 200 into/from the disk drive 500. However, effects similar to those of this preferred embodiment are also achievable even if the disk drive 500 adopts a slot-in arrangement, for example, and if a portion for transporting the disk cartridge 200 has the cam shape.

Optionally, the disk drive 500 of this preferred embodiment may sense any abnormality in the operation of the first and second driving levers either mechanically or electrically. By adopting such an arrangement, the erroneous insertion of the disk cartridge 200 can be detected.

Also, the disk drive 500, made up of the upper and lower casings 510 and 520, may have its external dimensions defined by a height H1 of 41.3 mm, a width of 146 mm, and a depth of 190 mm, for example.

As described above, the disk drive of this preferred embodiment can be used effectively for a disk cartridge that opens and closes its shutters by rotating its rotational member. In particular, by driving first and second driving levers to respectively fit with the first and second notched portions of the rotational member such that the first and second driving levers fit with only the first and second notched portions, respectively, and do not contact with any other portion of the side surface of the disk cartridge (e.g., its locking member), jam beside the cartridge and damage to be done on the levers or disk cartridge due to repetitive movement can be eliminated and the reliability of the driving mechanism can be increased.

Also, while the tray mounting the disk cartridge thereon is inserted into the disk drive, the cam structure drives the first and second driving levers such that the first driving lever, rack portion and second driving lever contact with the rotational member of the disk cartridge in this order. Accordingly, no matter in what state the shutters of the disk cartridge on the tray are, at least one of the first driving lever, rack portion and second driving lever interlocks with the rotational member, thereby opening the shutter pair.

On top of that, the first and second driving lever portions can be driven respectively according to the shape of a part of a transporting portion (such as the tray) near the shutter driving mechanism. Accordingly, a guide wall for regulating the position of the disk cartridge on the transporting portion can be provided for the transporting portion. Consequently, the disk cartridge can be positioned accurately within the transporting portion and the shutters can be opened and closed with good stability. What is more, the disk cartridge being positioned can also avoid contact with the shutter driving mechanism 150. As a result, the disk cartridge can be positioned within the disk drive with even more stability.

In addition, since the shutter driving mechanism can have a space saving and simplified configuration, it is also possible to realize a disk drive with dimensions of 146 mm×190 mm×41.3 mm, which are adopted in a normal PC drive.

Furthermore, by providing a cam structure that drives the first and second driving levers for the transporting portion, the first and second driving levers can be driven at an appropriate timing with respect to the specific location of the disk cartridge and the reliability of the shutter driving mechanism can be increased.

Moreover, by applying elastic force to the first and second driving lever portions from their respective springs and by driving the transporting portion excessively during the opening/closing operation, the error caused by shape variations of respective members can be removed and the shutters can be opened and closed just as intended.

Plus, by sensing the operation abnormality of the first and second driving levers either mechanically or electrically, the erroneous insertion of the disk cartridge 200 can be detected.

What is more, by defining a guide shape for guiding the transporting portion for the base, the shutter driving mechanism can be positioned more accurately with respect to the transporting portion.

In addition, by applying elastic force from force-applying springs to the base against the cartridge transporting portion, the shutter driving mechanism can be positioned more accurately with respect to the transporting portion.

Besides, by applying elastic force from the force-applying springs to the base against the disk cartridge, the shutter driving mechanism can be positioned more accurately with respect to the disk cartridge.

Embodiment 2

Hereinafter, a second preferred embodiment of the present invention will be described in detail. The disk cartridge that can be loaded into the disk drive of this preferred embodiment is the same as the counterpart of the first preferred embodiment. This preferred embodiment of the disk drive will be described as being adapted for use with the disk cartridge 200 as in the first preferred embodiment. However, as mentioned above, the disk drive 500 is also applicable for use with the disk cartridge 300 or a disk cartridge having the structure described above.

Figure 27:
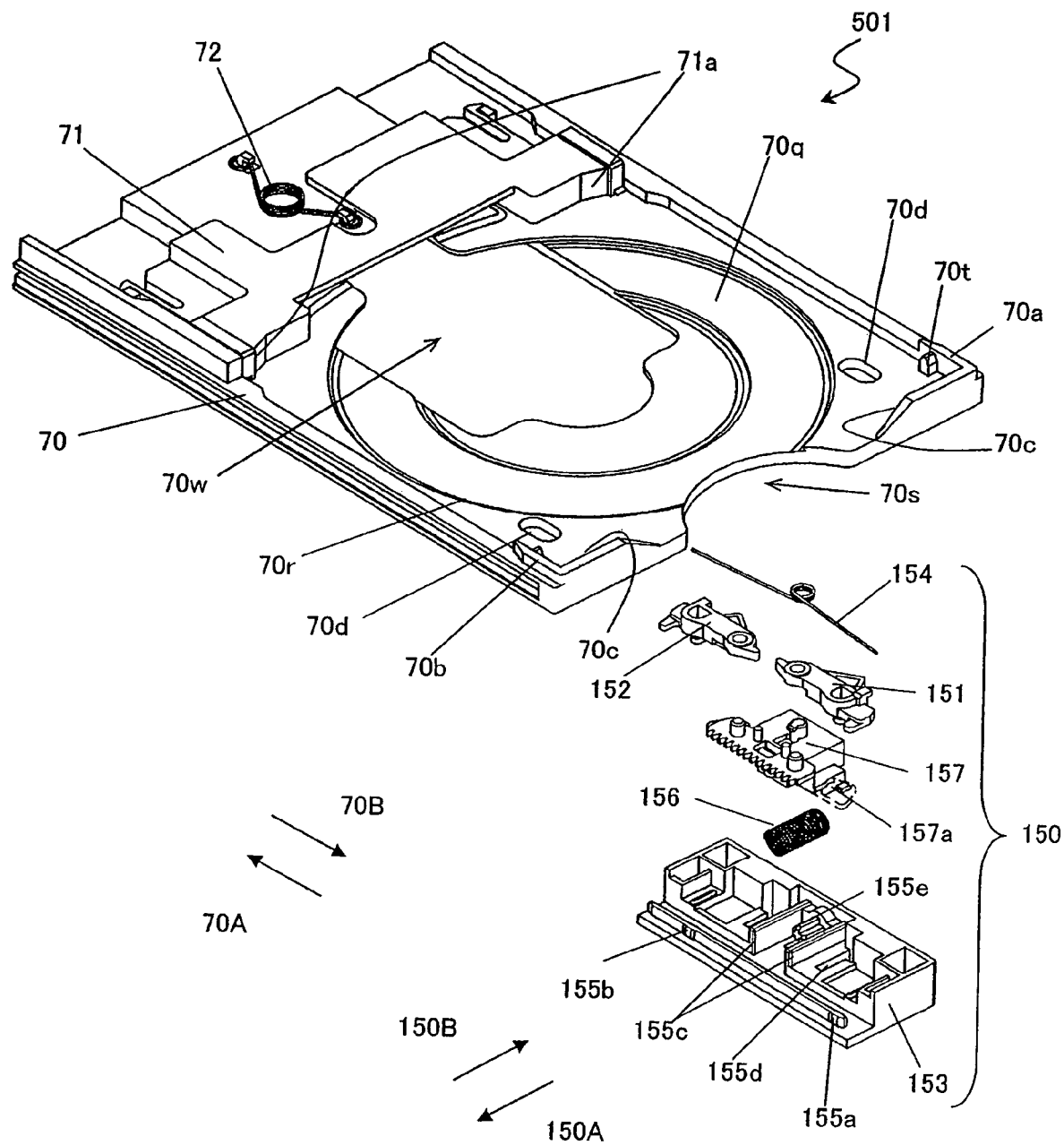
FIG. 27 is an exploded perspective view illustrating the structure of a disk drive according to a second preferred embodiment of the present invention.

FIG. 27 is an exploded perspective view illustrating the arrangement of a disk drive 501 according to this preferred embodiment. In FIG. 27, each member having the same function as the counterpart of the first preferred embodiment is identified by the same reference numeral. In this disk drive 501, a rack member 157 with the rack portion 153a is separated from the base 153 (i.e., the base 153 and the rack member 157 are two independent members). Thus, the structure of the shutter driving mechanism 150 and that of the tray 70 to interlock with it are different from those of the first preferred embodiment. However, the structures, functions and operations of the other members are the same as those already described for the first preferred embodiment and the following detailed description will be focused on these differences.

As shown in FIG. 27, the tray 70 has a recess 70r to receive the disk cartridge 200. In the tray 70, the guide walls 70a and 70b are provided parallel to the tray inserting direction 70A and ejecting direction 70B. The guide wall 70a, provided near the shutter driving mechanism 150, is partially notched to allow the shutter driving mechanism 150 to pass there. In this preferred embodiment, to make the tray 70 look more beautiful, the guide wall 70b has the same shape as the guide wall 70a and these two guide walls 70a and 70b are arranged symmetrically to each other on the tray 70. Even so, the guide walls 70a and 70b can fulfill the function of guiding the side portions of the disk cartridge 200.

Also, convex portions 70t are provided inside of the guide walls 70a and 70b to position the disk cartridge 200 on the tray 70 in the directions pointed by the arrows 70A and 70B. On the bottom of the recess 70r, provided is a window 70w that allows the spindle motor 30 and the optical head 40 to access the disk 10.

Optionally, another circular recess 70q may be further defined on the bottom of the recess 70r so as to directly mount the disk 10 that is not stored in a cartridge. Furthermore, to make the disk cartridge 200 on the recess 70r easily removable from the tray 70, a notch 70s to partially expose a side surface of the cartridge may be provided on the front side of the tray 70. A pair of guide walls 70c for positioning the disk cartridge 200 is provided on both sides of the notch 70s.

Figure 63:
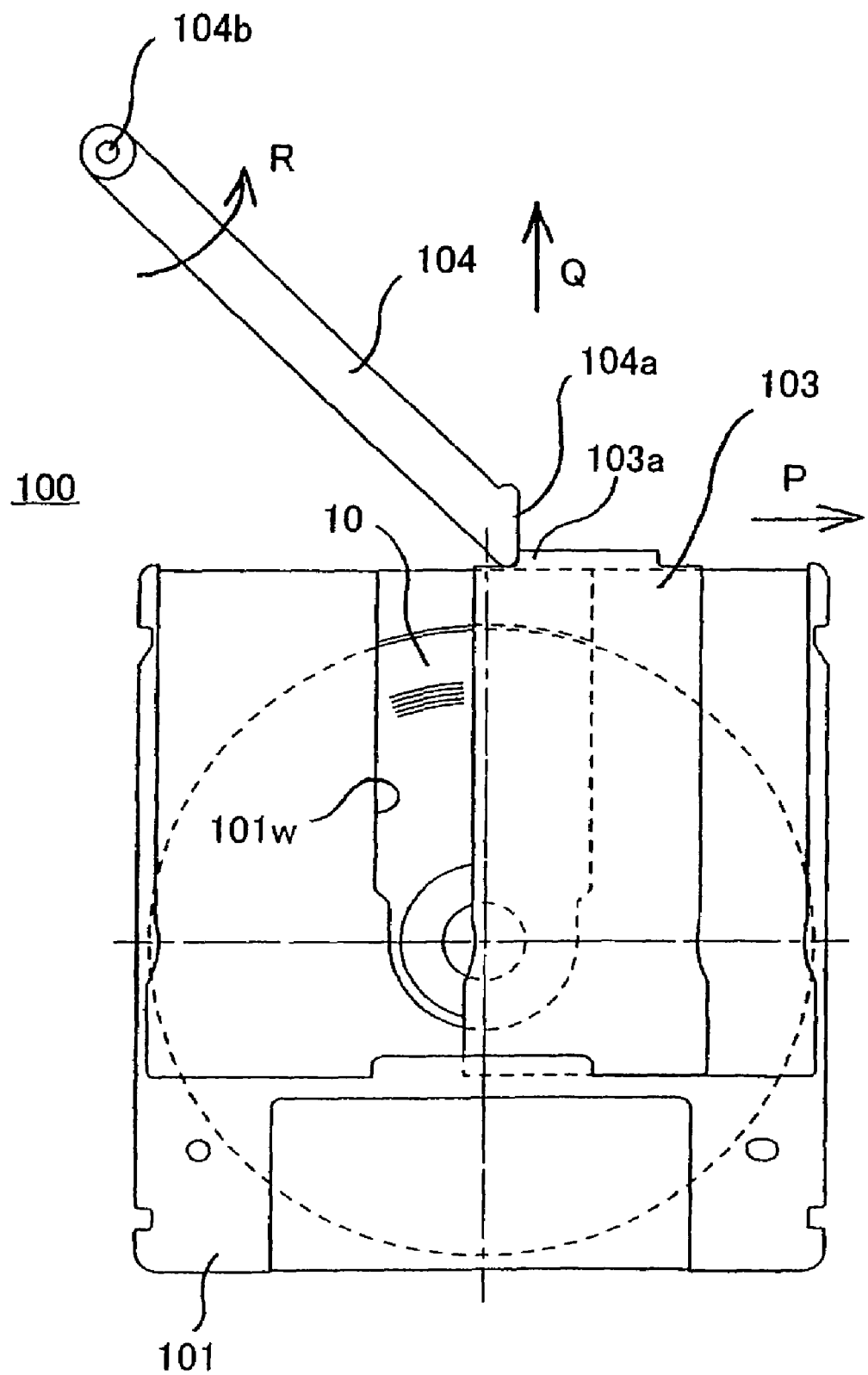
FIG. 63 is a plan view showing the structure of a conventional disk cartridge and how to open and close its shutter.

The tray 70 further includes a sliding portion 71 and a force applying spring 72 for applying elastic force to the sliding portion 71. The force applying spring 72 applies elastic force to the sliding portion 71 in the direction pointed by the arrow 70B, thereby making the guide wall 71a of the sliding portion 71 contact with the disk cartridge 200. As a result, the disk cartridge 200 on the tray 70 can be positioned within the recess 70r of the tray 70 as shown in FIG. 2. Alternatively, as already described for the first preferred embodiment, the tray 70 may also be designed so as to load the disk cartridge 100 shown in FIG. 63 by using the sliding portion 71.

The shutter driving mechanism 150 includes the first driving lever 151, the second driving lever 152, a rack member 157 with the rack portion 153a, a base 153 for guiding the rack member in the directions pointed by the arrow 150A and 150B, a spring 154 for applying elastic force to the first and second driving levers 151 and 152, and a rack spring 156 for applying elastic force to the rack member 157.

Te base 153 has guide ribs 155a and 155b for guiding the tray 70 in the direction pointed by the arrow 70A or 70B, thereby increasing the positioning accuracy of the shutter driving mechanism 150 with respect to the tray 70. The base 153 also has another guide rib 155c for guiding the rack member 157 in the arrow directions 150A and 150B and a fitting hole 155d to fit with the fitting portion 157a of the rack member 157. The fitting hole 155d also functions as a stopper when the rack spring 156 applies elastic force to the rack member 157 in the arrow direction 150A such that the rack member 157 does not drop off due to the elastic force applied by the rack spring 156 when the shutter driving mechanism 150 is assembled.

Next, the cam structure provided for the shutter driving mechanism 150 and the tray 70 will be described. In the shutter driving mechanism 150 of this preferred embodiment, not only the first and second driving levers 151 and 152 but also the rack member 157 are driven as well. For that purpose, cam grooves 75 and 76 are provided as first and second cam structures on the side surface of the tray 70.

Figure 28:
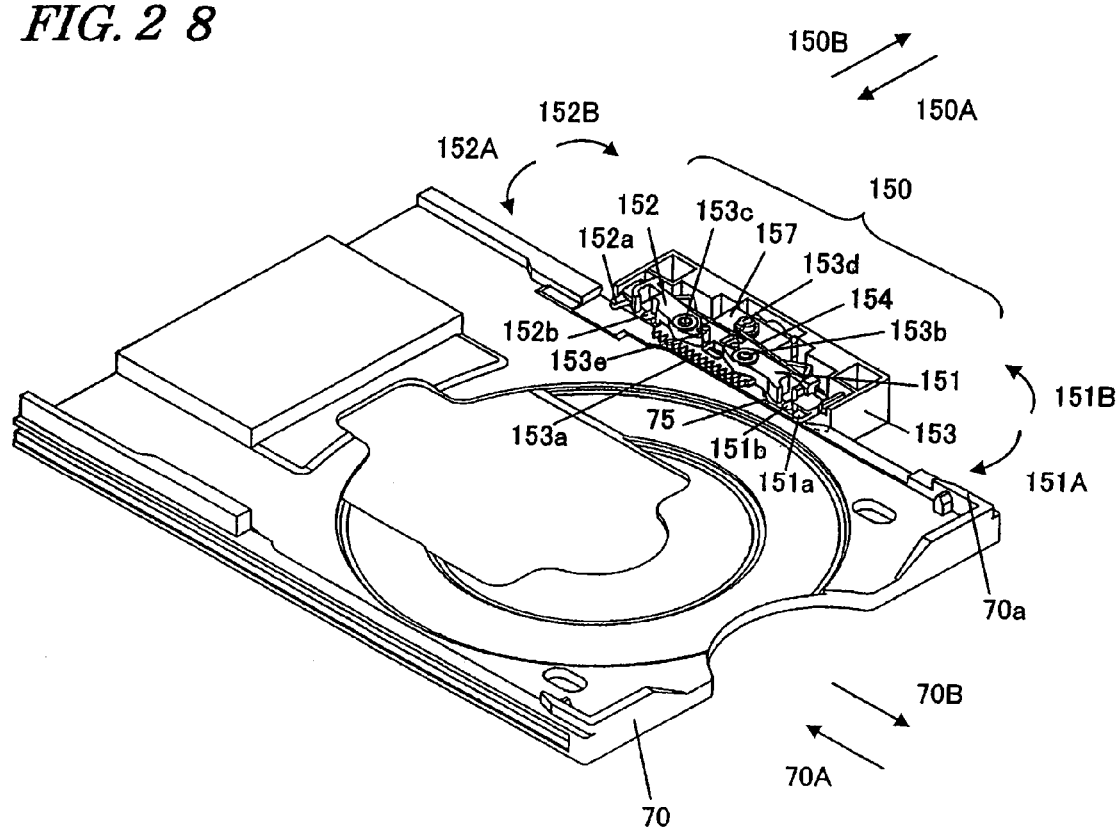
FIG. 28 is a perspective view showing the configuration of the shutter driving mechanism shown in FIG. 27 and its relationship with a cam groove of the tray.
Figure 29:
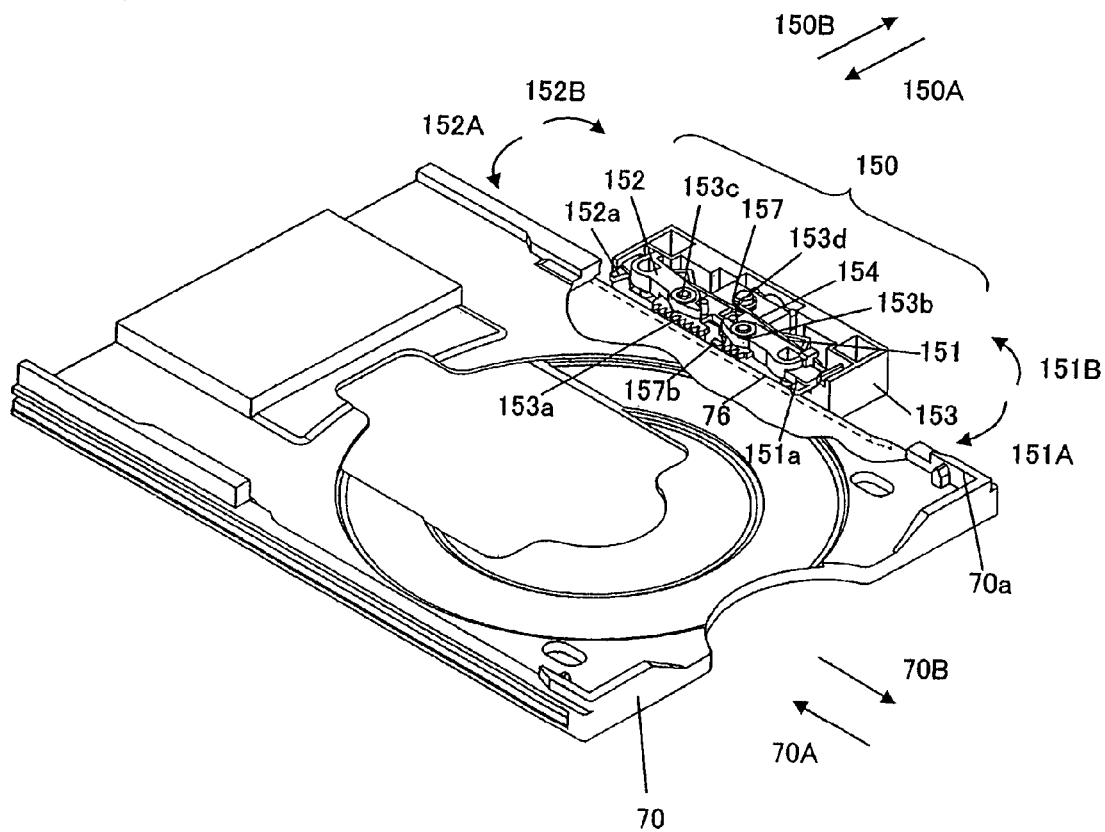
FIG. 29 is a perspective view showing the configuration of the shutter driving mechanism shown in FIG. 27 and its relationship with another cam groove of the tray.
Figure 30:
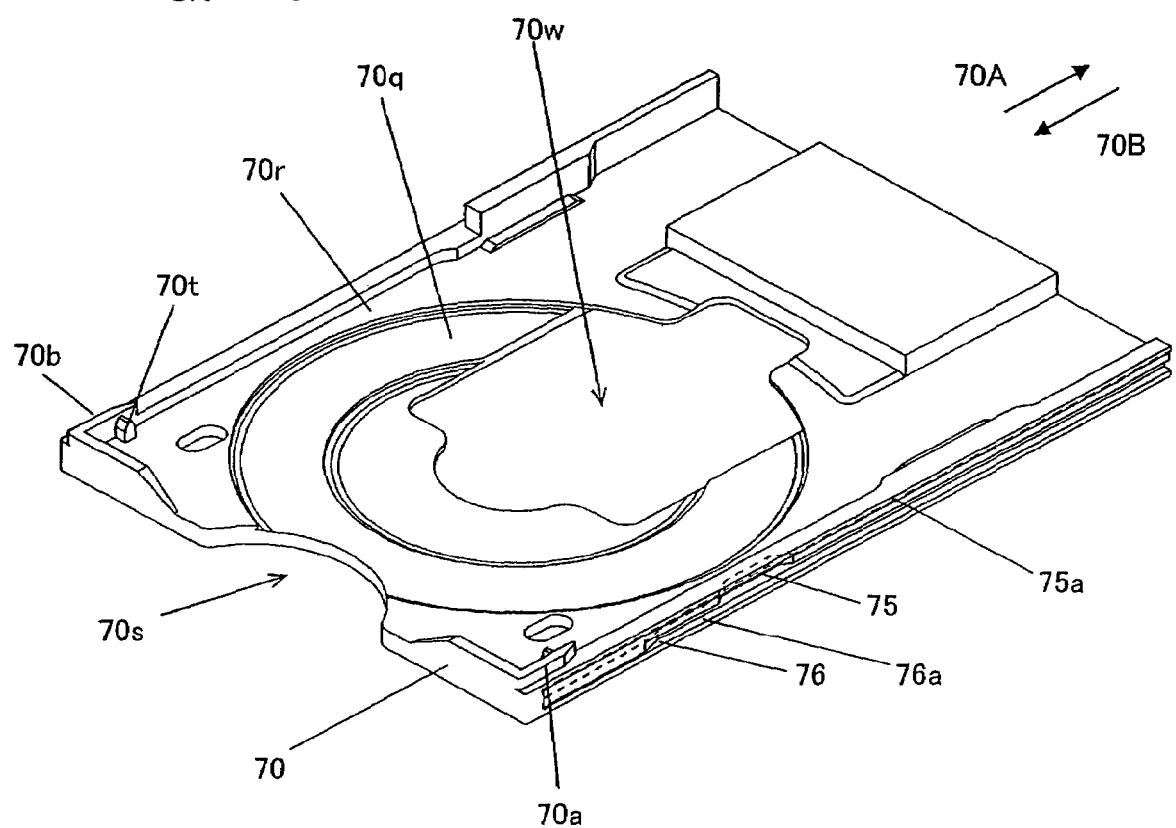
FIG. 30 is a perspective view of a tray illustrating a cam groove portion to fit with the shutter driving mechanism.

FIGS. 28 and 29 are perspective views showing the shutter driving mechanism 150 interlocked with the tray 70. FIG. 30 is a perspective view illustrating the cam grooves 75 and 76 provided for the tray 70. And FIGS. 31A and 31B are respectively a front view and a cross-sectional view of the shutter driving mechanism 150.

Figure 64:
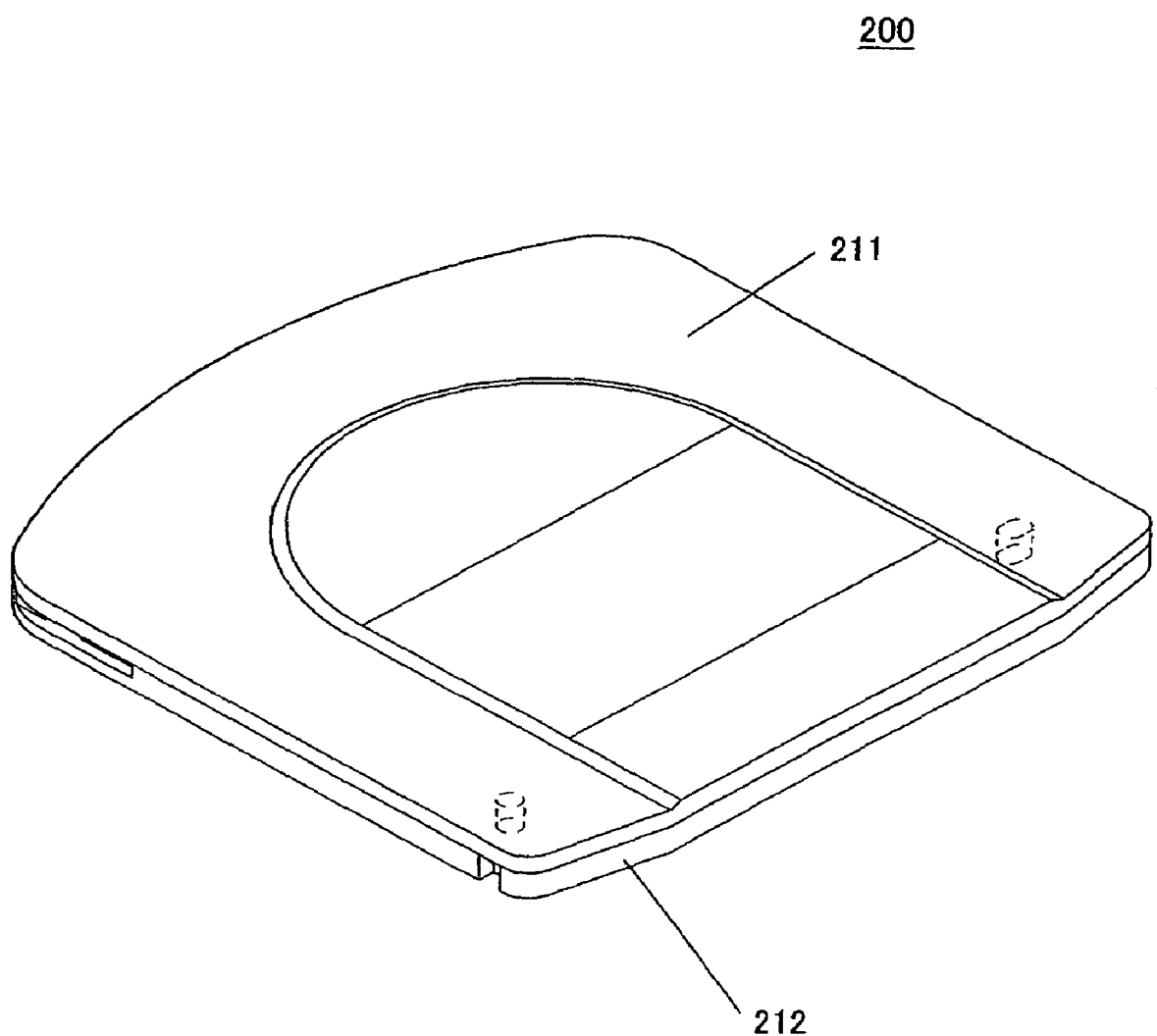
FIG. 64 is a perspective view illustrating the appearance of a disk cartridge for use in the present invention.
Figure 65:
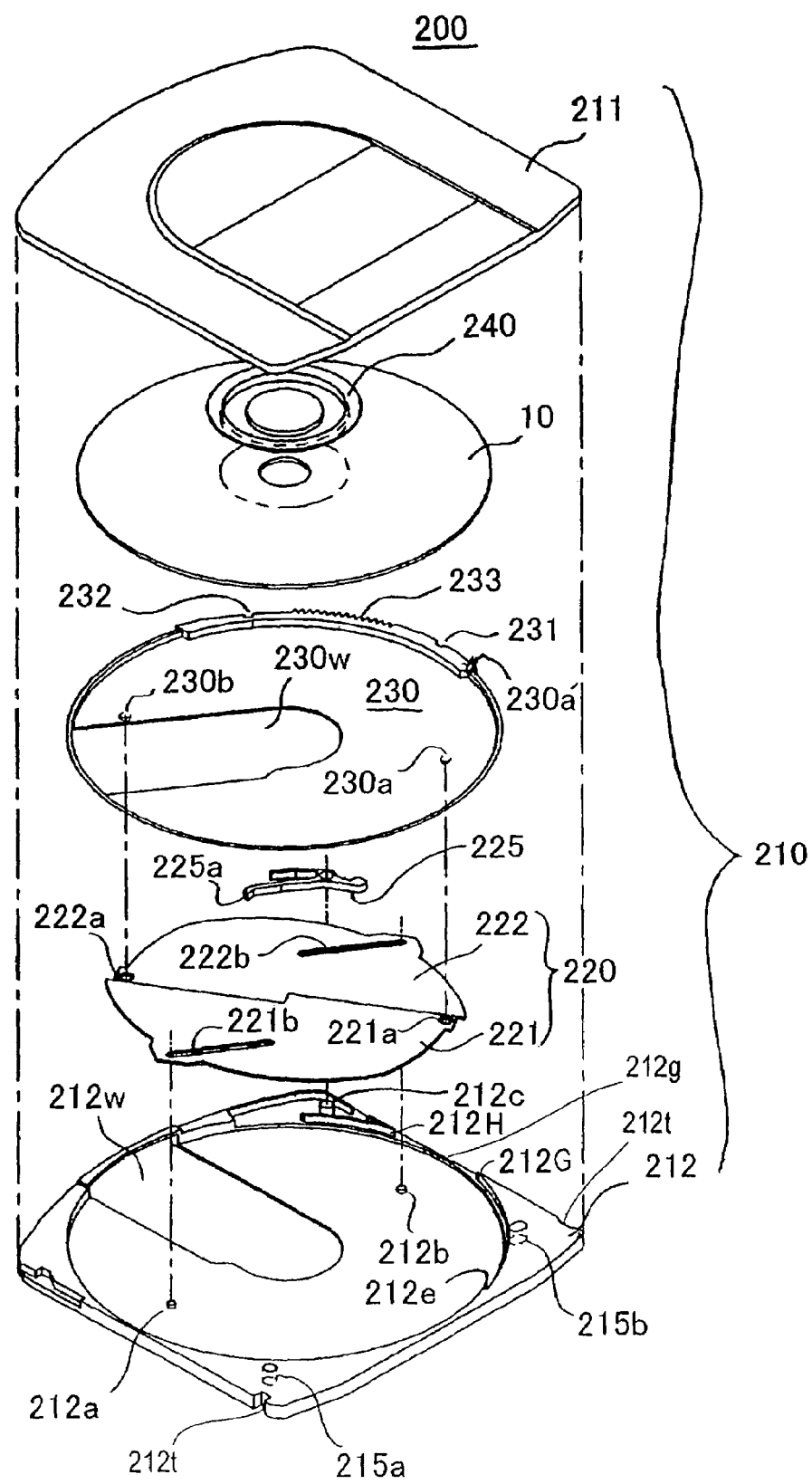
FIG. 65 is an exploded perspective view illustrating the disk cartridge for use in the present invention.
Figure 66:
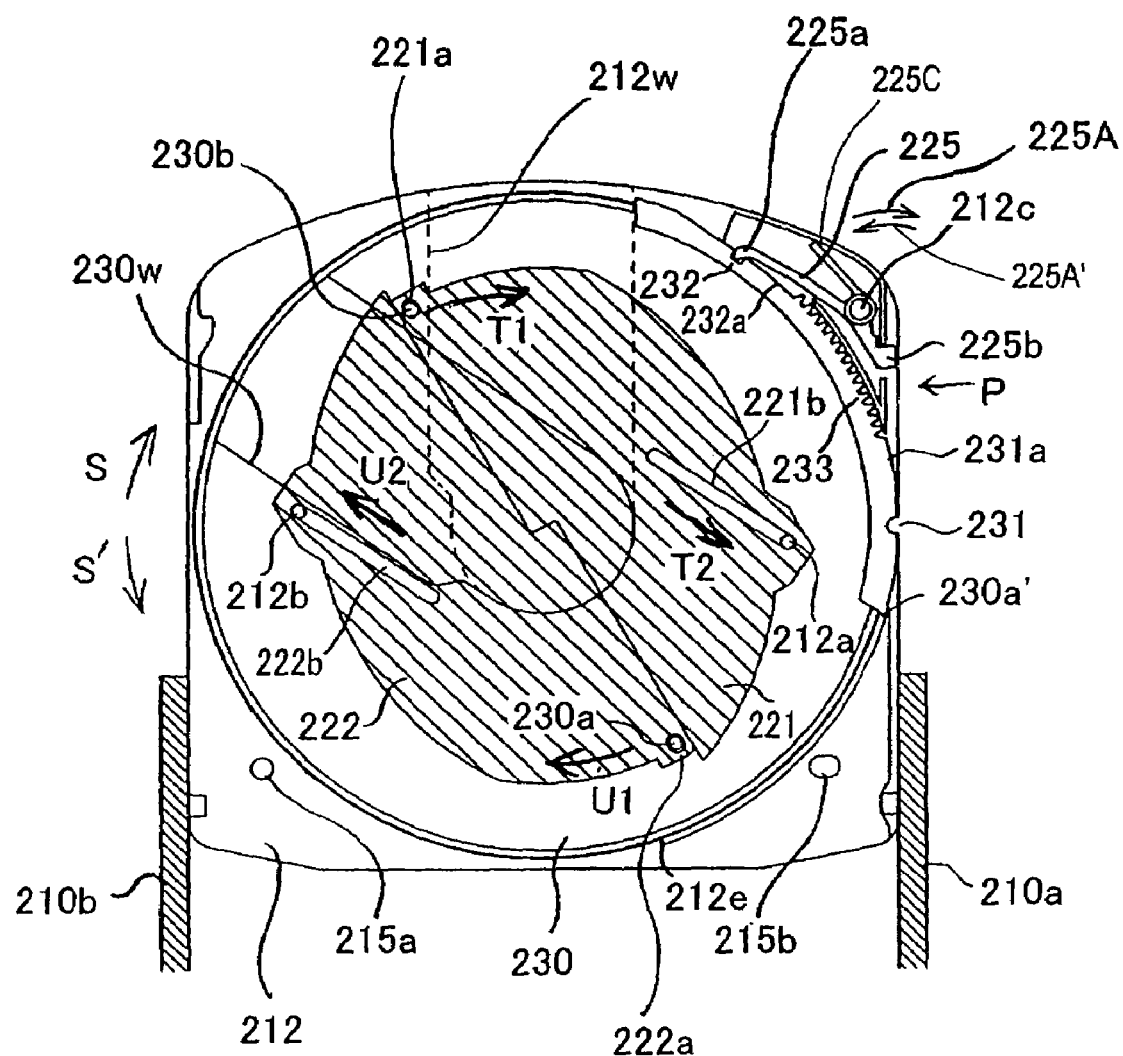
FIG. 66 is a plan view showing a state of the shutters being opened or closed in the disk cartridge shown in FIG. 64.
Figure 67:
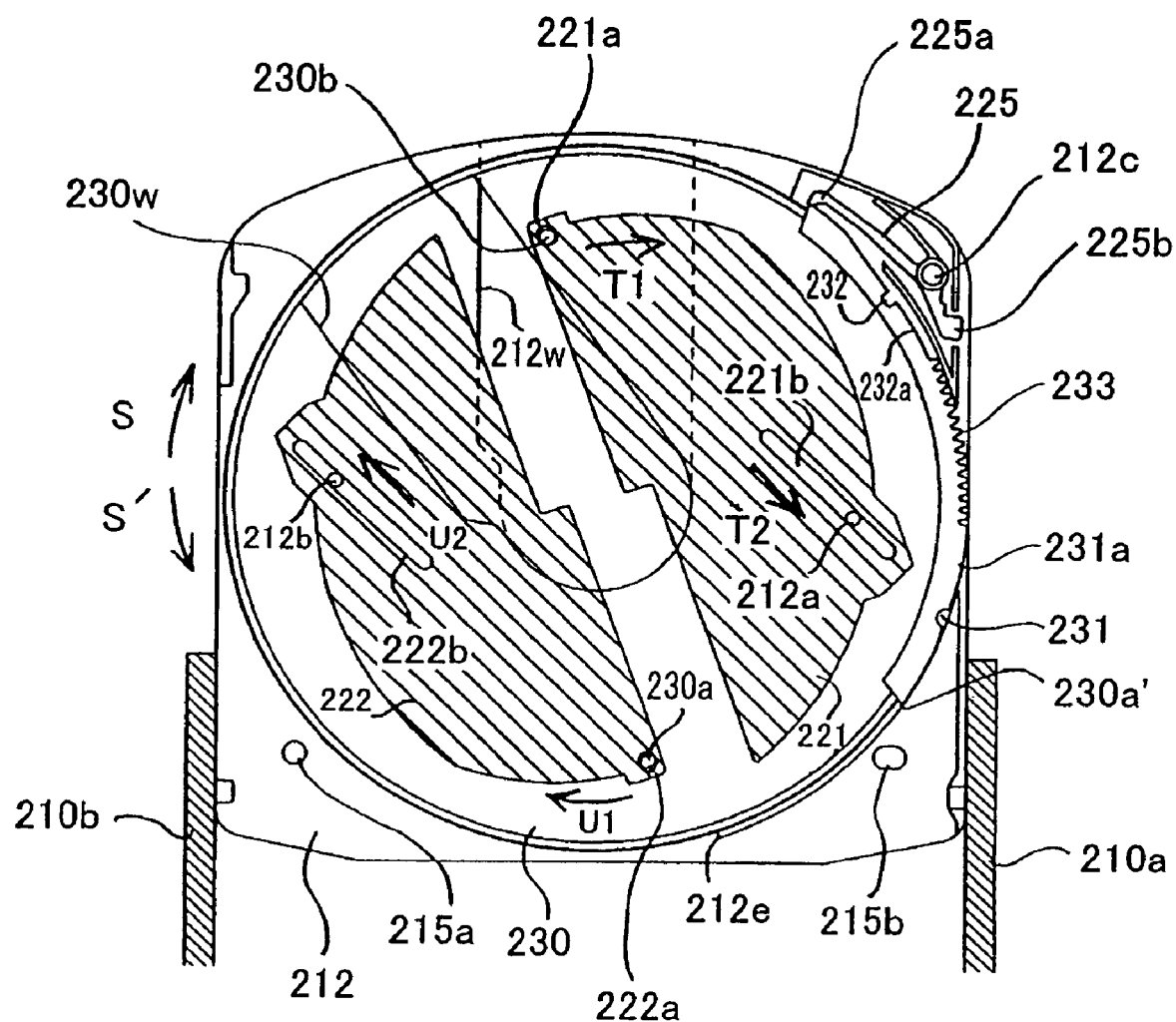
FIG. 67 is a plan view showing another state of the shutters being opened or closed in the disk cartridge shown in FIG. 64.
Figure 68:
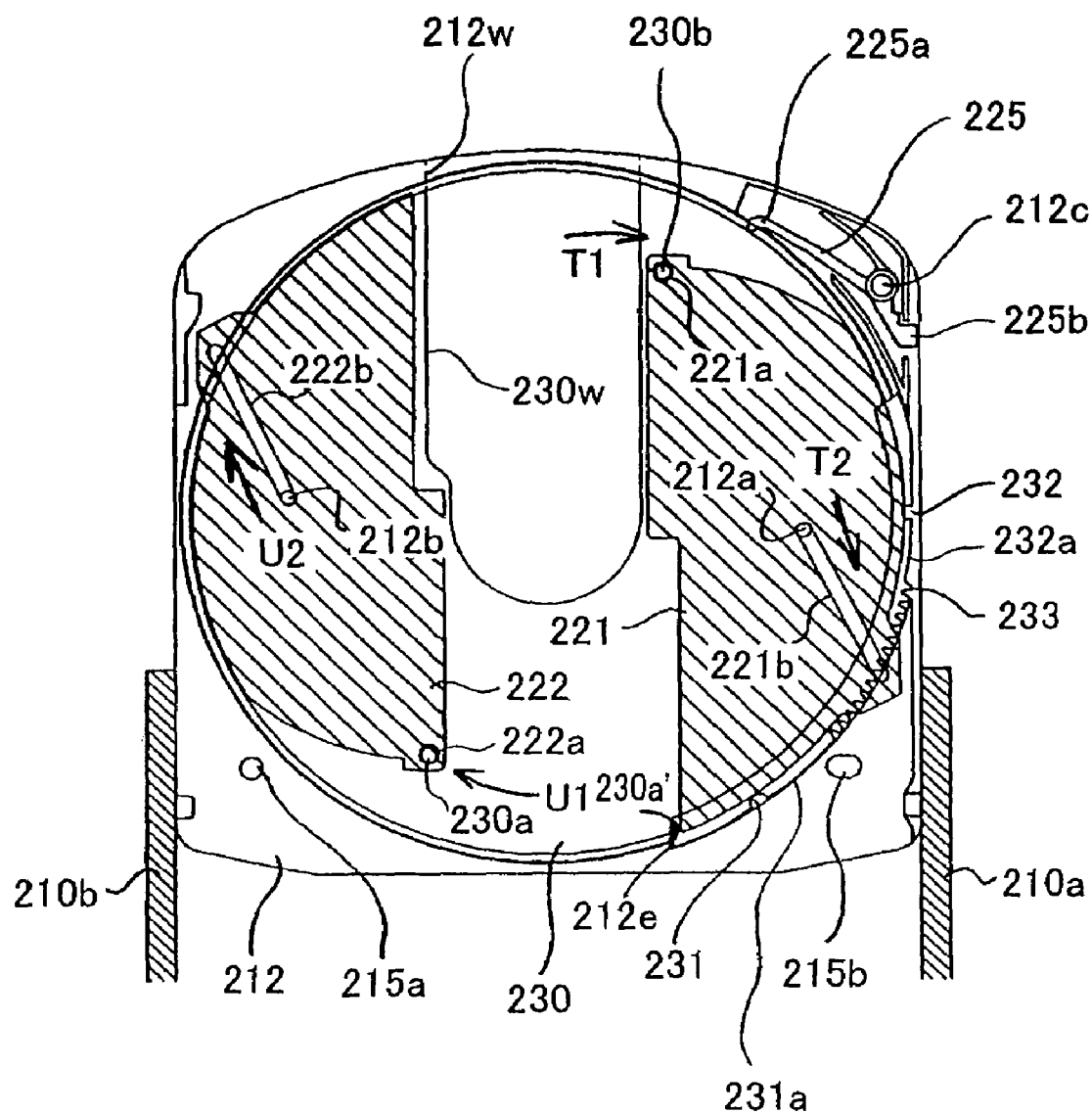
FIG. 68 is a plan view showing another state of the shutters being opened or closed in the disk cartridge shown in FIG. 64.
Figure 69:
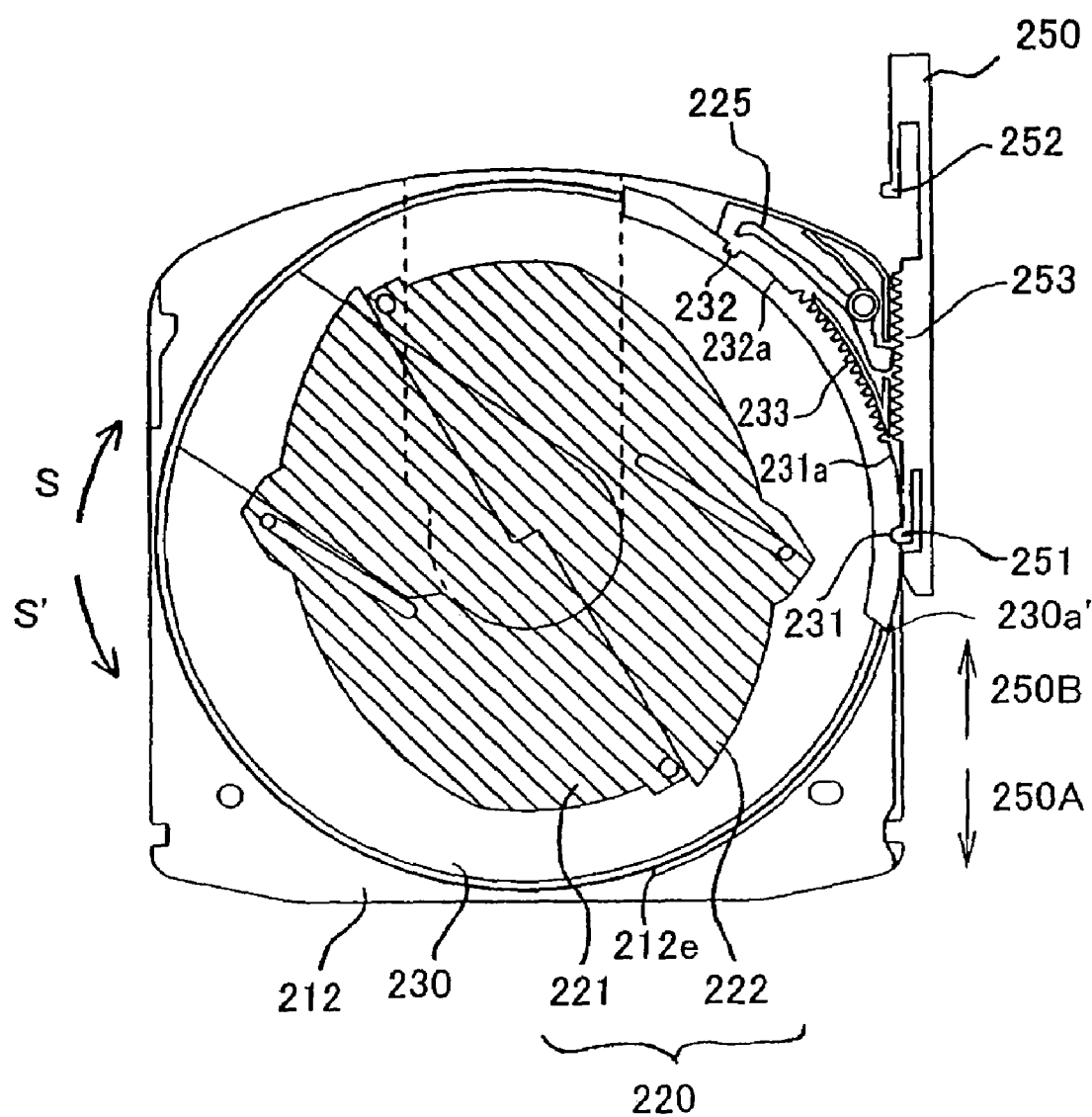
FIG. 69 is a plan view showing another state of the shutters being opened or closed in the disk cartridge shown in FIG. 64.
Figure 70:
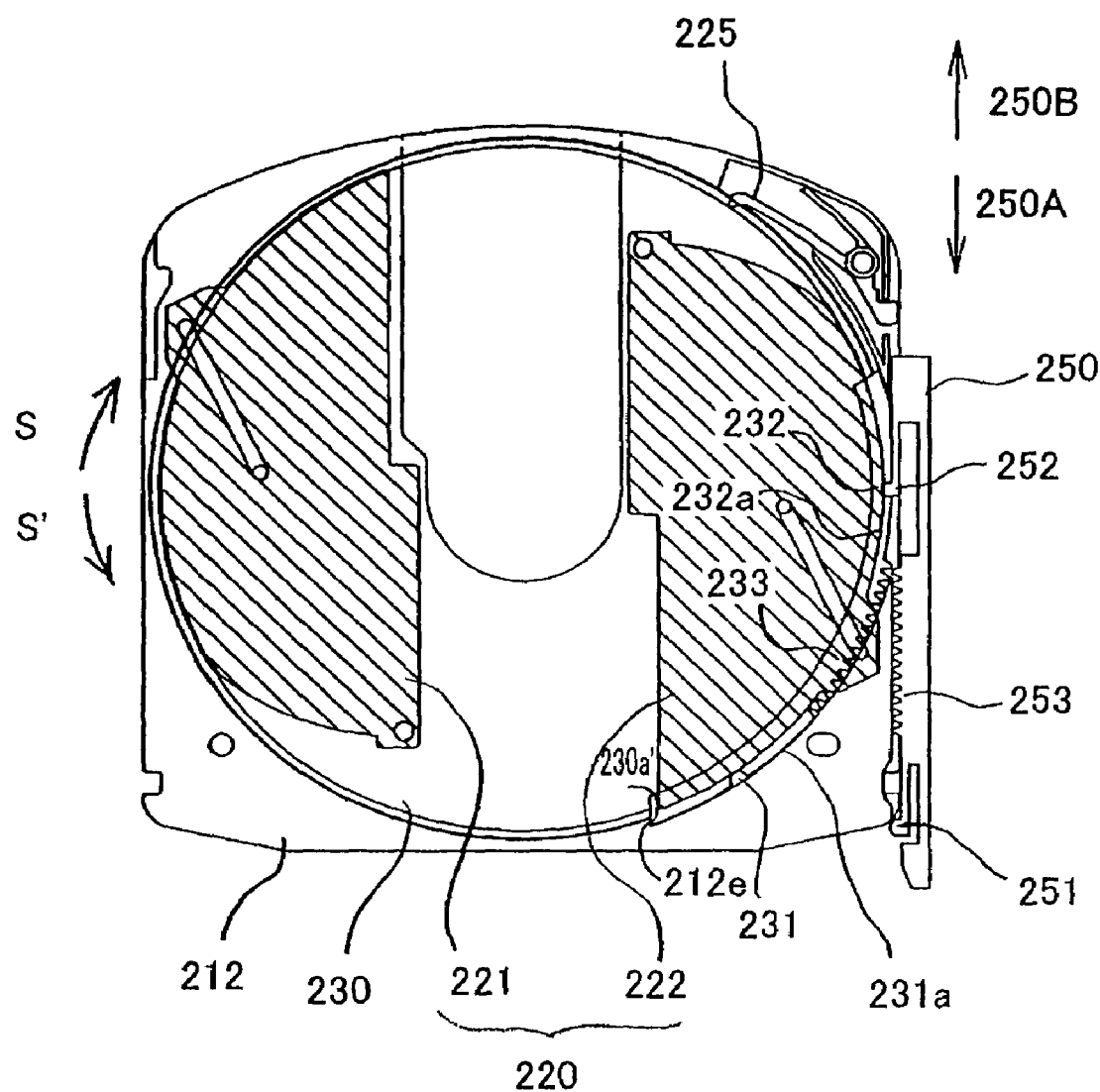
FIG. 70 is a plan view showing another state of the shutters being opened or closed in the disk cartridge shown in FIG. 64.

The shutter driving mechanism 150 opens and closes the shutter pair 220 by driving the rotational member 230 of the disk cartridge 200 shown in FIG. 64. As shown in FIG. 28, the first and second driving levers 151 and 152 of the shutter driving mechanism 150 respectively fit into the first and second notched portions 231 and 232 of the rotational member 230. The rack portion 153a of the rack member 157 engages with the gear portion 233 of the rotational member 230.

The first and second driving levers 151 and 152 are respectively supported on rotation shafts 153b and 153c on the rack member 157 in rotatable positions. The spring 154 is fitted with a spindle 153d provided on the base 153 and applies elastic force to the first and second driving levers 151 and 152 in the directions pointed by the arrows 151A and 152A, respectively. On the rack member 157, provided is a stopper portion 153e, which stops the rotation of the first and second driving levers 151 and 153 produced by the spring 154. The first and second driving levers 151 and 153 are held by this stopper portion 153e with respective predetermined angles of rotation.

Figure 31A:
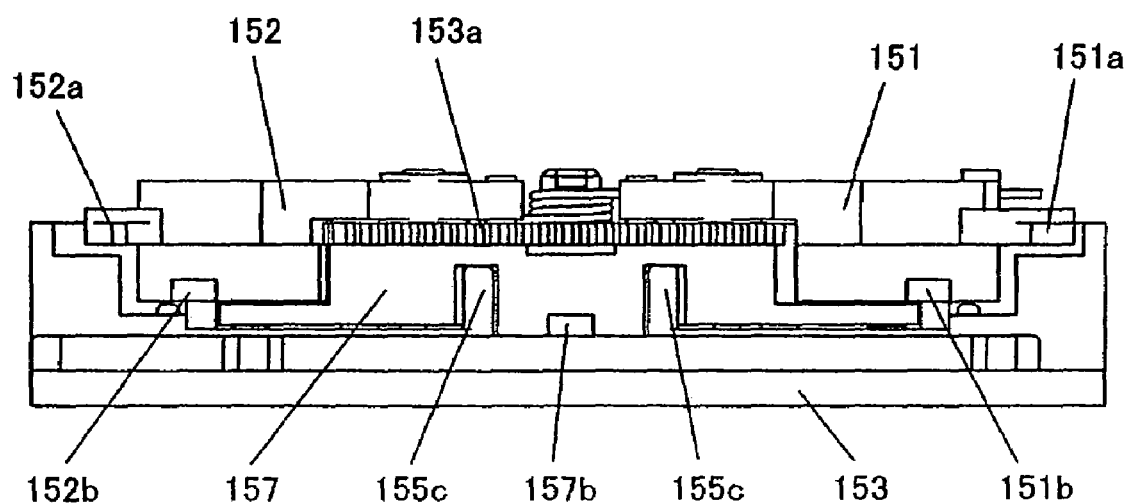
FIGS. 31A and 31B are respectively a front view and a cross-sectional view of the shutter driving mechanism.
Figure 31B:
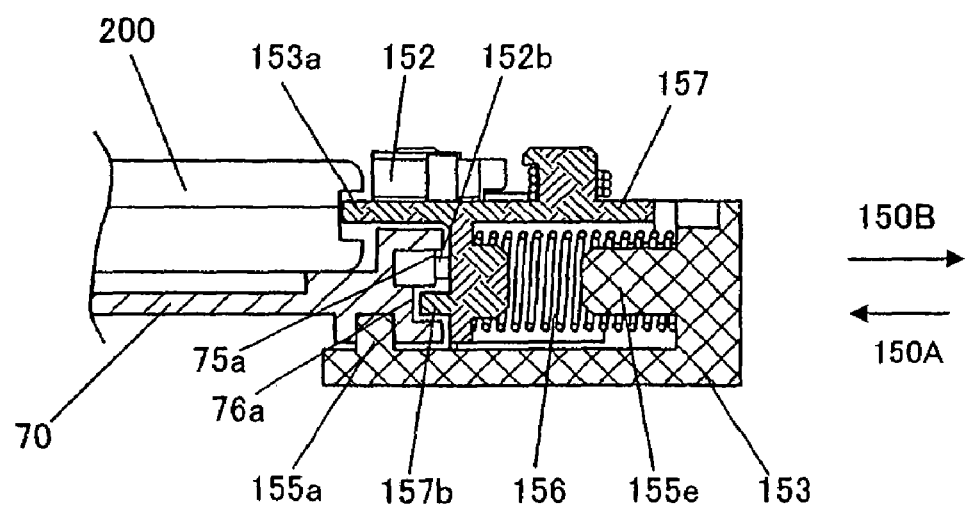

As shown in FIGS. 28, 29 and 31A, the first driving lever 151 includes a fitting portion 151a to fit into the first notched portion 231 of the rotational member 230 and another fitting portion 151b to contact with the guide surface 75a of the cam groove 75 on the side surface of the tray 70 (see FIG. 30). Likewise, the second driving lever 152 also includes a fitting portion 152a to fit into the second notched portion 232 of the rotational member 230 and another fitting portion 152b to contact with the guide surface 75a of the cam groove 75.

On the other hand, the rack member 157 includes a rack portion 153a to engage with the gear portion 233 of the rotational member 230 and a fitting portion 157b to contact with the second guide surface 76a of the cam groove 76 on the side surface of the tray 70. As shown in FIG. 31B, a spring 56 applies elastic force to the rack member 157 in the arrow direction 150A.

As shown in FIG. 30, the cam grooves 75 and 76, functioning as first and second cam structures, respectively, are defined on a side surface of the tray so as to face the shutter driving mechanism 150 and to extend parallel not only to the direction in which the tray 70 moves but also to each other.

As shown in FIGS. 28 and 29, if the tray 70 has moved in the direction pointed by the arrow 70A or 70B with respect to the shutter driving mechanism 150, then the fitting portions 151b and 152b move while keeping contact with the guide surface 75a of the cam groove 75. As a result, the first and second driving levers 151 and 152 swing on the rotation shafts 153b and 153c, respectively, according to the profile of the cam groove 75. Meanwhile, the fitting portion 157b of the rack member 157 also shifts while keeping contact with the guide surface 76a of the cam groove 76. Thus, the rack member 157 moves in the direction pointed by the arrow 150A or 150B along the guide rib 155c of the base 153 according to the profile of the cam groove 76.

Next, the relationships between the pitches of the first and second notched portions 231 and 232 and gear portion 233 of the rotational member 230 and those of the fitting portions 151a and 152a of the first and second driving levers 151 and 152 and the rack portion 153a of the rack member 157 in the shutter driving mechanism 150 will be described.

Figure 32A:
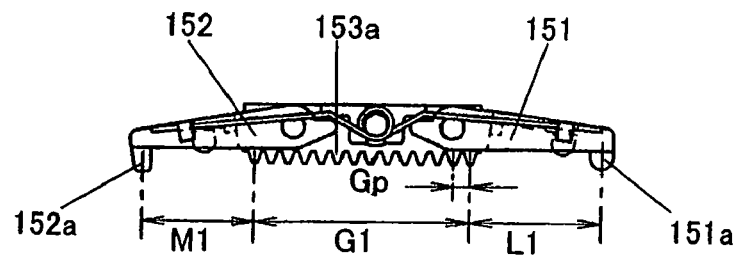
FIGS. 32A, 32B and 32C are plan views showing the shutter driving mechanism of the first preferred embodiment, the shutter driving mechanism of the second preferred embodiment and the sizes of respective portions of the rotational member in the disk cartridge.
Figure 32B:
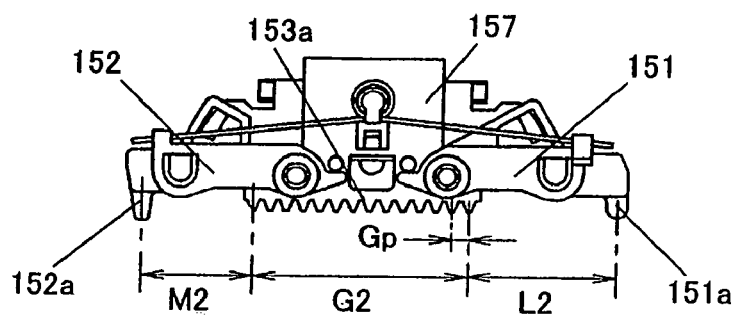
Figure 32C:
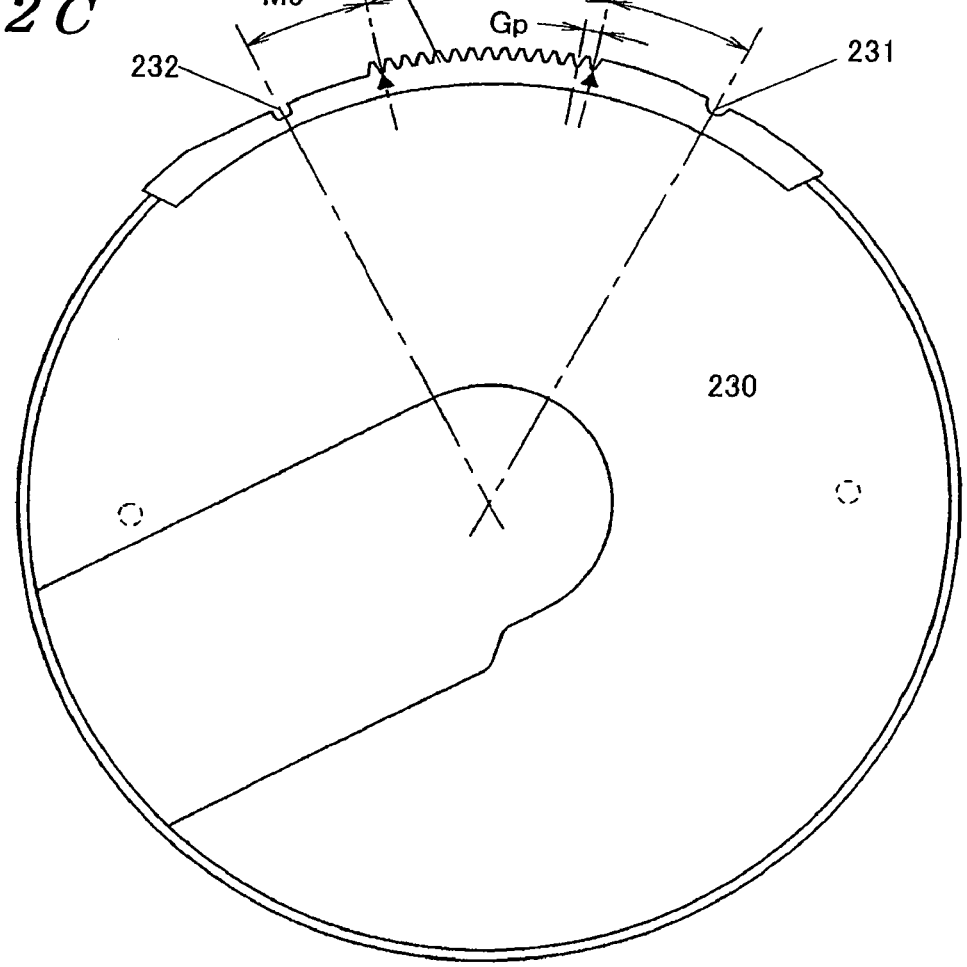

FIGS. 32A and 32B show the dimensions of main portions of the shutter driving mechanisms 150 of the first and this preferred embodiments, respectively. FIG. 32C shows the dimensions of main portions of the rotational member 230.

As shown in FIG. 32A, in the first preferred embodiment, the pitch L1 between the fitting portion 151a of the first driving lever 151 and a tooth of the rack portion 153a closest to the first driving lever is equal to the pitch L3 between the first notched portion 231 of the rotational member and a groove of the gear portion 233 closest to the first notched portion 231; the pitch G1 between the two end teeth of the rack portion 153a is equal to the pitch G3 between both end grooves of the gear portion 233; and the pitch M1 between the fitting portion 152a of the second driving lever and a tooth of the rack portion 153a closest to the second driving lever is equal to the pitch M3 between the second notched portion 232 and a groove of the gear portion 233 closest to the second notched portion 232. That is to say, L1=L3, G1=G3, and M1=M3. As used herein, the "pitch" is a distance that is measured by linearly extending the fitting portions 151a and 152a, both ends of the rack portion 153a, the first and second notched portions 231 and 232 and both ends of the gear portion 233.

In the second preferred embodiment on the other hand, the pitch L2 between the fitting portion 151a of the first driving lever and a tooth of the rack portion 153a closest to the first driving lever, the pitch G2 between the two end teeth of the rack portion 153a and the pitch M2 between the fitting portion 152a of the second driving lever and a tooth of the rack portion 153a closest to the second driving lever satisfy L2=L3+Gp, G2=G3, and M2=M3, respectively. As used herein, Gp refers to the gear pitch of the rack portion 153a and the gear portion 233. That is to say, in the second preferred embodiment, the pitch between the fitting portion 151a of the first driving lever 151 and the groove located at one end of the rack portion 153a is longer than the pitch of the gear train of the rotational member 230 precisely by the gear pitch Gp.

In other words, when the fitting portion 151a of the first driving lever gets fitted with the first notched portion 231 of the rotational member 230, the point where the rack portion 153a and the gear portion 233 start engaging with each other shifts by one tooth as compared with the first preferred embodiment. This one-tooth shift improves the reliability of the shutter closing operation to be done by the shutter driving mechanism 150 as will be described in detail later.

Next, it will be described how the shutter driving mechanism 150 works. As in the first preferred embodiment, when the tray 70 on which the disk cartridge 200 has been mounted is inserted into the disk drive 501 (i.e., moved in the direction pointed by the arrow 70A), the shutter driving mechanism 150 is driven so as to perform the operation of opening the shutter pair 220 of the disk cartridge 200. On the other hand, if the tray 70 has been ejected from the disk drive 501 (i.e., moved in the direction pointed by the arrow 70B), the shutter driving mechanism 220 is driven so as to perform the operation of closing the shutter pair 220.

As long as the disk cartridge 200 is used in a normal condition, the operator or the user is not supposed to open or close the shutter pair 220 arbitrarily. Even so, the operator may still open or close the shutter pair 220 by intentionally turning the locking member 225 that is locking the rotational member 230 and by unlocking and rotating the rotational member 230. This is why the shutter pair 220 is not always closed when the operator loads the disk cartridge 200 into the disk drive 501.

That is to say, when the disk cartridge 200 is mounted onto the tray 70 and when the tray 70 is inserted into the disk drive 501, the disk cartridge 200 may assume State (A) in which the shutter pair 220 is fully closed, State (B) in which the shutter pair 220 is not closed fully, and State (C) in which the shutter pair 220 is fully opened. On the other hand, whenever the disk cartridge 200 starts to be ejected out of the disk drive 501, the shutter pair 220 is always opened. That is to say, when the disk cartridge 200 starts to be ejected from the disk drive 501, the disk cartridge 200 must assume only State (D) in which the shutter pair 220 is fully opened. Hereinafter, it will be described how the disk drive 501 operates in each of these four situations. As in the first preferred embodiment, some of the drawings to be referred to in the following description are identified by a combination of a reference drawing number and one of the two capital letters A and B (e.g., FIGS. 33A and 33B). In each of those pairs of drawings, the portion A illustrates a situation where the disk cartridge 200 has been mounted, while the portion B illustrates a situation where no disk cartridge has been mounted yet.

First, it will be described how the shutter driving mechanism 150 operates in the situation (A) where the disk cartridge 200 is mounted on the tray 70 and then loaded into the disk drive 501 with the shutter pair 220 fully closed.

Figure 33A:
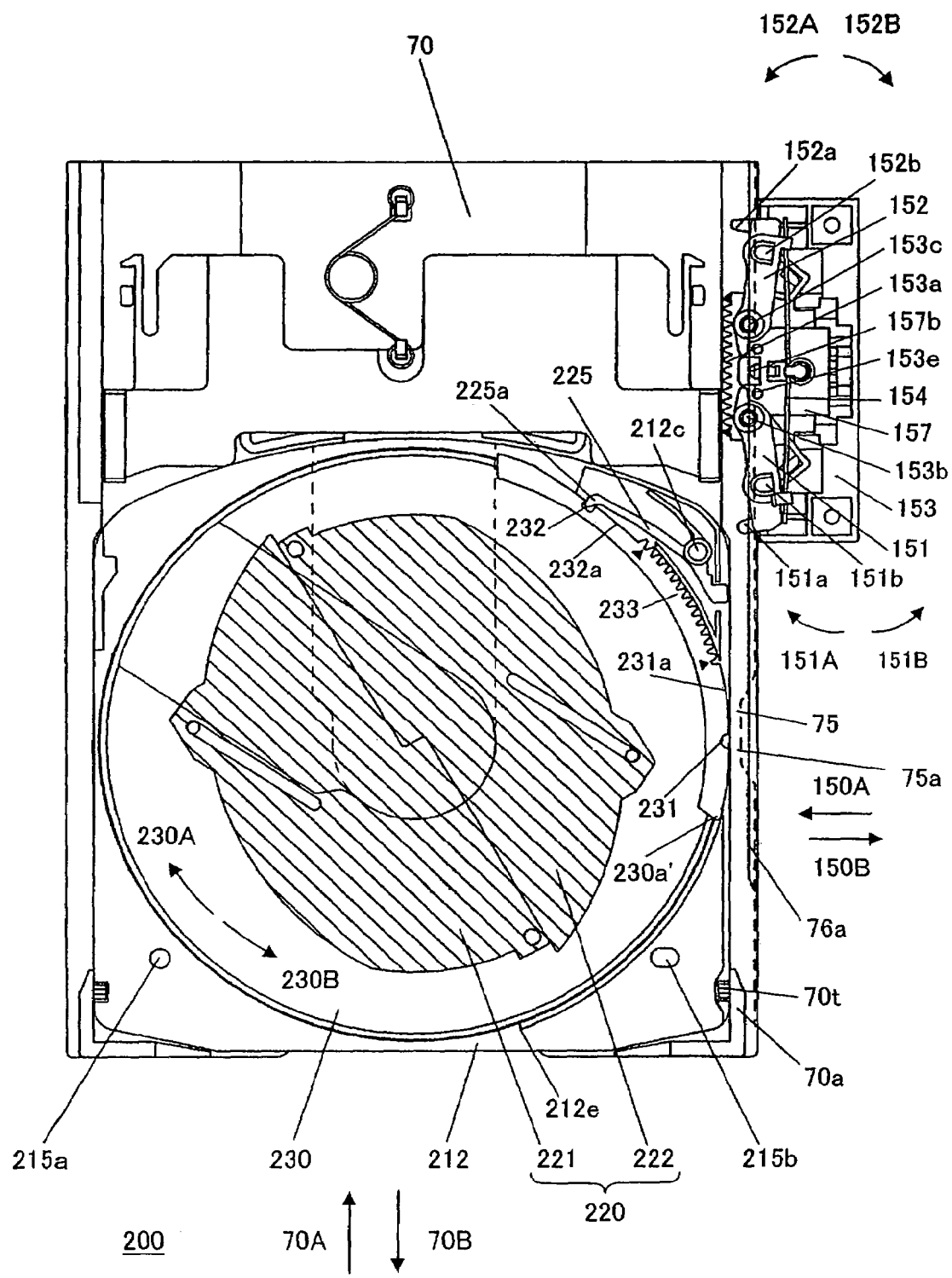
Figure 33B:
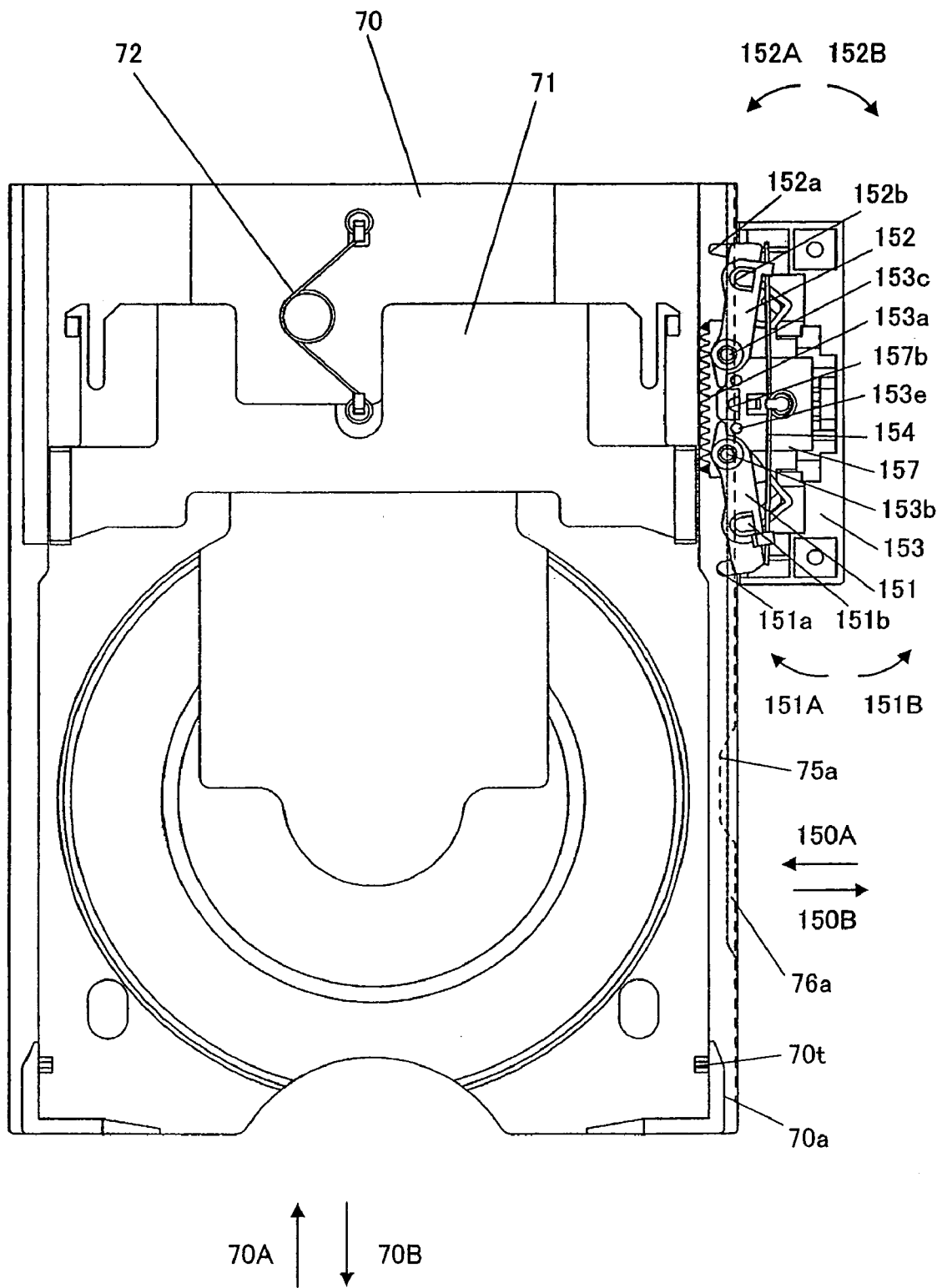
FIG. 33B is a plan view showing a state corresponding to that shown in FIG. 33A with the disk cartridge removed.

FIGS. 33A and 33B illustrate a situation where the tray 70 has been ejected out of the disk drive 501. Specifically, FIG. 33A illustrates a situation where the disk cartridge 200 has been mounted on the tray 70 with the shutter pair 220 closed, while FIG. 33B illustrates only the tray 70 and the shutter driving mechanism 150. As shown in FIGS. 33A and 33B, the disk cartridge 200 is mounted on the tray 70 and then the tray 70 is inserted in the direction pointed by the arrow 70A by the drive motor 51. The shutter driving mechanism 150 is secured to the base chassis 50. Accordingly, as the tray 70 is inserted deeper, the shutter driving mechanism 150 gets closer to the disk cartridge 200. At this point in time, the fitting portions 151b and 152b of the first and second driving levers 151 and 152 contact with the guide surface 75a of the cam groove 75. The first and second driving levers 151 and 152 turn in the arrow directions 151B and 152B, respectively, and maintain predetermined angles of rotation at the position of the guide plane 75a. More specifically, as shown in FIGS. 33A and 33B, the fitting portions 151a and 152a of the first and second driving levers 151 and 152 are retracted in the arrow direction 150B with respect to the rack portion 153a so as to avoid contact with the locking member 225.

Meanwhile, the fitting portion 157b of the rack member 157 is in contact with the guide surface 76a of the cam groove 76 and the rack portion 153a stays at the position defined by the guide surface 76a. By adopting such an arrangement, the rack portion 153a can be positioned with respect to the tray 70. Since the disk cartridge 200 is mounted on, and positioned with respect to, the tray 70, the rack portion 153a is positioned with respect to the disk cartridge 200 by way of the tray 70. In this manner, the positioning accuracy of the rack member 157 with respect to the cartridge 200 can be increased and the shutter driving mechanism 150 can be interlocked with the rotational member 230 of the disk cartridge 200 just as intended.

Alternatively, the guide surface 76a of the cam groove 76 may have a recess and the cam groove 76 may be designed such that the fitting portion 157b of the rack member 157 does not contact with the guide surface 76a of the cam groove 76 in a predetermined period during the operation of inserting or ejecting the tray 70. By adopting such an arrangement, the drive load on the tray 70 can be reduced. In that case, the stopper portion 155d of the base 153 prevents the rack member 157 from reaching a predetermined distance from the tray 70.

Figure 34:
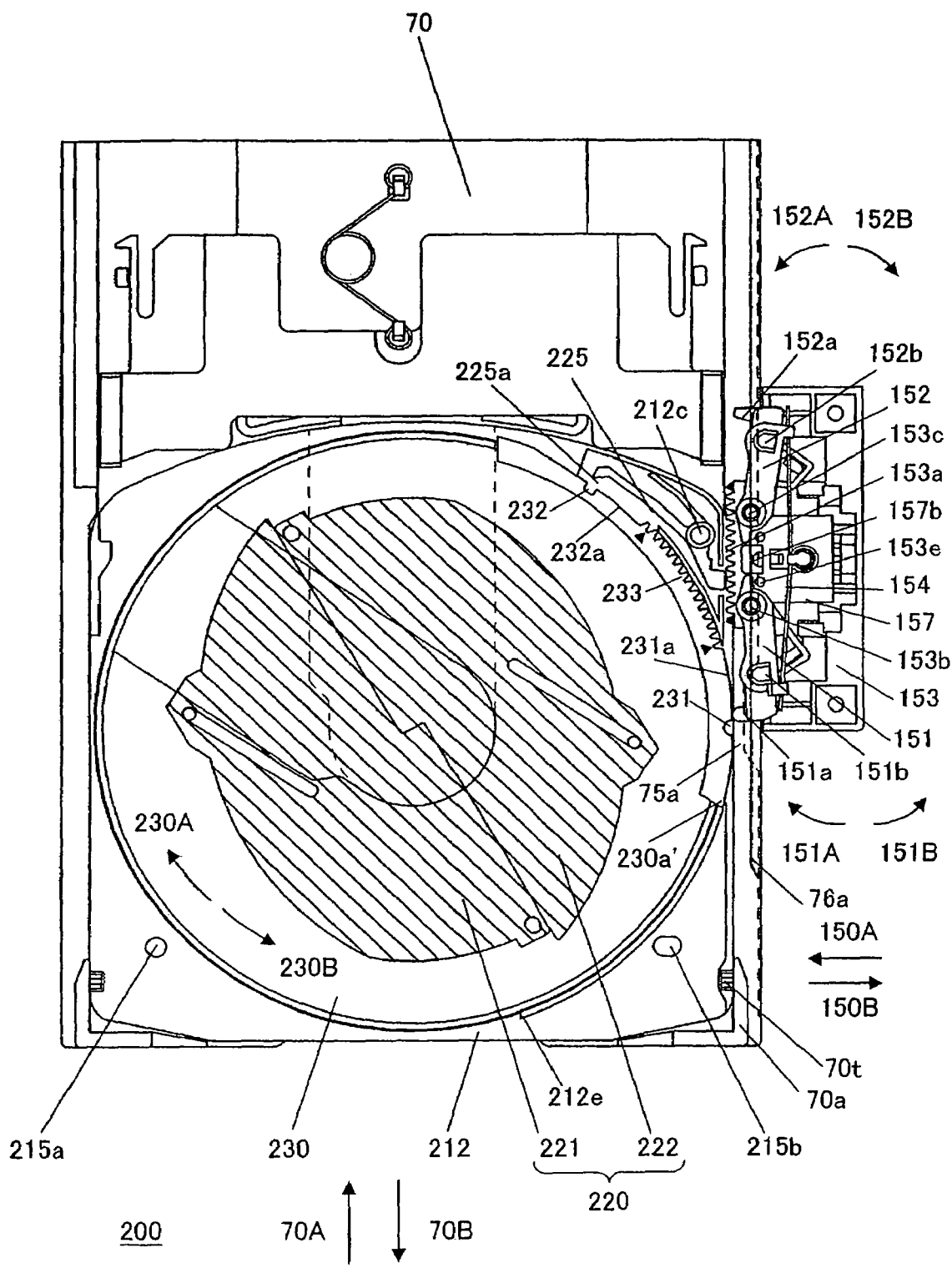
FIG. 34 is a plan view showing a state of the shutter driving mechanism during its opening or closing operation in a situation where the disk cartridge has been inserted into the disk drive with its shutter pair fully closed.

When the tray 70 is further inserted in the arrow direction 70A from the position shown in FIGS. 33A and 33B, the fitting portion 151a of the first driving lever 151 passes the locking member 225 without making a contact with that member and the rack portion 153a reaches a position to contact with the locking member 225 of the disk cartridge 200 as shown in FIG. 34.

The locking member 225 is pushed by the rack portion 153a and the convex portion 225a of the locking member 225 turns on the spindle 212c. As a result, the convex portion 225a of the locking member 225 is disengaged from the second notched portion 232 of the rotational member 230 and the rotational member 230 is unlocked. At this point in time, the fitting portion 151b of the first driving lever 151 soon reaches the recessed portion of the cam groove 75. Since the spring 154 applies elastic force thereto, the first driving lever 151 turns in the direction pointed by the arrow 151A to make the fitting portion 151b contact with the recessed guide surface 75a. Then, the fitting portion 151a of the first driving lever 151 contacts with the side surface portion 231a of the rotational member 230. Meanwhile, the second driving lever 152 has still been turned to the arrow direction 152B by the guide surface 75a of the cam groove 75.

Figure 35A:
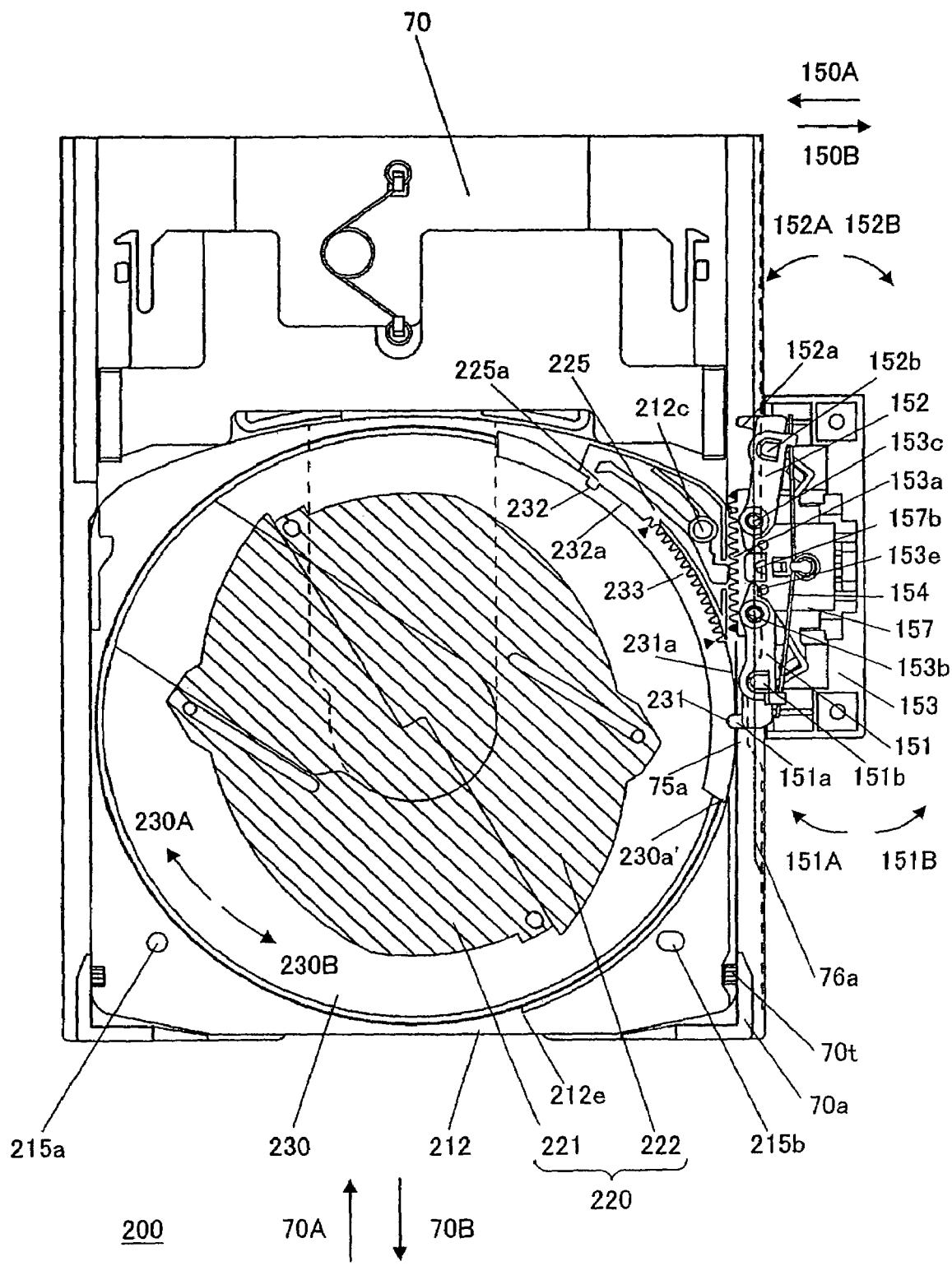
Figure 35B:
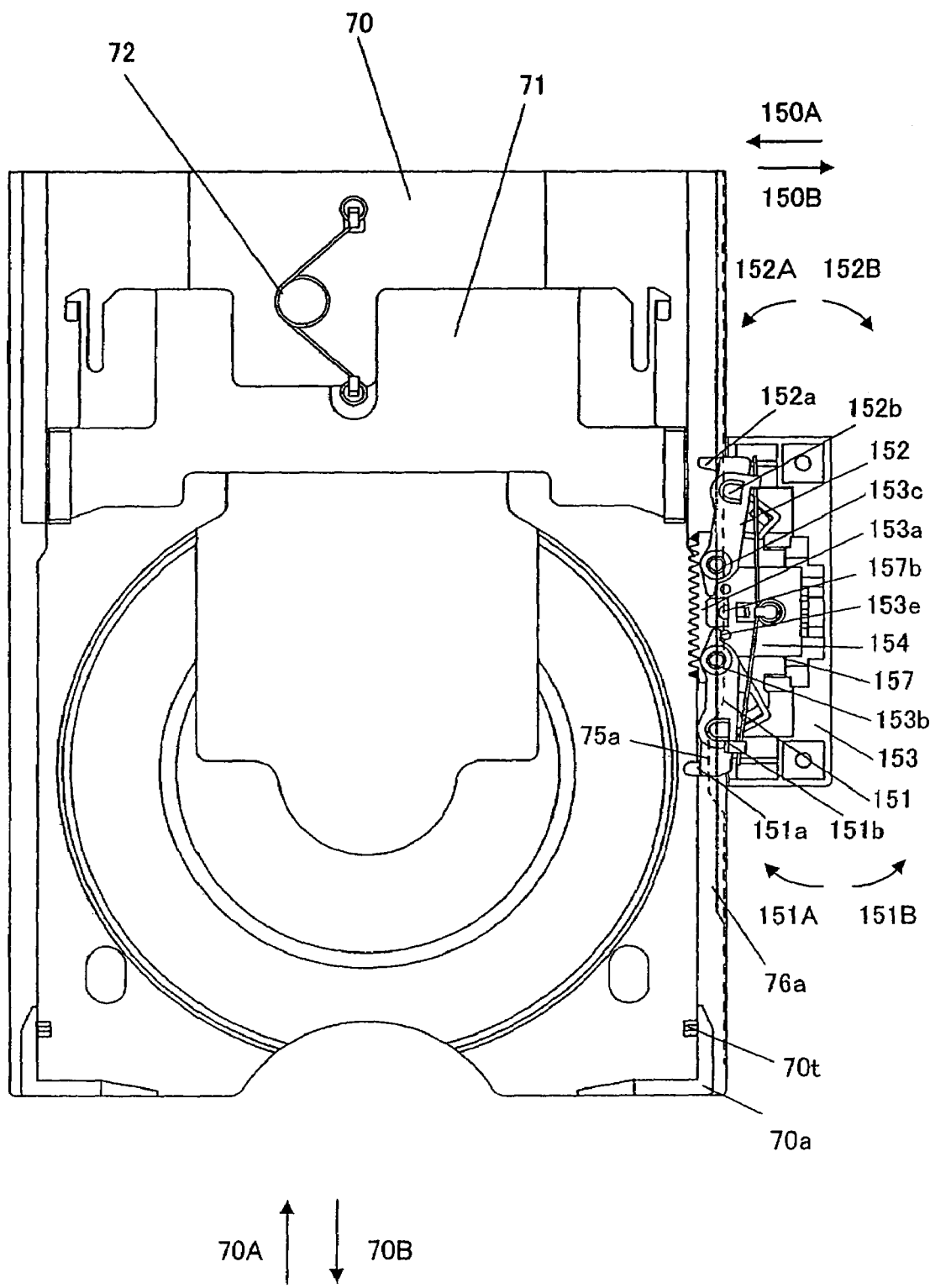
FIG. 35B is a plan view showing a state corresponding to that shown in FIG. 35A with the disk cartridge removed.

Thereafter, as the tray 70 is inserted even deeper in the arrow direction 70A, the fitting portion 151a of the first driving lever 151 slides on the side surface portion 231a of the rotational member 230 and then gets fitted with the first notched portion 231 of the rotational member 230 as shown in FIGS. 35A and 35B. Since the locking member 225 has been pushed inward by the rack portion 153a, the rotational member 230 is now unlocked. Accordingly, as the tray 70 is inserted even deeper in the arrow direction 70A from the position shown in FIG. 35A, the rotational member 230, being interlocked with the first driving lever 151 of the shutter driving mechanism 150, rotates in the direction pointed by the arrow 230A. As a result, the shutter pair 220, interlocked with the rotational member 230, starts to open its shutters.

Figure 36A:
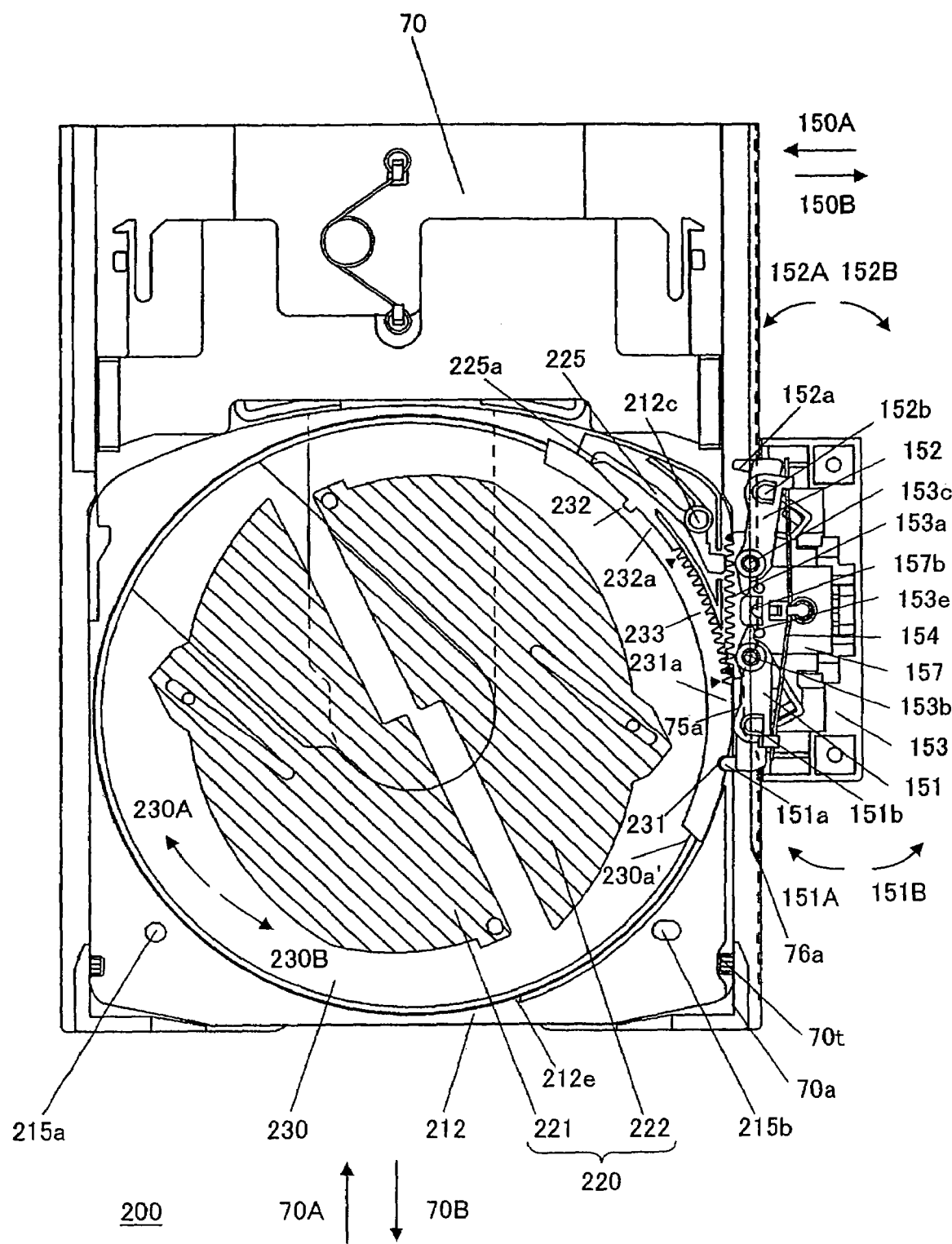
Figure 36B:
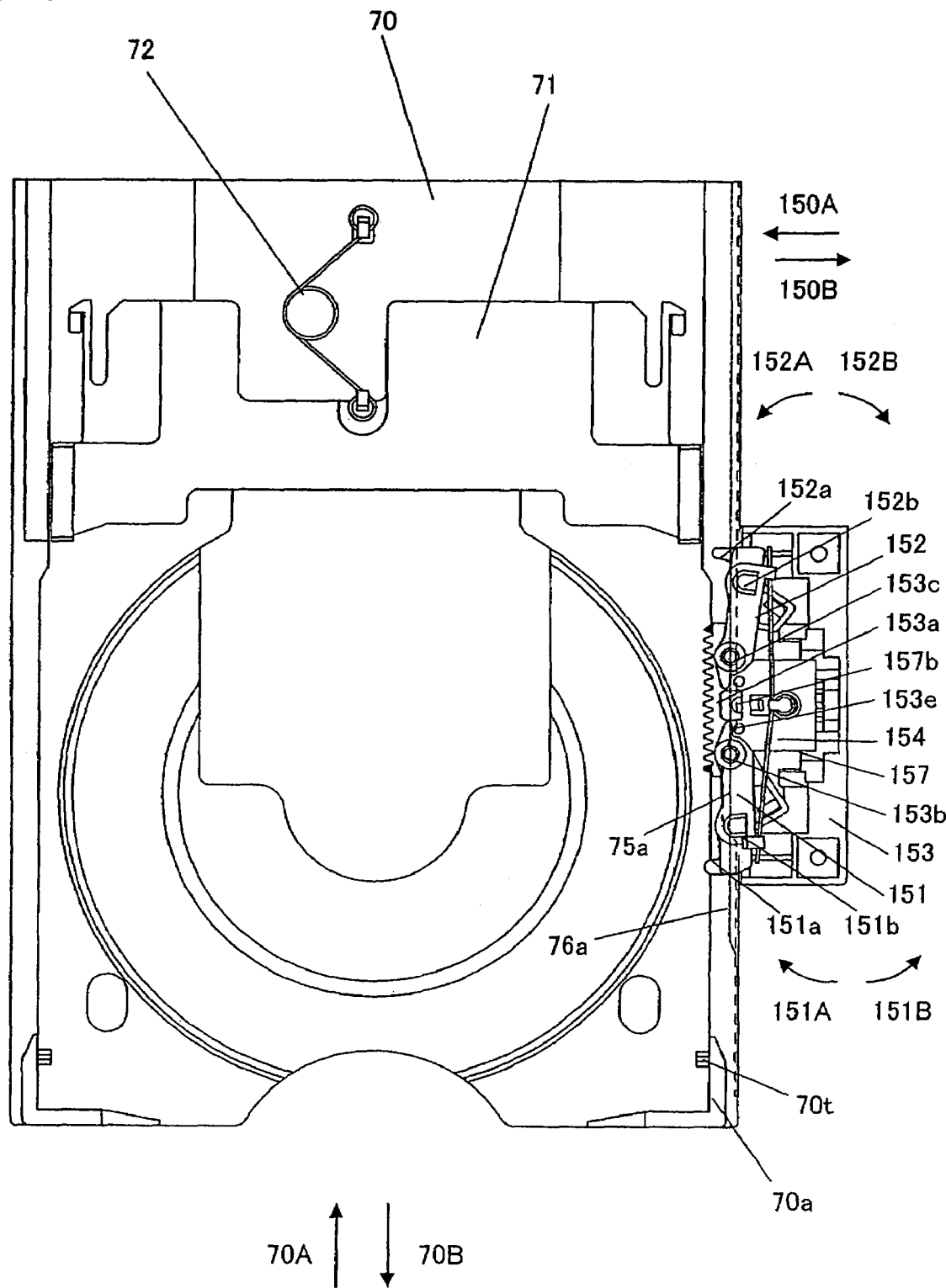
FIG. 36B is a plan view showing a state corresponding to that shown in FIG. 36A with the disk cartridge removed.

As shown in FIG. 36, the rotational member 230 rotates to a predetermined degree as defined by the relative movement of the tray 70 with respect to the shutter driving mechanism 150. Then, before the fitting portion 151a of the first driving lever 151 disengages itself from the first notched portion 231, the rack portion 153a starts engaging with the gear portion 233 of the rotational member 230. After that, the rotational member 230 receives driving force from the shutter driving mechanism 150 due to the engagement between the rack portion 153a and the gear portion 233. And as the rotational member 230 rotates, the shutter pair 220 is going to open to an even greater degree.

At this point in time, the distance between the fitting portion 151a of the first driving lever 151 and a tooth of the rack portion 153a, which is located closest to the first driving lever 151 (illustrated as a solid black tooth), is longer by one tooth than the first preferred embodiment. As a result, the engagement between that tooth of the rack portion 153a closest to the first driving lever 151 and a groove of the gear portion 233 of the rotational member 230 closest to the first notched portion shifts by one tooth. On the other hand, the fitting portion 152b of the second driving lever 152 contacts with the guide surface 75a of the cam groove 75. Thus, the second driving lever 152 keeps turned on the rotation shaft 153c in the arrow direction 152B. Consequently, the locking member 225 of the disk cartridge 200 does not contact with the second driving lever 152.

Figure 37A:
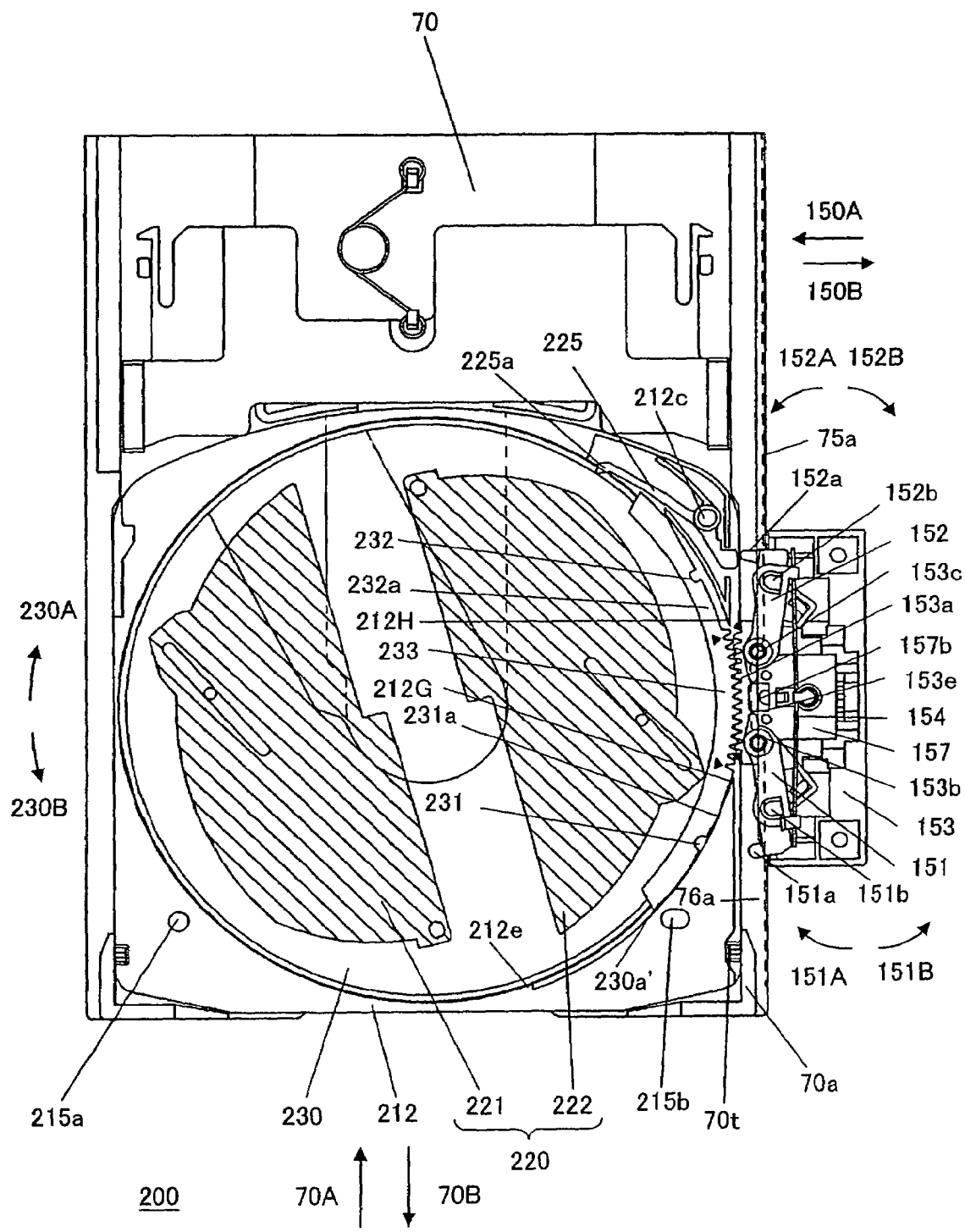
Figure 37B:
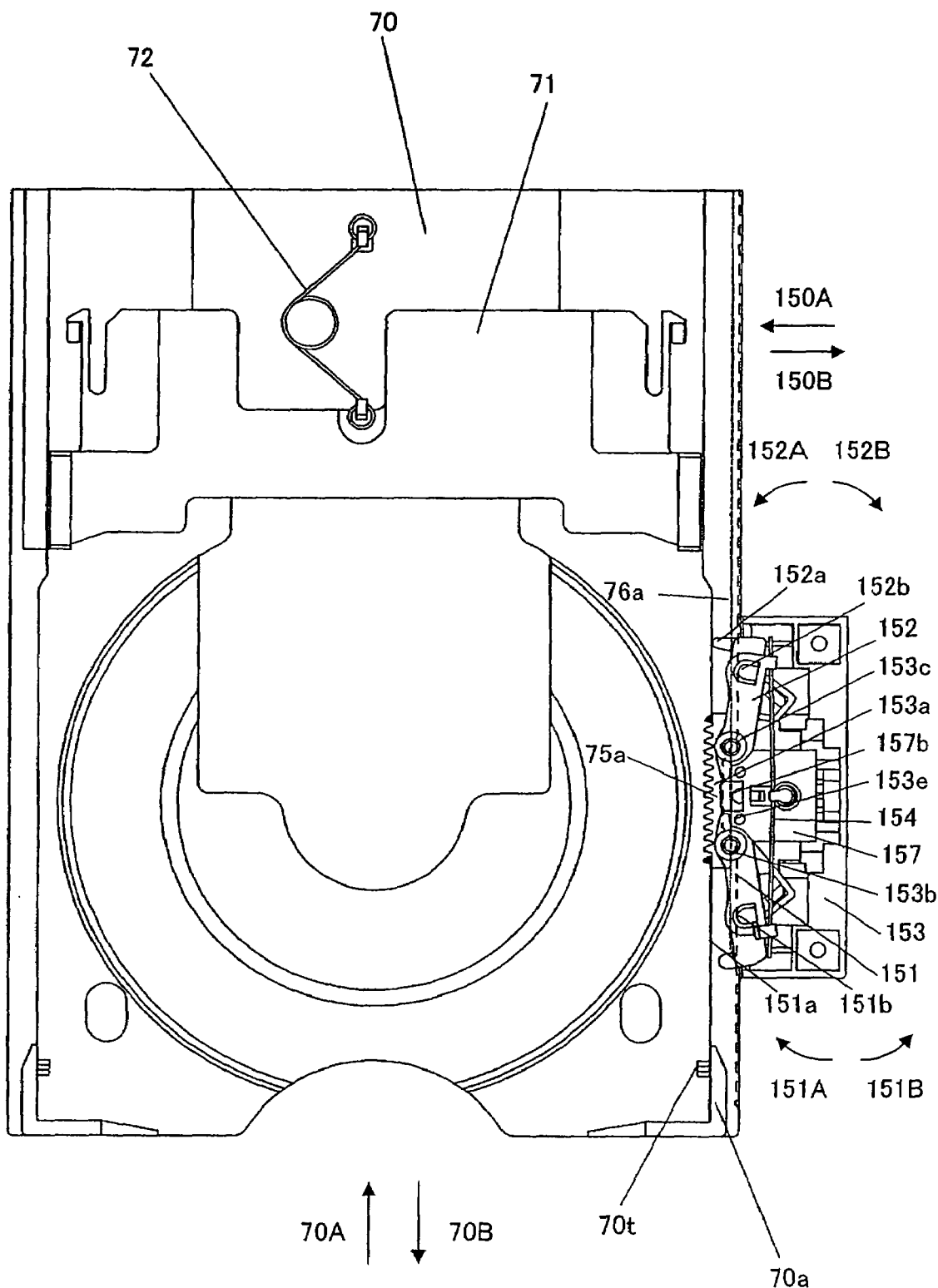
FIG. 37B is a plan view showing a state corresponding to that shown in FIG. 37A with the disk cartridge removed.

As the tray 70 is inserted even deeper in the arrow direction 70A, the rotational member 230 further rotates in the arrow direction 230A and the shutter pair 220 opens to a greater degree due to the engagement between the rack portion 153a and the gear portion 233 of the rotational member 230 as shown in FIGS. 37A and 37B. At this point in time, the fitting portion 151b of the first driving lever 151 contacts with the guide surface 75a of the cam groove 75 and is driven by the cam groove 75. As a result, the first driving lever 151 turns on the rotation shaft 153b in the direction pointed by the arrow 151B so as to avoid contact with the outer surface of the disk cartridge 200. This contact should be avoided to prevent the guide portion 212G that defines the outer shape of the disk cartridge 200 for the rotational member 230 from contacting with the first driving lever 151.

Figure 38A:
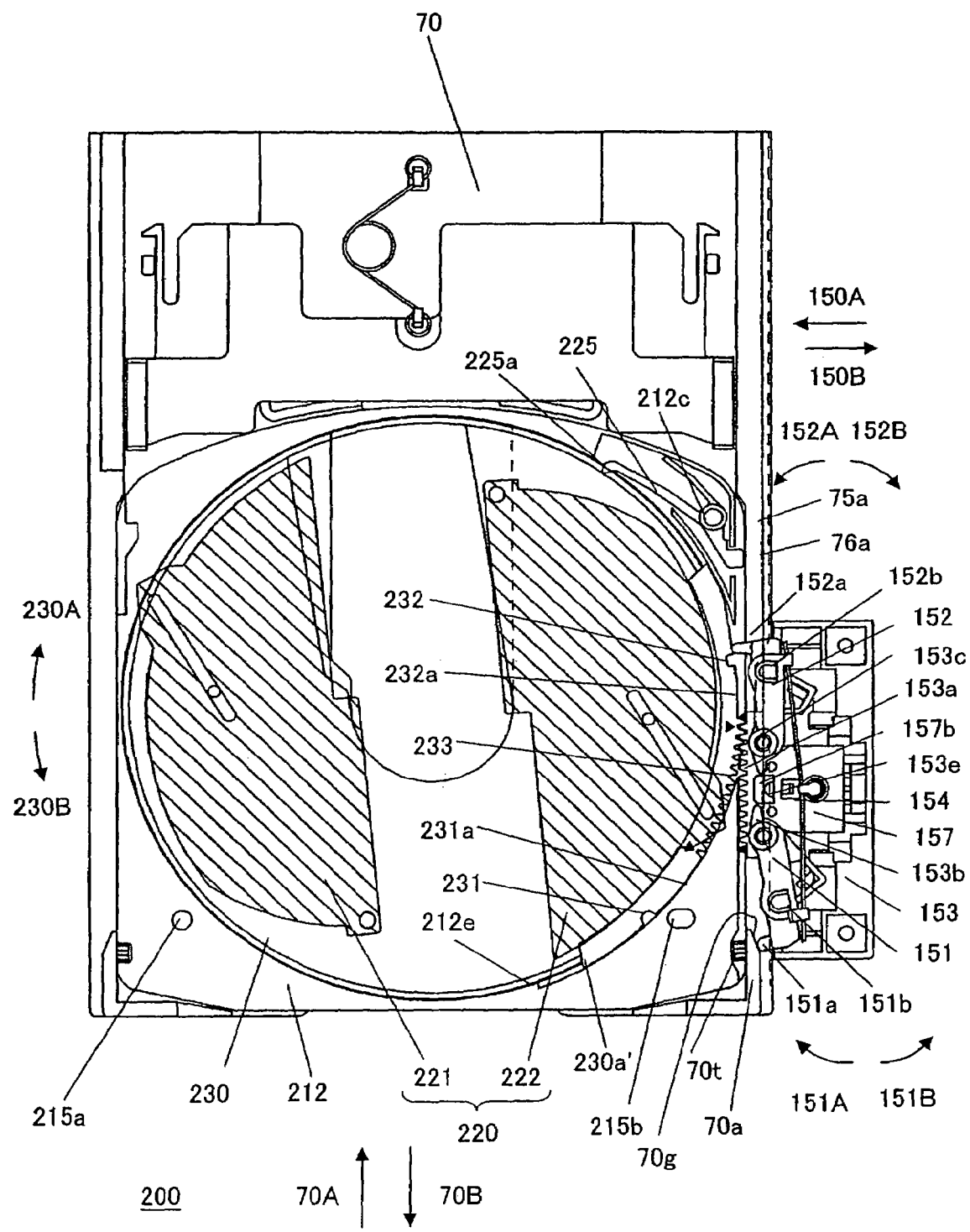
Figure 38B:
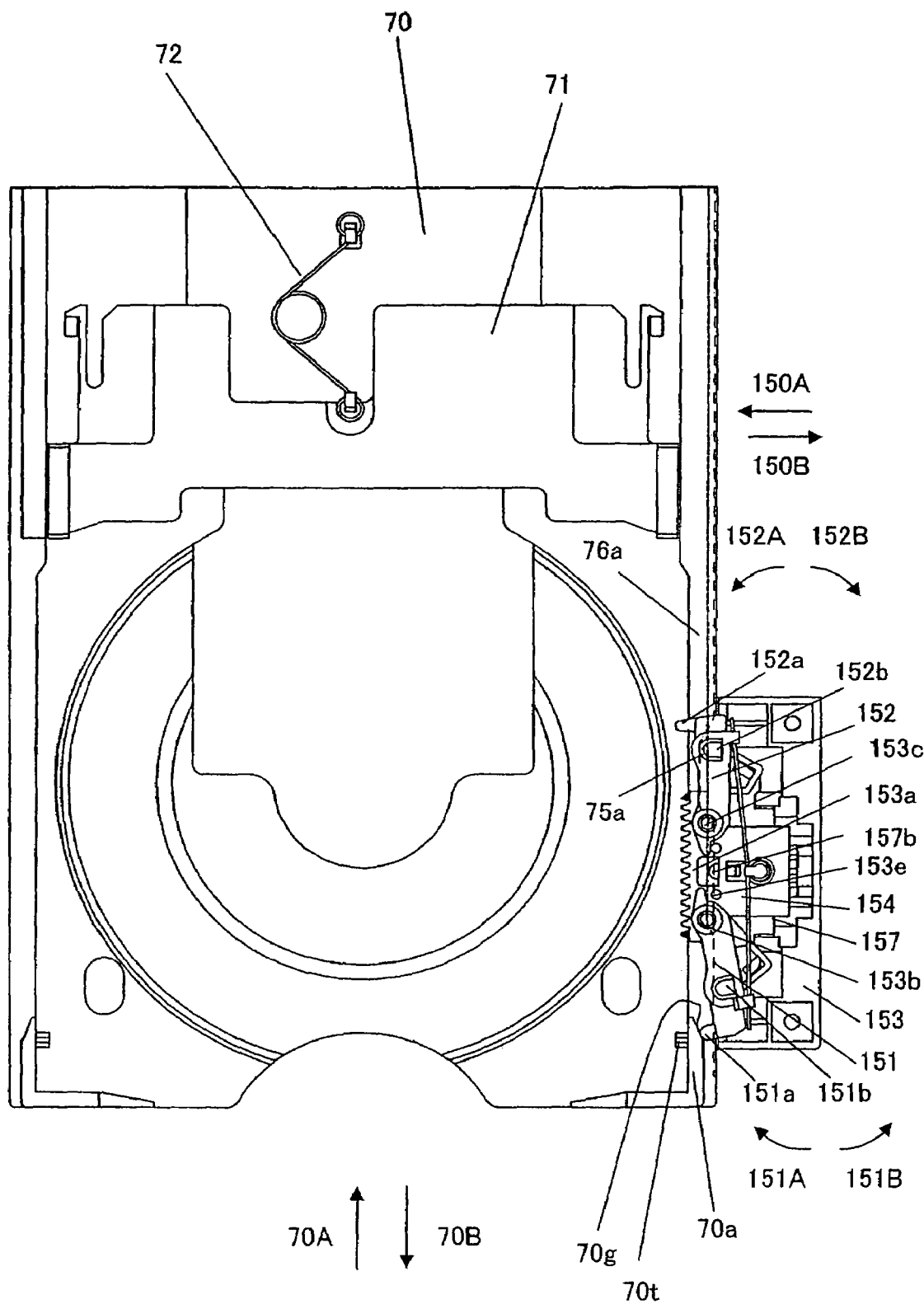
FIG. 38B is a plan view showing a state corresponding to that shown in FIG. 38A with the disk cartridge removed.

As the tray 70 is inserted even deeper in the arrow direction 70A, the fitting portion 152b of the second driving lever 152 soon reaches the recessed portion of the cam groove 75 as shown in FIGS. 38A and 38B. Since the spring 154 applies elastic force thereto, the second driving lever 152 turns in the direction pointed by the arrow 152A to make the fitting portion 152b contact with the recessed guide surface 75a. Then, due to the engagement between the gear portion 233 of the rotational member 230 and the rack portion 153a, the rotational member 230 further rotates. In this case, the rack portion 153a starts engaging with the gear portion 233 of the rotational member 230 with one tooth shifted. Accordingly, the number of teeth of the rack portion 153a is greater by one than that of grooves of the gear portion 233 and one tooth of the rack portion 153a, located closest to the second driving lever 152, remains unengaged. However, since the side surface portion 232a of the rotational member 230 with the second notched portion 232 is as high as the addendum plane (groove) of the gear portion 233, the last tooth of the rack portion 153a may remain unengaged with the gear portion 233 without interfering with the rotational member 230.

As the rotational member 230 rotates, the fitting portion 152a of the second driving lever 152 slides and shifts on the side surface portion 232a of the rotational member 230. Meanwhile, the fitting portion 151a of the first driving lever 151 contacts with the sloped surface 70g of the guide wall 70a of the tray 70 to turn in the direction pointed by the arrow 151B along this sloped surface 70g and the guide wall 70a. By turning the first driving lever 151 in this manner, a guide wall 70a for positioning the disk cartridge 200 within the tray 70 can be defined. In this preferred embodiment, the first driving lever 151 is turned by bringing the fitting portion 151a of the first driving lever 151 into contact with the guide wall 70a. However, the first driving lever 151 may also be driven by providing a cam structure, which interlocks with the fitting portion 151b of the first driving lever 151, for the tray 70 as in driving it with the guide surface 74a of the cam groove 75.

Figure 39:
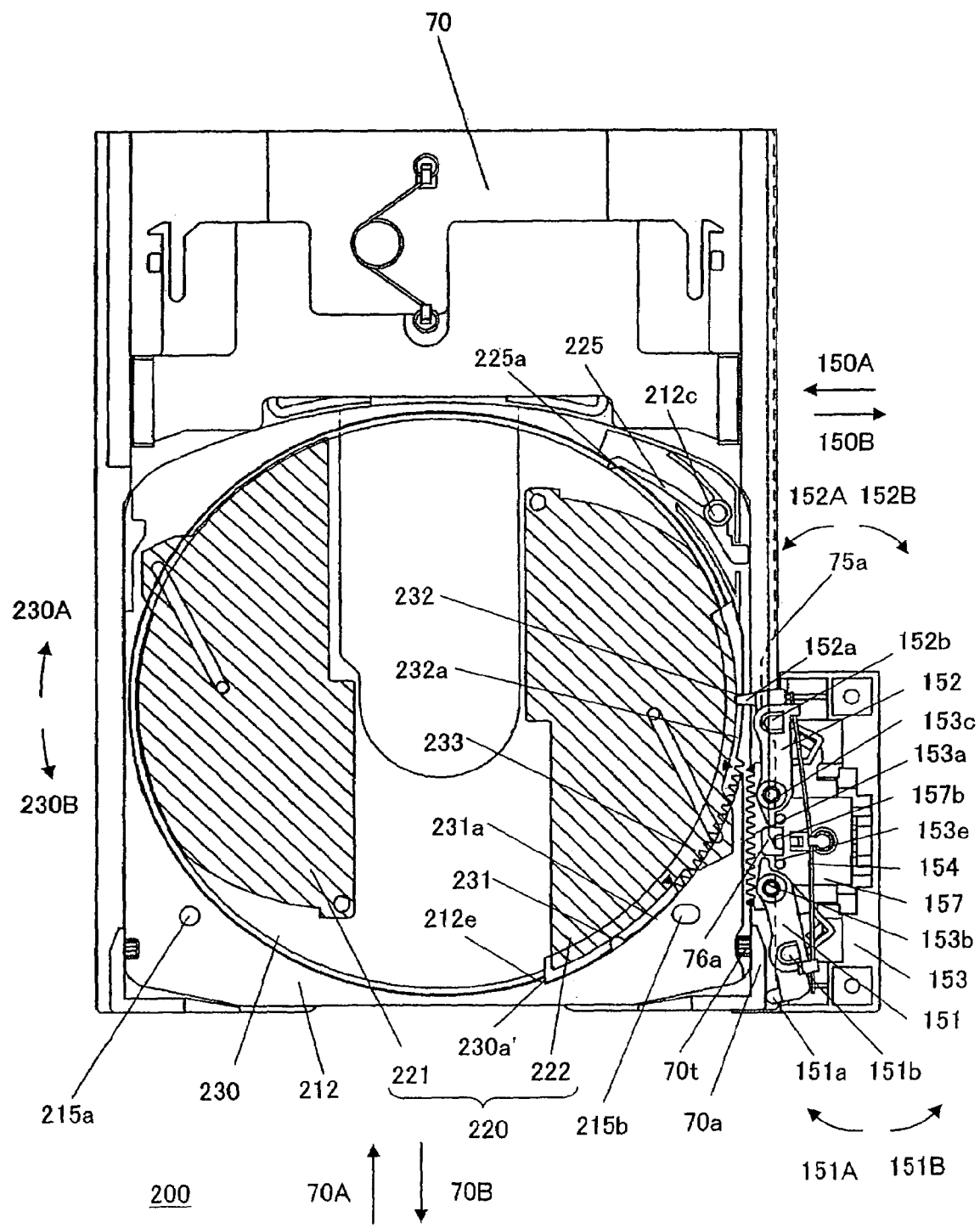
FIG. 39 is a plan view showing a state of the shutter driving mechanism during its opening or closing operation in a situation where the disk cartridge has been inserted into the disk drive with its shutter pair fully closed.

As the tray 70 is further inserted in the arrow direction 70A from the position shown in FIG. 38, the rotational member 230 rotates to a predetermined degree while opening the shutter pair 220 to a greater degree. Then, before the rack portion 153a disengages itself from the gear portion 230, the fitting portion 152a of the second driving lever 152 starts fitting with the second notched portion 232 of the rotational member 230. As shown in FIG. 39, the fitting portion 152a of the second driving lever 152 gets fitted with the second notched portion 232 of the rotational member 230, thereby rotating the rotational member 230 and opening the shutter pair 200 to an even greater degree. When the stopper protrusion 230a' of the rotational member 230 contacts with the stopper portion 212e of the lower shell 212, the rotational member 230 stops its rotation. Then, the shutter pair 220 is fully opened and finishes its opening operation.

However, depending on variations in the shape accuracy of the shutter driving mechanism 150, the disk cartridge 200 and other members (e.g., imperfect and loose fit between the fitting portion 152a of the second driving lever 152 and the second notched portion 232 of the rotational member 230) and/or the shift of the tray 70 in the disk cartridge 200 in the direction pointed by either the arrow 70A or the arrow 70B, the shutters may not have been opened fully when the relative position of the tray 70 to the shutter driving mechanism 150 is as shown in FIG. 39.

In addition, the tray 70 inserted into the disk drive 501 cannot always stop at exactly the same position with high accuracy. For that reason, the position of the disk cartridge 200 with respect to the spindle motor 30 on the traverse base 20 could slightly shift. To correct such a positional error, normally positioning is carried out by fitting the positioning pins 21 and 22 on the traverse base with the positioning holes 215a and 215b of the disk cartridge 200. In that case, however, if the second notched portion 233 and second driving lever 152 remained fitted with each other, the movement of the disk cartridge 200 might be restricted too much to position them accurately.

Thus, in this preferred embodiment, by making the fitting portion 157b of the rack member 157 contact with the guide surface 76a of the cam groove 76 unlike the first preferred embodiment, the rack member 157 is driven in the arrow direction 150B so as to prevent the rack portion 153a from interfering with the body portion 212 of the disk cartridge 200 being positioned. In this manner, the positional error of the rack portion 153a can be removed.

Also, the tray 70 is inserted even deeper in the arrow direction 70A from the position shown in FIG. 39, thereby making the stopper protrusion 230a' of the rotational member 230 contact with the stopper portion 212e of the lower shell 212 just as designed. The guide surface of the cam groove 75 is designed such that after that, the fitting portion 152b of the second driving lever 152 is disengaged from the second notched portion 232 and the second driving lever 152 is turned in the direction pointed by the arrow 152B against the elastic force applied by the spring 154. In this manner, the error caused by the variations in the shape accuracy of respective members described above is removed.

Figure 40A:
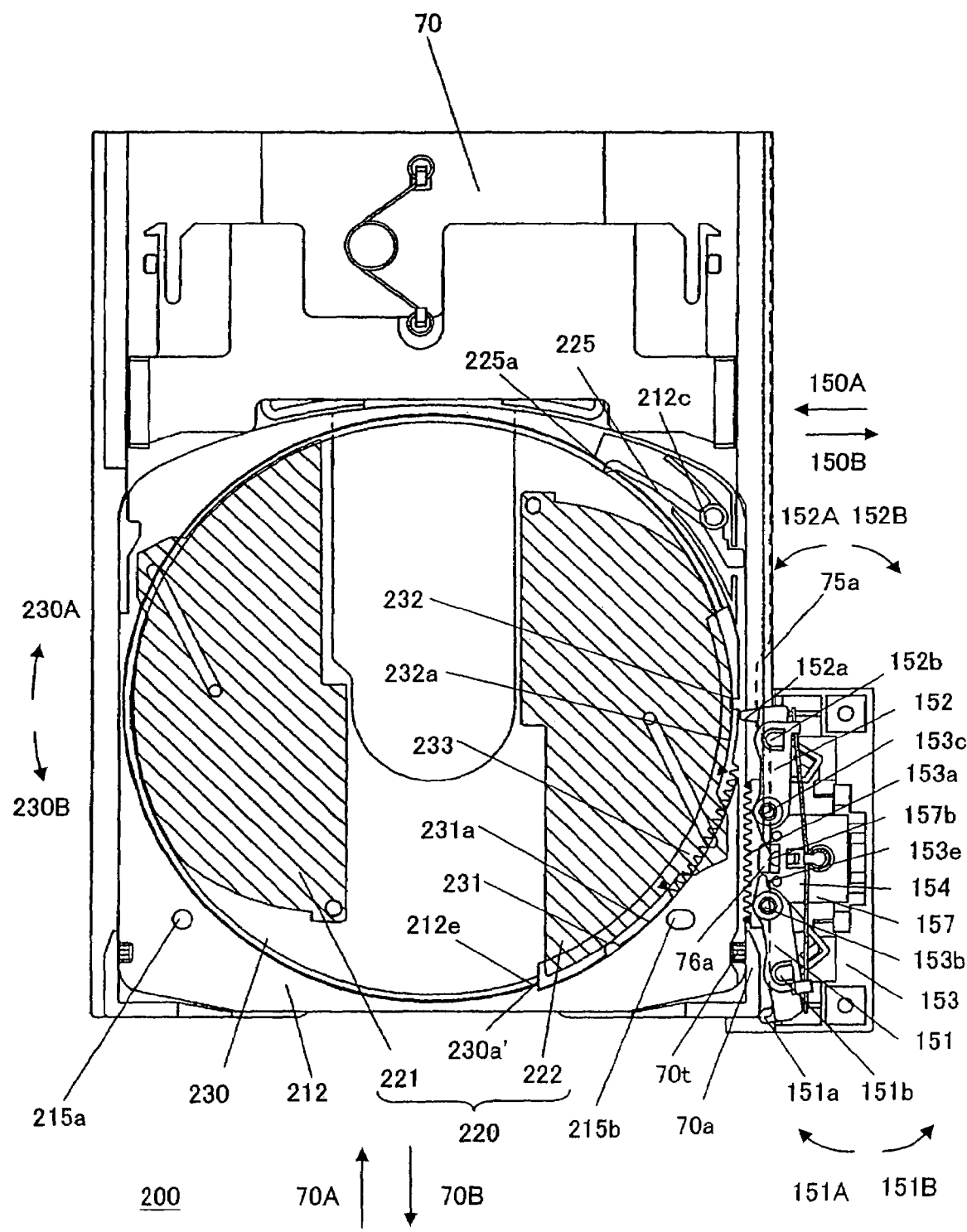
Figure 40B:
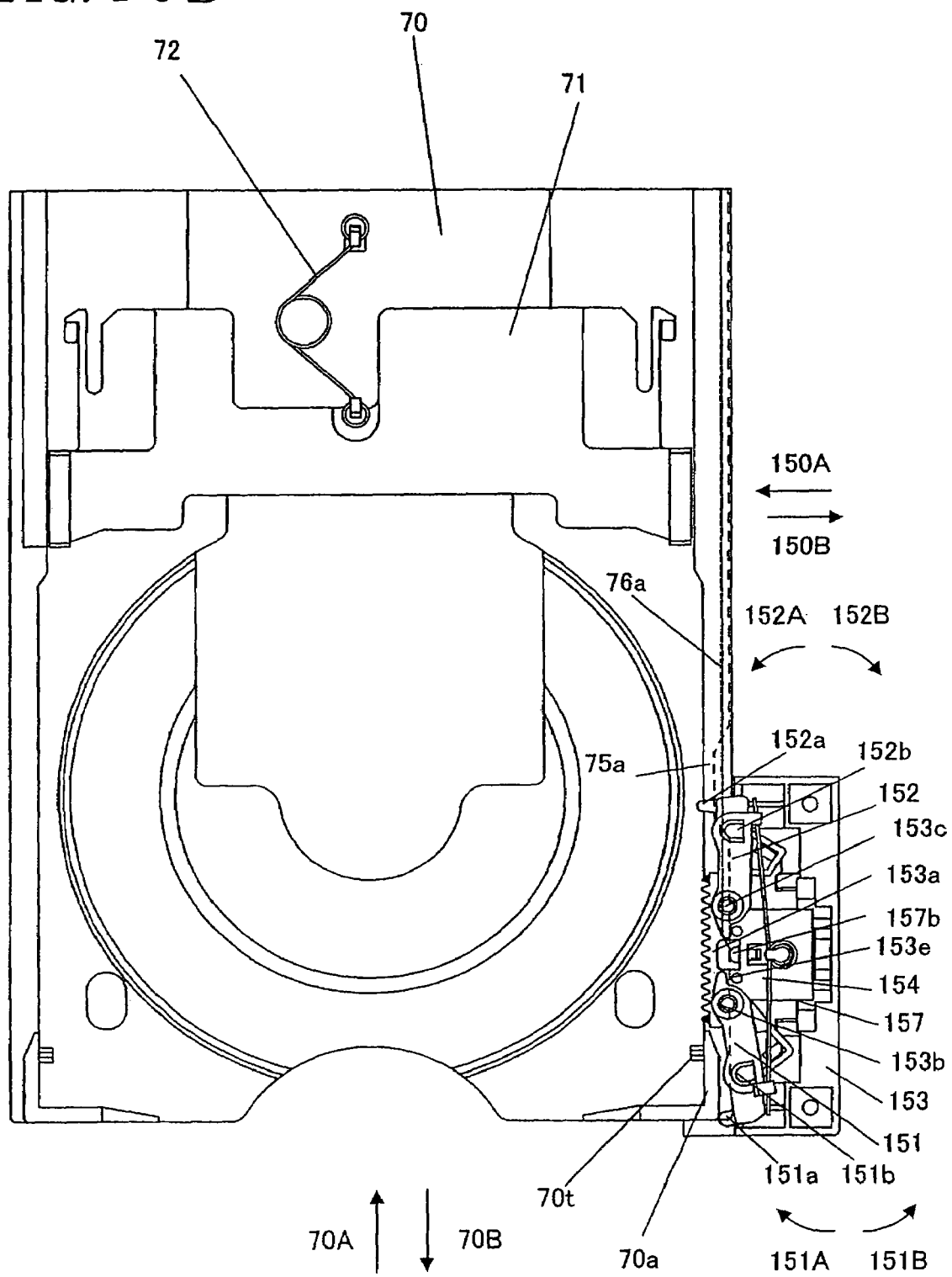
FIG. 40B is a plan view showing a state corresponding to that shown in FIG. 40A with the disk cartridge removed.

As the tray 70 is further inserted in the arrow direction 70A, the second driving lever 152 is turned in the arrow direction 152B by the guide surface 75a of the cam groove 75 as shown in FIGS. 40A and 40B. As a result, the elastic force applied to the disk cartridge 200 is weakened and the second driving lever 152 is disengaged from the second notched portion 232. In this manner, the operation of inserting the tray 70 is finished. In the situation shown in FIG. 40A, the shutter pair 220 is fully opened, and the operation of opening the shutter driving mechanism 150 is finished. Also, the disk cartridge 200 is now movable, within the recess 70r of the tray 70, both in the direction in which the tray 70 is moving (i.e., the direction pointed by the arrow 70A or 70B) and perpendicularly to the tray (70) moving direction (i.e., the direction pointed by the arrow 150A or 150B).

Next, it will be described how the shutter driving mechanism 150 operates in the situation (B) where the disk cartridge 200 is mounted on the tray 70 and then loaded into the disk drive 501 with the shutter pair 220 closed incompletely.

Figure 41:
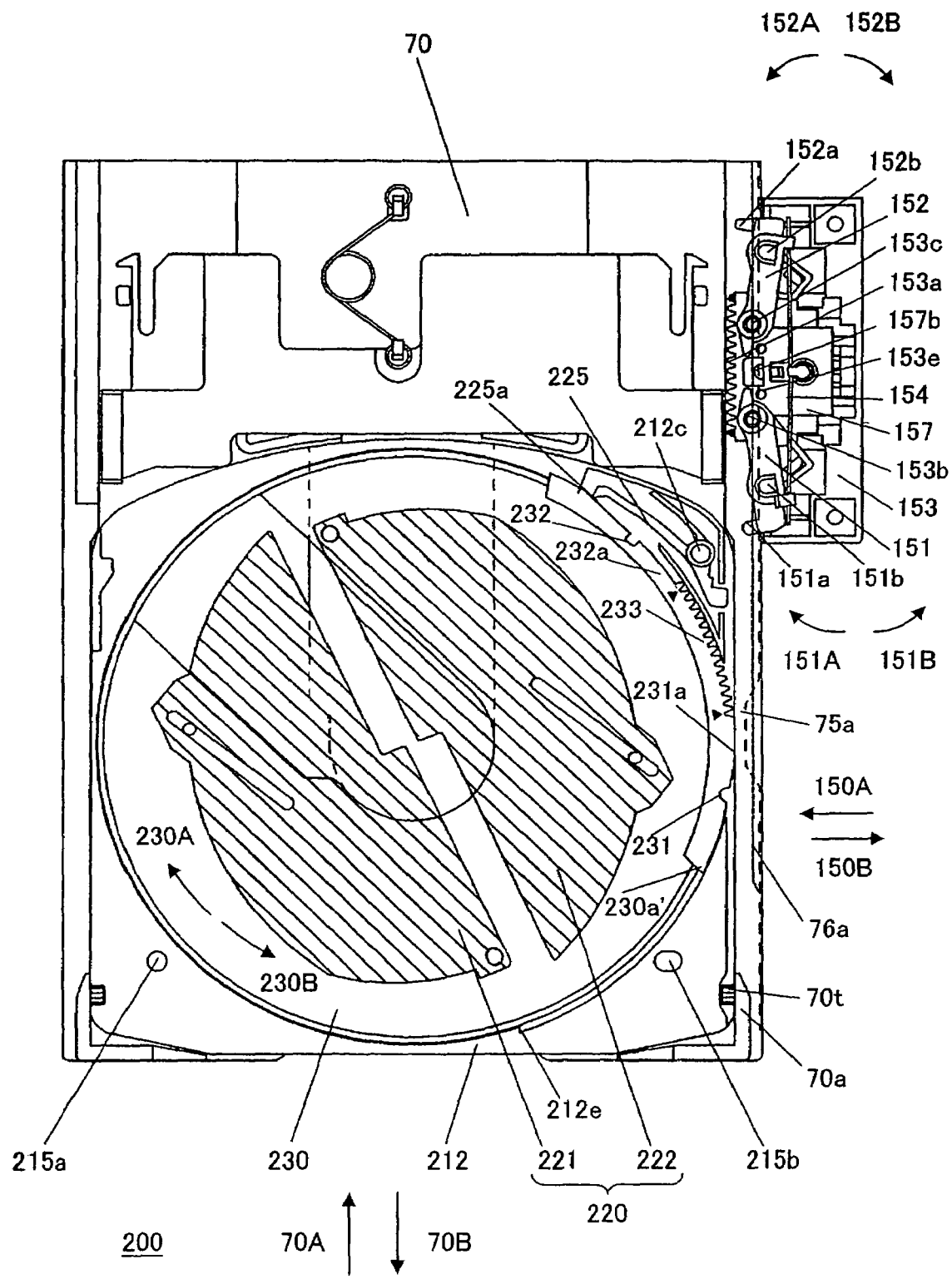
FIG. 41 is a plan view showing a state of the shutter driving mechanism during its opening operation in a situation where the disk cartridge has been inserted into the disk drive with its shutter pair incompletely closed.

As shown in FIG. 41, when the shutter pair 220 is closed incompletely, the gear portion 233 of the rotational member 230 is partially exposed through the window on the side surface of the disk cartridge 200. The disk cartridge 200 in such a condition is mounted on the tray 70 and then the tray 70 is inserted in the direction pointed by the arrow 70A by the drive motor 51. Then, as the tray 70 is inserted deeper, the shutter driving mechanism 150 gets closer to the disk cartridge 200.

At this point in time, the fitting portions 151b and 152b of the first and second driving levers 151 and 152 contact with the guide surface 75a of the cam groove 75 provided for the tray 70. Thus, the first and second driving levers 151 and 152 turn in the arrow directions 151B and 152B, respectively, and maintain predetermined angles of rotation as defined by the position of the guide plane 75a. More specifically, the fitting portions 151b and 152b of the first and second driving levers 151 and 152 are retracted in the arrow direction 150B with respect to the rack portion 153*a* so as to avoid contact with the locking member 225.

Meanwhile, the fitting portion 157*b* of the rack member 157 is out of contact with the guide surface 76*a* of the cam groove 76 provided for the tray 70. Since the force produced by the spring 154 is greater than that of the spring 156, the rack member 157 stays at the position defined by the stopper portion 155*d* of the opening/closing base 153.

In such a state, the shutter driving mechanism 150 is getting closer to the disk cartridge 200 as the tray 70 is inserted deeper.

Figure 42:
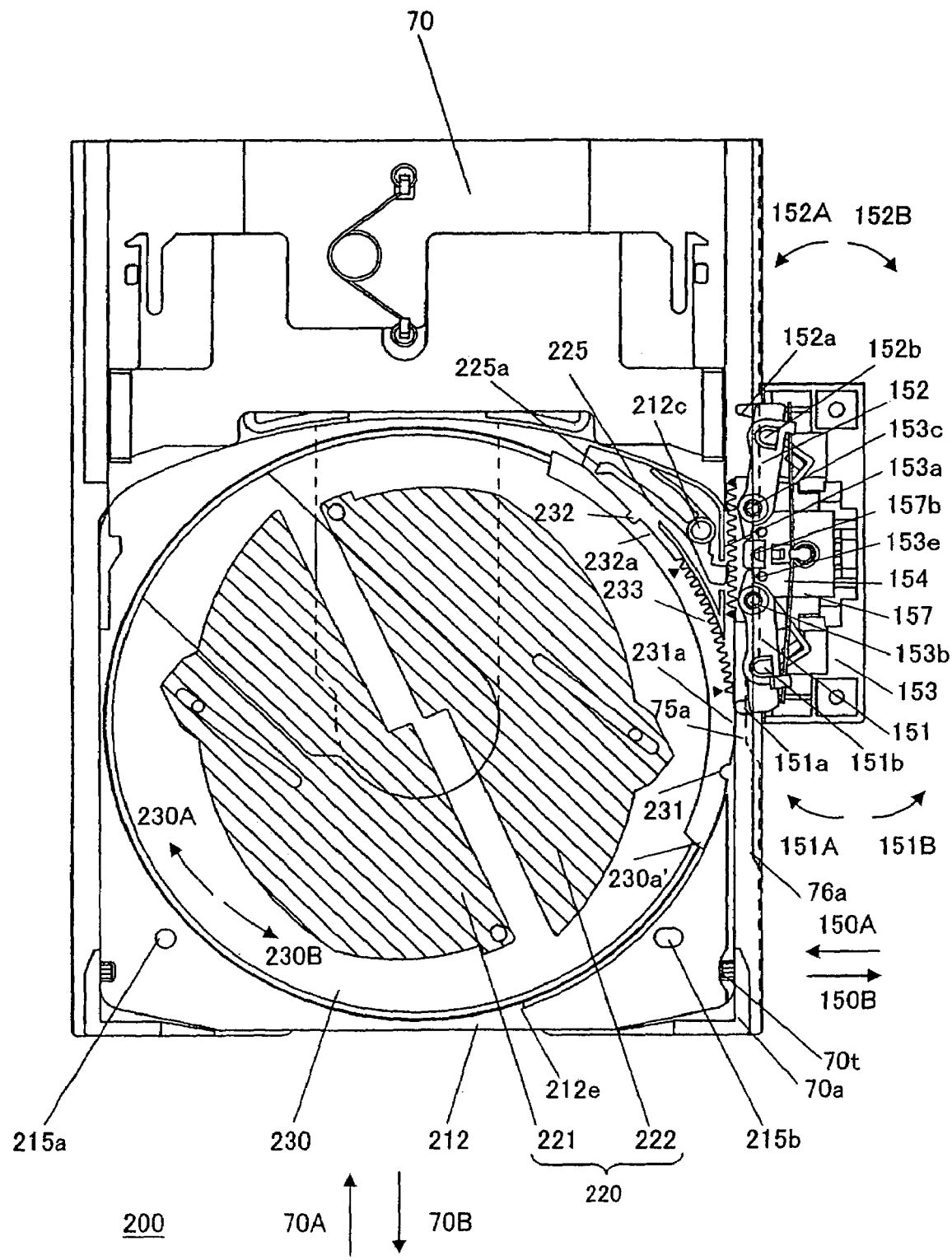
FIG. 42 is a plan view showing a state of the shutter driving mechanism during its opening operation in a situation where the disk cartridge has been inserted into the disk drive with its shutter pair incompletely closed.

As the tray 70 is inserted even deeper in the arrow direction 70A from the position shown in FIG. 41, the locking member 225 of the disk cartridge 200 is pushed by the rack portion 153*a* as shown in FIG. 42. However, since the rotational member 230 has been rotated in the direction pointed by the arrow 230A, the rotational member 230 has already been unlocked. At this point in time, the fitting portion 151*b* of the first driving lever 151 reaches the recessed portion of the guide surface 75*a* of the cam groove 75. Thus, the first driving lever 151 turns in the direction pointed by the arrow 151A along the guide surface 75*a* of the cam groove 75. As a result, the fitting portion 151*a* of the first driving lever 151 contacts with the side surface portion 231*a* (or the gear portion 233) of the rotational member 230.

Figure 43:
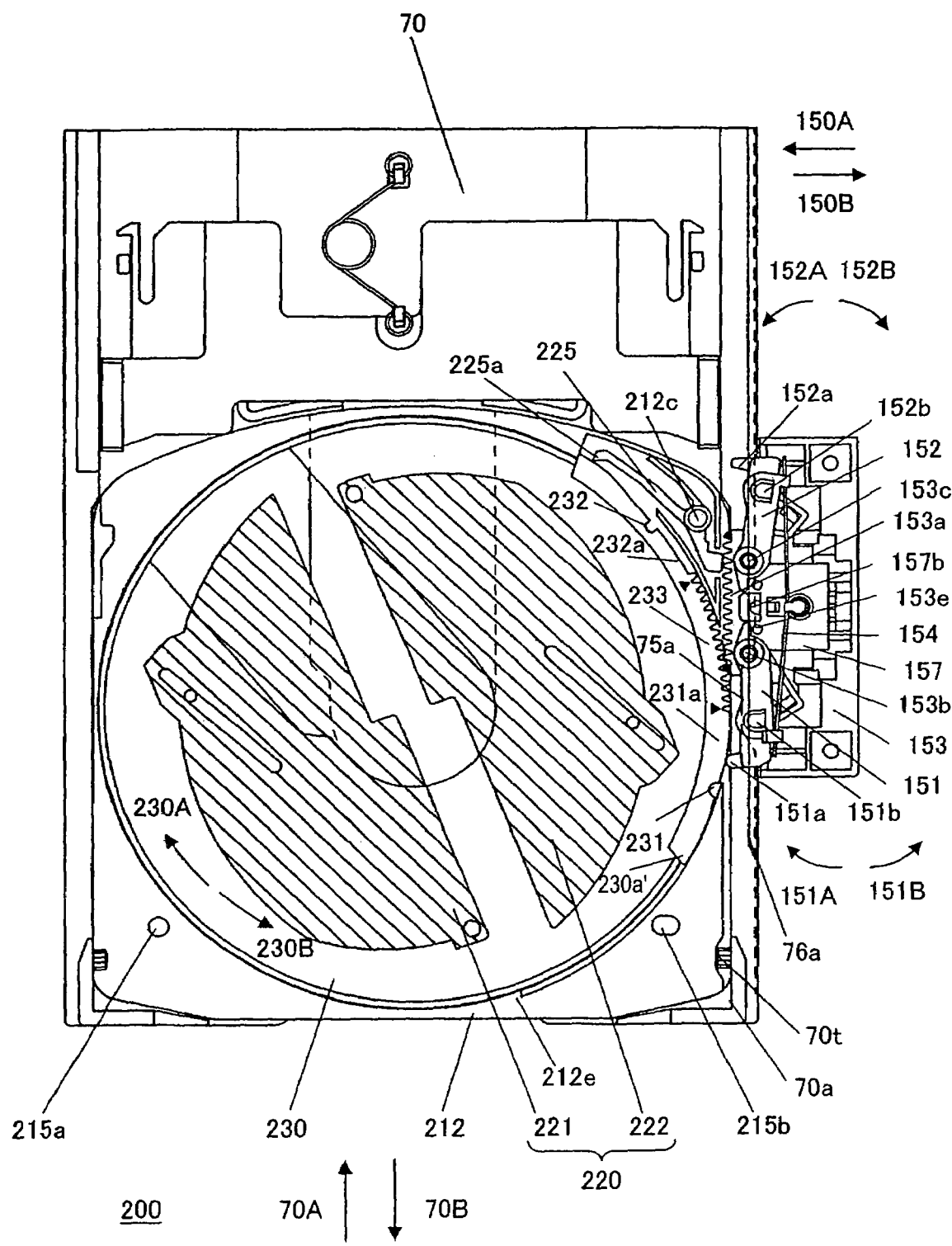
FIG. 43 is a plan view showing a state of the shutter driving mechanism during its opening operation in a situation where the disk cartridge has been inserted into the disk drive with its shutter pair incompletely closed.

As the tray 70 is further inserted in the arrow direction 70A from the position shown in FIG. 42, the first driving lever 151, being fitted with the first notched portion 231 of the rotational member 230, slides and shifts on the side surface portion 231*a* (or the gear portion 233) of the rotational member 230. When the tray 70 is inserted even deeper in the arrow direction 70A, the rack portion 153*a* contacts with the gear portion 233 of the rotational member 230 as shown in FIG. 43 and gets engaged with teeth that are located at different positions than those shown in FIG. 36A. As a result, the rotational member 230 rotates in the arrow direction 230A and the shutter pair 220 starts to open from the incompletely closed position.

At this point in time, the fitting portion 152*b* of the second driving lever 152 is in contact with the guide surface 75*a* of the cam groove 75, and therefore, the second driving lever 152 maintains a predetermined angle of rotation. Accordingly, the locking member 225 of the disk cartridge 200 does not contact with the second driving lever 152.

Figure 44:
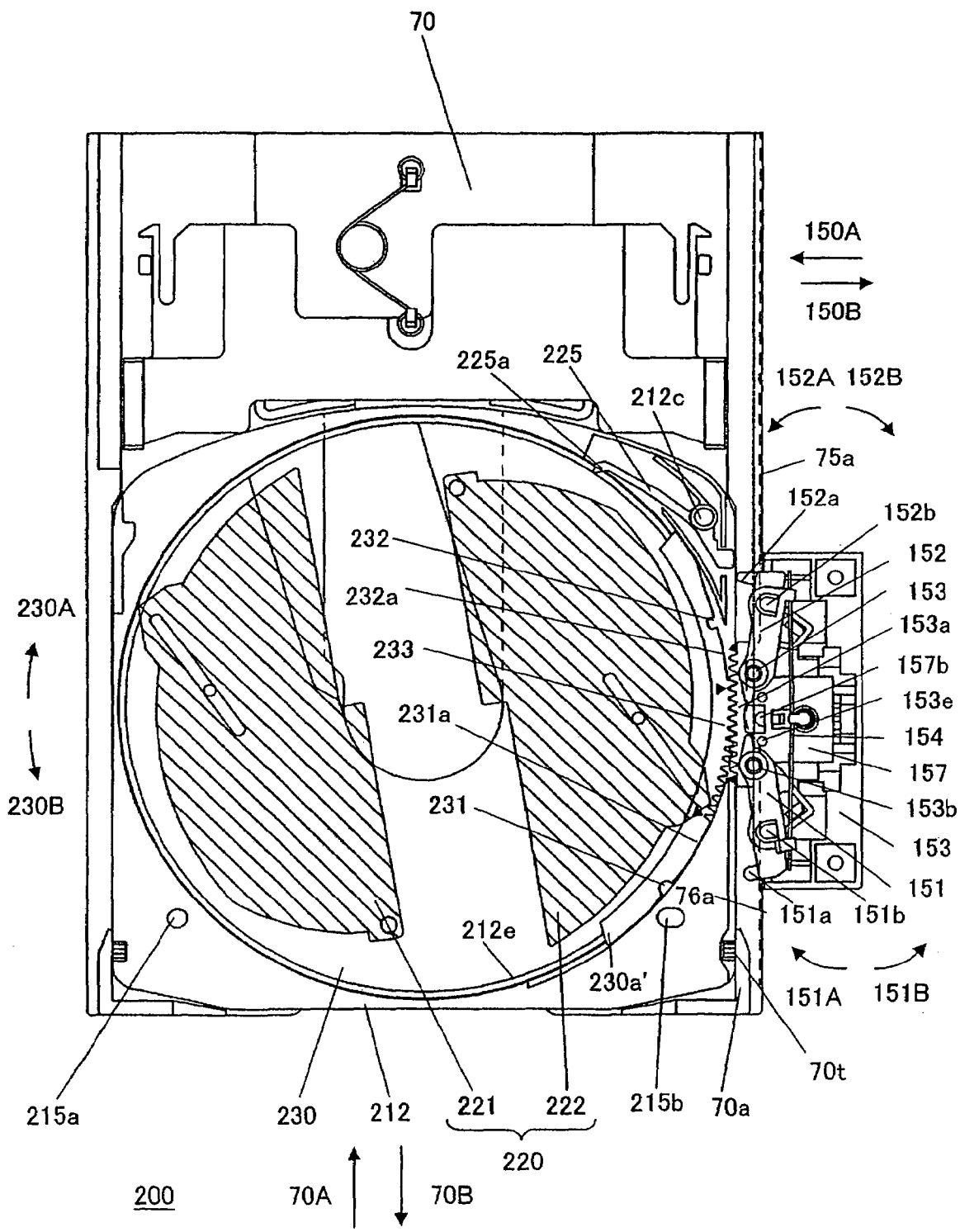
FIG. 44 is a plan view showing a state of the shutter driving mechanism during its opening operation in a situation where the disk cartridge has been inserted into the disk drive with its shutter pair incompletely closed.

As the tray 70 is further inserted in the arrow direction 70A from the position shown in FIG. 43, the rotational member 230 keeps rotating in the arrow direction 230A and the shutter pair 220 opens to an even greater degree due to the engagement between the rack portion 153*a* and the gear portion 233 of the rotational member 230 as shown in FIG. 44. In this case, the first driving lever 151 turns on the rotation shaft 153*b* in the arrow direction 151B according to the profile of the guide surface 75*a* of the cam groove 75 and is driven so as to avoid contact with the side surface of the disk cartridge 200.

Figure 45:
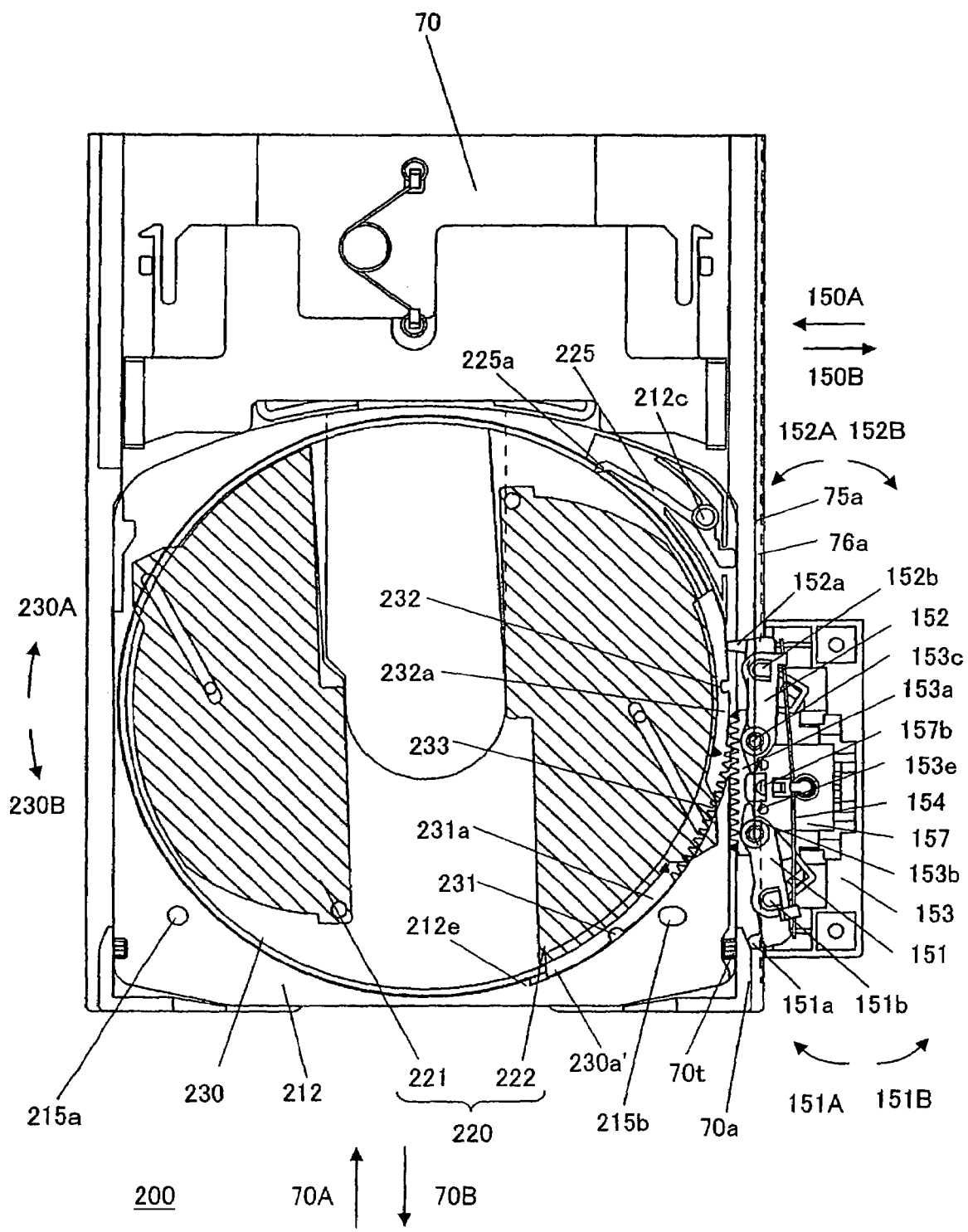
FIG. 45 is a plan view showing a state of the shutter driving mechanism during its opening operation in a situation where the disk cartridge has been inserted into the disk drive with its shutter pair incompletely closed.

As the tray 70 is inserted even deeper in the arrow direction 70A from the position shown in FIG. 44, the fitting portion 152*b* of the second driving lever 152 soon reaches the recessed portion of the guide surface 75*a*. Since the spring 154 applies elastic force to the second driving lever 152 to make the fitting portion 152*b* contact with the guide surface 75*a* of the cam groove 75, the second driving lever 152 turns in the direction pointed by the arrow 152A and contacts with the side surface portion 232*a* of the rotational member 230 as shown in FIG. 45.

Then, due to the engagement between the gear portion 233 of the rotational member 230 and the rack portion 153*a*, the rotational member 230 further rotates. The rack portion 153*a* started to engage with the gear portion 233 from a halfway point thereof. Thus, when the groove located at the end of the gear portion 233 engages with the rack portion 153*a* as a result of the rotation, several teeth of the rack portion 153*a* will remain unengaged. However, the side surface portion 232*a* of the rotational member 230 with the second notched portion 232 is as high as the addendum (i.e., the bottom of the groove) of the gear portion 233. Accordingly, those extra teeth of the rack portion 153*a* do not interfere with the rotational member 230.

Meanwhile, the fitting portion 152*a* of the second driving lever 152 also slides and moves on the side surface portion 232*a* of the rotational member 230. And when the fitting portion 152*a* of the second driving lever 152 gets fitted with the second notched portion 232, the rotational member 230 is rotated by the second driving lever 152 and the shutter pair 220 opens to an even greater degree as described above. As already described with reference to FIG. 39, the error caused by the shape variations of respective members, for example, is removed and the first driving lever 151, second driving lever 152 and rack member 157 are separated from the disk cartridge 200 by the cam grooves 75 and 76 of the tray 70. As a result, the shutter pair 220 is fully opened as shown in FIG. 40 and the opening operation by the shutter driving mechanism 150 is finished.

As described above, even if the disk cartridge 200 is mounted on the tray 70 with the shutter pair 220 closed incompletely and if the tray 70 is loaded into the disk drive 501, the shutter pair 220 can be opened just as intended and the disk cartridge 200 can be loaded into the disk drive 501 without causing any inconvenience.

Next, it will be described how the shutter driving mechanism 150 operates in the situation (C) where the disk cartridge 200 is mounted on the tray 70 and then loaded into the disk drive 501 with the shutter pair 220 fully opened.

Figure 46:
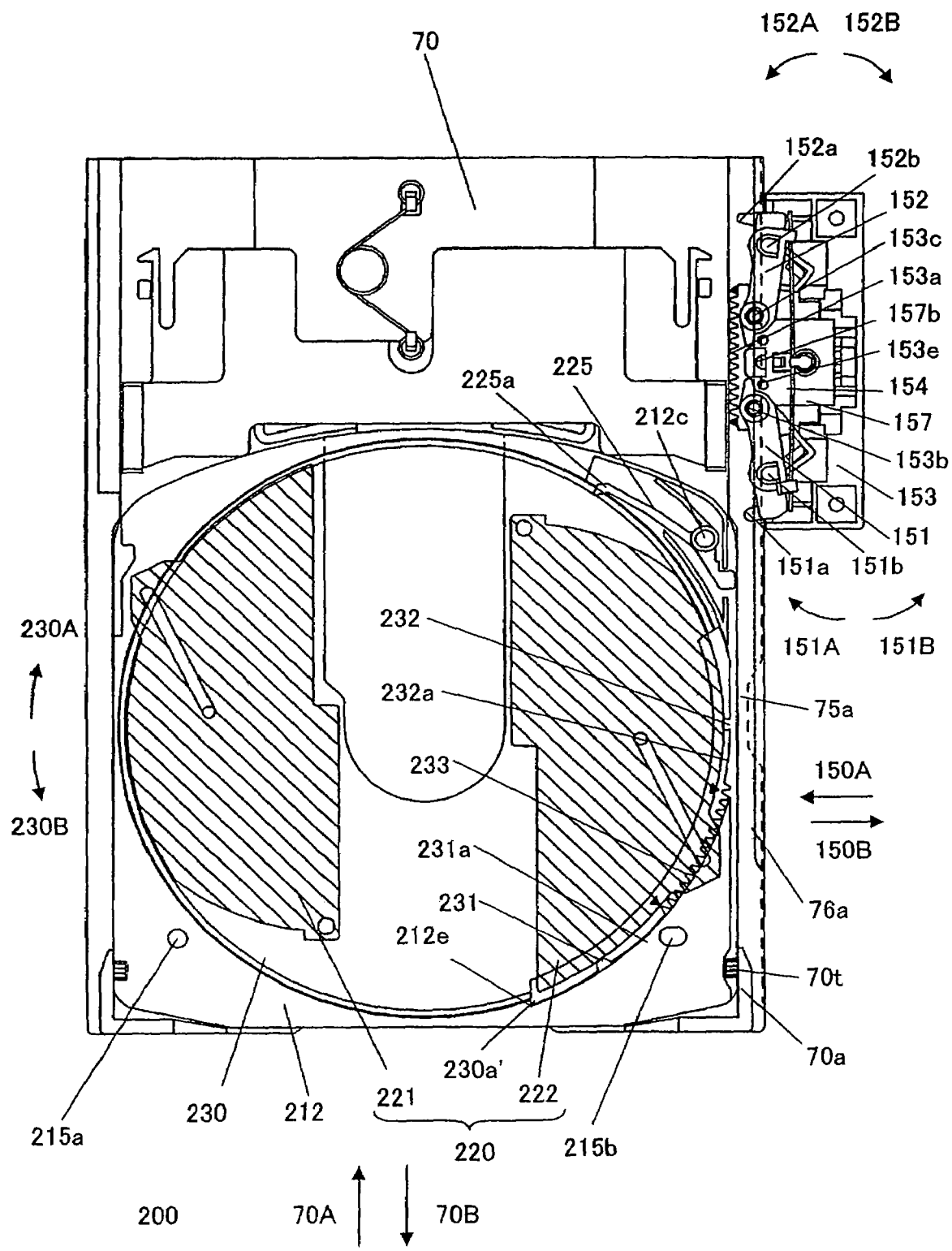
FIG. 46 is a plan view showing a state of the shutter driving mechanism during its opening operation in a situation where the disk cartridge has been inserted into the disk drive with its shutter pair fully opened.

As shown in FIG. 46, when the shutter pair 220 is opened fully, the second notched portion 232 of the rotational member 230 is fully exposed through the window on the side surface of the disk cartridge 200. The disk cartridge 200 in such a condition is mounted on the tray 70 and then the tray 70 is inserted in the direction pointed by the arrow 70A by the drive motor 51. Then, as the tray 70 is inserted deeper, the shutter driving mechanism 150 gets closer to the disk cartridge 200. At this point in time, the fitting portions 151*b* and 152*b* of the first and second driving levers 151 and 152 contact with the guide surface 75*a* of the cam groove 75. Thus, the first and second driving levers 151 and 152 turn in the arrow directions 151B and 152B, respectively, and maintain predetermined angles of rotation as defined by the position of the guide plane 75*a*. More specifically, as shown in FIG. 46, the fitting portions 151*a* and 152*a* of the first and second driving levers 151 and 152 are retracted in the arrow direction 150B with respect to the rack portion 153*a* so as to avoid contact with the locking member 225.

Meanwhile, the fitting portion 157*b* of the rack member 157 is out of contact with the guide surface 76*a* of the cam groove 76. Since the force produced by the rack spring 156 is greater than that produced by the spring 154, elastic force is applied to the rack member 157 in the arrow direction 150A and the rack member 157 stays at the position defined by the stopper portion 155*d* of the base 153.

Figure 47:
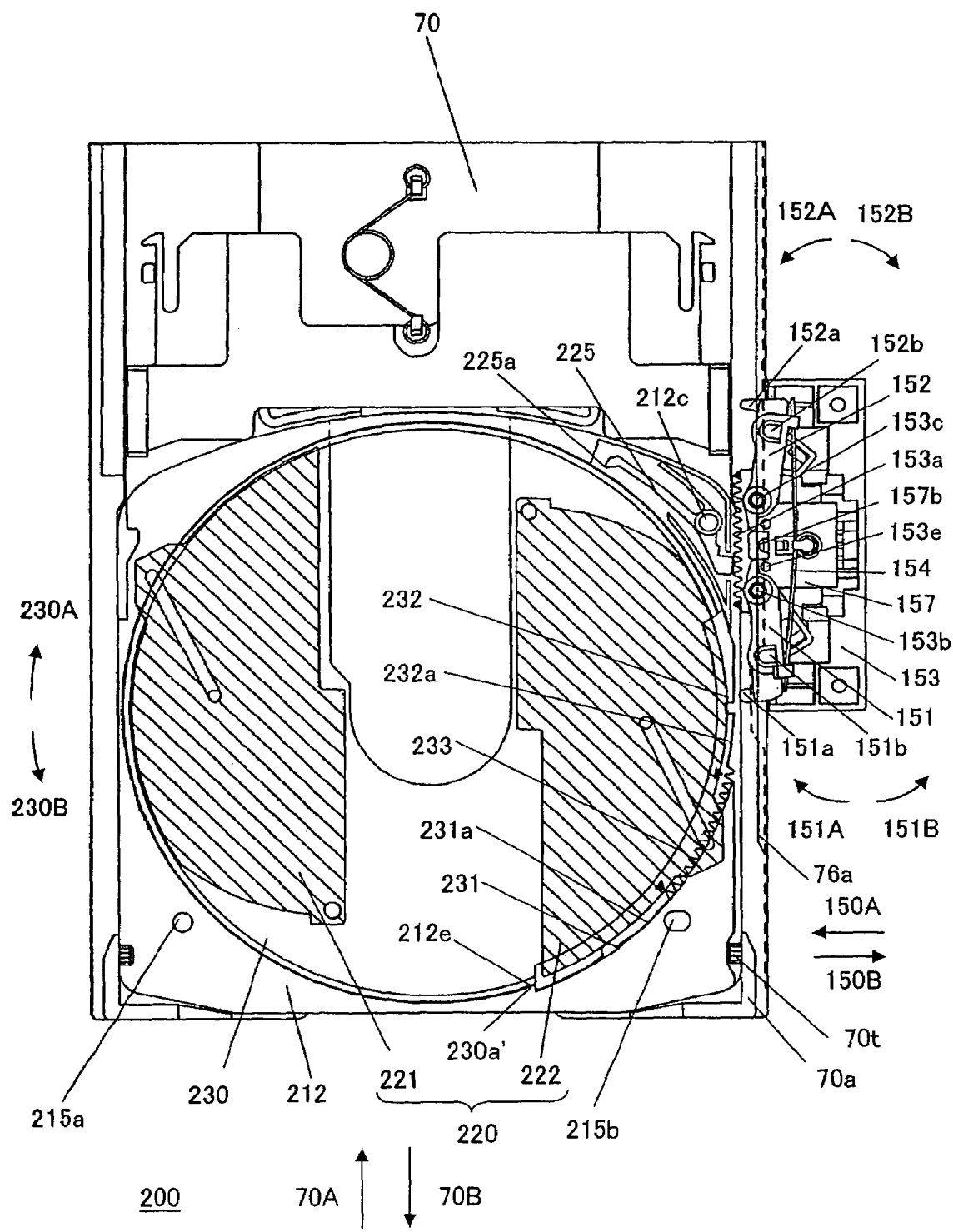
FIG. 47 is a plan view showing a state of the shutter driving mechanism during its opening operation in a situation where the disk cartridge has been inserted into the disk drive with its shutter pair fully opened.

In such a state, the shutter driving mechanism 150 is getting closer to the disk cartridge 70 as the tray 70 is inserted deeper. As the tray 70 is inserted even deeper in the arrow direction 70A from the position shown in FIG. 46, the locking member 225 of the disk cartridge 200 is pushed by the rack portion 153a as shown in FIG. 47. However, since the rotational member 230 has been rotated in the direction pointed by the arrow 230A, the rotational member 230 has already been unlocked. At this point in time, the fitting portion 151b of the first driving lever 151 reaches the recessed portion of the cam groove 75. Since the spring 154 applies elastic force thereto, the first driving lever 151 turns in the direction pointed by the arrow 151A such that its fitting portion 151b contacts with the recessed guide surface 75a. As a result, the fitting portion 151a of the first driving lever 151 contacts with the side surface portion 231a of the rotational member 230. On the other hand, the second driving lever 152 is still turned in the arrow direction 152B by the guide surface 75a of the cam groove 75.

As the tray 70 is further inserted in the arrow direction 70A from the position shown in FIG. 47, the fitting portion 151a of the first driving lever 151 gets closer to the exposed second notched portion 232. However, the side surface portion 232a with the second notched portion 232 is as high as the addendum (i.e., the bottom of the groove) of the gear portion 233. Accordingly, the fitting portion 151a of the first driving lever 151 does not fit into the second notched portion 232. Thus, the rotational member 230 is not driven by the shutter driving mechanism 150 but remains stopped. Meanwhile, the fitting portion 151a of the first driving lever 151 also slides and moves on the side surface portion 232a of the rotational member 230.

Even if the fitting portion 151a of the first driving lever 151 happen to get fitted with the second notched portion 232 due to the shape variation of respective members, the stopper portion 212e of the cartridge lower shell 212 prevents the rotational member 230 from rotating in the arrow direction 230A. Accordingly, even in such a situation, the first driving lever 151 is turned in the direction pointed by the arrow 151B and disengaged easily due to the reactive force applied from the non-rotating rotational member 230 such that the fitting portion 151a of the first driving lever 151 goes away from the second notched portion 152.

Figure 48:
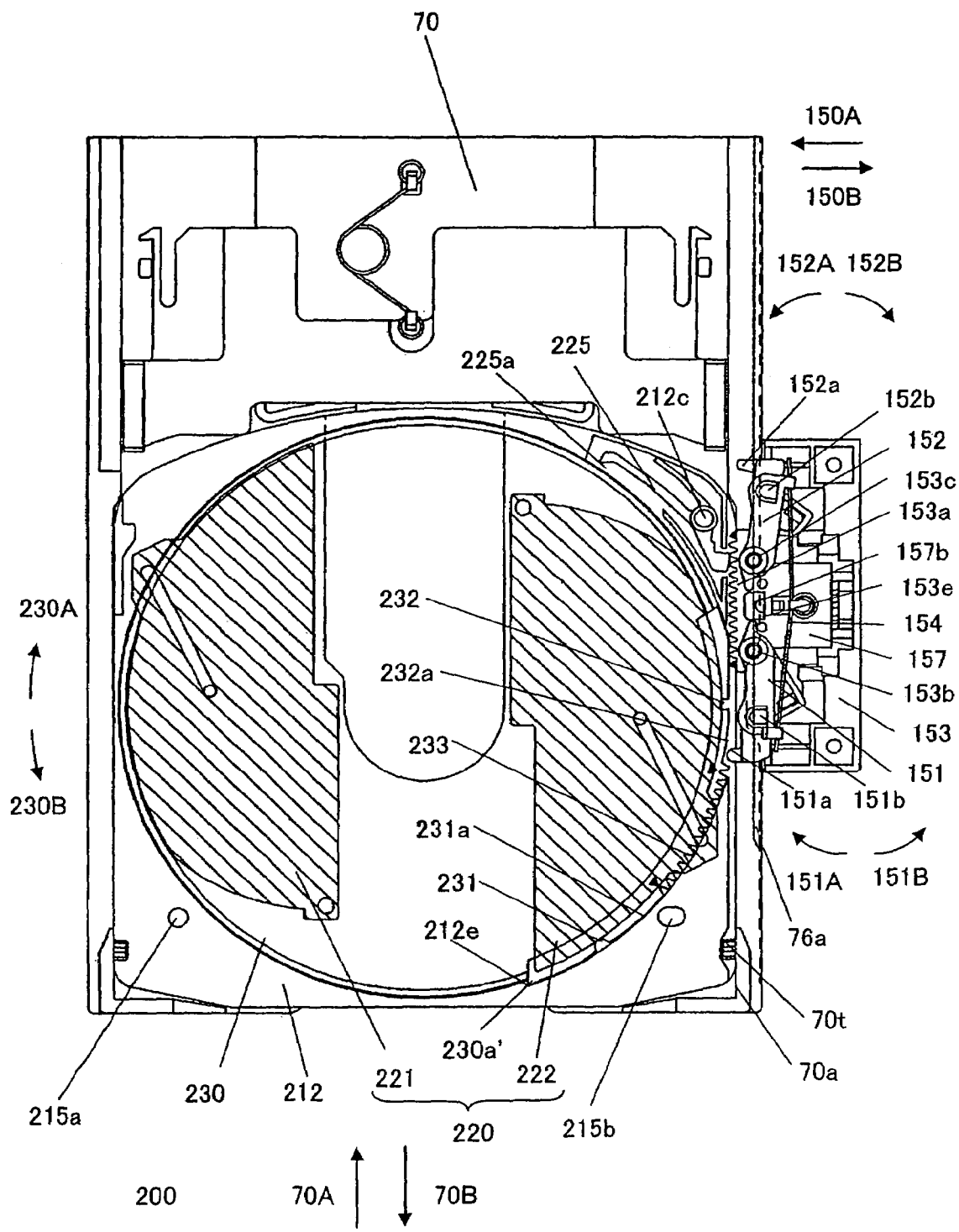
FIG. 48 is a plan view showing a state of the shutter driving mechanism during its opening operation in a situation where the disk cartridge has been inserted into the disk drive with its shutter pair fully opened.

As the tray 70 is inserted even deeper in the arrow direction 70A, the rack portion 153a gets closer to the second notched portion 232 of the rotational member 230 as shown in FIG. 48. However, the side surface portion 232a with the second notched portion 232 is located as high as the addendum plane of the gear portion 233. Thus, the rack portion 153a does not fit with the rotational member 230 but just slips. At this point in time, the fitting portion 152b of the second driving lever 152 contacts with the guide surface 75a of the cam groove 75, thereby turning the second driving lever 152 on the rotation shaft 153c in the arrow direction 152B and preventing the locking member 225 of the disk cartridge 200 from contacting with the second driving lever 152.

Figure 49:
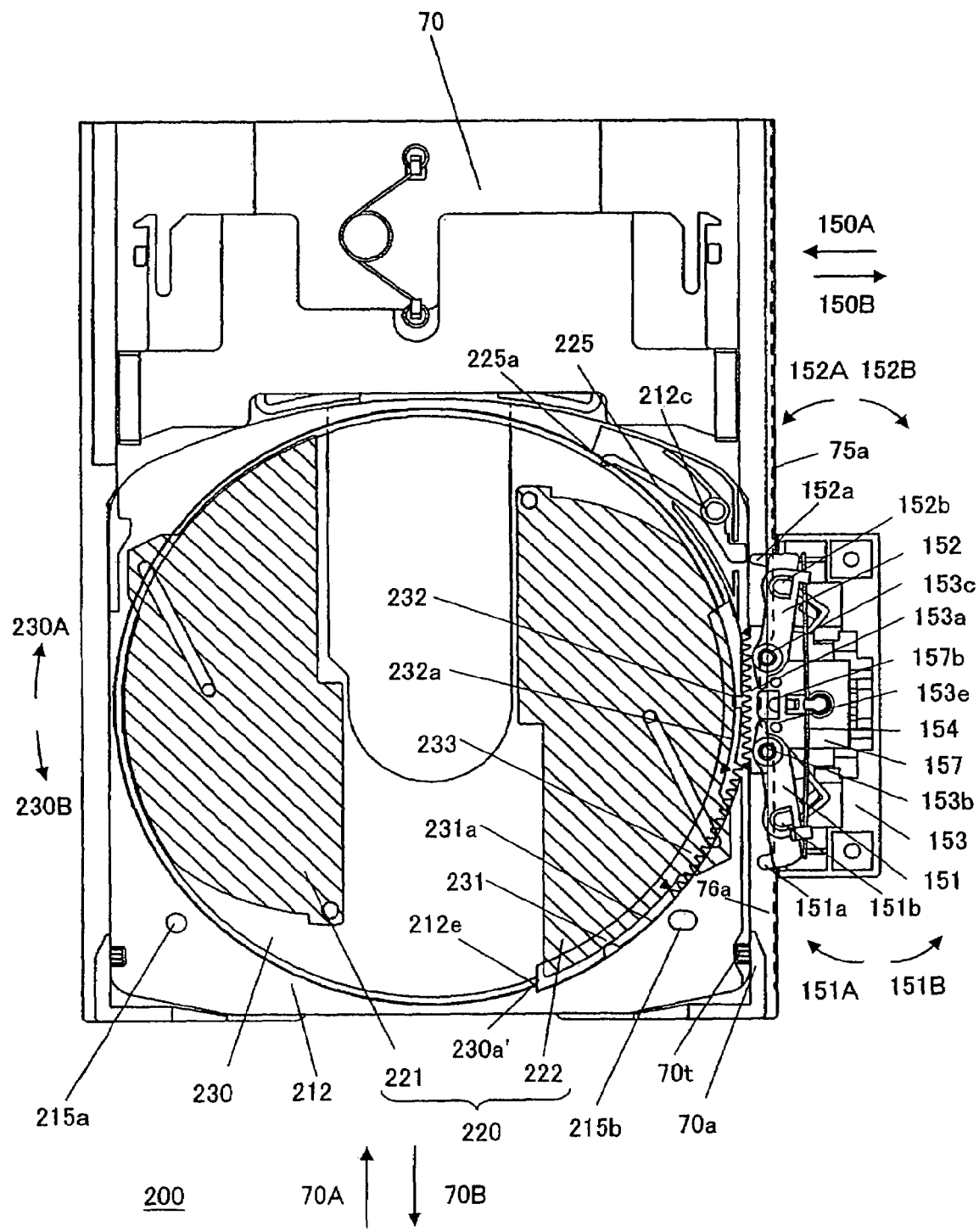
FIG. 49 is a plan view showing a state of the shutter driving mechanism during its opening operation in a situation where the disk cartridge has been inserted into the disk drive with its shutter pair fully opened.

Even if the tray 70 is further inserted in the arrow direction 70A from the position shown in FIG. 48, the gear portion 233 of the rotational member 230 has already been rotated to such a point as not to engage with the rack portion 153a when the shutter pair 220 is fully opened as shown in FIG. 49. Accordingly, the rack portion 153a just slips on the side surface portion 232a of the rotational member 230 and the rotational member 230 does not rotate. Meanwhile, the first driving lever 151 is turned on the rotation shaft 153b in the arrow direction 151B by the guide surface 75a of the cam groove 75 and the fitting portion 151a goes away from the disk cartridge 200.

Figure 50:
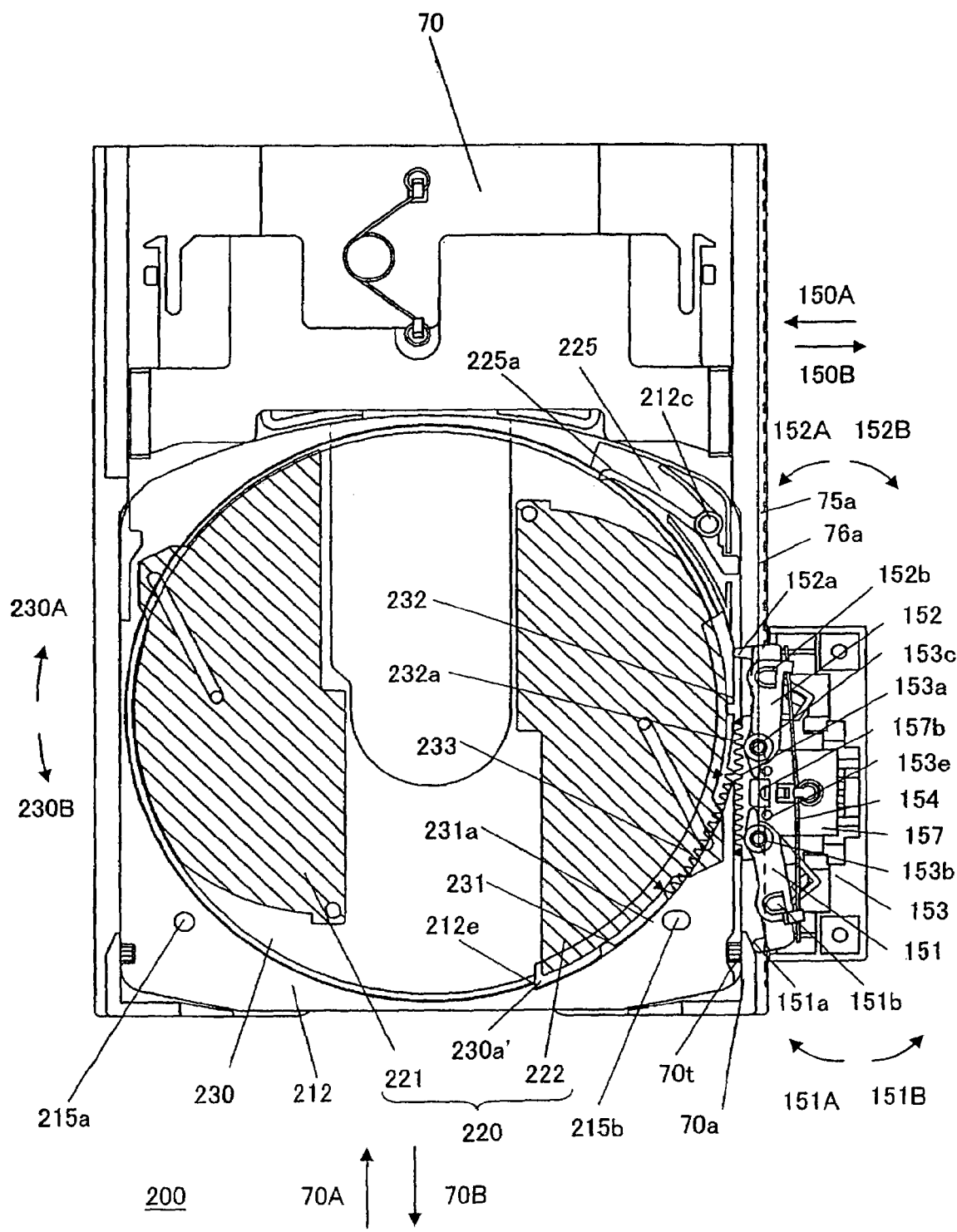
FIG. 50 is a plan view showing a state of the shutter driving mechanism during its opening operation in a situation where the disk cartridge has been inserted into the disk drive with its shutter pair fully opened.

As the tray 70 is inserted even deeper in the arrow direction 70A from the position shown in FIG. 49, the fitting portion 152b of the second driving lever 152 soon contacts with the recessed portion of the guide surface 75a of the cam groove 75 due to the elastic force applied from the spring 154. Thus, the second driving lever 152 turns in the direction pointed by the arrow 152A to make contact with side surface portion 232a of the rotational member 230 as shown in FIG. 50. As the tray 70 is further inserted in the arrow direction 70A, the fitting portion 152a of the second driving lever 152 slides and moves on the side surface portion 232a of the rotational member 230 and gets fitted with the second notched portion 232 as already described with reference to FIG. 39. Thereafter, the error caused by the shape variations of respective members is removed and the shutter pair 220 is fully opened as shown in FIG. 40. In this manner, the shutter driving mechanism 150 finishes its opening operation.

As described above, even if the disk cartridge 200 is mounted on the tray 70 with the shutter pair 220 fully opened and then the tray 70 is loaded into the disk drive 501, the disk cartridge 200 can be loaded into the disk drive 501 without causing any inconvenience and with the shutter pair 220 kept opened.

Finally, it will be described how the shutter driving mechanism 150 operates in closing the shutter pair 220 (i.e., in the situation (D)). The shutter driving mechanism 150 performs the closing operation when the tray 70 is ejected from the disk drive 501. In this preferred embodiment, the closing operation is carried out slightly differently from the opposite procedure to the shutter opening operation to begin in the situation (A) where the shutter pair 220 is fully closed.

FIGS. 40A and 40B illustrate a state of the disk drive 501 in which the shutter pair 220 of the disk cartridge is fully opened and in which the tray 70 is about to be ejected from the disk drive 501. As the drive motor 51 moves the tray 70 in the direction pointed by the arrow 70B from the position shown in FIG. 40A to eject the tray 70, the second driving lever 152 turns in the direction pointed by the arrow 152A under the elastic force applied from the spring 154 and along the guide surface 75a of the cam groove 75 provided for the tray 70. Thus, the fitting portion 152a of the second driving lever 152 contacts with the side surface portion 232a of the rotational member 230. Thereafter, as the tray 70 is further moved forward in the arrow direction 70B, the fitting portion 152a of the second driving lever 152 slides and shifts on the side surface portion 232a of the rotational member 230 and then gets fitted with the second notched portion 232 of the rotational member 230 as shown in FIG. 51.

Figure 51:
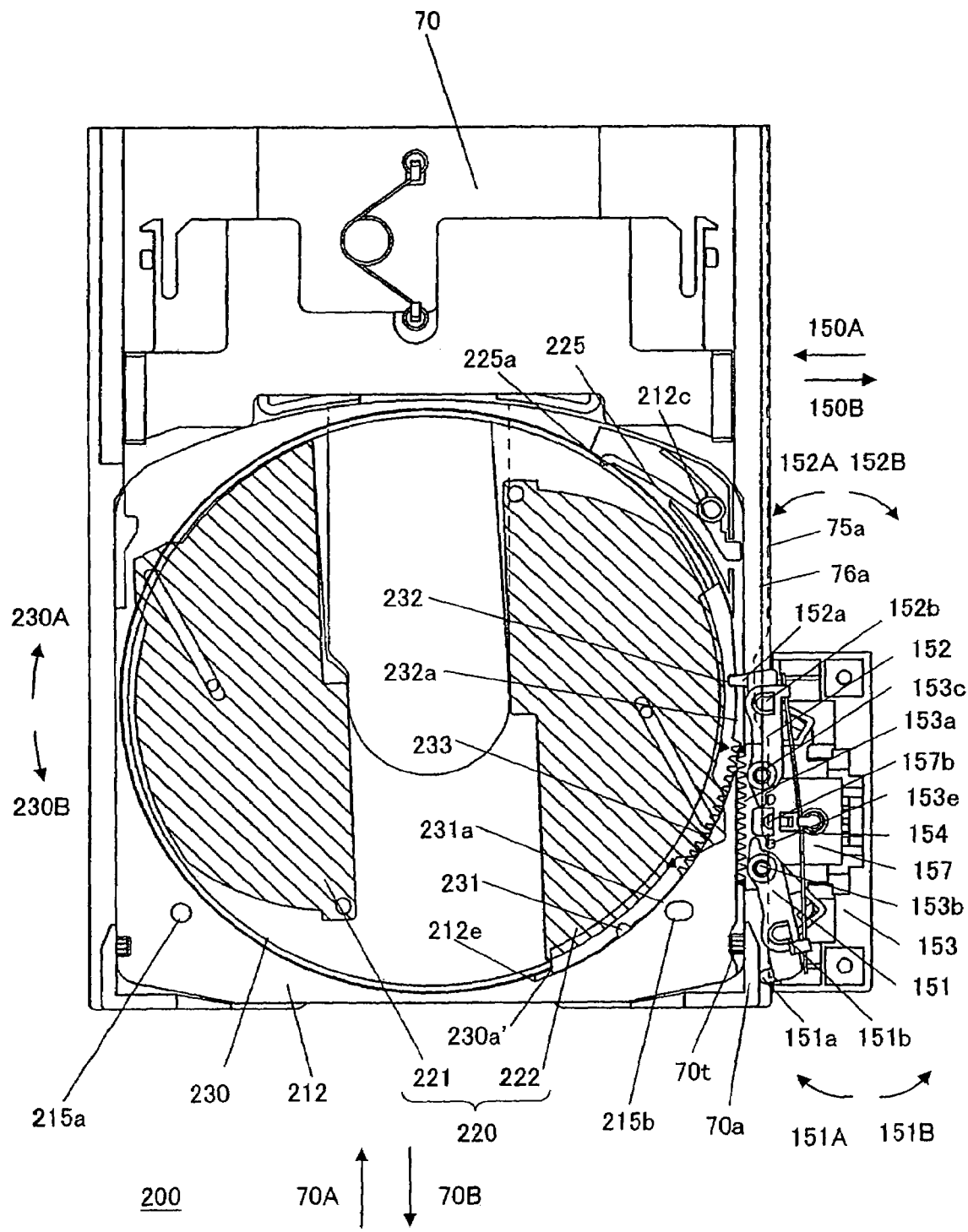
FIG. 51 is a plan view showing a state of the shutter driving mechanism during its closing operation in a situation where the disk cartridge is ejected from the disc drive.

As the tray 70 is further moved forward in the arrow direction 70B from the position shown in FIG. 51, the rotational member 230 is rotated in the direction pointed by the arrow 230B due to the engagement between the fitting portion 152a of the second driving lever 152 and the second notched portion 232. As a result, the shutter pair 220 starts to close its shutters.

Figure 52:
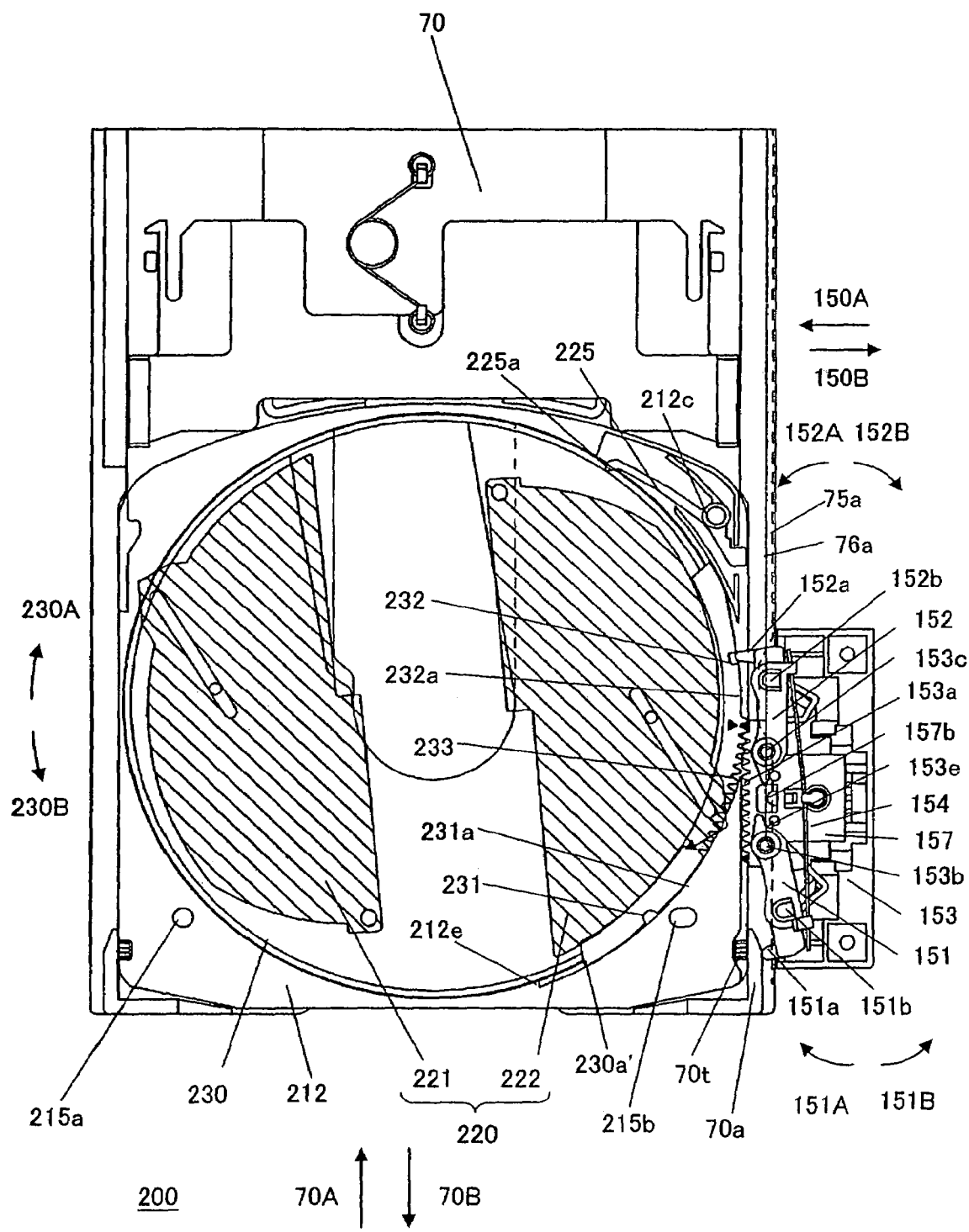
FIG. 52 is a plan view showing a state of the shutter driving mechanism during its closing operation in a situation where the disk cartridge is ejected from the disc drive.

Consequently, the rotational member 230 rotates to a predetermined degree as defined by the relative movement of the tray 70 with respect to the shutter driving mechanism 150 as shown in FIG. 52. Then, before the fitting portion 152a of the second driving lever 152 disengages itself from the second notched portion 232, the rack portion 153a starts engaging with the gear portion 233 of the rotational member 230. And the shutter pair 220 is further closed.

In this case, unlike in opening the shutter pair 220 (see FIG. 38), the rack portion 153a and the gear portion 233 of the rotational member 230 engage with each other such that a tooth of the rack portion 153a located at the far end thereof (i.e., the solid black tooth) engages with a groove of the gear portion 232 located at the far end thereof (i.e., the solid black triangular groove). That is to say, compared with opening the shutter pair 220, the teeth locations have shifted by one.

Figure 53:
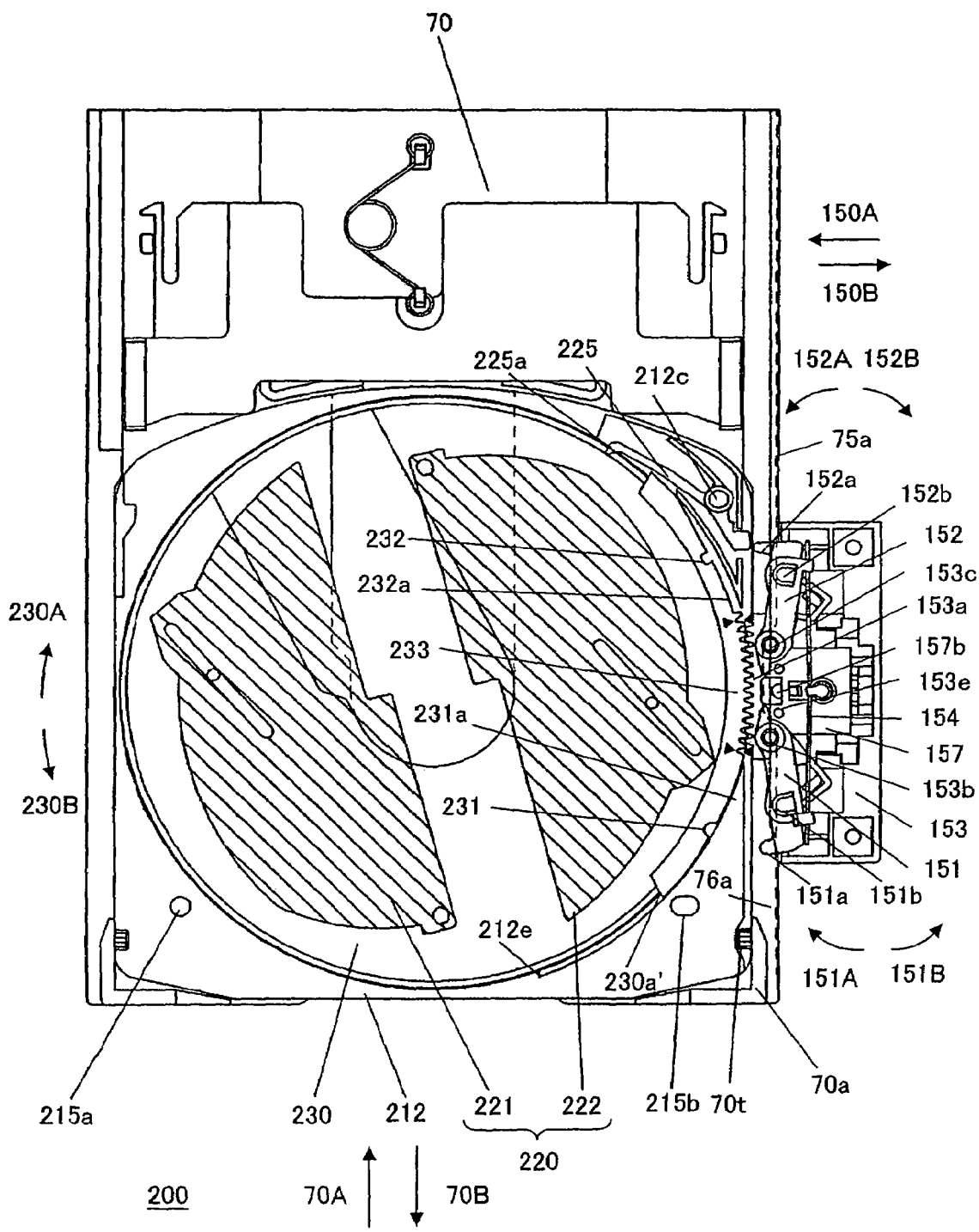
FIG. 53 is a plan view showing a state of the shutter driving mechanism during its closing operation in a situation where the disk cartridge is ejected from the disc drive.
Figure 54:
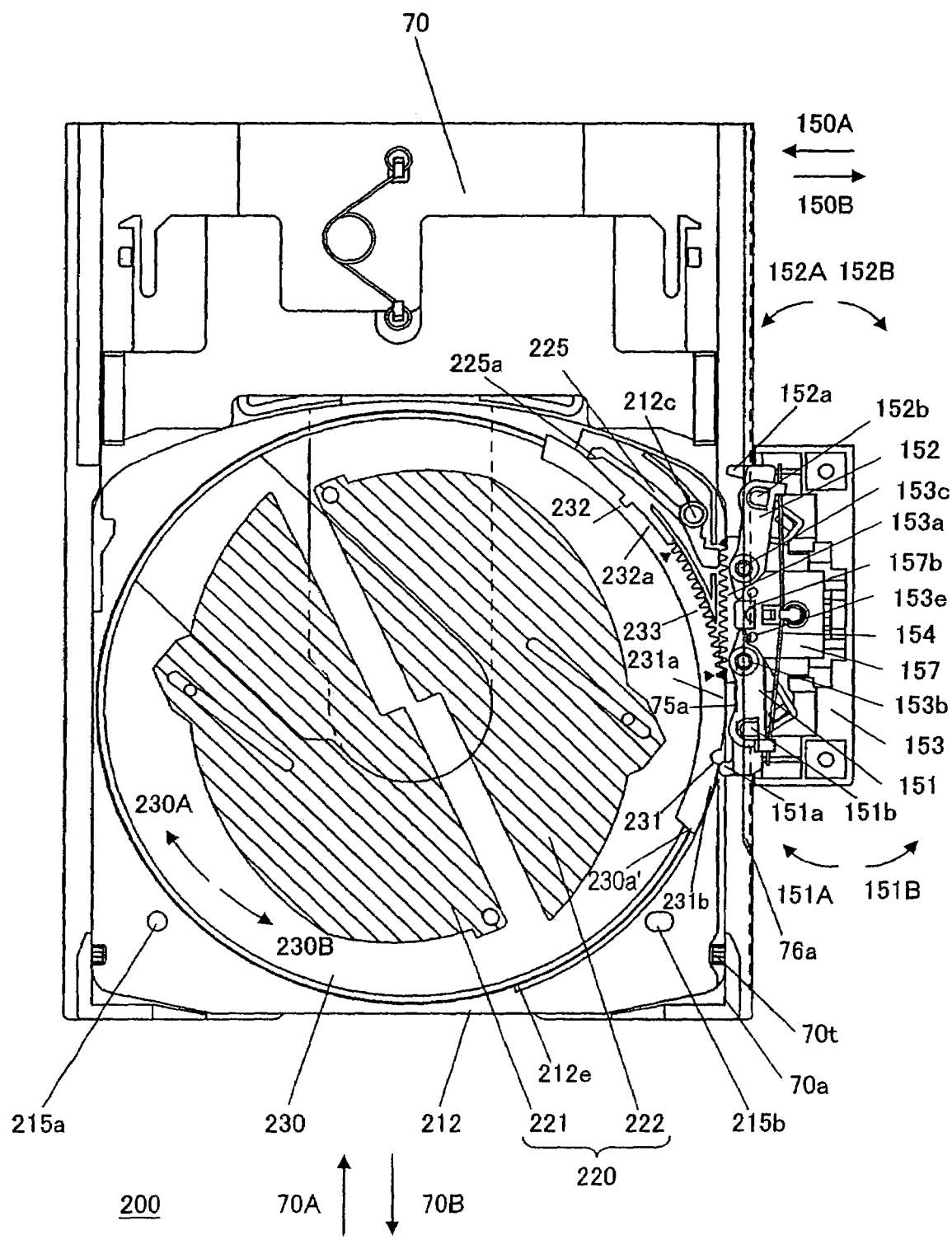
FIG. 54 is a plan view showing a state of the shutter driving mechanism during its closing operation in a situation where the disk cartridge is ejected from the disc drive.

As the tray 70 is further moved forward in the arrow direction 70B from the position shown in FIG. 52, the rotational member 230 further rotates in the arrow direction 230B and the shutter pair 220 is further closed due to the engagement between the rack portion 153a and the gear portion 233 of the rotational member 230 as shown in FIG. 53. At this point in time, being guided by the guide surface 75a of the cam groove 75, the second driving lever 152 turns on the rotation shaft 153c in the direction pointed by the arrow 152B and the fitting portion 152a goes away from the disk cartridge so as to avoid contact with the locking member 225.

As the tray 70 is further moved forward in the arrow direction 70B from the position shown in FIG. 53, the first driving lever 151 turns in the direction pointed by the arrow 151A under the elastic force applied from the spring 154 and along the guide surface 75a of the cam groove 75. Then, the first driving lever 151 soon contacts with the side surface portion 231b of the rotational member 230 (i.e., the side surface portion located between the first notched portion 231 and the stopper portion 230a'). At this point in time, the groove of the gear portion 233 located at the other end thereof (i.e., the solid black triangular groove) engages with the tooth of the rack portion 153a located at the other end thereof (i.e., the solid black tooth) as shown in FIG. 53.

Figure 55:
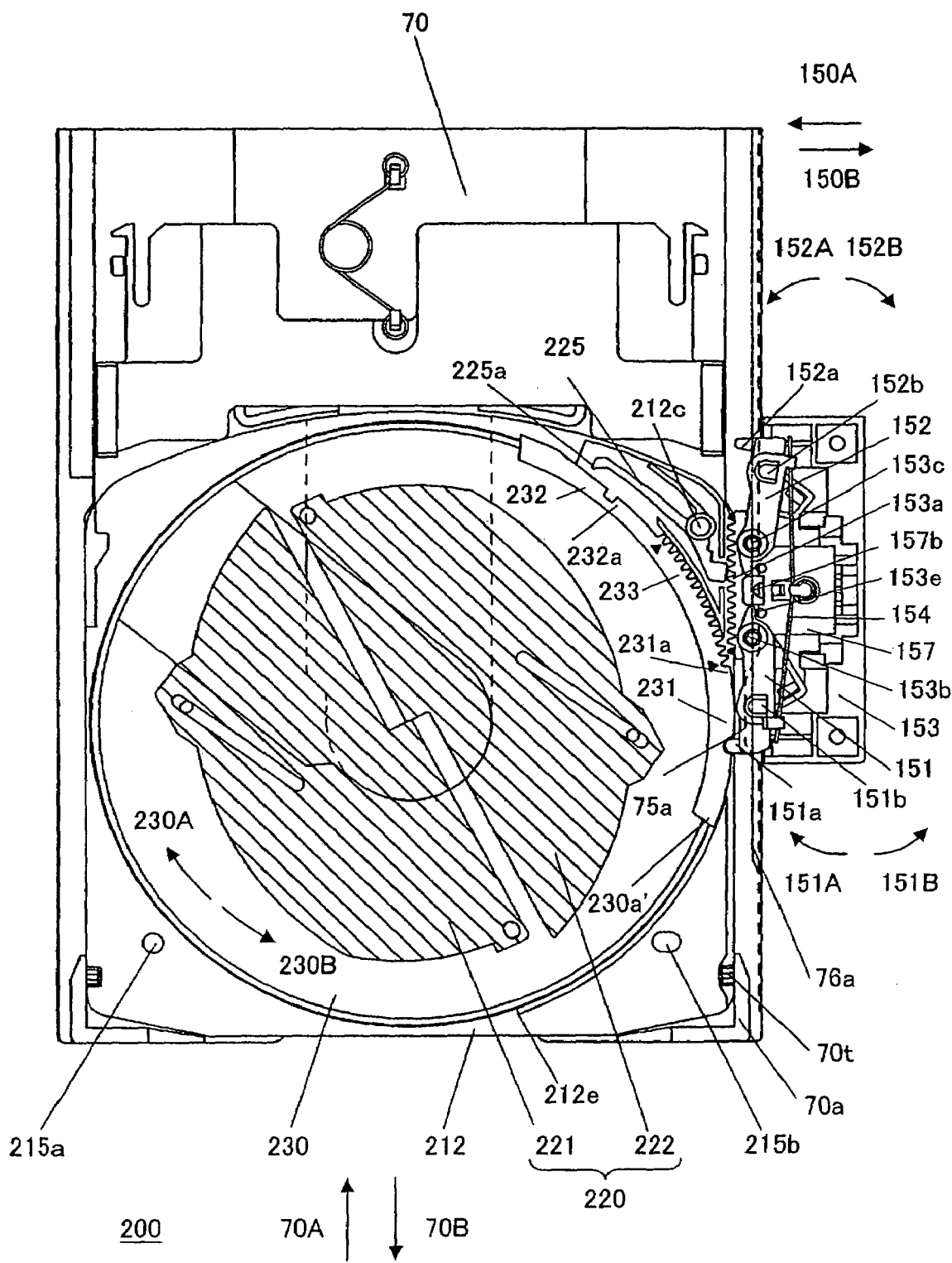
FIG. 55 is a plan view showing a state of the shutter driving mechanism during its closing operation in a situation where the disk cartridge is ejected from the disc drive.

As the tray 70 is further moved forward in the arrow direction 70B, the gear portion 233 and the rack portion 153a disengage from each other and then the fitting portion 151a of the first driving lever 151 gets fitted with the first notched portion of the rotational member 230 as shown in FIG. 55. In this manner, the first notched portion 231 and the fitting portion 151a of the first driving lever 151 can be fitted with each other just as intended and the closing operation can be stabilized. At this point in time, the locking member 225 has been pushed by the rack portion 153a and the rotational member 230 has been unlocked.

As the tray 70 is further moved forward in the arrow direction 70B from the position shown in FIG. 55, the rotational member 230 rotates while closing the shutter pair 220 due to the engagement between the fitting portion 151a of the first driving lever 151 and the first notched portion 231 of the rotational member 230 as shown in FIGS. 35A and 35B. When the shutter pair 220 is closed fully, the rotational member 230 stops its rotation. Also, one end of the locking member 225 gets fitted with the second notched portion 232, thereby locking the rotational member 230 and preventing it from rotating in any direction.

However, considering variations in the shape accuracy of respective members (e.g., imperfect and loose fit between the fitting portion 151a of the first driving lever 151 and the first notched portion 231 of the rotational member 230) and/or the shift of the disk cartridge 200 in the direction pointed by either the arrow 70A or the arrow 70B, the shutters may not have been closed fully at this point in time.

In view of this consideration, the tray 70 is further moved forward in the arrow direction 70B from the position shown in FIG. 55, thereby rotating the rotational member 230 until the first and second shutters 221 and 222 contact with each other closely. Thereafter, the fitting portion 151a of the first driving lever 151 is disengaged from the first notched portion 231 and the first driving lever 151 is turned in the direction pointed by the arrow 151B against the elastic force applied by the spring 154. In this manner, the error caused by the variations in the shape accuracy of respective members is removed.

As the tray 70 is further moved forward in the arrow direction 70B, the fitting portion 151b of the first driving lever 151 contacts with the guide surface 75a of the cam groove 75 provided for the tray 70 and the first driving lever 151 turns on the rotation shaft 153b in the direction pointed by the arrow 151B as shown in FIG. 34. As a result, the fitting portion 151a goes away from the disk cartridge 200 so as to avoid contact with the locking member 225.

When the tray 70 is further moved forward in the arrow direction 70B from the position shown in FIG. 34, the fitting portions 151b and 152b of the first and second driving levers 151 and 152 contact with the guide surface 75a of the cam groove 75 as shown in FIG. 33. Then, the first and second driving levers 151 and 152 turn in the arrow directions 151B and 152B, respectively, so as to avoid contact with the locking member 225. While the first and second driving levers 151 and 152 keep these angles of rotation, the operation of ejecting the tray 70 is finished and the closing operation of the shutter driving mechanism 150 is finished, too.

However, when the member interlocking with the rotational member 230 switches from the second driving lever 152 into the rack portion 153a during this closing operation, some teeth of the rack portion 153a may remain unengaged as mentioned above according to the degree of shape error caused by the machining accuracy of the rotational member 230 of the disk cartridge 200 or that of respective members of the shutter driving mechanism 150. Thus, it will be described what if the tooth of the rack portion 153a that engages with the gear portion 233 of the rotational member 230 first has shifted from the designed tooth by one back and forth.

Figure 56:
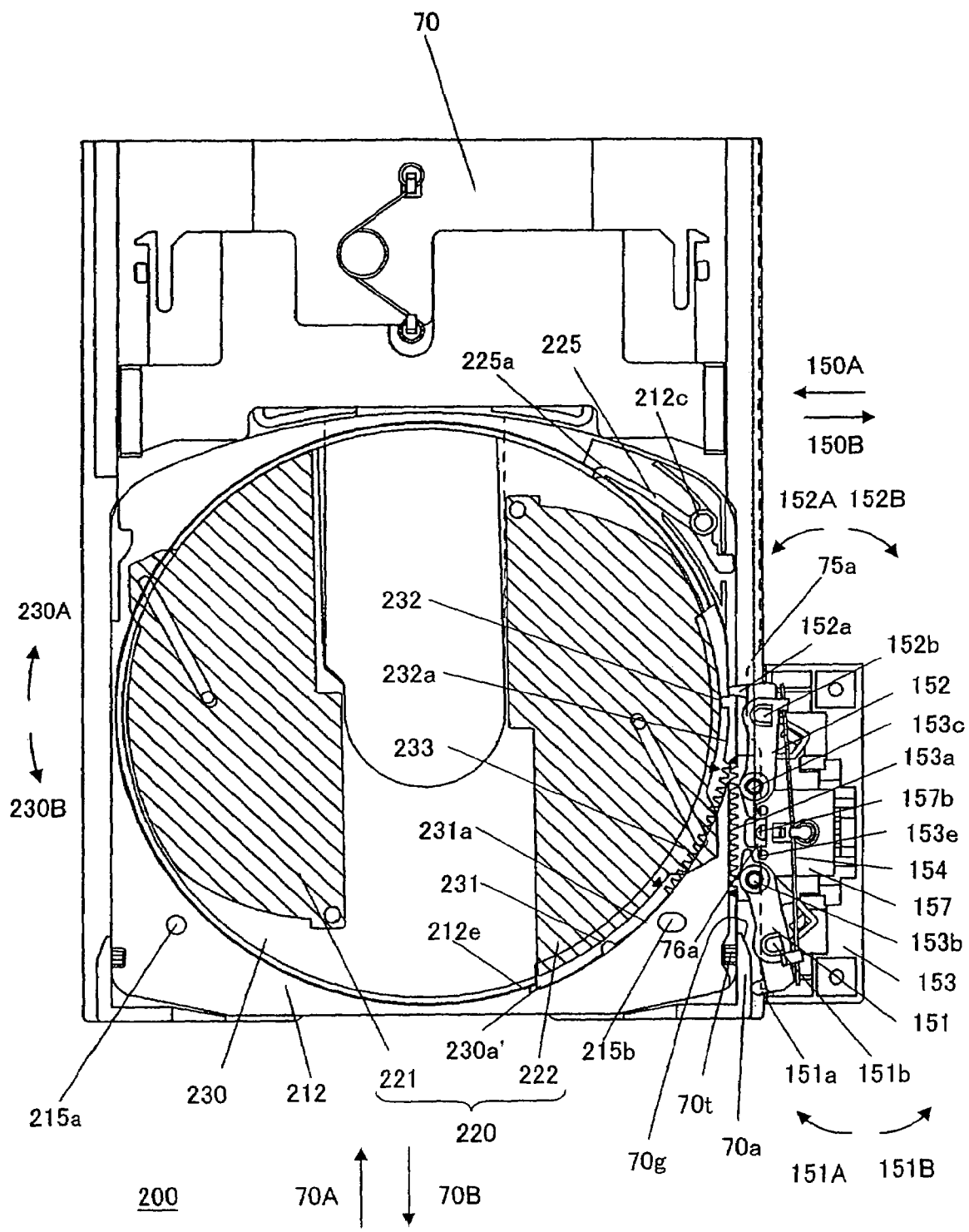
FIG. 56 is a plan view showing a state of the shutter driving mechanism during its closing operation in a situation where the disk cartridge is ejected from the disc drive.
Figure 57:
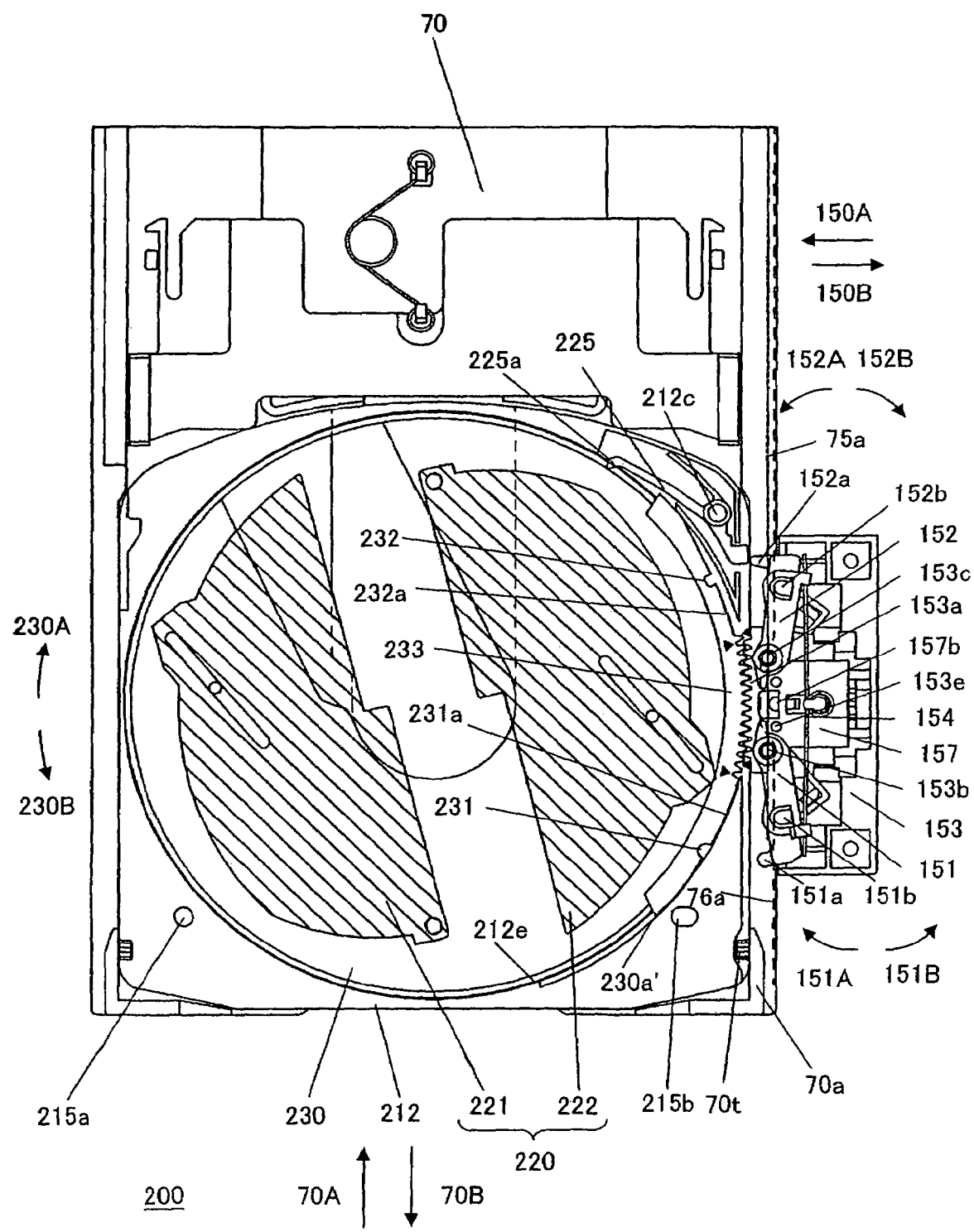
FIG. 57 is a plan view showing a state of the shutter driving mechanism during its closing operation in a situation where the disk cartridge is ejected from the disc drive.

As shown in FIG. 56, if the second last tooth of the rack portion 153a of the shutter driving mechanism 150, not the far end tooth thereof, engages with the far end groove of the gear portion 233 of the rotational member 230 of the disk cartridge 200, then the engagement between the gear portion 233 and the rack portion 153a is delayed by one tooth as compared with the regular engagement described above. Accordingly, as shown in FIG. 57, when the gear portion 233 has engaged with the rack portion 153a, no tooth of the rack portion 153a will be left for the last groove of the gear portion 233.

Figure 58:
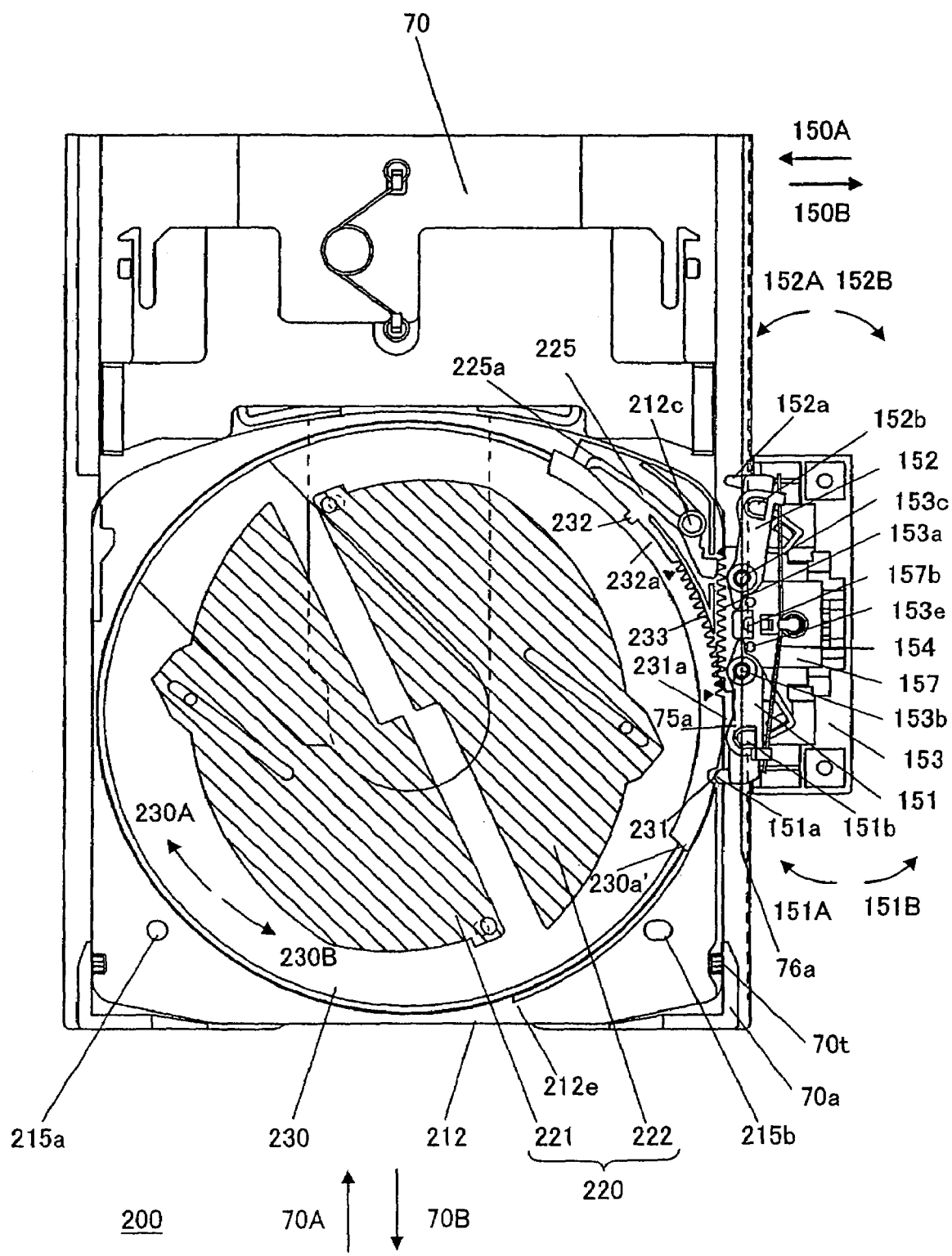
FIG. 58 is a plan view showing a state of the shutter driving mechanism during its closing operation in a situation where the disk cartridge is ejected from the disc drive.

However, the pitch L3 between the end of the gear portion 233 of the rotational member 230 and the first notched portion 231 is one tooth shorter than the pitch L2 between the fitting portion 151a of the first driving lever 151 and the far end tooth of the rack portion 153a as shown in FIG. 32. Thus, as in the first preferred embodiment described above, before the rack portion 153a is disengaged from the gear portion 233, the fitting portion 151a of the first driving lever 151 can be fitted with the first notched portion 231 as shown in FIG. 58. As a result, the closing operation can be completed successfully. It should be noted that if there is an excessively heavy load on the shutter pair 220 or if the error of some member is significant, then the fitting portion 151a of the first driving lever 151 may disengage from the first notched portion 231 and the closing operation may be incomplete. Even so, the tray transporting operation will never come to a halt.

Figure 59:
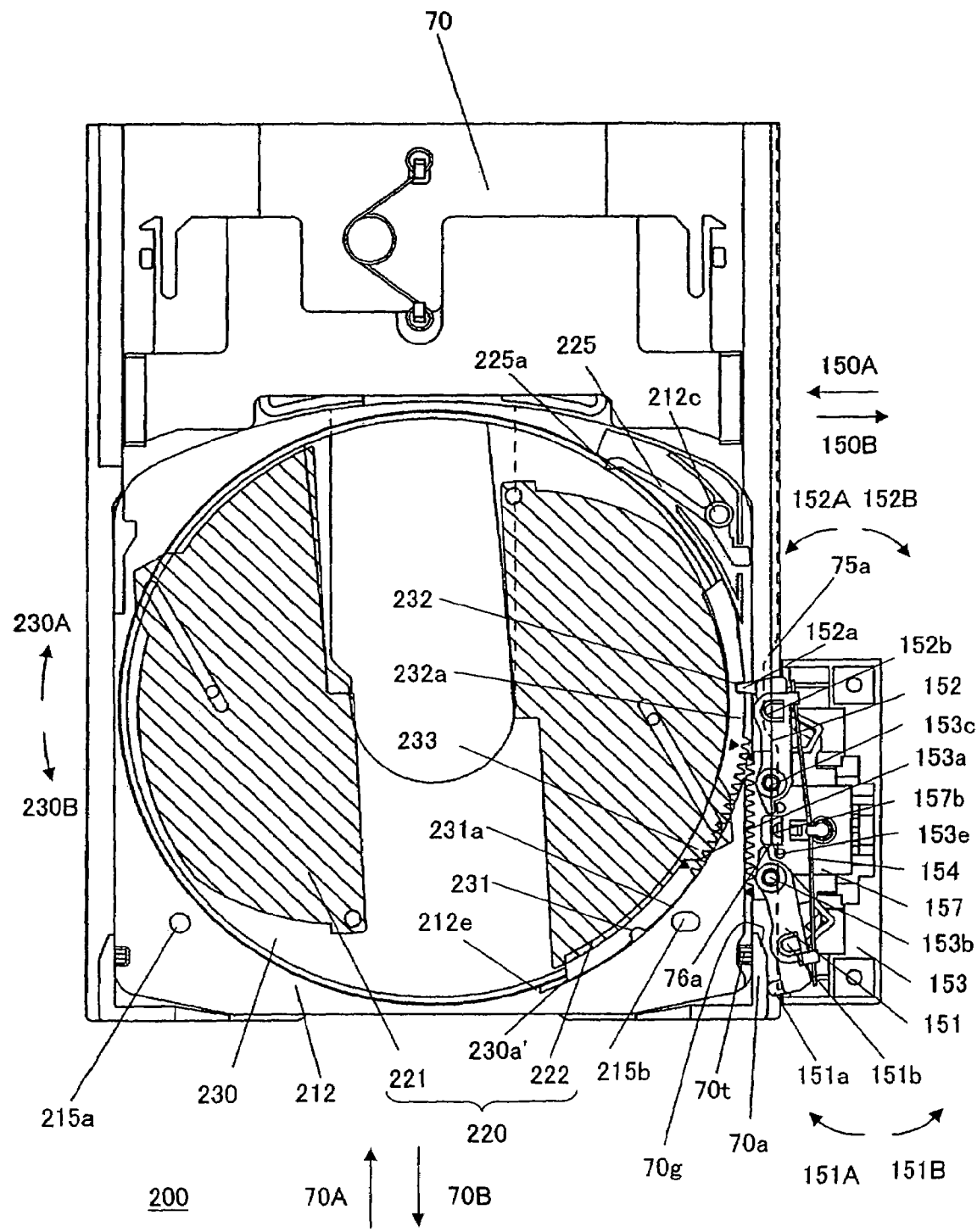
FIG. 59 is a plan view showing a state of the shutter driving mechanism during its closing operation in a situation where the disk cartridge is ejected from the disc drive.
Figure 60:
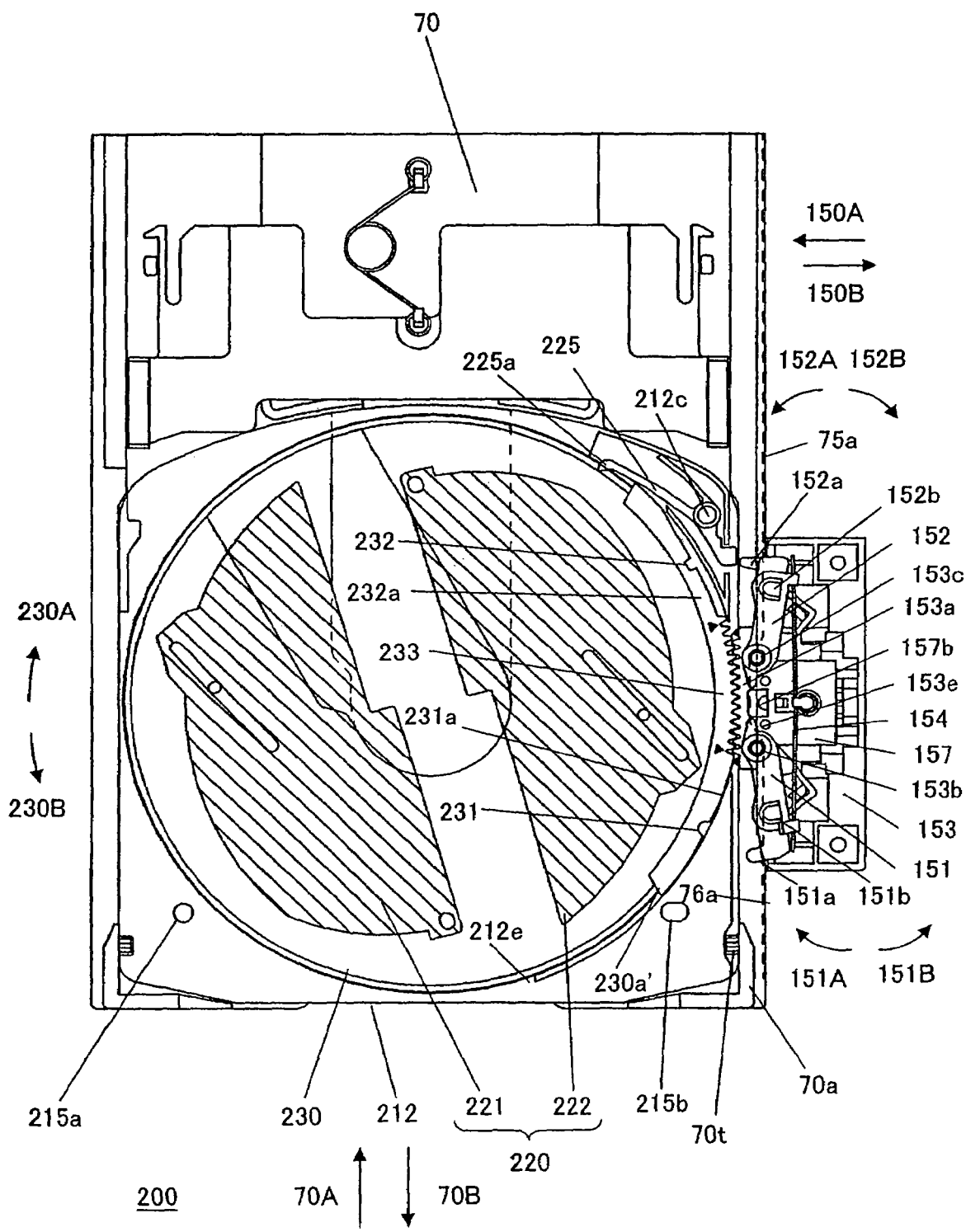
FIG. 60 is a plan view showing a state of the shutter driving mechanism during its closing operation in a situation where the disk cartridge is ejected from the disc drive.
Figure 61:
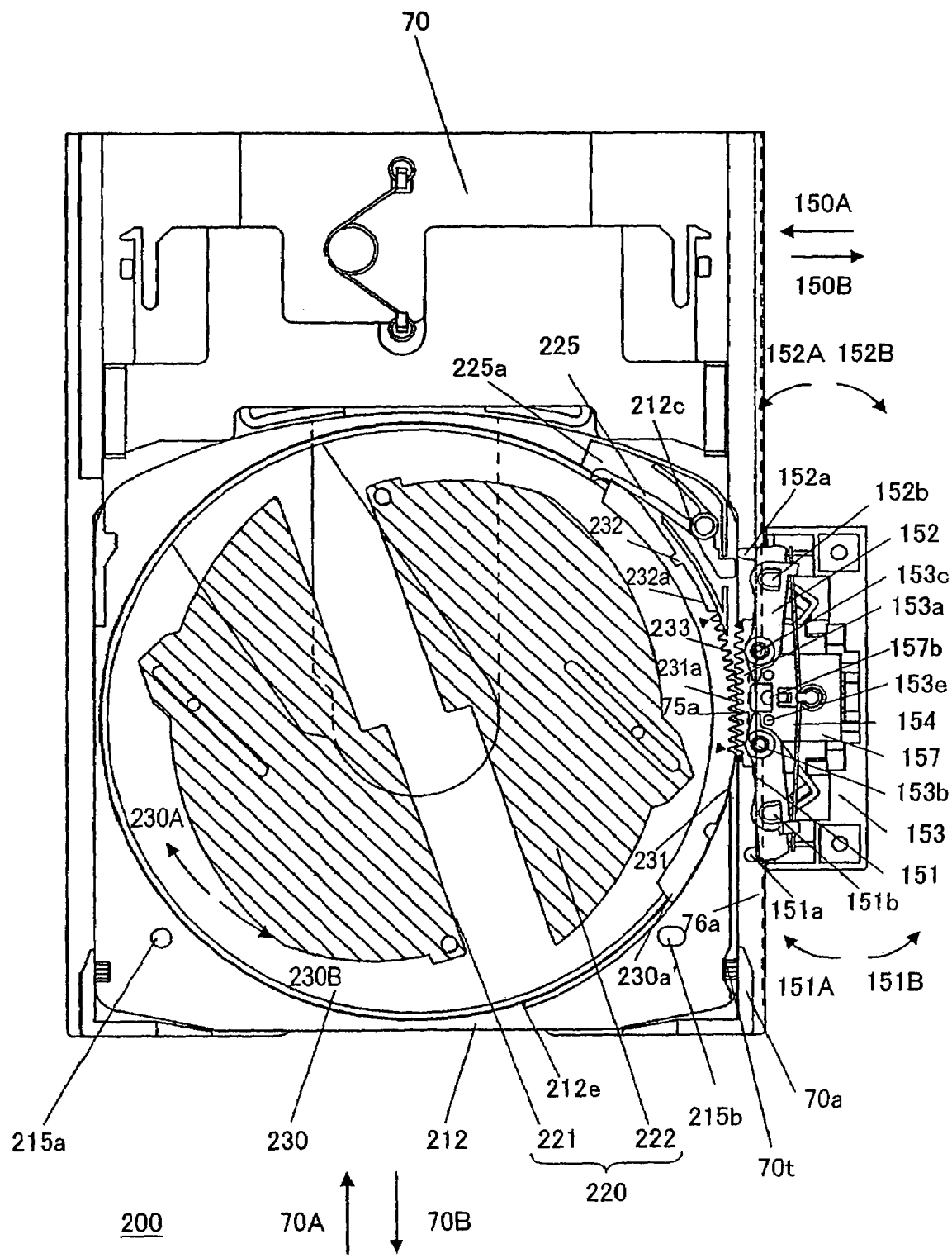
FIG. 61 is a plan view showing a state of the shutter driving mechanism during its closing operation in a situation where the disk cartridge is ejected from the disc drive.

On the other hand, if the far end of the rack portion 153a of the shutter driving mechanism 150 engages with the gear portion 233 of the rotational member 230 of the disk cartridge 200 one tooth ahead as shown in FIG. 59, then the engagement between the gear portion 233 and the rack portion 153a advances by one tooth as compared with the regular engagement. Accordingly, the rotational member 230 has no groove for the last tooth of the rack portion 153a and that tooth lands on the rotational member 230 as shown in FIG. 60. However, since the rack portion 153a is movable in the arrow direction 150B with respect to the opening/closing base 153, the tooth that has landed on the gear portion 233 of the rotational member 230 is disengaged and then only the shutter driving mechanism 150 advances by one tooth. As a result, the rack can be disengaged and returned to the regular engagement position and the closing operation can be performed normally.

Figure 62A:
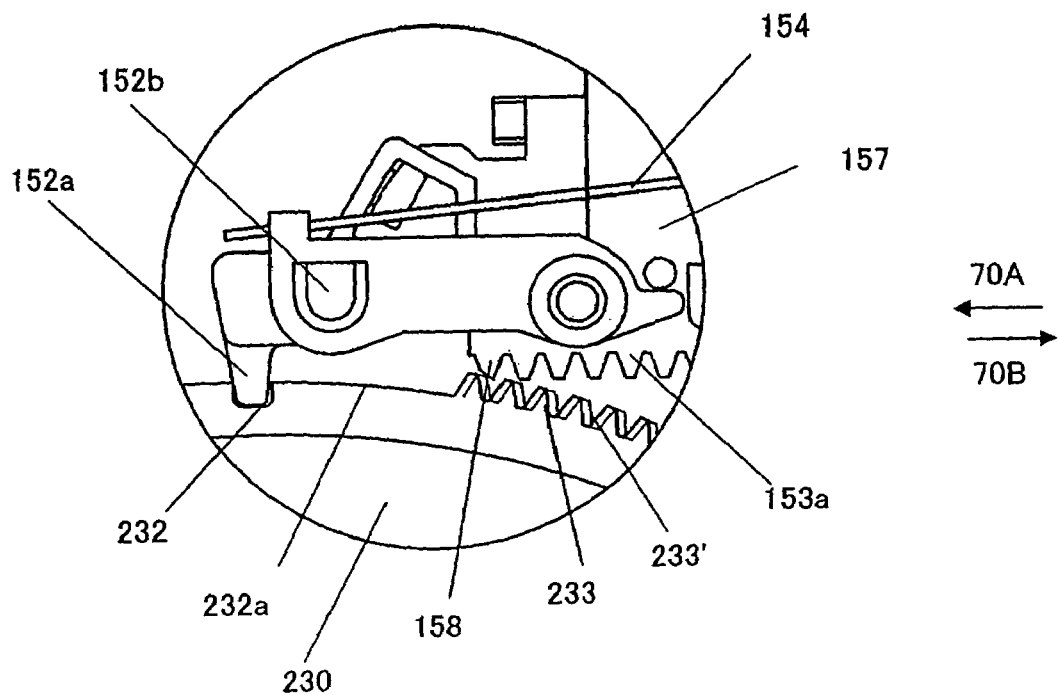
FIGS. 62A and 62B illustrate how the rack portion of the shutter driving mechanism and the gear portion of the rotational member of the disk cartridge engage with each other.

Thus, according to this preferred embodiment, even if the rack portion 153a of the shutter driving mechanism and the gear portion 233 provided for the rotational member 230 of the cartridge engage with each other either at a second position, which is one tooth ahead of a regular, first position, or at a third position, which is one tooth behind the first position, the shutters can still be closed just as intended. However, if such a non-designed operation is performed, normally an excessive load will be placed on the shutter driving mechanism or the cartridge, which is not beneficial. For that reason, the tooth 158 of the rack portion 153a, which is closest to the second driving lever 152, is preferably chamfered so as to engage with the gear portion 233 of the rotational member 230 at a predetermined point as shown in FIG. 62A. Also, even if the gear portion 233 of the rotational member has shifted to the position 233' with respect to the rack portion 153a due to the shape error caused by the machining accuracy of the rotational member 230 of the disk cartridge 200 or that of some member of the shutter driving mechanism 150, the engagement error can also be removed by chamfering the teeth of the rack portion 153a. As a result, it is possible to prevent the engagement between the gear portion 233 and the rack portion 153a from being delayed from the regular engagement.

Figure 62B:
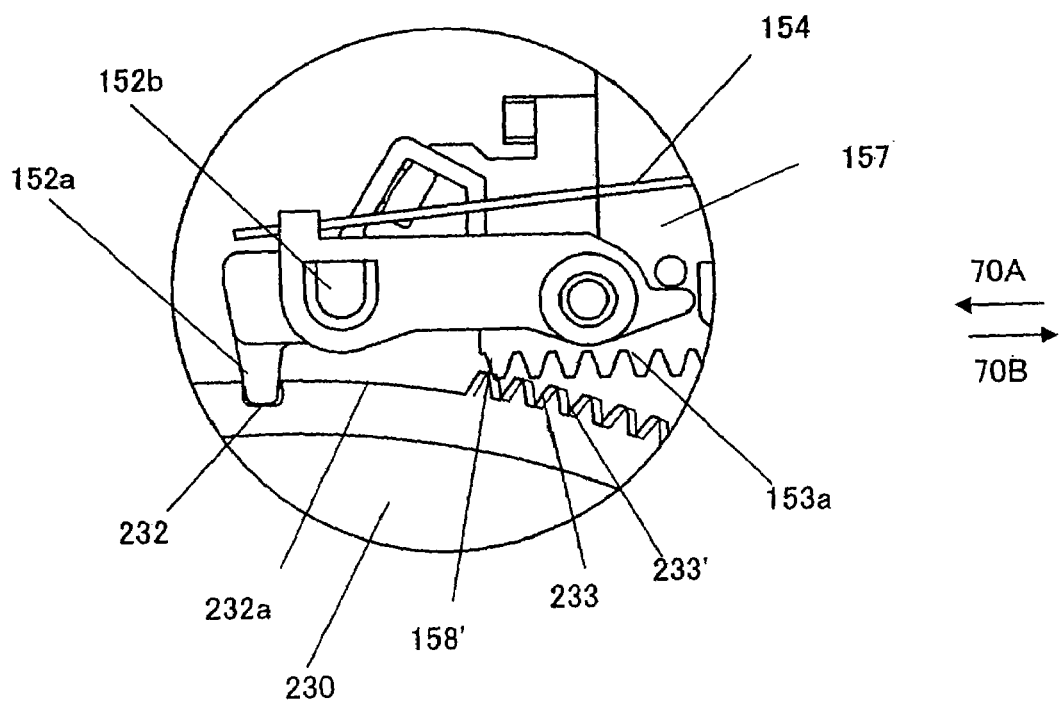

On the other hand, if there is a non-chamfered tooth 158' at the end of the rack portion 153a and if the gear portion 233 has shifted to the position 233' as shown in FIG. 62B, then the tooth of the gear portion 233 and that of the rack portion 153a will contact with each other but cannot engage with each other well at their regular position. Consequently, engagement error is likely to arise.

As can be easily seen from the foregoing description, in this preferred embodiment, a rack member for supporting the first and second driving levers is provided so as to be movable with respect to the base and the rack portion is driven with a cam groove provided for the tray as a cartridge transporting member. Thus, after the shutters of the cartridge have been opened, the rack portion can be driven by the cam groove of the tray away from the side surface of the cartridge and the rack portion and the first and second driving levers of the shutter driving mechanism can be separated from the rotational member of the cartridge. Accordingly, while the cartridge is being positioned with the positioning pins provided for the traverse base after the shutters have been opened, it is possible to prevent the shutter driving mechanism from interfering with the positioning.

Also, by setting the pitch between one fitting portion of the first driving lever and the rack portion longer by one tooth than the pitch between the first notch and the gear portion, the errors due to the tray operations and the shutter outer shape can be removed and the shutters can be opened and closed just as intended.

In the first and second preferred embodiments described above, the disk drive is adapted to a disk cartridge that includes the rotational member 230 and that opens and closes its shutters by rotating the rotational member. However, the disk drive may be adapted to not only such a disk cartridge but also any other type of disk cartridge as well.

Furthermore, in the first and second preferred embodiments described above, the incompletely opened position of the shutter pair in the disk cartridge is just an example. Thus, even if the shutters of a given disk cartridge are in any other non-illustrated position (e.g., even if its shutter pair is just slightly opened or almost fully opened), the disk drive of the present invention can also open the shutter pair just as intended and be loaded with the disk cartridge as already described for those preferred embodiments.

INDUSTRIAL APPLICABILITY

A disk drive according to the present invention is adapted to a disk cartridge, which opens and closes its shutters by rotating its rotational member, and drives first and second driving levers, which respectively fit with the first and second notched portions of the rotational member, thereby eliminating jam on the side surface of the cartridge or damage that could be done on the levers or on the disk cartridge due to repetitive movement and improving the reliability of the driving mechanism.

In addition, while the disk cartridge is going to be held by, or mounted on, a disk cartridge transporting member by driving the first and second driving levers, the guide wall can be provided to regulate the position of the disk cartridge. As a result, the cartridge can be positioned more accurately within the cartridge transporting member and the shutter opening/closing operation can be carried out with good stability.

Furthermore, while the disk cartridge is being positioned by driving the first and second driving levers, the elastic force being applied to the disk cartridge can be removed and the cartridge can be positioned with good stability.

The disk drive of the present invention is adapted to a disk cartridge that opens and closes its shutters by rotating its rotational member, and contributes to opening and closing the shutters of the disk cartridge with good stability and much more certainty by using a simple arrangement. The applicability of this disk drive never depends on the storage method of a given disk. Thus, the present invention can also be effectively applicable to a disk drive adapted to a cartridge that can store not just an optical disk but also a magnetic disk, magneto-optical disk or a disk of any other storage type and that has the structure described above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A disk drive adapted for use with a disk cartridge,
the disk cartridge comprising: a disk; a body to store the disk therein; a window, which is provided for the body to allow a head to access the disk to read and/or write data from/on the disk; a shutter for opening or shutting the window; and a rotational member, which includes a gear portion and first and second notched portions to sandwich the gear portion and which interlocks with the shutter,
wherein the disk drive comprises:
a motor for spinning the disk;
a transporting portion for holding and transporting the disk cartridge between a position where the motor is ready to spin the disk and a position where the disk cartridge is loaded into, or unloaded from, the disk drive;

the head for reading and/or writing the data; and a shutter driving mechanism, which includes a rack portion that engages with the gear portion, and first and second driving levers that are supported to fit into, and turn with, the first and second notched portions, respectively, wherein the transporting portion includes a first cam structure for driving the first and second driving levers of the shutter driving mechanism such that the first and second driving levers swing as the transporting portion moves, and wherein as the transporting portion moves, the first and second notched portions and the gear portion of the disk cartridge held on the transporting portion get engaged with the shutter driving mechanism, which then rotates the rotational member so as to open or close the shutter.

2. The disk drive of claim 1, wherein the first and second driving levers are supported in rotatable positions on the rack portion.

3. The disk drive of claim 1, wherein the first and second driving levers include fitting portions to fit into the first and second notched portions, respectively, and wherein the shutter driving mechanism includes a first force applying structure for applying elastic force to the first and second driving levers such that the fitting portions of the first and second driving levers are pressed toward the transporting portion.

4. The disk drive of claim 3, wherein the shutter driving mechanism further includes: a base portion for supporting the rack portion such that the rack portion is movable perpendicularly to the direction in which the transporting portion is transported; and a second force applying structure for applying an elastic force to the rack portion toward the transporting portion.

5. The disk drive of claim 4, wherein the transporting portion includes a second cam structure for driving the rack portion perpendicularly to the transporting direction.

6. The disk drive of claim 5, wherein the transporting portion has a side surface that is opposed to the shutter driving mechanism and that includes the first and second cam structures thereon.

7. The disk drive of claim 6, wherein the first cam structure has a first guide surface that contacts with the first and second driving levers.

8. The disk drive of claim 7, wherein the second cam structure has a second guide surface that contacts with the rack portion.

9. The disk drive of claim 8, wherein the first and second guide surfaces are provided parallel to each other on the side surface of the transporting portion.

10. The disk drive of claim 5, wherein the first cam structure drives the first and second driving levers, and the second cam structure drives the rack portion, such that as the transporting portion is going to load the disk cartridge into the disk drive, the first driving lever, the rack portion and the second driving lever contact with the rotational member of the disk cartridge in this order.

11. The disk drive of claim 10, wherein while the transporting portion is unloading the disk cartridge from the disk drive, the rack portion is able to engage with the gear portion at least in first and second positions, and wherein no matter whether the rack portion has engaged with the gear portion in the first position or the second position, the shutter is closable.

12. The disk drive of claim 4, wherein the shutter driving mechanism includes a guide rib for guiding the transporting portion.

13. The disk drive of claim 12, wherein the guide rib is provided for the rack portion.

14. The disk drive of claim 12, wherein the guide rib is provided for the base portion.

15. The disk drive of claim 4, wherein the force applied by the second force applying structure is greater than that applied by the first force applying structure.

16. The disk drive of claim 3, wherein the first cam structure drives the first and second driving levers such that the fitting portions of the first and second driving levers fit with only the first and second notched portions without contacting with any other portion of the side surface of the disk cartridge.

17. The disk drive of claim 3, wherein a pitch as measured from the first notched portion of the rotational member to either a tooth or a groove, which is located at one end of the gear portion closest to the first notched portion, is equal to a pitch as measured from the fitting portion of the first driving lever to either a groove or a tooth, which is located at one end of the rack portion closest to the first driving lever.

18. The disk drive of claim 3, wherein a pitch as measured from the second notched portion of the rotational member to either a tooth or a groove, which is located at one end of the gear portion closest to the second notched portion, is equal to a pitch as measured from the fitting portion of the second driving lever to either a groove or a tooth, which is located at one end of the rack portion closest to the second driving lever.

19. The disk drive of claim 3, wherein a pitch as measured from the second notched portion of the rotational member to either a tooth or a groove, which is located at one end of the gear portion closest to the second notched portion, is longer by one tooth than a pitch as measured from the fitting portion of the second driving lever to either a groove or a tooth, which is located at one end of the rack portion closest to the second driving lever.

20. The disk drive of claim 1, wherein the transporting portion has a guide wall for holding the disk cartridge at a predetermined position.

21. The disk drive of claim 1, wherein the first and second driving levers are arranged in the shutter driving mechanism, and one tooth of the rack portion, which is located closest to the second driving lever, is chamfered, such that as the shutter of the disk cartridge is going to be closed, the second driving lever gets interlocked with the rotational member of the disk cartridge earlier than the first driving lever.

22. The disk drive of claim 1, wherein the first cam structure drives the first and second driving levers such that as the transporting portion is going to load the disk cartridge into the disk drive, the first driving lever, the rack portion and the second driving lever contact with the rotational member of the disk cartridge in this order.

23. The disk drive of claim 1, wherein after the shutter of the disk cartridge has been opened, the first and second driving levers are driven so as to avoid contact with the disk cartridge.

24. The disk drive of claim 23, wherein after the shutter of the disk cartridge has been opened, the rack portion is driven so as to avoid contact with the disk cartridge.

25. The disk drive of claim 1, wherein after the shutter of the disk cartridge has been either opened or closed, the transporting portion moves a predetermined distance.

26. The disk drive of claim 1, wherein the transporting portion has a recess on which another disk cartridge, having a different shape from that of the disk cartridge, is mountable.

27. The disk drive of claim 1, wherein the disk cartridge includes a locking member for keeping the rotational member from rotating, and wherein the first cam structure drives the first and second driving levers such that the first and second driving levers avoid contact with the locking member.

* * * * *